United States Patent [19]
Burnett et al.

[11] Patent Number: 5,444,702
[45] Date of Patent: Aug. 22, 1995

[54] VIRTUAL NETWORK USING ASYNCHRONOUS TRANSFER MODE

[75] Inventors: John L. Burnett, Cupertino; Peter Newman, Mountain View, both of Calif.

[73] Assignee: Network Equipment Technologies, Inc., Redwood City, Calif.

[21] Appl. No.: 944,682

[22] Filed: Sep. 14, 1992

[51] Int. Cl.⁶ ................................................ H04J 3/26
[52] U.S. Cl. ................................ 370/60.1; 370/94.3
[58] Field of Search .................. 370/94.1, 94.2, 60, 370/60.1, 85.13, 85.14, 58.1, 58.2, 58.3, 94.3, 92, 110.1; 340/825.52

[56] References Cited

U.S. PATENT DOCUMENTS

| | | | |
|---|---|---|---|
| 5,062,106 | 10/1991 | Yamazaki et al. | 370/60 |
| 5,067,123 | 11/1991 | Hyodo et al. | 370/58.1 |
| 5,079,762 | 1/1992 | Tanabe | 370/60 |
| 5,101,404 | 3/1992 | Kunimoto et al. | 370/60 |
| 5,136,580 | 8/1992 | Videlock et al. | 370/60 |
| 5,140,585 | 8/1992 | Tomikawa | 370/60.1 |
| 5,202,885 | 4/1993 | Schrodi et al. | 370/94.1 |
| 5,204,857 | 4/1993 | Obara | 370/94.1 |
| 5,280,476 | 1/1994 | Kojima et al. | 370/60.1 |
| 5,287,535 | 2/1994 | Sakagawa et al. | 370/60 |

Primary Examiner—Douglas W. Olms
Assistant Examiner—Chau T. Nguyen
Attorney, Agent, or Firm—Fliesler, Dubb, Meyer and Lovejoy

[57] ABSTRACT

Asynchronous Transfer Mode Local Area Network (ATM LAN). The ATM LAN is implemented as a set of MAC entities which share a common group address space for the purposes of establishing multicast connections. Each station has one or more ATM MAC entities per physical connection to an ATM network. The network ATM LAN service provides the station with ATM LAN configuration information needed for ATM MAC operation. Included in this information is the number of ATM LANs the network has configured for that station.

32 Claims, 6 Drawing Sheets

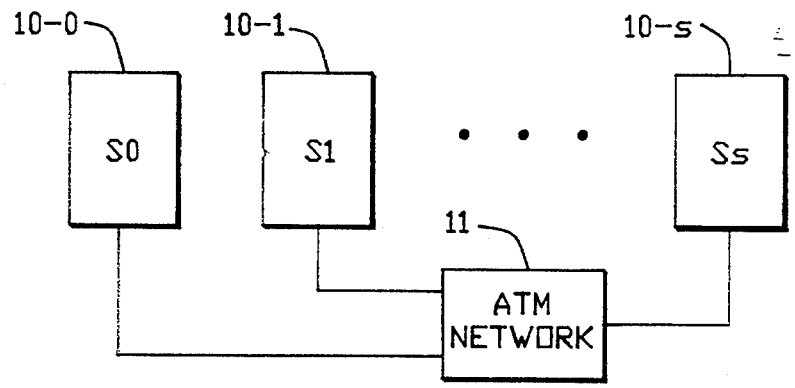
FIG.—1
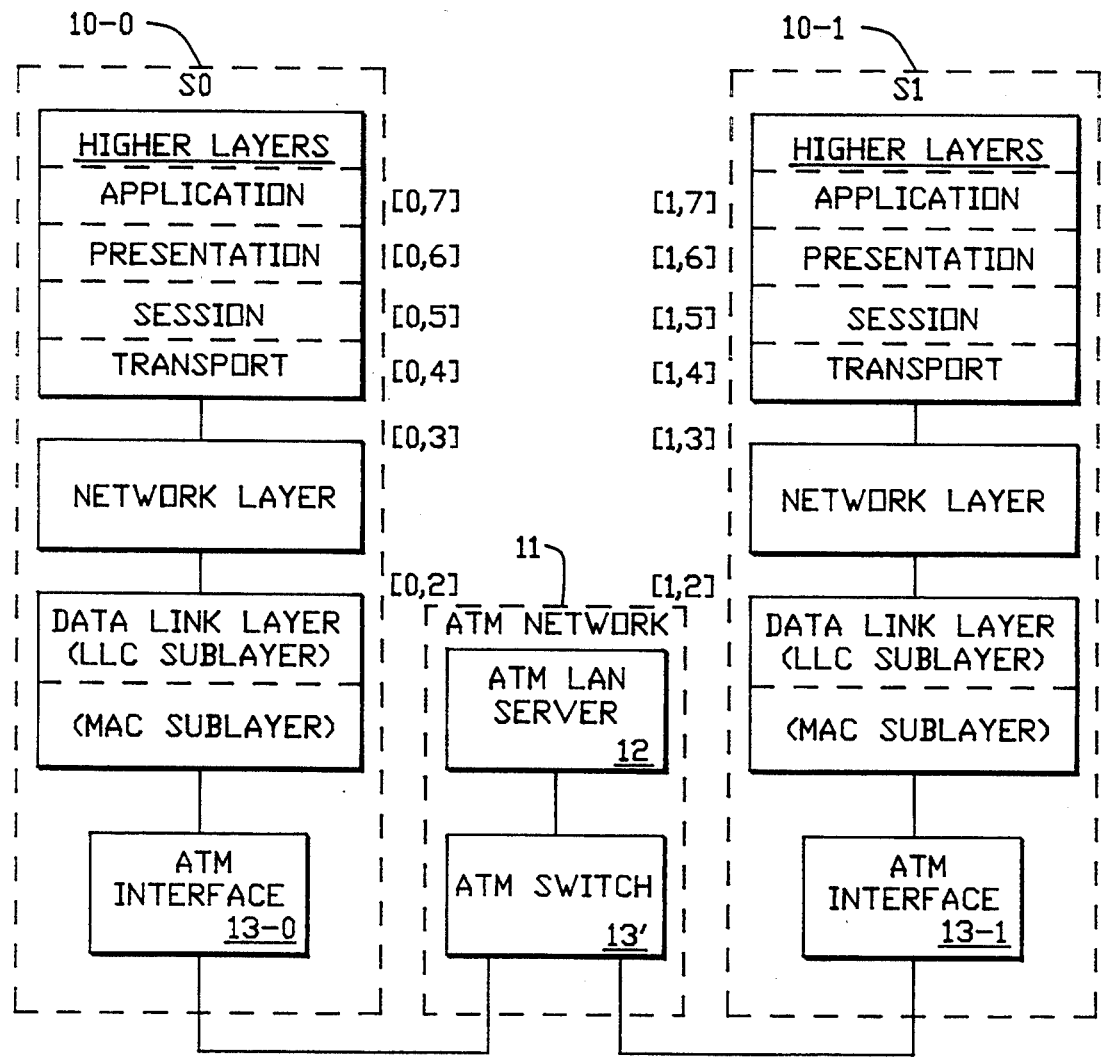
FIG.—2

FIG.—4

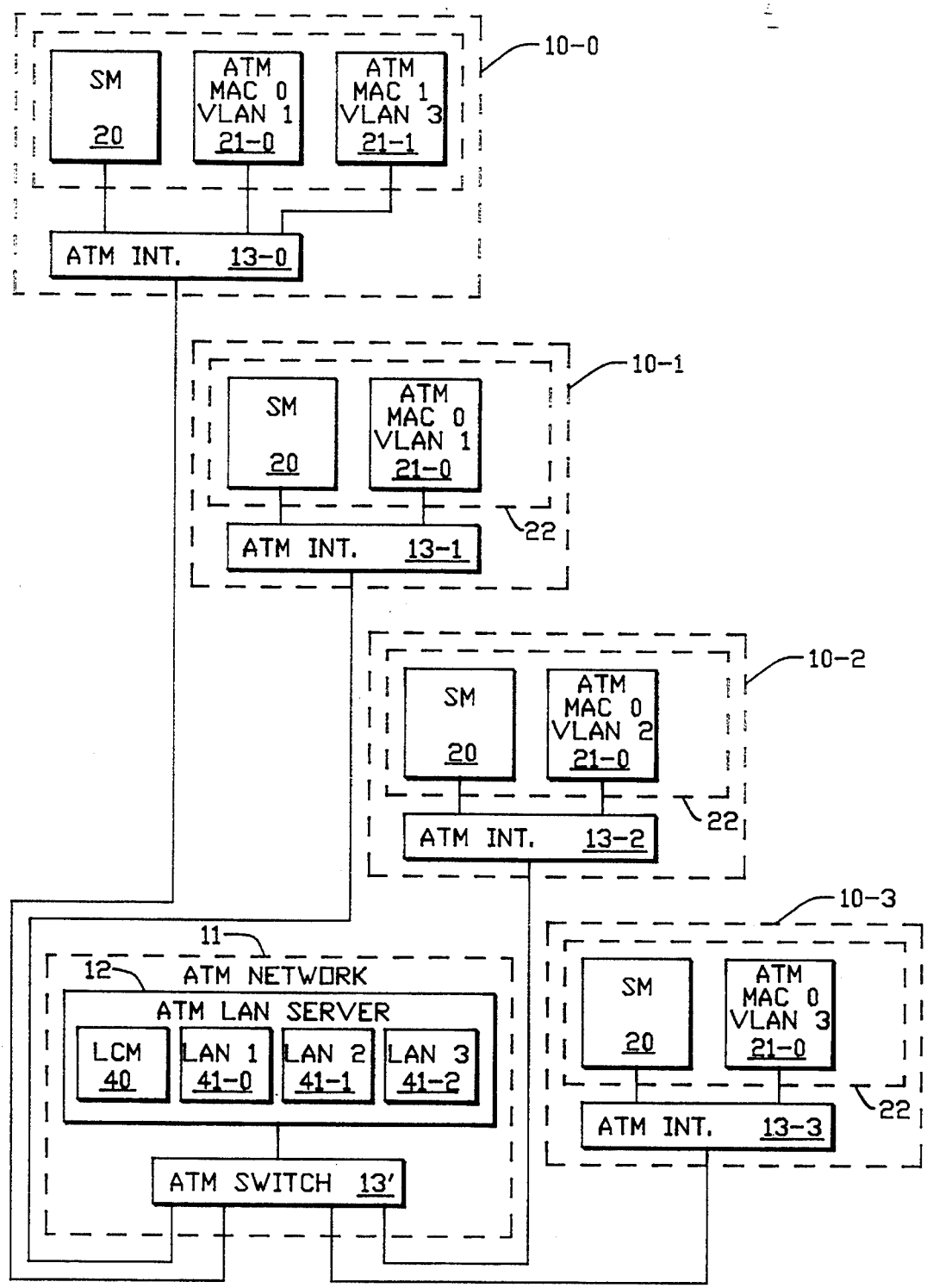
FIG.—7

VIRTUAL NETWORK USING ASYNCHRONOUS TRANSFER MODE

CROSS-REFERENCE TO RELATED APPLICATIONS

Title: METHOD AND APPARATUS FOR REACTIVE CONGESTION CONTROL IN AN ASYNCHRONOUS TRANSFER MODE (ATM) NETWORK
Inventors: Willie T. Glover, Gururaj Singh, Amar Gupta, Peter Newman and Clifford James Buckley
Ser. No.: 07/756,462
Filed: Sep. 9, 1991
Attorney Docket No: NETW.7910.DEL
Title: CONCURRENT MULTI-CHANNEL SEGMENTATION AND REASSEMBLY PROCESSORS FOR ASYNCHRONOUS TRANSFER MODE (ATM)
Inventors: Willie T. Glover, Gururaj Singh, Amar Gupta, Peter Newman
Ser. No.: 07/866,317
Filed: Apr. 9, 1992
Attorney Docket No: NETW.7910-CIP1.DEL

BACKGROUND OF THE INVENTION

The present invention relates to networks and particularly to networks of computers that communicate data and other information.

Wide Area Networks

With the increased bandwidth available through transmission channels, for example increases from T1 to T3, and with the increase in bandwidth provided by broadband services such as SONET, larger enterprises are evaluating new applications which require higher speed communications. These new applications will dramatically enhance business productivity, but will require vastly improved network control and management facilities. However, neither private networks nor common carriers have fully addressed the emerging needs of the new communication environment.

Computer Networks

In the computer field, in order for users to have access to more information and to greater resources than those available on a single computer, computers are connected through networks.

In a computer network, computers are separated by distance where the magnitude of the distance has a significant bearing on the nature of communication between computers. The distance can be short, for example, within the same computer housing (internal bus), can be somewhat longer, for example, extending outside the computer housing but within several meters (external bus), can be local, for example, within several hundred meters (local area networks, LANs), within tens of miles (metropolitan area networks, MANs) or can be over long distances, for example, among different cities or different continents (wide area networks, WANs).

Multi-Layer Communication Architecture

For networks, the communication facilities are viewed as a group of layers, where each layer in the group is adapted to interface with one or more adjacent layers in the group. Each layer is responsible for some aspect of the intended communication. The number of layers and the functions of the layers differ from network to network. Each layer offers services to the adjacent layers while isolating those adjacent layers from the details of implementing those services. An interlayer interface exists between each pair of adjacent layers. The interlayer interface defines which operations and services a layer offers to the adjacent layer. Each layer performs a collection of well-defined functions.

Many multi-layered communication architectures exist including Digital Equipment's Digital Network Architecture (DNA), IBM's System Network Architecture (SNA) and the International Standards Organization (ISO) Open System Interface (OSI).

The ISO architecture is representative of multi-level architectures and consists of a 7-layer OSI model having a physical link layer, a data link layer, a network layer, a transport layer, a session layer, a presentation layer, and an application layer.

In the OSI model, the physical layer is for standardizing network connectors and the electrical properties required to transmit binary 1's and 0's as a bit stream. The data link layer breaks the raw bit stream into discrete units and exchanges these units using a data link protocol. The network layer performs routing. The transport layer provides reliable, end-to-end connections to the higher layers. The session layer enhances the transport layer by adding facilities to help recover from crashes and other problems. The presentation layer standardizes the way data structures are described and represented. The application layer includes protocol handling needed for file transfer, electronic mail, virtual terminal, network management and other applications.

In the n-layer multi-layer models, layers 1, 2, ..., n are assumed to exist in each host computer. Layers 1, 2, ..., n in one host computer appear to communicate with peer layers 1, 2, ..., n, respectively, in another host computer. Specifically, layer 1 appears to communicate with layer 1, layer 2 appears to communicate with layer 2 and so on with layer n appearing to communicate with layer n. The rules and conventions used in communications between the peer layers are collectively known as the peer level protocols. Each layer executes processes unique to that layer and the peer processes in one layer on one computer station appear to communicate with corresponding peer processes in the same layer of another computer station using the peer protocol.

Although peer layers appear to communicate directly, typically, no data is directly transferred from layer n on one computer station to layer n on another computer station. Instead, each layer n passes data and control information to the n-1 layer immediately below it in the same computer station, until the lowest layer in that computer is reached. The physical medium through which actual communication occurs from one computer station to another exists below the top layer n and typically below the bottom layer 1.

In order to provide communication to the top layer n of an n-layer network, a message, M, is produced by a process running in a top layer n of a source computer station. The message is passed from layer n to layer n-1 according to the definition of the layer n/n-1 interface. In one example where n equals 7, layer 6 transforms the message (for example, by text compression), and then passes the new message, M, to the n-2 layer 5 across the layer 5/6 interface. Layer 5, in the 7 layer example, does not modify the message but simply regulates the direction of flow (that is, prevents an incoming message from being handed to layer 6 while layer 6 is busy handing a series of outgoing messages to layer 5).

In many networks, there is no limit to the size of messages accepted by layer 4, but there is a limit imposed by layer 3. Consequently, layer 4 must break up the incoming messages into smaller units, prefixing a header to each unit. The header includes control information, such as sequence numbers, to allow layer 4 on the destination computer to put the pieces back together in the right order if the lower layers do not maintain sequence. In many layers, headers also contain sizes, times and other control fields.

Layer 3 decides which of the outgoing lines to use, attaches its own headers, and passes the data to layer 2. Layer 2 adds not only a header to each piece, but also a trailer, and gives the resulting unit to layer 1 for physical transmission. At the destination computer, the message moves upward, from lower layer 1 to the upper layers, with headers being stripped off as it progresses. None of the headers for layers below n are passed up to layer n.

Virtual Peer To Peer Communication

An important distinction exists between the virtual and actual communication and between protocols and interfaces. The peer processes in source layer 4 and the destination layer 4, for example, interpret their layer 4 communication as being "direct" using the layer 4 protocol without recognition that the actual communication transcends down source layers 3, 2, 1 across the physical medium and thereafter up destination layers 1, 2, and 3 before arriving at destination layer 4.

The virtual peer process abstraction assumes a model in which each computer station retains control over its domain and its communication facilities within that domain.

Communication Networks Generally

For more than a century, the primary international communication system has been the telephone system originally designed for analog voice transmission. The telephone system (the public switched network) is a circuit switching network because a physical connection is reserved all the way from end to end throughout the duration of a call over the network. The telephone system originally sent all its control information in the 4 kHz voice channel using in-band signaling.

To eliminate problems caused by in-band signaling, in 1976 AT&T installed a packet switching network separate from the main public switched network. This network, called Common Channel Interoffice Signaling (CCIS), runs at 2.4 kbps and was designed to move the signaling traffic out-of-band. With CCIS, when an end office needed to set up a call, it chose a channel on an outgoing trunk of the public switched network. Then it sent a packet on the CCIS network to the next switching office along the chosen route telling which channel had been allocated. The next switching office acting as a CCIS node then chose the next outgoing trunk channel, and reported it on the CCIS network. Thus, the management of the analog connections was done on a separate packet switched network to which the users had no access.

The current telephone system has three distinct components, namely, the analog public switched network primarily for voice, CCIS for controlling the voice network, and packet switching networks for data.

Future Communication Networks-ISDN

User demands for improved communication services have led to an international undertaking to replace a major portion of the worldwide telephone system with an advanced digital system by the early part of the twenty-first century. This new system, called ISDN (Integrated Services Digital Network), has as its primary goal the integration of voice and nonvoice services.

The investment in the current telephone system is so great that ISDN can only be phased in over a period of decades and will necessarily coexist with the present analog system for many years and may be obsolete before completed.

In terms of the OSI model, ISDN will provide a physical layer onto which layers 2 through 7 of the OSI model can be built.

Telephone Network Domains

In a telephone network, the system architecture from the perspective of the telephone network is viewed predominantly as a single domain. When communication between two or more callers (whether people or computers) is to occur, the telephone network operates as a single physical layer domain.

Communication Network Architectures

Most wide area networks have a collection of end-users communicating via a subnet where the subnet may utilize multiple point-to-point lines between its nodes or a single common broadcast channel.

In point-to-point channels, the network contains numerous cables or leased telephone lines, each one connecting a pair of nodes. If two nodes that do not share a cable are to communicate, they do so indirectly via other nodes. When a message (packet), is sent from one node to another via one or more intermediate nodes, the packet is received at each intermediate node in its entirety, stored there until the required output line is free, and then forwarded. In broadcast channels, a single communication channel is shared by all the computer stations on the network. Packets sent by any computer station are received by all the others. An address field within the packet specifies the intended one or more computer stations. Upon receiving a packet, a computer station checks the address field and if the packet is intended only for some other computer station, it is ignored.

Most local area networks use connectionless protocols using shared medium where, for example, all destination and source information is included in each packet and every packet is routed autonomously with no prior knowledge of the connection required.

In the above-identified application CONCURRENT MULTI-CHANNEL SEGMENTATION AND REASSEMBLY PROCESSORS FOR ASYNCHRONOUS TRANSFER MODE (ATM) an apparatus for concurrently processing packets in an asynchronous transfer mode (ATM) network is described. Packets that are to be transmitted are segmented into a plurality of cells, concurrently for a plurality of channels, and the cells are transmitted over an asynchronous transfer mode (ATM) channel. Cells received from the asynchronous transfer mode (ATM) channel are reassembled into packets concurrently for the plurality of channels.

Accordingly, there is a need for new networks which satisfy the emerging new requirements and which provide broadband circuit switching, fast packet switching, and intelligent network attachments.

SUMMARY OF INVENTION

The present invention is an Asynchronous Transfer Mode Local Area Network (ATM LAN). The ATM LAN is implemented as a set of MAC entities which share a common group address space for the purposes of establishing multicast connections. Each station has one or more ATM MAC entities per physical connection to an ATM network. The network ATM LAN service provides the station with ATM LAN configuration information needed for ATM MAC operation. Included in this information is the number of ATM LANs the network has configured for that station.

In the present invention, a communication system includes an ATM network. The ATM network has a plurality of ports, each port having a unique port address. The ATM network includes one or more ATM switches for connecting sending ports to receiving ports.

The communication system includes a plurality of stations, each station having a unique station address distinguishing the station from other stations. Each station is connected to the ATM network at a port whereby source stations communicate with destination stations. Each station provides packets for transferring information, information including a destination station address, for addressing destination stations. Each station includes a packet converter for converting between packets and cells for transfers between stations.

The communication system provides address resolution for determining a port address corresponding to a destination station address. The address resolution includes multicast for multicasting the destination station address to a group of stations.

The communication system provides management for requesting connections through the ATM network connecting sending ports to receiving ports whereby packets are transferred from source stations to destination stations by cell transfers through ATM network.

ATM LANs may be extended by bridging several ATM LANs together using transparent MAC bridges and routers.

Permanent virtual connections or switched virtual connections may underlie the layer management.

The communication system operates with a multi-level architecture, such as the ISO architecture, and Logical Link Control (LLC), Media Access Control (MAC) and addressing functions are performed for ATM LANs. An ATM LAN provides support for the LLC sublayer by means of a connectionless MAC sublayer service in a manner consistent with other IEEE 802 local and metropolitan area networks. The ATM LAN interface is built on the user-to-network interface for ATM and adaptation layers.

The communication system including the ATM LAN provides the following benefits:

Physical plug-in locations can be moved and changed without changing logical locations.

The stations in the communication system are partitionable into multiple work groups.

The communication system provides high bandwidth that supports multimedia applications including voice, video, real-time and time-sensitive applications.

The communication system integrates Wide Area Networks (WAN) and Local Area Networks (LAN) into one system.

The foregoing and other objects, features and advantages of the invention will be apparent from the following detailed description in conjunction with the drawings.

BRIEF DESCRIPTION OF THE DRAWINGS

FIG. 1 depicts a number of user stations connected together in an ATM network system.

FIG. 2 depicts the multi-level protocol used to connect two or more stations in the ATM network system of FIG. 1.

FIG. 7 is a representation of the details of the ATM MACs of stations S0, S1, S2 and S3 from FIG. 6.

DETAILED DESCRIPTION

Figure 3:
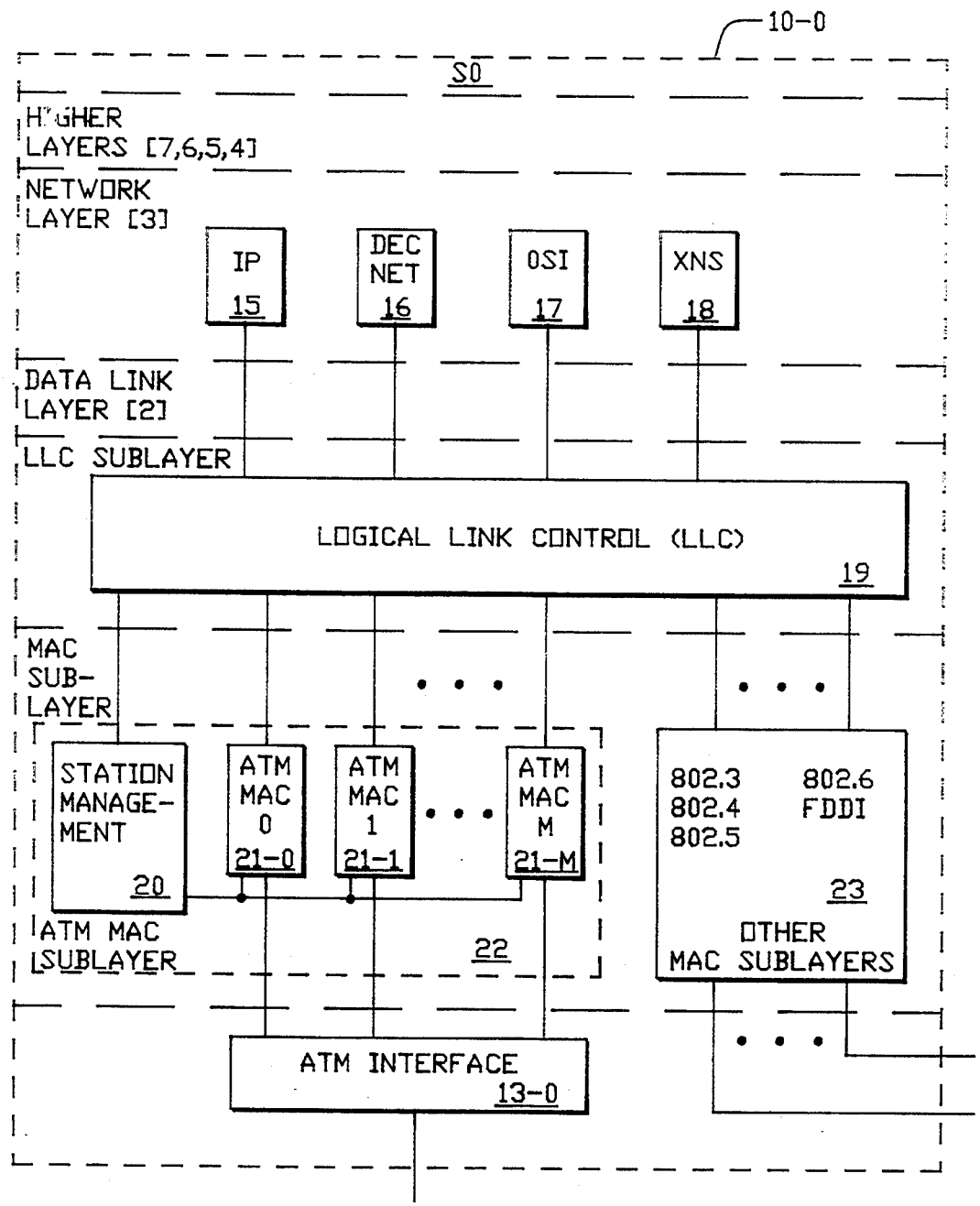
FIG. 3 depicts the network layer and the data link layer connected to a ATM interface in the ATM network system of FIGS. 1 and 2.

In FIG. 1, an ATM network system is shown in which two or more computer stations 10 are interconnected by an ATM network 11 for network communication. The stations 10 include the station S0, S1, . . . , Ss designated 10-0, 10-1, . . . , 10-s. The ATM network system of FIG. 1 employs, for example, the top six of the seven OSI model layers. The OSI model physical layer 1 is replaced with a ATM interface which operates in an asynchronous transfer mode (ATM) in accordance with the B-ISDN protocol.

In FIG. 2, the ATM network 11 connects, by way of example, the S0 station 10-0 to the S1 station 10-1. The S0 station 10-0 includes the top six OSI layers, namely, the application layer [0, 7], the presentation layer [0, 6], the session layer [0,5] and the transport layer [0,4]. The layers 7 through 4 in FIG. 2 are designated as the higher layers and operate in the conventional manner for the OSI model.

In FIG. 2, the S0 station 10-0 includes the network layer [0,3] and the data link layer, [0, 2]. The data link layer [0,2] includes the logical link control (LLC) sublayer and the media access control (MAC) sublayer. The MAC sublayer in the data link layer [0, 2] connects to a ATM interface 13-0. The ATM interface 13-0 operates in accordance with the B-ISDN protocol defined by the CCITT.

In FIG. 2, the S1 station 10-1 has the higher layers including the application layer [1,7], the presentation layer [1,6], the session layer [1,5] and the transport layer [1,4]. The S1 station 10-1 also includes the network layer [1,3] and the data link layer [1,2] that connects to the ATM interface 13-1. In FIG. 2, the ATM interface 13-0 for the S0 station 10-0 and the ATM interface 13-1 for the S1 station 10-1 connect to a ATM switch 13' in the ATM network 11. The ATM interfaces 13-0 and 13-1 and ATM switch 13' operate in accordance with an ATM architecture for ATM communicationn. The ATM LAN communication is under control of an ATM LAN server 12 in the ATM network 11.

In FIG. 2 each of the higher layers in the S0 station 10-0 and in the S1 station 10-1 function in a well known manner in accordance with the OSI model. Also, the network layer [0, 3] in the S0 station 10-0 and the network layer [1, 3] in the S1 station 10-1 conform to the model OSI The data link layer [0,2 in the S0 station 10-0 and the data link layer [1,2] in the S1 station 10-1 have OSI compatibility. The compatibility with the OSI model at the data link layer enables the ATM network system of FIGS. 1 and 2 to be compatible with other local area networks and other networks that conform to the OSI model from layer [2] and above. Below the OSI layer [2], the communication and connections are compatible with the B-ISDN model of the CCITT.

The FIG. 2 communication network system is a hybrid of the OSI model above layer [1] and asynchronous transfer mode below the data link layer [2].

In FIG. 3, further details of the S0 station 10-0 are shown and are typical of all of the other stations 10-1, . . . , 10-s of FIG. 1. In FIG. 3, the higher layers 7, 6, 5 and 4 are conventional. Typically the higher layers of the station 10-0 of FIG. 3 are implemented on a processor such as a Sun Workstation.

In FIG. 3, the network layer [3] uses any one of a number of standard protocols such as the IP protocol 15, the DEC NET protocol 16, the OSI protocol 17 or the XNS protocol 18. Any other protocol can be implemented in the network layer 3.

In FIG. 3, the data link layer [2] includes the LLC sublayer and the MAC sublayer. The LLC sublayer includes the Logical Link Control (LLC) 19 which is conventional in the data link layer of the OSI model.

The data link layer [2] also includes the MAC sublayer which as a component of the data link layer [2]. The MAC sublayer typically may include other MAC sublayers in accordance with the standards IEEE 802.3, 802.4, 802.5, 802.6 and FDDI. ATM LANs are, therefore, capable of interoperating with a wide variety of media. ATM LANs interoperate with all IEEE 802 Local Area Networks and Metropolitan Area Networks using transparent bridges and routers. Stations connected to ATM LANs communicate with stations connected to any IEEE 802 LAN or MAN via a bridge.

In accordance with the present invention, the data link layer [2] also includes a new ATM MAC sublayer 22 analogous to the other MAC sublayers 23. The ATM MAC sublayer 22 differs from the other MAC sublayers 23 in that the ATM MAC sublayer 22 communicates with the ATM switch 13 for ATM communication.

In FIG. 3, the ATM MAC sublayer 22 includes one or more ATM MACs including, for example, ATM MAC 0, ATM MAC 1, . . . , ATM MAC M designated 21-0, 21-1, . . . , 21-M respectively. Each of ATM MACs 21-0, 21-1, . . . , 21-m defines an ATM local area network (ATM LAN). The ATM MACs of the ATM MAC sublayer 22 connect between the logical link control 19 and the ATM interface 13-0. The control of which of the stations (like the stations 10-0, 10-1, . . . , 10-s) are serviced by particular ones of the ATM MACs 21 of FIG. 3 is determined by the station management 20 within the ATM MAC sublayer 22. Other stations (or the same stations) may also be serviced by other local area networks such as Ethernet under control of the other MAC sublayers 23.

In FIG. 3, the ATM MAC sublayer is capable of servicing the communication requirements of the stations 10-0 through 10-s of FIG. 1 in one or more ATM LANs. Stations can be switched from one ATM LAN to another ATM LAN under control of station management 20 without requirement of modifying the physical connection to the station. For this reason, the ATM LANs are virtual LANs.

Figure 4:
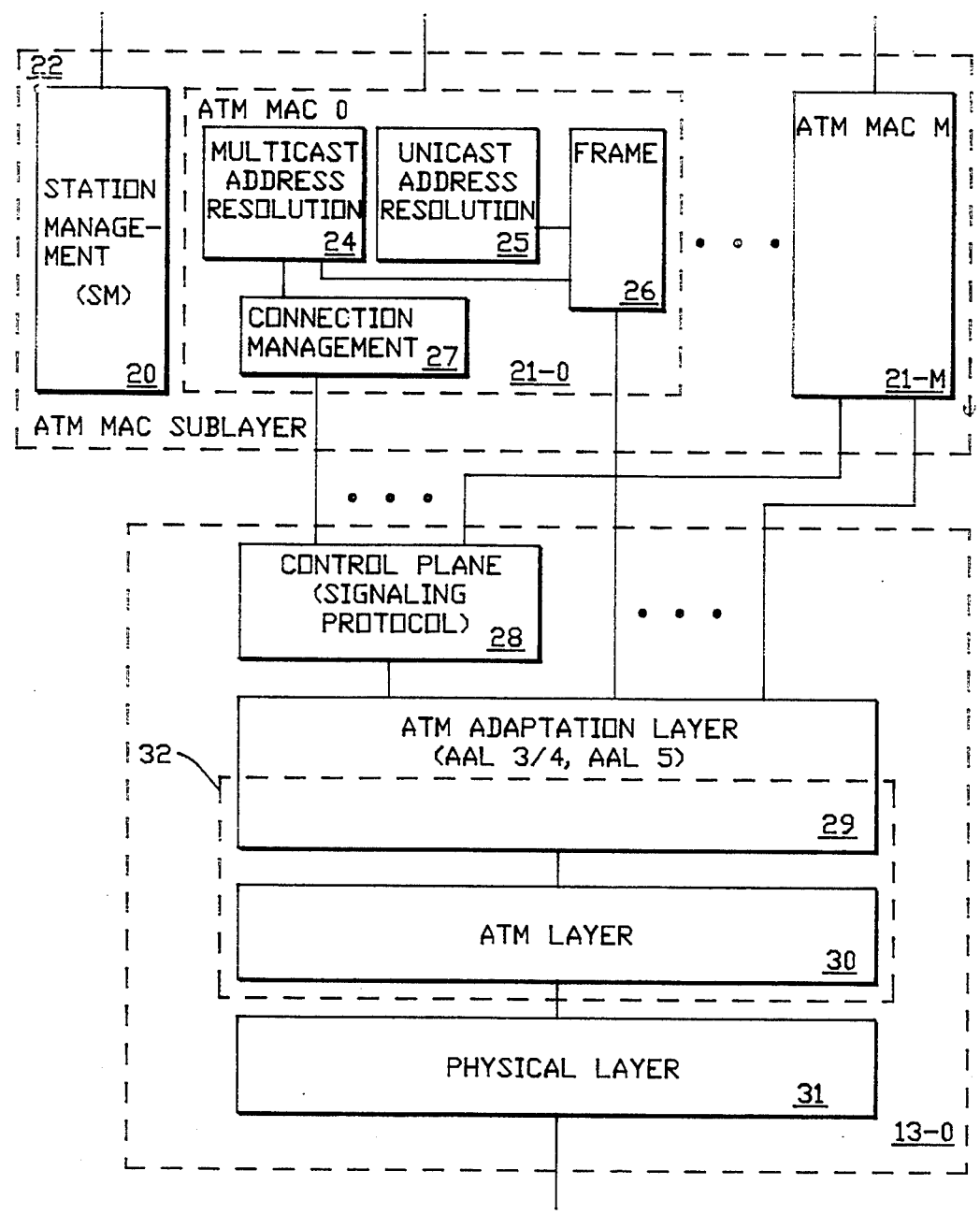
FIG. 4 depicts details of the ATM MAC sublayer and the ATM interface for stations of FIGS. 1 and 2.
Figure 5:
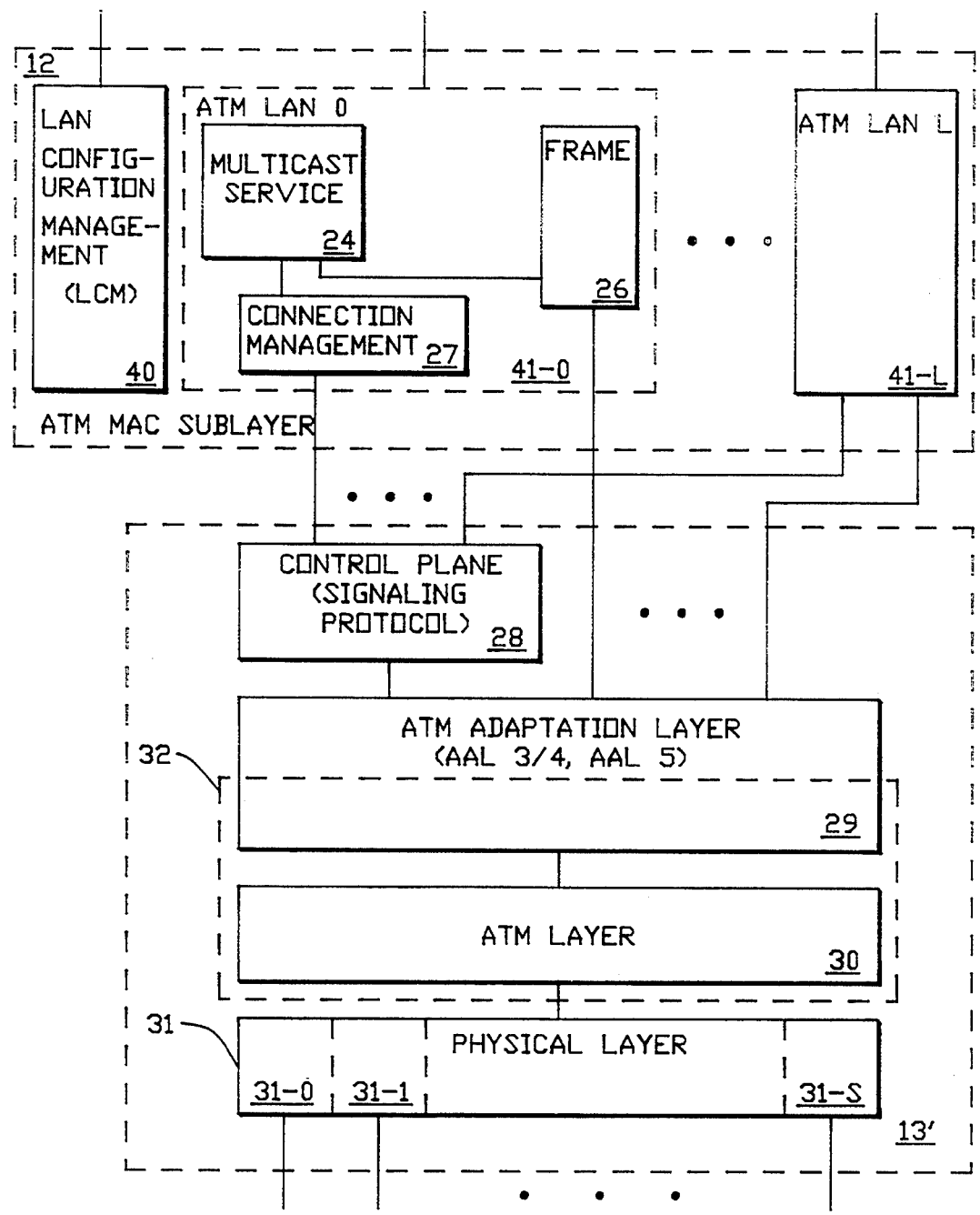
FIG. 5 depicts details of the ATM LAN Server and the ATM interfaces of the network of FIGS. 1 and 2.

In FIG. 4, further details of the ATM MAC sublayer 22 and the ATM interface 13-0 of FIG. 3 are shown.

In FIG. 4 the ATM MAC sublayer includes the station management 20 and the ATM MACs including the ATM MAC 0, . . . , ATM MAC M designated as 21-0, . . . , 21-M.

In FIG. 4, the ATM MAC 0 includes the multicast address resolution 24, the unicast address resolution 25, the frame 26 and the connection management 27.

In FIG. 4, the ATM interface 13-0 includes the signaling protocol 28 in the control plane, the ATM ADAPTATION LAYER (AAL) 29, the ATM layer 30 and the physical layer 31.

1 ATM LANs
1.1 Introduction

In FIG. 3, the higher layers [7,6,5,5] and [3] are conventional while the data link layer [2] includes the LLC sublayer and the ATM MAC sublayer to implement the Asynchronous Transfer Mode Local Area Networks (ATM LANs). Such an implementation is provided with newly defined Media Access Control (MAC) including addressing protocols. The ATM LAN provides support for the LLC sublayer by means of connectionless MAC sublayer service in a manner consistent with other IEEE 802 local area networks (LAN) and metropolitan area networks (MAN). The ATM LAN interface is built on the user-to-network interface for the ATM layer and the ATM adaptation layer (AAL).

An ATM LAN includes a set of MAC entities which share a common group address space for the purposes of establishing multicast connections. Each station has one or more ATM MAC entities per physical connection to an ATM network. The network ATM LAN service provides the station with ATM LAN configuration information needed for ATM MAC operation. Included in this information is the number of ATM LANs the network has configured for that station.

The user-to-network interface at the LLC and MAC levels is defined for the ATM LAN Architecture in a manner analogous to other Data Link Layer architectures.

1.3 ATM LAN Functionality
An ATM LAN has the following characteristics:

| | |
|---|---|
| addressing- | all LANs connected by MAC bridges use 48 bit addressing |
| unicast- | all stations can send frames to any other station in the LAN |
| duplication- | frames are not duplicated |
| broadcast- | all stations can broadcast to every other station in a LAN |
| multicast- | any station can send to any group address and any station can register to receive frames for any group address |
| promiscuity- | any station may chose to receive all frames with group destination addresses |

1.4 ATM LANs

An ATM LAN is a local network having a set of stations which share a common group address space for the purpose of establishing multicast connections. An ATM LAN is implemented using services of ATM LAN MAC, ATM signaling and ATM Adaptation Layers. Stations may participate in more than one ATM LAN. ATM LANs may be bridged together using MAC bridges.

ATM LANs are sometimes called Virtual LANs because they are not limited by the limitations of any physical media characteristics. A single underlying ATM network may support many ATM LANs. A station with a single ATM interface may be connected to many separate ATM LANs. There are no inherent limitations in the ATM LAN protocol itself to restrict either the physical extent or the number of stations in a particular ATM LAN. Practical limitations, such as multicast traffic, usually limit the size and scope of ATM LANs.

ATM LANs interoperate with a wide variety of media. ATM LANs can interoperate with all IEEE 802 Local Area Networks and Metropolitan Area Networks using transparent bridges and routers. Stations connected to ATM LANs are able to communicate with stations connected to any IEEE 802 LAN/MAN connected via bridge.

2 ATM LAN Architecture

2.1 Overview

An ATM LAN includes a set of procedures and protocols which work together to provide the services found in IEEE 802 LANs. The AAL and ATM protocols defined by CCITT are augmented by the ATM LAN MAC layer which maps unacknowledged MAC PDUs (MAC Protocol Data Units) onto unacknowledged AAL PDUs transmitted over virtual connections provided by the ATM physical layer. The ATM MAC manages connections using an ATM signaling protocol.

2.2 Logical Link Control

Stations must comply with 802.2 Type I specification which is defined by ISO 8802. This includes mandatory response to XID (Exchange ID) and Test commands.

When SNAP encapsulations are defined for upper layer protocols they are used.

2.3 Station ATM LAN MAC

Each station has one ATM LAN module per physical ATM interface. Each ATM LAN module provides MAC services via one or more ATM MAC entities. The ATM LAN server provides the ATM LAN MAC with configuration parameters.

2.3.1 ATM MAC Functions

The ATM MAC layer provides the following functions:

| | |
|---|---|
| ATM LAN Configuration- | determines the number of ATM LANs which have been configured for the station and the operational parameters needed to establish multicast connections for each ATM LAN. |
| MAC PDU Framing- | MAC SDUs (Service Data Units) are encapsulated in an AAL specific framing. |
| Address Resolution- | IEEE 802. 48 bit MAC addresses are mapped onto E.164 ATM addresses. |
| Connection Management- | establishes and releases virtual connections for transmission of MAC PDUs (Protocol Data Units) and reception of frames addressed to registered group (multicast) addresses. |
| Multicast Service- | protocol and procedures are defined for transmission and reception of frames with group addresses. The network provides unreliable delivery via multicast service. The interface to the multicast service is AAL specific. The interface to be used is determined by configuration management. |

2.3.2 ATM MAC Entity Service Interface

The ATM MAC entity provides the following service interface to MAC users.

| Primitive | Parameters |
|---|---|
| M_UNITDATA.request | destination address source address |

| Primitive | Parameters |
|---|---|
| M_UNITDATA.indication | mac service data unit destination address source address mac service data unit |
| M_REGISTER_ADDRESS | group address |
| M_UNREGISTER_ADDRESS | group address |
| M_REGISTER_ALL | |
| M_UNREGISTER_ALL | |

2.4 ATM Adaptation Layer

The adaptation layers provide transmission and reception of frames on virtual connections. The standard CCITT AAL are used. In this application, AAL 3 is used to denote AAL ¾ when end systems negotiate the use of the multiplexing identifier. AAL 4 is used to identify AAL ¾ when the multiplexing identifiers used are specified by the network. IEEE 802.2 LLC will be identified by a value of 1 in the protocol id field of AAL ¾ frames.

2.5 ATM Signaling Protocol

The ATM LAN signaling protocol contains a subset of the functions in Q.93B. It provides the following services:
- establishment of virtual connections (VCs)
- negotiation of the upper layer protocol (ULP)
- clearing of connections
- dynamic port address assignment
- user to network keep alive

2.6 ATM LAN Server

The ATM LAN server provides configuration and multicast services. It provides operational parameters for each ATM LAN in which each ATM station is configured. Membership in ATM LANs is controlled via policies implemented by the server. These policies may vary between ATM LAN providers. The ATM LAN configuration protocol defines the information provided by stations with which servers may implement policies. Two policies which can be implemented are "port based configuration" and "station based configuration". The ATM LAN server may use the physical cabling to determine LAN membership. This is called "port based configuration". Alternatively, the ATM LAN server may use station MAC addresses to determine LAN membership. This is called "station based configuration". The same station to server protocol is used in either case. The station is not affected by the configuration policies implemented. When requesting ATM LAN configuration parameters, the station always provides its MAC address(es).

Figure 6:
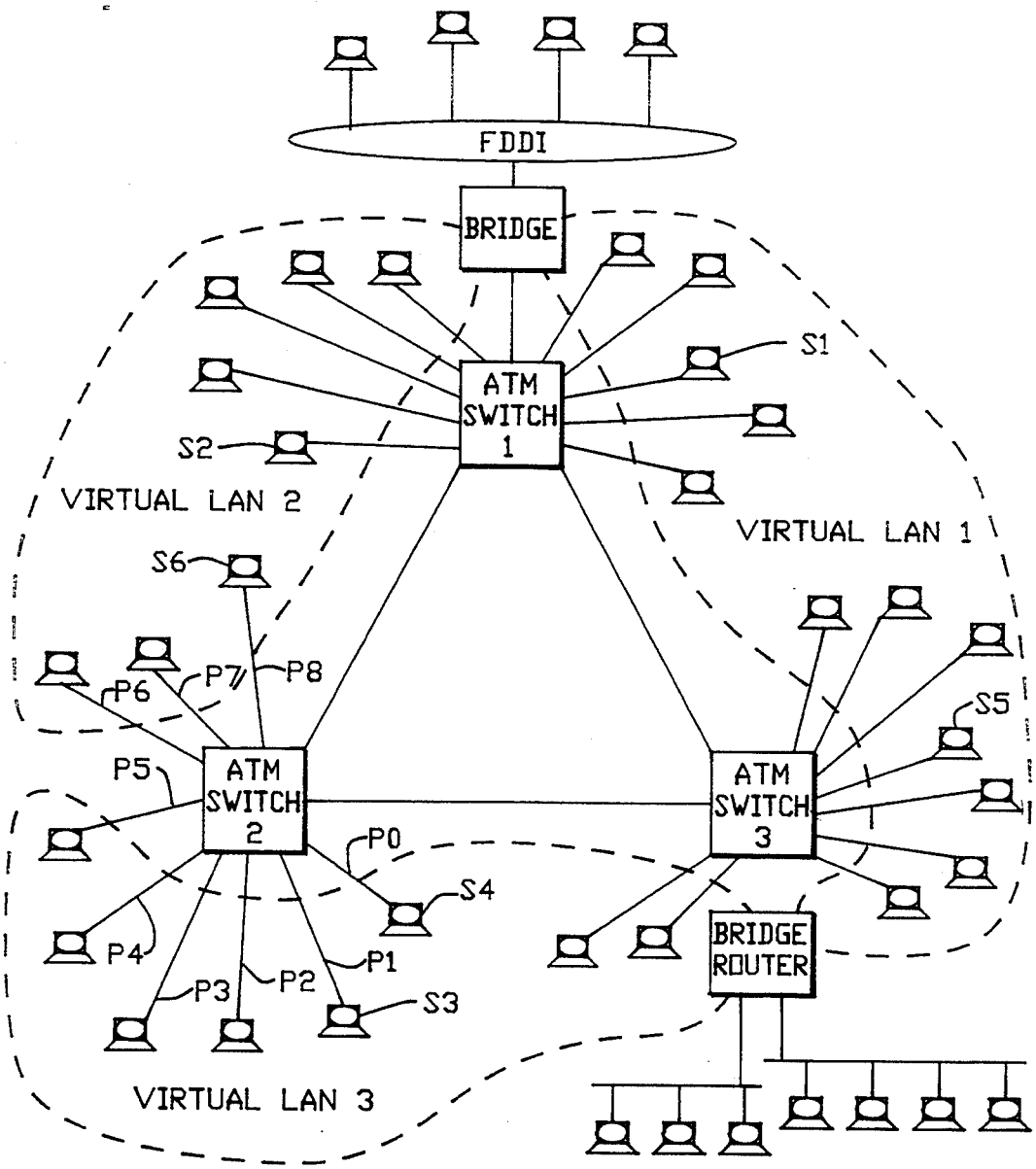
FIG. 6 depicts three ATM LANs configured on a three-switch ATM network.

The station table shown below is an example of the station-based configuration for the system shown in FIG. 6. The port table shown below is an example of port-based configuration for the system shown in FIG. 6.

| STATION TABLE (VLAN MEMBERSHIP) | |
|---|---|
| VLAN | MAC_ADDRESS |
| VLAN 1 | MAC_Add[0](S0), MAC_Add [1](S1), MAC_Add [5](S5) . . . |
| VLAN 2 | MAC_Add[2](S2), MAC_Add [6](S6) . . . |
| VLAN 3 | MAC_Add[0](S0), MAC_Add [3](S3), MAC_Add [4](S4) . . . |

| PORT TABLE (VLAN ASSOCIATION) | |
|---|---|

-continued

| Port Addresses [s/p#] | VLAN |
|---|---|
| PA [2,2], PA [2,3], PA [2,4], PA [2,5] | VLAN [3] |
| PA [2,6], PA [2,7], PA [2,8], PA [2,9] | VLAN [2] |
| . | . |
| . | . |
| PA [2,3], PA [3,4] | VLAN [3] |
| . | . |
| . | . |

Each station establishes a VC to an ATM LAN server for each physical interface. A well known group address is used. If redundant ATM LAN servers are providing configuration and multicast service, this service is transparent to the ATM station. The servers agree amongst themselves which ones will serve any particular station. The servers may elect to distribute responsibility for multicast service over several servers. This election is transparent to the station.

3 ATM LAN Configuration Management

A station may belong to one or more distinct ATM LANs. The station will then have been configured with one or more MAC entities each having a unique MAC address.

At power-on, the station establishes a VC to the network ATM LAN server. The station ATM MAC sends a configuration enquiry to the ATM LAN server. The enquiry contains the station's MAC address, alan_mac.

```
struct alan_req { /* configuration request */
    u_char          alan_proto;
    u_char          alan_pdu_type;
    u_short         alan_seqnum;
    struct atm_addr alan_mac;
};
```

Using the unique MAC address, alan_mac, the ATM LAN server determines the number of ATM LANs configured for that station and the configuration for each connected ATM LAN. A configuration response is sent to the station.

```
struct alan_config {
    u_char           alan_proto;
    u_char           alan_pdu_type;
    u_short          alan_seqnum;
    int              alan_num_lans;
    struct alan_parms alan_lan[ ];
};
```

The configuration response contains one alans_parms per ATM LAN. For each ATM LAN the configuration manager activates an ATM MAC entity. The parameters in the alan_parms element control the configuration parameters of each ATM LAN "tap".

Each ATM LAN 'tap' is described by the following parameters. The alan_config and alan_update messages contain one or more alan_parms structures.

```
struct alan_parms {
    int              alan_version;
    int              alan_aal;
    struct atm_addr  alan_port;
    struct atm_addr  alan_mcast_base;
    struct atm_addr  alan_lan_uid[ ];
    int              alan_num_mcast;
    u_short          alan_mid;
    u_short          alan_mtu;
};
```

The alan_aal parameter specifies which AAL is used for multicast frames. Currently defined values are 4 and 5 for AALs 4 and 5 respectively. The alan_port is the port address from which VCs are setup for this ATM LAN. The ATM LAN server may specify different port addresses for different taps or may specify the same for all. The ATM MAC entity treats this E.164 address as an unstructured bit string.

The ATM LAN manager allocates a range of E.164 group address space for each ATM LAN. The alan_mcast_base is E.164 group address which is used in conjunction with alan_num_mcast (the number of group addresses allocated to the ATM LAN) to map IEEE 802.1 group addresses onto the E.164 group address space. AAL and multicast service parameters are protocol specific.

AAL multicast service requires that multicast AAL PDUs be transmitted using multiplexing identifiers, (MIDs), provided by the ATM LAN server. This allows multicast service to be provided via replication functions often found in ATM switch fabrics. Each ATM MAC entity is assigned a LAN unique MID for transmission and must reassemble AAL using the full 10 bit MID.

Each ATM LAN is assigned a globally unique identifier, alan_lan_uid. This is a 128-bit name created by the ATM LAN server. The ATM LAN server provides alan_parms structures for the requested MAC addresses. If the station requests configuration parameters for two MAC addresses which belong to the same ATM LAN, two identical alan_parms elements are returned.

Once the ATM MAC entities have been created, the configuration manager periodically sends keep alive frames on the configuration SVC. If the configuration SVC is released the configuration manager destroys the ATM LAN entities it created. If after some number of retries the ATM LAN server does not respond to keep alive packets, the configuration manager will release the configuration SVC and destroy ATM MAC entities.

| Configuration Acquisition Protocol State Machine | | | |
|---|---|---|---|
| State | Event | Actions | Newstate |
| Inactive | Activate | Setup Request Start timer C1 | Wait for Setup Conf |
| Wait for Setup Conf | Release Ind | Setup Request, Start timer C1 | Wait for Setup Conf |
| | Setup Conf | Config Request, Start Timer C2 | Wait for Setup Conf |
| Wait for Setup Conf | Timeout | Config Request, Increment Retries | Wait for Setup Conf |
| | Max retries | Release, Setup Request | Wait for Setup Conf |
| | Config Resp | Activate MAC Entities | Active |
| Any state \|Active | Deactivate | Deactive active MAC entities, Release configuration VC | Inactive |
| | Release Ind | Setup Request, Start timer C1 | Setup Request, Start timer C1 |

4. ATM LAN MAC

The ATM MAC maps IEEE 802.1 flat 48 bit addresses to 60 bit hierarchical E.164 ATM addresses by the address resolution function. Individual IEEE 802. addresses are mapped into port addresses via the ATM Address Resolution Protocol, ATM ARP. Group IEEE 802.1 addresses are mapped to ATM group addresses using a fixed algorithm.

Once an ATM address is determined, the ATM signaling protocol is used to establish a virtual connection. The connection is either a unicast connection or a multicast connection depending upon whether the ATM address is an individual or group address. Connection management is responsible for establishing and clearing these connections.

Once the appropriate connection has been determined for a frame, it is encapsulated in an AAL specific encapsulation method. AAL 4 and AAL 5 have distinct multicast mechanisms due to the limitations of AAL 5.

4.1 Framing 4.1.1 AAL ¾

ATM LAN uses the same MAC framing as 802.6. ATM LANs use 48 bit MAC addresses to enable interoperability with 802 LANs via MAC bridges. As shown in the following table, addresses are encoded as byte quantities as per 802.6.

| Address Type | | Padding | Address |
|---|---|---|---|
| ATM port address | 110x | no padding | 60 bits |
| ATM group address | 111x | no padding | 60 bits |
| MAC station address | 1000 | 12 bits | 48 bits |
| MAC group address | 1000 | 12 bits | 48 bits | x — indicates whether the address is publicly or privately administered 4.3 Multicast Service 4.3.1 Background Any station on the LAN can register to receive frames addressed to specific group addresses. All stations register to receive frames addressed to group address FFFFFFFFFFFF which is defined to be the broadcast group address. Any station can send frames to any group address without the knowledge of which stations want to receive them.

4.3.2 ATM LAN Multicast

In an ATM LAN, multicast capability is provided by

| COM PDU HEAD | MCP HEAD | | | | | | COM PDU TRAIL |
|---|---|---|---|---|---|---|---|
| | DEST ADR | SOUR ADR | MC BITS | HEAD EXT | LLC | PAD | CRC 32 | |
| 4 | 8 | 8 | 4 | 0-20 | 0-9188 | 0-3 | 0,4 | 4 |

| Prot ID | Pad LEN | QOS Delay | Qos Loss | CRC Ind | Head Ext Len | Bridging (Not Used) |
|---|---|---|---|---|---|---|
| 6 | 2 | 3 | 1 | 1 | 3 | 16 |

4.2 Addresses

Two types of addresses are used in an ATM LAN, station MAC addresses and ATM (or port) addresses. Both types of addresses may either be individual or group addresses.

MAC station addresses identify individual stations connected to an ATM LAN. Station addresses are 48 bit universally administered 802.1 MAC addresses. These MAC addresses enable interoperability with 802.1D LAN MAC bridges. Station addresses are used as MAC frame source or destination addresses.

MAC group addresses are used to address frames to multiple destination stations on an ATM LAN. Group addresses are used to set up virtual connections to multiple destination stations without knowledge of those stations' individual addresses. They are used to provide multicast and broadcast services. Broadcast is a a specific instance of multicast with all stations receiving frames with well defined group address, specifically all 1's. Group addresses are 48 bit universally or locally administered 802. MAC addresses. The group address with all bits set to one is the broadcast address.

ATM Port addresses or port addresses or ATM individual addresses identify physical ports on switches. They are hierarchical 60 bit E.164 addresses dynamically assigned by the network. Each virtual connection has a port address for at least one endpoint. Port addresses are used in ATM ARP and Signaling PDUs.

ATM group addresses (or multicast port addresses) identify an ATM level multicast group. They are used in signaling PDUs.

the multicast server which is part of the LAN server. Stations use that service by establishing virtual connections to the server using the multicast base ATM address provided in the configuration parameters (alan_p-arms). The multicast base address is a privately administered group E.164 address. Virtual connections with a group ATM address at one endpoint are multicast VCs. When setting up a multicast VC the station may request transmit only access so that it will not receive frames transmitted on that VC.

IEEE 802.1 48 bit addressing provides for up to $2^{46}$ possible group addresses all registered by various stations in one LAN. Few ATM networks could support $2^{46}$ virtual connections. To bridge this gap in service offering and network capability, each ATM LAN is configured to support a small (typically 100s) number of multicast circuits. This number is exported in the alan_parms configuration element. Each ATM MAC entity is also provided with a multicast base address which is treated as a 64-bit integer. These two numbers are used to map many 48-bit IEEE group addresses to fewer ATM group addresses which are then used to setup multicast connections. If alan_num_multicast is zero, then the 48-bit group address is added to alan_mcast_base. Otherwise the 48-bit group address is treated as a 16 most significant bits of the 48-bit group address are Exclusive-Ored into the 32 least-significant bits, the result is divided by alan_num_mcast and the resulting remainder is added to alan_mcast_base. In either case, the result value is used as a group address to set up a multicast connection for that group address.

4.3.3 Registering for a group address

Each ATM MAC entity maintains a list of group addresses for which its users have requested it receive frames. Each of these group addresses is mapped onto a ATM group address when the MAC entity is given is alan_parms information, that is, when it becomes active. There after, the ATM MAC entity will maintain a multicast connection for each port address derived from the above computations. Note, several MAC group addresses may map onto one group port address. In this case, only one connection is maintained for those MAC group addresses. If the network releases a multicast connection, the ATM MAC entity will re-establish another one.

The ATM MAC entity will always maintain a multicast connection for the group port address derived from the broadcast MAC address.

4.3.4 Transmission of Multicast MAC PDUs

When an ATM MAC entity is presented with a M_UNITDATA.request with a group destination address it maps the group MAC address to the group ATM address, and transmits the MAC PDU on the connection established to that port address. If no connection is already established, the frame is queued until one is established. Multicast connections setup solely for the transmission of multicast PDUs are aged in the same fashion as those setup for unicast PDUs.

4.3.5 Reception of Multicast MAC PDUs

The group destination addresses in received MAC PDUs are checked against the list of registered group addresses. If the group addresses are not registered, the frame is dropped. This dropping is necessary because transmitters may map MAC group addresses onto a multicast connection established to register other group addresses.

All group addressed frames are not received on corresponding multicast connections. Stations listening for multicast frames must be prepared to receive those frames on either the appropriate multicast VC or the broadcast VC.

4.3.6 Unregistering a group address

Multicast connections established for registered group addresses are not aged. They are not released until the last MAC service users want to receive frames addressed to any of the group addresses mapped onto that connection.

The ATM MAC entity maintains reference counts on the number of MAC service users which have registered a group address. A reference count on the multicast connection is maintained for each MAC group which maps onto the connections group ATM address.

4.3.7 AAL 4 Multicast Service

Stations connected to multicast VCs can receive frames from many sources simultaneously. The multiplexing identifier (MID) in the ALL4 SAR header is used to correctly reassemble these frames. MIDs are unique within a given ATM LAN. The LAN server assigns a unique MID to each port address.

Up to 1023 stations may be connected to an ATM AAL ¾ LAN. Each station has a globally unique 48-bit address per ATM LAN. Each station is assigned one MID per ATM LAN (local port address to the station) to be used when transmitting frames on multicast VCs. Stations may not transmit more than one frame simultaneously on multicast VCs with the same local port address. Each station implements MAC level address filtering for frames received on multicast VCs.

Each station has a multicast filter which is used to filter frames received on broadcast VCs. This filter may be implemented in hardware or software. The filter is necessary because each ATM network provides limited multicast service and stations may broadcast unicast frames.

4.3.8 AAL 5 Multicast Service

AAL 5 does not provide for multiplexing frames on a single VC simultaneously. The mid field in the alan_parms structure is ignored. There is no limit on the number of stations (or ATM MACs) which may belong to an AAL 5 ATM LAN.

4.4 ATM Address Resolution Protocol

Individual IEEE 802.1 MAC addresses are mapped into port addresses via the ATM Address Resolution Protocol (ATM ARP). Once the port address is determined the ATM signaling protocol is used to establish a virtual connection.

4.4.1 ATM ARP Operation

Stations connected directly to ATM LANs will, conceptually, have address translation tables to map MAC addresses (both station and group addresses) into virtual connection identifiers. The MAC-to-port table, provides mappings from MAC addresses to port addresses.

The MAC transmission function accesses this table to get next hop port address given destination station address. This table is updated when new station address to port address mappings are learned via ATM ARP and when MAC group address to ATM group address mappings are computed. The entries in the MAC to port table are updated when ATM ARP requests and replies are received.

When the MAC layer is presented with a frame for transmission, it looks up the destination address in the station to port address table. If an entry is found, connection management selects the appropriate virtual connection upon which the frame should be transmitted.

If no entry is found, a new entry is allocated for that MAC address. If the MAC address is a group address, an ATM group address is computed using an AAL specific function. This operation permits the broadcast VC to be established without sending ATM ARP requests. Mapping individual MAC addresses to port addresses is accomplished by broadcasting an ATM ARP request for the MAC addresses to all stations connected to the ATM LAN. The ATM ARP request carries the senders MAC and port address mapping. All stations receive the request. The station with the specified MAC address responds with an ATM ARP reply. The responder updates its MAC-to-port table using the information in the request. The reply carries both the responders' and the requestors MAC and port addresses. When the requestor receives the ATM ARP reply, it updates its port-to-MAC address table.

| MAC to Port entry | | |
| --- | --- | --- |
| Station Address 48 Bit 802.1 MAC | Next Hop Port Address E.164 | Status |

The requesting station must transmit MAC frames on broadcast connections until it receives responses to its ATM ARP requests. It may then set up a connection using the port address in the reply. Usually, the responder sets up the connection before replying.

The ATM ARP function times out entries in the MAC-to-port table when they have been idle for some time. Connection management is notified when entries in the MAC-to-port table are added, updated or deleted. Connection management notifies ATM ARP when connections are established and released. Entries in this table are deleted when an SVC establishment to the port address fails. They are deleted when the connection corresponding to an entry is released.

TABLE 5

| Port to VPI-VCI entry | | | |
|---|---|---|---|
| Local Port Address | Peer Port Address | OOS | VPI/VCI |

4.4.2 ATM ARP PDUs

ATM ARP requests and replies are encapsulated in 802.2 LLC and the appropriate AAL for the connection upon which they are sent. ATM ARP requests are always broadcast. Therefore they are encapsulated in the AAL used for multicast connections. ATM ARP replies are usually sent on point to point connections. The ATM MACs negotiate the AAL to be used for that connection. The reply is then encapsulated in 802.2 LLC and the specific AAL framing.

The ATM ARP messages are:

```
/*
 * ATM Address Resolution Protocol.
 */
struct atm_arp {
    u_short    aa_llp;  /* lower layer protocol */
    u_short    aa_ulp;  /* upper layer protocol *
    u_char     aa_llp_len;
    u_char     aa_ulp_len;
    u_short    aa_msg_type;
    u_char     aa_sender_port[8];
    u_char     aa_sender_mac[6];
    u_char     aa_target_port[8];
    u_char     aa_target_mac[6];
};
/* aa_msg_type's */
#define ATM_ARP_REQUEST   1
#define ATM_ARP_REPLY     2
```

The aa_ulp_len and aa_llp_len fields are always 6 and 8 respectively. The aa_ulp field is set to 16. The sender mac and port addresses are set to the sender's Mac and Port addresses for request and non-proxy reply messages. The aa_send_mac field in proxy replies contains the aa_target_mac from the corresponding request. The aa_target_mac is always set to the Mac address needing resolution in requests and it is set to the requestor's Mac address in replies. The aa_target_port is undefined in requests and in replies it contains the aa_sender_port from the corresponding request. The recipient of a reply verifies that the aa_target_port corresponds to one of its own port addresses.

4.5 Connection Management

Once a MAC address has been resolved to a ATM address a connection to the station receiving frames for that MAC address can be set up and those frames can be transmitted directly to that station rather than broadcast. Connection management is responsible for defining the connection establishment and release policies. The ATM signaling protocol is used to establish connections for ATM LAN MAC frames. A specific upper layer protocol identifier is reserved for ATM LAN MAC frames.

4.5.1 Connect Establishment

Connections are established when an Unacknowledged Data Request needs to be transmitted to a MAC address for which a MAC-to-ATM address mapping is known, but no connection to that ATM address, is established (or emerging). It is possible for two MAC entities to simultaneously establish connections to each other. When connection management receives connection setup SDU from ATM signaling, it checks to see if a connection to the peer port address already exists. If another connection exists (or is being established), the connection initiated from the lower port address is released. Thus there will never be more than one connection established between two ATM MAC entities.

While a connection is being setup, frames which would be transmitted on that connection once it is established must be queued or dropped. Frames should not be broadcast. At least one frame must be queued. Implementations may chose to queue more. Once the connection is set up, any queued frames are transmitted. The first frame transmitted on a connection initiated by a station must be the ATM ARP response for the an ATM ARP request.

4.5.2 Quality of Service

Currently, distinct qualities of service may be defined for ATM MAC PDUs.

4.5.3 Connection Release

Connections for which there is no MAC-to-ATM address mapping are held for the product of the number of ATM ARP retries and retry interval and then released. The MAC-to-ATM address mappings are aged separately.

When ATM ARP deletes all the translations to a specific ATM address, all connections to that ATM address are released.

When a connection is released, the ATM ARP function deletes all MAC to ATM translations for that connection's remote ATM address.

4.6 Frame Reception

Frame Reception Stations are responsible for performing filtering of incoming frames. Unicast addressed frames for other stations will be received on the broadcast VC. Multicast frames for unregistered multicast addresses may be received on multicast VCs. These frames are not passed up to the MAC service user.

4.7 Address Resolution and Connection Establishment Example

In this example, the steps are described that are required for one station, called Lyra, to deliver a MAC UNITDATA SDU to another station, called Altera, assuming neither station has had any prior communication. It is assumed that both stations are part of the same ATM LAN. These steps are only required for the initial transmission from Lyra to Altera. Additional MAC PDUs may be transmitted on the connection setup by these steps until either station decides it no longer wishes to maintain the connection. In this example, MAC addresses are expressed in xx:xx:xx:xx:xx:xx form where each pair of hex digits, xx, is one octet for the address. Port addressees are expressed in the same form except that they have 8 octets.

An ATM MAC service user on Lyra provides the ATM MAC with an UNITDATA SDU to be sent to station address 00:80:b2:e0:00:60. The MAC consults its MAC to port address table, but finds no translation.

The MAC creates an ATM ARP request for MAC address 00:80:b2:e0:00:60. The request contains Lyra's own MAC and port addresses, 00:80:b2:e0:00:50 and d1:41:57:80:77:68:00:02 respectively. The ATM ARP is encapsulated in LLC/SNAP. The destination MAC address is ff:ff:ff:ff:ff:ff (the broadcast address). The ATM MAC recursively invokes itself to transmit the ATM ARP request.

The MAC address to port address table is searched for the broadcast MAC address and the corresponding port address is obtained, f1:41:57:80:77:68:01:01. The station established a connection to this port address when the ATM LAN MAC entered the active state. The ATM ARP PDU is encapsulated in an 802.6 frame and passed to the AAL 4 function along with the MID associated with this ATM MAC entity for transmission of that multicast connection.

The MAC must transmit the MAC SDU. In lieu of a valid MAC address to port address mapping the broadcast MAC to port mapping and associated connection are used. The MAC SDU is encapsulated in an 802.6 frame and passed to the AAL 4 function with the MID associated with this ATM MAC entity for transmission of that multicast connection.

All the above took place on Lyra. The subsequent steps take place on Altera as it receives the ATM ARP and the ATM MAC PDU containing user data.

The ATM ARP is received by all MAC entities including Altera. The other MACs determine that the requested MAC address is not theirs and ignore the request. Altera determines that its MAC address is in the request. Altera updates its MAC to port address table with Lyra's MAC and port addresses provided in the ATM ARP request. Next an ATM ARP reply is constructed using Altera's port and MAC addresses. This request, in the form of an MAC SDU with Lyra's MAC address as the destination, is passed to the ATM MAC entity.

The ATM MAC looks up Lyra's MAC address in the MAC to port address table. It finds Lyra's port address. The port to VCI table is searched using that port address. No entry is found. Connection management is invoked to establish a connection to Lyra. Connection management passes a SETUP request to ATM signaling. The MAC queues the ATM ARP response until the connection is established.

Altera ATM signaling module sends a SETUP PDU to establish a connection to port address d1:41:57:80:77:68:00:02. The upper layer protocol (sometimes called upper layer compatibility) is the ATM LAN MAC. (This is not a function of the ATM MAC. But it is included for illustrative purposes.)

Next all stations receive the MAC SDU containing the user data on the broadcast connection. All stations except Altera determine that the destination MAC address is not theirs and drop the frame. Altera accepts the frame strips off the 802.6 and LLC/SNAP overhead and passes the frame up to the user function identified by LLC/SNAP.

At this time, the SDU provided to Lyra's ATM MAC has been delivered to the appropriate MAC user on Altera. However, the MAC entities continue connection establishment and address resolution for subsequent communications between the two stations. The next sequence of operations occurs on Lyra.

ATM signaling on Lyra receives a connection setup indication from the network. This indication is passed up to the upper layer protocol which in this instance is the ATM MAC.

The ATM MAC receives a setup indication SDU from signaling. At this point Lyra knows some other station's ATM MAC is trying to setup a connection to it. The port to vci table is searched for a connection to the callers port address. In this case none is found. The connection is accepted by passing a CONNECT SDU to ATM signaling. The MAC starts an idle timer for the connection. Note, that the ATM MAC can not use this connection until an ATM ARP request or response is received indicating MAC addresses for stations accessible via the connection.

Lyra's ATM signaling transmits a CONNECT PDU to the network. Typically, network communication is bi-directional. Assuming this is the case the MAC service user on Altera has responded to the MAC SDU indication with a MAC SDU request. The following actions take place on Altera. The ordering of the arrival of MAC SDU and the CONNECT SDU are arbitrary.

The MAC service user passed the ATM MAC an SDU with a destination MAC address of 00:80:b2:e0:00:50 (Lyra's). The MAC finds the mapping from MAC address to port address learned when the ATM ARP request was received from Lyra. The MAC next finds that it is setting up a connection to Lyra's port address and that the connection is not yet established. A MAC PDU is created from the MAC SDU and queued waiting connection establishment.

Altera ATM signaling receives a connect PDU. This is passed up to the MAC as a SETUP confirmation. The ATM signaling sends a CONNECT acknowledge PDU to Lyra. The connection is considered established.

Altera's ATM MAC, upon receiving the SETUP confirmation, transmits all frames which were queued awaiting connection establishment. The ATM ARP reply is the first frame to transmitted. It is followed by the MAC PDU containing user data.

At this TIME, address resolution and connection are complete on Altera. Any further frames addressed to Lyra's MAC address will use the new connection. The connection is not established on Lyra. Also Lyra still does not have a mapping for Altera's MAC address. The following actions complete address resolution and connection establishment on Altera.

The ATM ARP reply is received on the connection which is still being setup. (Note most ATM networks have slower signaling channels than payload channels. Typically the ATM ARP response will be received prior to the CONNECT acknowledge PDU.)

The MAC enters Lyra's MAC address to port address mapping in the MAC to port table. At this point any MAC UNIT-DATA requests will be queued until the SETUP complete indication for the connection is passed up from ATM signaling.

The MAC PDU containing user data from Lyra's MAC users is received. The 802.6, LLC and SNAP headers are removed and a MAC UNITDATA indication is passed up to the appropriate MAC service user.

Altera's ATM signaling receives a CONNECT_ACK PDU. This moves the connection into established state. The ATM signaling function passes up a SETUP COMPLETE indication informing the ATM MAC it may transmit on the connection. Connection management starts its idle timer for the connection.

The connection is now established on both stations. One or more MAC UNITDATA SDUs have been delivered. The connection will be timed out as per local policy decisions.

ATM LAN Code Overview

One detailed embodiment of computer software code used in connection with the present invention appears in the VIRTUAL NETWORK USING ASYNCHRONOUS TRANSFER MODE APPENDIX.

The ATM LAN MAC code in the appendix is organized by functional components and Operating System (OS) dependencies. The file if_atm.c contains the routines which contain OS dependencies and which are typically implemented differently for each OS. The unicast unit 25 and multicast unit 24 address resolution functions are implemented in the file atmarp.c. The file atmarp.h contains the definitions for the ATM ARP protocol and the structures used by atmarp.c to implement the protocol. The file atm.c implements the function of connection management unit 27. Those routines interact with the ATM signaling function to establish and release connections. The framing unit 26 function is implemented in the OS specific file if_niu.c in the routines niuoutput(), atm_mac_input() which encapsulate and decapsulate frames respectively. The station management unit 28 functions are implmenented in atm_init.c and in parts of the ATM signaling unit 28 in the files svc.c, svc_utl.c and svc_pdu.c. The ATM LAN server unit 12 functions are implemented in the files lm.c, lm_cfg.c, lm_mgmt.c and lm_util.c.

In the APPENDIX the configuration management units 20 and 40 are implemented in an alternate embodiment wherein the operational unit 28 PDUs rather than in a switched VCs as previously described.

While the invention has been particularly shown and described with reference to preferred embodiments thereof it will be understood by those skilled in the art that various changes in form and details may be made therein without departing from the spirit and scope of the invention.

VIRTUAL NETWORK USING ASYNCHRONOUS TRANSFER MODE

APPENDIX

TABLE OF CONTENTS

| | | |
|---|---|---|
| 1 | atm.c | 2 |
| 2 | atm.h | 9 |
| 3 | atm_init.c | 13 |
| 4 | atmarp.c | 18 |
| 5 | atmarp.h | 29 |
| 6 | bits.c | 31 |
| 7 | bits.h | 33 |
| 8 | if_atm.c | 34 |
| 9 | if_atm.h | 48 |
| 10 | if_niu.c | 52 |
| 11 | if_niu.h | 71 |
| 12 | lm.c | 80 |
| 13 | lm.h | 90 |
| 14 | lm_cfg.c | 101 |
| 15 | lm_mgmt.c | 113 |
| 16 | lm_util.c | 147 |
| 17 | q.c | 178 |
| 18 | q.h | 182 |
| 19 | svc.c | 183 |
| 20 | svc.h | 220 |
| 21 | svc_pdu.c | 226 |
| 22 | svc.utl.c | 233 |
| 23 | vim.c | 246 | atm.c
/*
 * COPYRIGHT 1992 ADAPTIVE CORPORATION
 * ALL RIGHTS RESERVED
 */

/*
 * This file contains: atm_init() is called at initialization.
 * atm_find_atp() returns an atmif given a MAC and physical i/f.
 * atm_fint_mac() returns an atmif given a MAC. atm_sdu_handler() is
 * the interface to ATM signaling. atm_release() releases a VC and
 * frees any queued packets. atm_find_at() searches for an arptab
 * entry given a mac address. atm_initiate_setup() initiates VC
 * establishment.
 */ static char    sccsid[] = "%A%";

include "atm.h"
include "svc.h"
include "debug.h"
include "niu.h"
include "atmarp.h"
include "llc.h"
include "if_atm.h"

int        atm_trace = 2;
define TL1    1
define TL2    atm_trace>1
define TL3    atm_trace>2
define TL4    atm_trace>3
define TL5    atm_trace>4 int        atm_assert_panic = 1;

define HASHMA(x) HASH_LOW((x)->aa_long[1])  /* pass in a atm_addr */
define HASH_LOW(part0) (((part0>>8)^(part0))&0xf) /* pass in low 32 bits
            * of addr */

/*
 * atm_init() is called to allocate atm_glob which contains all the
 * ATM LAN MAC global variables which are written after program load.
 */ atm_init()
{
    int        i, atm_mac_input(), atm_sdu_handler();
    struct atm_globs *ag = atm_glob;

if (ag->atm_initialized)

atm.c
-3-

```
    return 0;
  ag->atmifn = NNIU * NATMS;
  ag->atm_ulp = ulp_register(LMI_MAC_ORG, LMI_MAC_PID,
        atm_mac_input, atm_sdu_handler, 0);
  ((u_short *) & ag->llc_def)[0] = 0xaaaa;
  ((u_short *) & ag->llc_def)[1] = 0x0300;
  ((u_short *) & ag->llc_def)[2] = 0x0;
  ((u_short *) & ag->llc_def)[3] = 0x0;
  ag->atm_null.aa_long[0] = 0;
  ag->atm_null.aa_long[1] = 0;
  ag->atm_null.aa_type = AAT_NULL;
  ag->atm_broadcast.aa_long[0] = 0;
  ag->atm_broadcast.aa_long[1] = 0;
  ag->atm_broadcast.aa_type = AAT_MAC;
  for (i = 0; i < 6; i++)
    ag->atm_broadcast.aa_byte[ATM_FIRST_MAC + i] =
        (u_char) 0xff;
  ag->atm_initialized = 1;
  return;
}

/*
 * atm_find_atp() returns an ATM LAN structure pointer, atp, given a
 * port address and a phys i/f.
 */
struct atmif *
atm_find_atp(pc, port)
  struct pcif   *pc;
  struct atm_addr *port;
{
  struct atmif  *atp;

for (atp = pc->pc_atmif; atp; atp = atp->ati_next)
    if (ATM_ADDR_EQ(atp->ati_port, *port))
      return atp;
  return (struct atmif *) 0;
}

/*
 * atm_fint_at() returns a pointer to an atm interface entry to be
 * used for a specific MAC address.
 */
struct atmif *
atm_find_mac(mac)
  u_char    *mac;
{
  struct atm_addr addr;
  struct pcif   *pc;
  struct atmif  *atp;
``` atm.c

```
    atm_bzero(&addr, sizeof(addr));
    atm_bcopy(mac, &addr.aa_byte[2], 6);
    addr.aa_type = AAT_MAC;

for (pc = svc_glob->svc_pcif; pc < svc_glob->svc_pcifn; pc++)
        for (atp = pc->pc_atmif; atp; atp = atp->ati_next)
            if (ATM_ADDR_EQ(atp->ati_mac, addr))
                return atp;
    return 0;
}
/*
 * atm_sdu_handler() handles signaling SDUs from the ATM signaling
 * module. The necessary ATM ARP routines are called at connection
 * establishement and release.
 */
atm_sdu_handler(vp, sdu, len)
    struct vcte   *vp;
    struct setup  *sdu;
    int           len;
{
    struct ulptab *ulp;
    int           rtn;
    struct vcte   *ovp;  /* other VC */

ASSERT(VALID_VP(vp));
    TR1(TL2, "atm_sdu_handler(%s)\n",
        svc_xdu_type_str(sdu->lmi_pdu_type));

if (vp->vcte_flags & VCTEF_MCAST_SERVER) {
        if (ulp = ulp_find(LMI_MCAST_PID, LMI_MCAST_ORG)) {
            ASSERT(VALID_ULP(vp->vcte_ulp));
            ulp_free(vp->vcte_ulp);
            ulp_tax(ulp);
            vp->vcte_ulp = ulp;
            (*ulp->ulp_lmi) (vp, sdu, len);
        } else
            atm_release(vp, INVALID_DST_ADDR);
        return;
    }
    switch (sdu->lmi_pdu_type) {
    case SDU_SETUP_IND:
        if (!svc_find_local_port(vp->vcte_pcif,
                &((struct setup *) sdu)->lmi_callee)) {
            atm_release(vp, INVALID_DST_ADDR);
            break;
        }
        ASSERT(vp->vcte_atmif == 0);
        vp->vcte_atmif = atm_find_atp(vp->vcte_pcif,
                &vp->vcte_local);
        ASSERT(VALID_ATP(vp->vcte_atmif));
``` atm.c
-5-

```
        ovp = svc_find_vc(vp->vcte_pcif, &vp->vcte_local,
            &vp->vcte_peer, atm_glob->atm_ulp,
            VCS_NOT_DEAD_OR_DYING & ~(1 << VCS_WSR));
        if (ovp && bcmp(&vp->vcte_local,
            vp->vcte_peer, sizeof(struct atm_addr))) {
            if (atm_incoming_vc_is_better(vp, ovp)) {
                arp_release(ovp->vcte_atmif->ati_arptab, ovp);
                atm_release(ovp, VC_REDUNDANT);
            } else {
                atm_free_msg(sdu);
                atm_release(vp, VC_REDUNDANT);
                break;
            }
        }
        sdu->lmi_pdu_type = SDU_SETUP_RESP;
        if (rtn = svc_sdu(vp->vcte_pcif, vp, sdu,
            sizeof(struct setup)))
            TR1(TL2, "svc_sdu(SETUP_RESP)->%d\n", rtn);
        break;
    case SDU_SETUP_COMP:
        if (bcmp(&vp->vcte_local, vp->vcte_peer,
            sizeof(struct atm_addr)))
            arp_setup(vp->ycte_atmif->ati_arptab, vp);
    case SDU_SETUP_CONF:
        atm_free_msg(sdu);
        if (vp->vcte_packet)
            atm_send_packets(vp);
        break;
    case SDU_RELEASE_IND:
        if (vp->vcte_packet)
            atm_free_packets(vp);
        arp_release(vp->vcte_atmif->ati_arptab, vp);
        atm_free_msg(sdu);
        break;
    case SDU_STATUS_RESP:
        atm_free_msg(sdu);
        break;
    default:
        panic("unknown sdu");
        break;
    }
}

/*
 * atm_incoming_vc_is_better() choses the better VC given two
 * redundant VCs. We limit the number for VCs to one between every
 * pair of ports. When a new VC is initiated we check for a
 * duplicates. The VC initiated by the station with the lowest port
 * address is released. It is imperative that both sides use this
 * algorithm otherwise we could end up in a deadly embrace.
``` atm.c

```
*/
atm_incoming_vc_is_better(ivp, ovp)
    struct vcte    *ivp;  /* incoming VC */
    struct vcte    *ovp;  /* outgoing VC (we initiated) */
{
    struct atm_addr *ours, *theirs;
    int        true;

ASSERT(ovp != ivp);
    TR2(TL3, "atm_sdu_handler: dup vcs found %x & %x\n", ivp, ovp);
    if (ivp->vcte_pcif->pc_flags & PCIF_NIU_TO_NIU) {
        /* compare MAC addresses */
        true = ivp->vcte_pcif->pc_flags & PCIF_OTHER_MAC_ADDR_IS_HIGHER;
    } else {   /* compare port addresses */
        true = ATM_ADDR_GT(ivp->vcte_peer, ivp->vcte_local);
    }
    TR2(TL3, "atm_incoming_vc_is%s_better(%s) \n",
        true ? "" : "_not", e160_ntoa(&ivp->vcte_peer));
    ASSERT(ovp);    /* keep ovp alive */
    return true;
}

/*
 * atm_release() sends a release_req to the svc module and frees any
 * queued packets.
 */
atm_release(vp, cause)
    struct vcte    *vp;
{
    struct release *rdu;
    int        rtn;

if (vp->vcte_packet)
        atm_free_packets(vp);

if (!(rdu = (struct release *) atm_alloc_msg())) {
        printf("atm_release: no memory");
        return;
    }
    rdu->lmi_proto = LMI_PROTOCOL;
    rdu->lmi_pdu_type = SDU_RELEASE_REQ;
    rdu->lmi_cref_type = vp->vcte_cref_type;
    rdu->lmi_cref_value = vp->vcte_cref_value;
    LMI_SET_ELEMENT(&rdu->lmi_cause, LMI_RELEASE_CAUSE, cause);
    if (rtn = svc_sdu(vp->vcte_pcif, vp, rdu, sizeof(*rdu)))
        TR1(TL1, "atm_release: release failed %d\n", rtn);
}
/*
``` atm.c
-7-

```
 * atm_find_at() searches for an arptab entry given a mac address.
 * The "best" entry upon which to send to the mac address is
 * returned. If the entry has no VC this routine attempts to setup
 * one.
 */
u_char      atm_macbroadcastaddr[6] = {0xff, 0xff, 0xff, 0xff, 0xff, 0xff};

struct aate  *
atm_find_at(atp, dst)
    struct atmif  *atp;
    u_char        *dst;
{
    struct vcte  *vp = 0;
    struct aate  *at;

ASSERT(VALID_ATP(atp));

at = atm_mac_to_aate(atp, dst);
    if (!at)   /* we queue frames now... ||
              * !at->aate_vcte) */
        at = atm_mac_to_aate(atp, atm_macbroadcastaddr);
    if (!at)
        return 0;
    if (!at->aate_vcte)
        atm_initiate_setup(atp, at);
    return at;
}

/*
 * atm_initiate_setup() initiates a vc setup between to the port
 * addresses using the specific interface. If there is already a vc
 * coming up between the two ports using that interface we do not
 * bother. This huarantees that we do not initiate two VCs to the
 * same port address. When we get setup indications we must also
 * check for duplicates and decide which VC to keep.
 */ atm_initiate_setup(atp, at)
    struct atmif  *atp;
    struct aate   *at;
{
    int             rtn;
    struct pcif    *pc = atp->ati_pcif;
    struct atm_addr *from = &atp->ati_port;
    struct vcte    *vp;
    struct setup   *pdu; /* setup pdu and sdu are the same */
    struct lmi_ulp *lu;

if (pc->pc_sig->vcte_state != VCS_ACTIVE)
``` atm.c

```
        /* no signaling yet */
        return 0;
    vp = svc_find_vc(pc, from, &at->aate_atmaddr,
            atm_glob->atm_ulp, VCS_NOT_DEAD_OR_DYING);
    if (vp)
        goto found_a_vc;

pdu = (struct setup *) atm_alloc_msg();
    if (!pdu)
        return 0;
    pdu->lmi_proto = LMI_PROTOCOL;
    pdu->lmi_ncalls = 1;
    pdu->lmi_caller = *from;
    pdu->lmi_callee = at->aate_atmaddr;
    pdu->lmi_pdu_type = SDU_SETUP_REQ;
    pdu->lmi_cref_type = LMI_CREFTYPE_SVC;
    pdu->lmi_cref_value = 0;/* let svc module pick one */
    lu = (struct lmi_ulp *) & pdu[1];
    lu->af_type = LMI_ULP;
    lu->af_aal = PAYLOAD_AAL_4;
    lu->af_pid = LMI_MAC_PID;
    lu->af_org = LMI_MAC_ORG;

if (rtn = svc_sdu(pc, 0, pdu, sizeof(*pdu) + sizeof(*lu)))
        TR1(TL2, "atm_initiate_setup: svc_sdu->%d\n", rtn);
    vp = svc_find_vc(pc, from, &at->aate_atmaddr,
            atm_glob->atm_ulp, VCS_NOT_DEAD_OR_DYING);
found_a_vc:
    if (vp) {
        at->aate_vcte = vp;
        vp->vcte_atmif = atp;
        svc_inc(vp);
        TR1(TL1, "atm_find_at: setup to %s failed\n",
            e160_ntoa(&at->aate_atmaddr));
    }
}
``` atm.h

```c
/* atm.h
 *
 * COPYRIGHT 1992 ADAPTIVE CORPORATION
 * ALL RIGHTS RESERVED
 */ ifndef  NIU_ATM_H
define NIU_ATM_H included include "bytes.h"
include "unipdu.h"

/*
 * atm mac service interface (asi).  This is the same as an ethernet
 * header so that upper layers can simply assume ATM is an ethernet.
 */
struct atmmsi {
   u_char     asi_dst[6];
   u_char     asi_src[6];
   u_short    asi_type;
};

/*
 * Structure of an ATM mac header for aal type 4, this is an 802.6
 * header.
 */ struct atm_header {
   struct atm_addr atm_dst;
   struct atm_addr atm_src;
   union {
      struct {
         u_int     mcb_pid:6;
         u_int     mcb_pad:2;
         u_int     mcb_delay:3;
         u_int     mcb_loss:1;
         u_int     mcb_crc:1;
         u_int     mcb_elen:3;
         u_int     mcb_pad1:16;
      }   mcbits;
      u_int       atm_mcb_long;
   }   un_mcb;
};

#define  atm_mcbits un_mcb.atm_mcb_long
#define  atm_elen   un_mcb.mcbits.mcb_elen
#define  atm_crc    un_mcb.mcbits.mcb_crc
#define  atm_loss   un_mcb.mcbits.mcb_loss
#define  atm_delay  un_mcb.mcbits.mcb_delay
#define  atm_pid    un_mcb.mcbits.mcb_pid
``` atm.h
-10-

```c
#define ATM_PID_LLC    1  /* protocol ID for LLC */
#define ATM_MCBITS_NOCRC 0x04000000 /* protocol id 1 */
#define ATM_HDR_LEN sizeof(struct atm_header)
#define ATM_PAD_SHIFT  24

/*
 * The only header extension defined is a return port address. The
 * length must be set to ATME_RPA_SIZE. Pad exists to get the 64 bit
 * address 64 bit aligned relative to the atm header.
 */ struct atm_header_ext {
    u_char       atme_len;
    u_char       atme_type;
    u_char       atme_pad[2];   /* need not be zeros (nnbz) */
    struct atm_addr atme_rpa;  /* return port address */
};

#define ATME_RPA_TYPE 112  /* out of SMDS range */
#define ATME_RPA_BYTES  sizeof(struct atm_header_ext)
#define ATME_RPA_WORDS  ((sizeof(struct atm_header_ext)+3)/4)

/*
 * Callers to atm_data_req() must ensure atleast ATM_DATA_REQ_ROOM
 * bytes are available in front of the packet data.
 */
#define ATM_DATA_REQ_ROOM (ATM_HDR_LEN+LLC_SNAP_LEN+ATME_RPA_BYTES)

/*
 * multicast address structures are linked to atm_arptabs which are
 * marked ATF_MULTI. Such entries are not timed out, nor are they
 * freed when underlying VCs are released. atm_delete_lan() free's
 * the ATF_MULTI atm_arptab entries and atm_add_lan() &
 * atm_niu_to_niu() re-allocate them and re initiate MC VCs for the
 * registered addresses.
 */
struct mcaddr {
    u_char       mc_enaddr[6];  /* multicast address */
    u_short      mc_count;      /* reference count */
    struct aate  *mc_at;        /* multicast VC */
};

#define MCADDRMAX     64 /* multicast addr table length */
#define MCCOUNTMAX    (32*1024-1) /* multicast addr max
                * reference count */
/*
 * atmif, one per atm lan, used by atm lan layer
 */
struct atmif {
``` atm.h
-11-

```c
    struct niu_arpcom *ati_ac; /* contains arp and ifnet
            * structures */
    struct atmif  *ati_next; /* linked off pcif structure */
    u_short       ati_state; /* basically do we know who
            * we are */
    u_short       ati_mid;/* mid used for multicast frames */
    u_short       ati_mcasts;  /* max # multicasts circuits
            * configured */ struct atm_addr ati_port;
    struct atm_addr ati_mac;
#define   ac_mac      ati_mac.aa_byte[2]

struct pcif   *ati_pcif;
    struct aate   *ati_arptab;  /* set at initialization */
    int           ati_num_mcasts;
    struct mcaddr ati_mcaddrs[MCADDRMAX];
};

/* ati_state */
#define ATS_INACTIVE  0
#define ATS_ACTIVE    3

/*
 * global data structure for r/w variables and variables explicitly
 * initialized.
 */ include "llc.h"

struct atm_globs {
    struct if_tr_hdr *itrb;
    struct atmif  *atmif;
    int           atmifn;
    int           atmif_used;
    struct llc_snap llc_def;
    struct atm_addr atm_broadcast;
    struct atm_addr atm_null;
    struct ulptab *atm_ulp;
    int           atm_initialized;
    char          static_buf[32];
};

#ifndef RT68K
extern struct atm_globs atm_globs;
#define atm_glob (&atm_globs)
#else
#define atm_glob atm_get_glob()
struct atm_globs *atm_get_glob();
#endif
``` atm.h

```
define  LEN_FOR_MBUF_PTRS 0xf5560002 define  HASH_MULTICAST_ADDRESS(x) ((x)&0xff)

caddr_t      atm_alloc_msg(), atm_alloc_bytes();
#define  NATMS   4   /* max # of ATM lans per physical
         * interface */ define e160_ntoa  svc_e164_ntoa/* these are really E.164 addresses */ endif        /* NIU_ATM_H */
``` atm_init.c
-13-

```
/* atm_init.c
 *
 * COPYRIGHT 1992 ADAPTIVE CORPORATION
 * ALL RIGHTS RESERVED
 *
 * This file contains the ATM LAN configuration routines. They are
 * called by the ATM signaling module when signaling enters the
 * ACTIVE state and one or more ATM LANs have been provisioned
 * "added" by NM and they are called when signaling tranisitions to
 * the WGRC state to "deleted" the ATM LANs.
 *
 * atm_attach_lan() allocates atmif structures and initializes them.
 * atm_add_lan() actives an ATM LAN initiates. atm_delete_lan()
 * deactivates an ATM LAN. atm_niu_to_niu() activates an ATM LAN in
 * back to back configuration. atm_trace_buf() add a trace record to
 * the trace buffer. atm_trace_str() add a string to the trace
 * buffer.
 */ static char     sccsid[] = "%A%";

include "debug.h"
include "niu.h"

#include "atm.h"
#include "atmarp.h"
#include "svc.h"
include "debug.h"
#include "trace.h"
#include "if_atm.h"

#define TL1     1
#define TL2     atm_trace>1
#define TL3     atm_trace>2
#define TL4     atm_trace>3
define TL5     atm_trace>4 extern int      atm_trace;

/*
 * atm_attach_lan() is called when the maximum number of ATM LANs for
 * a particular physical interface is known. The appropriate number
 * of atm lan interface structures are allocated and linked into the
 * physical interface structure.
 */
atm_attach_lan(atp, pc)
    struct atmif    *atp;
    struct pcif     *pc;
{
    struct atmif    *an;
``` atm_init.c

```c
    if (an = pc->pc_atmif) {
        while (an->ati_next)
            an = an->ati_next;
        an->ati_next = atp;
        atp->ati_next = 0;
    } else {
        atp->ati_next = 0;
        pc->pc_atmif = atp;
    }
    atp->ati_pcif = pc;

ASSERT(atp->ati_state == ATS_INACTIVE);
    if_set_mac(atp);
    atm_arptab_alloc(atp);
    atm_bzero(atp->ati_mcaddrs, sizeof(atp->ati_mcaddrs));
    atp->ati_num_mcasts = 1;
    atp->ati_mcaddrs[0].mc_count = 1;
    atm_bcopy(&atm_glob->atm_broadcast.aa_byte[ATM_FIRST_MAC],
        atp->ati_mcaddrs[0].mc_enaddr, 6);
    if (pc->pc_flags & PCIF_NIU_TO_NIU)
        atm_niu_to_niu(atp);
}

/*
 * This is called when a real switch tells use some real port
 * addresses. The mte's were freed when the previous lan was
 * deleted. If the mtu is zero this is a null LAN. It should not be
 * made active. This allows users to configure interfaces starting
 * at aa2, aa3, etc.
 */
atm_add_lan(atp, port, mid, mcasts, mtu)
    struct atmif *atp;
    struct atm_addr *port;
{
    TR1(TL1, "atm_add_lan: port = %s",
        e160_ntoa(&atp->ati_port));
    if (mtu == 0)
        return;
    atp->ati_state = ATS_ACTIVE;
    atp->ati_mid = mid;
    atp->ati_mcasts = mcasts;
    atp->ati_port = *port;
    if_add_lan(atp, mtu);
    atm_setup_mcasts(atp);
    TR1(TL2, "atm_add_lan: port = %s",
        e160_ntoa(&atp->ati_port));
    TR1(TL2, " mac = %s\n", e160_ntoa(&atp->ati_mac));
}
``` atm_init.c
-15-

```
atm_setup_mcasts(atp)
  struct atmif *atp;
{
  int         i;
  struct mcaddr *mc;

for (i = 0; i < atp->ati_num_mcasts; i++) {
    mc = &atp->ati_mcaddrs[i];
    ASSERT(mc->mc_at == 0);
    mc->mc_at = atm_find_at(atp, mc->mc_enaddr);
    ASSERT(mc->mc_at);
    mc->mc_at->aate_flags |= ATF_MULTI;
    TR1(TL3, "atm_setup_mcast: port = %s\n",
      e160_ntoa(&mc->mc_at->aate_atmaddr));
  }
}

/*
 * Called to free up any resources tied up by the ATM LAN, atp. The
 * arptab has been cleared by release indications except for
 * ATF_MULTI entries. Here we go through list of registered
 * multicast addresses free those arptab entries referenced.
 */
atm_delete_lan(atp)
  struct atmif *atp;
{
  struct mcaddr *mc;

atp->ati_state = ATS_INACTIVE;
  TR1(TL1, "atm_delete_lan: port = %s",
    e160_ntoa(&atp->ati_port));
  TR1(TL1, " mac = %s\n", e160_ntoa(&atp->ati_mac));
  atp->ati_port.aa_type = AAT_NULL;
  for (mc = atp->ati_mcaddrs;
    mc < &atp->ati_mcaddrs[atp->ati_num_mcasts]; mc++) {
    ASSERT(mc->mc_count);
    if (mc->mc_at) {
      ASSERT(mc->mc_at->aate_flags & ATF_MULTI);
      mc->mc_at->aate_flags = 0;
      atm_aate_free(mc->mc_at);
      mc->mc_at = 0;
    }
  }
  if_delete_lan(atp);
}

/*
 * set a local port address and mac address based upon mac address in
 * niu_arpcom referenced by atp. This is used when changing atm lan
 * configuration to a niu-to-niu configuration. Also set to
``` atm_init.c

```
 * broadcast mte entry and if signaling not debugged install a nailed
 * up broadcast vc.
 */ atm_niu_to_niu(atp)
    struct atmif *atp;
{
    extern int    gosig, niumtu;

atm_bzero(&atp->ati_port, sizeof(atp->ati_port));
    atp->ati_port.aa_type = AAT_PORT;
    atm_bcopy(&atp->ati_mac.aa_byte[ATM_FIRST_MAC],
        &atp->ati_port.aa_byte[ATM_N2N_MAC], 6);
    atp->ati_port.aa_lannum = if_get_lan(atp);
    atp->ati_state = ATS_ACTIVE;
    atp->ati_mcasts = 32;   /* its arbitrary */
    atp->ati_mid = 0; /* must be zero till ALAN aal driver
            * gets fixed */
    if_add_lan(atp, 0);  /* do not change mtu */
    atm_setup_mcasts(atp);
    TR1(TL2, "atm_niu_to_niu: port = %s",
        e160_ntoa(&atp->ati_port));
    TR1(TL2, " mac = %s\n", e160_ntoa(&atp->ati_mac));
} svc_trace_pdu(p, len, in, vci)
    char    *p;
{
    atm_trace_buf(p, atm_bcopy, SVC_PDU_TRACE, len, in, vci);
}

/*
 * atm_trace_buf() add a trace record to the trace buffer.
 */
int     atm_trace_limit = 64;

atm_trace_buf(p, copyproc, sub, tlen, in, vci)
    caddr_t    p;
    int        (*copyproc) ();
{
    struct if_tr_hdr *rb;
    int      s, len;

if (tlen > atm_trace_limit)
        len = atm_trace_limit;
    else
        len = tlen;
    rb = (struct if_tr_hdr *) tr_get_entry(sizeof *rb + len);
    atm_glob->ltrb = rb;
    if (!rb)
``` atm_init.c

```
    return;
  rb->thdr.subsystem = sub;
  rb->thdr.sss = in;
  rb->thdr.length = len;
  rb->tlen = tlen;
  atm_settime(rb->thdr.time);
  rb->vci = vci;
  (*copyproc) (p, (char *) &rb[1], len);
}

/*
 * atm_trace_str() add a string to the trace buffer.
 */
atm_trace_str(str)
    char      *str;
{
  struct trace_header *tr;
  int        len;

for (len = 0; str[len]; len++);
  tr = (struct trace_header *) tr_get_entry(sizeof *tr + len);
  if (!tr)
      return;
  tr->subsystem = ASCII_LOG;
  tr->sss = 0;
  tr->length = len;
  atm_settime(tr->time);
  atm_bcopy((u_char *) str, (u_char *) &tr[1], len);
}
``` atmarp.c
-18-

```c
/* atmarp.c
 *
 * COPYRIGHT 1992 ADAPTIVE CORPORATION
 * ALL RIGHTS RESERVED
 *
 *
 * ATM address resolution protocol. This module contains the routines
 * which implement atm arp. The two primary entry points are
 * atm_mac_to_aate() and atm_arp_input().
 *
 * atm_mac_to_aate() returns a pointer to and atm arp table entry.
 * atm_arp_input() handles all atm arp requests and replies.
 */ static char     sccsid[] = "%A%";

ifdef notdef
include "all.h"
#include "ip_errs.h"
#include "unsp.h"
endif          /* notdef */ include "atm.h"
include "svc.h"
#include "atmarp.h"
#include "debug.h"
#include "if_atm.h"

#define TL1    1
#define TL2    arp_trace>1
#define TL3    arp_trace>2
#define TL4    arp_trace>3
#define TL5    arp_trace>4
int        arp_trace = 2;
int        arp_debug = 2;
char       *atm_mac_sprintf();
#define N_AATE_S 64
struct aate    atm_aate[N_AATE_S * ATM_ARP_TABLES];
int        atm_aate_size = N_AATE_S * ATM_ARP_TABLES;
int        atm_arptabs = 0;/* number of tables allocated (1 per
           * atm lan) */ struct aate    *
atm_arptab_look(atp, addr)
    struct atmif    *atp;
    u_char          *addr;
{
    struct aate    *ate = atp->ati_arptab, *end;
```

```
      end = &ate[N_AATE_S];
      while (ate < end) {
        if (atm_bcmp(ate->aate_macaddr, addr,
            sizeof(ate->aate_macaddr)) == 0)
          return ate;
        else
          ate++;
      }
      return 0;
    }

/*
     * Broadcast an ATM_ARP packet, asking who has addr on atm lan ac.
     */
    atm_arprequest(atp, addr)
      struct atmif  *atp;
      u_char        *addr;
    {
      struct atm_arp *aa;

TR2(TL3, "atm_arprequest(%x, %s)\n", atp,
          atm_mac_sprintf(addr, 6));
      aa = (struct atm_arp *) atm_alloc_msg();
      if (!aa)
        return;
      aa->aa_llp = htons(ARPHRD_ATM);
      aa->aa_ulp = htons(ETHERTYPE_ATMMAC);
      aa->aa_llp_len = sizeof(aa->aa_sender_port);
      aa->aa_ulp_len = sizeof(aa->aa_sender_mac);
      aa->aa_msg_type = htons(ATM_ARP_REQUEST);
      atm_bcopy((caddr_t) & atp->ati_port, (caddr_t) aa->aa_sender_port,
          (u_int) sizeof(aa->aa_sender_port));
      atm_bcopy((caddr_t) & atp->ac_mac, (caddr_t) aa->aa_sender_mac,
          (u_int) sizeof(aa->aa_sender_mac));
      atm_bcopy((caddr_t) addr, (caddr_t) aa->aa_target_mac,
          (u_int) sizeof(aa->aa_target_mac));
      atm_bzero((caddr_t) aa->aa_target_port, sizeof(aa->aa_target_port));
      atm_send_arp(atp, addr, aa, sizeof(*aa));
    }

/*
     * atm_mac_to_aate() returns a pointer to and atm arp table entry.
     *
     * desten is filled in. If there is no entry in arptab, set one up and
     * broadcast a request for the MAC address. An arptab point is
     * returned if an existing arptab entry was found. for the mac
     * address is found (or computed).
     */
``` atmarp.c

```
struct aate   *
atm_mac_to_aate(ac, destmac)
   struct atmif *ac;
   u_char       *destmac;
{
   struct aate   *at;

TR2(TL4, "atm_mac_to_aate(%x, %s)\n", ac,
      atm_mac_sprintf(destmac, 6));
   at = atm_arptab_look(ac, destmac);
   if (at == 0) {    /* not found */
      at = atm_aate_alloc(ac->atl_arptab, destmac);
      if (at == 0)
         panic("atm_mac_to_aate: no free entry");
      if (!atm_bcmp(destmac, &ac->ac_mac, 6)) {
         atm_bcopy((caddr_t) & ac->atl_port,
            (caddr_t) & at->aate_atmaddr,
            (u_int) sizeof(ac->atl_port));
         atm_bcopy((caddr_t) & ac->ac_mac,
            (caddr_t) at->aate_macaddr,
            (u_int) sizeof(at->aate_macaddr));
         at->aate_timer = 0;
         at->aate_flags = AATF_COMPLETE;
         at->aate_vcte = 0;
         TR2(TL4, " -> %x %s\n", at,
            svc_e164_ntoa(&at->aate_atmaddr));
         return at;
      } else if (destmac[0] & 0x1) {
         /*
          * Calulate a suitable atm address to make a
          * connection with for this multicast
          * address.
          */
         atmarpmhash(ac, destmac,
            (caddr_t) & at->aate_atmaddr);
         atm_bcopy(destmac, (caddr_t) at->aate_macaddr,
            (u_int) sizeof(at->aate_macaddr));
         at->aate_timer = 0;
         at->aate_flags = AATF_COMPLETE;
         at->aate_vcte = 0;    /* no vcte get */
         TR2(TL4, " -> %x %s\n", at,
            svc_e164_ntoa(&at->aate_atmaddr));
         return at;
      }
      /*
       * Generate an ARP request, AATF_RESOLVING avoids
       * recursion.
       */
      at->aate_flags |= AATF_RESOLVING;
      atm_arprequest(ac, destmac);
``` atmarp.c
-21-

```
     at->aate_flags &= ~AATF_RESOLVING;
     TR0(TL4," -> 0\n");
     return 0;
  }
  at->aate_timer = 0; /* restart the timer */
  if (at->aate_flags & AATF_COMPLETE) { /* entry IS complete */
     TR2(TL4,"-> %x %s\n", at,
        svc_e164_ntoa(&at->aate_atmaddr));
     return at;
  }
  /*
   * There is an aate entry, but no e164 address response yet.
   * Avoid infinite recursion by using the AATF_RESOLVING flag.
   * This is temporary. The port to rt68k will necessitate
   * restructuring which, hopefully, will remove the need for
   * this flag.
   */
  if (!(at->aate_flags & AATF_RESOLVING)) {
     at->aate_flags |= AATF_RESOLVING;
     atm_arprequest(ac, destmac);
     at->aate_flags &= ~AATF_RESOLVING;
  }
  TR0(TL4, " -> 0\n");
  return 0;
}

/*
 * atm_arp_input() handles all atm arp requests and replies.
 */
atm_arp_input(atp, aa, src)
  struct atmif  *atp;
  struct atm_arp *aa;
  u_char        *src;
{
  struct aate   *at;
  u_char        target_mac[6];  /* copy of target protocol
                   * address */
  struct atm_addr *sport;

TR2(TL2, "atm_arp_input(from %s / %s)\n",
     atm_mac_sprintf(aa->aa_sender_mac, 6), svc_e164_ntoa(aa->aa_sender_port));

if (aa->aa_ulp != ETHERTYPE_ATMMAC)
     goto drop;

/* make a copy of target mac for use later */
  atm_bcopy((caddr_t) aa->aa_target_mac, (caddr_t) target_mac,
     (u_int) sizeof(target_mac));

if (!atm_bcmp((caddr_t) aa->aa_sender_mac, (caddr_t) & atp->ac_mac,
``` atmarp.c
-22-

```c
                        sizeof(aa->aa_sender_mac)))
            /* its from me so just drop it */
            goto drop;
    /*
     * Search the local database for senders mac address. Update
     * the database with new information (first deleting old
     * infomation).
     */
    at = atm_arptab_look(atp, aa->aa_sender_mac);
    if (at) {       /* If at is complete and address is
                     * different then free entry */
        if (at->aate_flags & AATF_COMPLETE) {
            if (atm_bcmp(aa->aa_sender_port, (caddr_t) & at->aate_atmaddr,
                (u_int) sizeof(aa->aa_sender_port)) != 0) { /* if different */
                atm_aate_free(at);
                at = 0;
            }
        } else { /* if at is incomplete update it */
            atm_bcopy((caddr_t) aa->aa_sender_port, (caddr_t) & at->aate_atmaddr,
                sizeof(aa->aa_sender_port));
            at->aate_flags |= AATF_COMPLETE;
        }
    }
    /*
     * If we did'nt find his mac address and he IS looking for
     * us. Then learn his as well
     */
    if (at == 0 && !atm_bcmp(target_mac, &atp->ac_mac, sizeof(target_mac))) {
        /* ensure we have a table entry */
        if (at = atm_aate_alloc(atp->ati_arptab, aa->aa_sender_mac)) {
            atm_bcopy((caddr_t) aa->aa_sender_port, (caddr_t) & at->aate_atmaddr,
                (u_int) sizeof(aa->aa_sender_port));
            at->aate_flags |= AATF_COMPLETE;
        }
    }
    /*
     * If we found his mac address and his mac address is NOT the
     * same as the guy we got this frame from, then set
     * AATF_PROXY.
     */
    if (at && atm_bcmp((caddr_t) src, (caddr_t) aa->aa_sender_mac,
            (u_int) sizeof aa->aa_sender_mac))
        at->aate_flags |= AATF_PROXY;
reply:
    /*
     * Make sure that you are trying to resolve a MAC address vs
     * some other type of address.
     */
    if (aa->aa_msg_type != ATM_ARP_REQUEST)
        goto drop;
``` atmarp.c
-23-

```c
    if (!atm_bcmp(target_mac, &atp->ac_mac, (u_int) sizeof(target_mac)) ||
        atm_mac_learned_on_non_atm_interface(target_mac))
        /*
         * Either we are the target of the arp request or we
         * found the target mac address is in our forwarding
         * database and it was learned on a non-ATM interface
         * so we send a proxy atm arp response because the
         * atm arp request can not be forwarded onto that
         * link.
         */
        sport = &atp->ati_port;
    else
        goto drop;

/*
     * We have decided to respond. Turn the request into a
     * response by copying the sender's port address into the
     * target port adr. Copy the senders protocol (MAC) address
     * into the target address. Copy the target protocol address
     * (target_mac) into the senders protocol address and copy
     * the port selected above into the senders port address.
     */ atm_bcopy((caddr_t) aa->aa_sender_port, (caddr_t) aa->aa_target_port,
        (u_int) sizeof(aa->aa_sender_port));
    atm_bcopy((caddr_t) aa->aa_sender_mac, (caddr_t) aa->aa_target_mac,
        (u_int) sizeof(aa->aa_sender_mac));
    atm_bcopy((caddr_t) target_mac, (caddr_t) aa->aa_sender_mac,
        (u_int) sizeof(aa->aa_sender_mac));
    atm_bcopy((caddr_t) sport, (caddr_t) aa->aa_sender_port,
        (u_int) sizeof(aa->aa_sender_port));
    aa->aa_msg_type = htons(ATM_ARP_REPLY);

/* go ahead and send it */
    atm_send_arp(atp, (caddr_t) aa->aa_target_mac, aa, sizeof(*aa));
    return;
drop:
    atm_free_msg((char *) aa);
    return;
}

/*
 * atm_arptab_alloc() allocates an atm arp table for the atmif
 * structure atp and schedules the first first timeout for that atm
 * arp table. Each atm arp table has uts timeouts scheduled
 * separately. This is an attempt to spread signaling traffic out
 * when there are multiple LANs. Zero is returned if no table could
 * be allocated.
 */
``` atmarp.c

```
struct aate    *
atm_arptab_alloc(atp)
    struct atmif  *atp;
{
    struct aate    *at;

at = &atm_aate[N_AATE_S * atm_arptabs];
    if (atm_arptabs == ATM_ARP_TABLES)
        return 0;
    atp->ati_arptab = at;
    atm_sched_timeout(atp);
    atm_arptabs++;
    return at;
}

/*
 * atm_aate_free() is called when an atm arp table entry is no longer
 * in use. If a VC is referenced its reference count is decremented.
 * If the VC's reference goes to zero atm_release() is called to
 * release the VC.
 */ atm_aate_free(at)
    struct aate    *at;
{
    TR2(TL3, "atm_aate_free(%s / %s)\n", atm_mac_sprintf(at->aate_macaddr, 6),
        svc_e164_ntoa(&at->aate_atmaddr));
    ASSERT((at->aate_flags & AATF_MULTICAST) == 0);
    at->aate_timer = at->aate_flags = 0;
    if (at->aate_vcte && (svc_dec(at->aate_vcte) == 0))
        atm_release(at->aate_vcte, VC_IDLE);
    at->aate_vcte = 0;
}

/*
 * Enter a new address in aate, pushing out the oldest entry from the
 * bucket if there is no room. This always succeeds since no bucket
 * can be completely filled with permanent entries (except from
 * atm_arpioctl when testing whether another permanent entry will
 * fit).
 */ struct aate    *
atm_aate_alloc(at, addr)
    struct aate    *at;    /* base of aate table for this lan */
    u_char         *addr;
{
    int            hiwater = 0;
    struct aate    *victum = 0, *end = &at[N_AATE_S];
``` atmarp.c

```
    TR1(TL3, "atm_aate_alloc(%s)\n", atm_mac_sprintf(addr, 6));
    while (at < end) {
        if (at->aate_flags == 0)
            goto found;
        if ((at->aate_flags & AATF_MULTICAST) == 0
            && (at->aate_timer >= hiwater)) {
            hiwater = at->aate_timer;
            victum = at;
        }
        at++;
    }
    if (!victum)
        return 0;
    at = victum;
    atm_aate_free(at);
found:
    atm_bcopy((caddr_t) addr, (caddr_t) at->aate_macaddr,
        (u_int) sizeof(at->aate_macaddr));
    at->aate_flags = AATF_INUSE;
    at->aate_vcte = 0;
    return (at);
}

/*
 * atmarphash() - algorithmicly generates an ATM multicast address
 * from a 48 bit address. If the number of multicast circuits
 * supported on this LAN (ati_mcasts) is 0 then use all 48 bits of
 * the MAC multicast address. The asumption being the network is
 * providing multicast service via a server with no limit to number
 * of multicast connections available to each station. If ati_mcasts
 * is greater than zero then the 48 bit address is folded into a
 * unsigned 32 bit integer by exclusive or'ing the first 2 bytes into
 * the last two bytes. The resulting integer is divided by ati_mcasts
 * and the resulting number is used as the ATM multicast address.
 */ atmarpmhash(atp, mac, port)
    struct atmif   *atp;
    u_char         *mac;
    struct atm_addr *port;
{
    port->aa_long[0] = 0;  /* clear first word of address */
    if (atp->ati_mcasts == 0) {
        atm_bcopy(mac, &port->aa_byte[ATM_FIRST_MAC], 6);
    } else {
        port->aa_long[1] = ((mac[2] << 24) |
            ((mac[3] ^ mac[1]) << 16) |
            ((mac[0] ^ mac[4]) << 8) |
            (mac[5]));
        port->aa_long[1] %= atp->ati_mcasts;
```

```c
    /*
     * This must be flipped in order to get it into
     * network byte order
     */
    htonl(port->aa_long[1]);
    port->aa_byte[ATM_FIRST_MAC] = 1;  /* set multicast bit */
}
TR1(TL4, "computed mcast of %x\n", port->aa_long[1]);
port->aa_type = AAT_MAC;/* set the type field */
}

/*
 * arp_setup() is called when a new VC is setup.  The arptable is
 * searched for entries needing a VC to the peer port.  Those entries
 * are updated to reference the new VC.
 */ arp_setup(at, vp)
    struct aate    *at;
    struct vcte    *vp;
{
    int            i;
    TR1(TL2, "atm_setup(%s)\n", svc_e164_ntoa(&vp->vcte_peer));

for (i = 0; i < N_AATE_S; i++, at++) {
        if (!(at->aate_flags & AATF_COMPLETE))
            continue;
        if (!atm_bcmp(&at->aate_atmaddr, &vp->vcte_peer,
            sizeof(vp->vcte_peer)) &&
            at->aate_vcte != vp) {
            at->aate_vcte = vp;
            svc_inc(vp);
        }
    }
}

/*
 * arp_release() is called when a VC is about to be released.  The
 * arptable is searched for references to the VC.  Any entries found
 * are freed.
 */ arp_release(at, vp)
    struct aate    *at;
    struct vcte    *vp;
{
    int            i;
    TR1(TL2, "arp_release(%s)\n", svc_e164_ntoa(&vp->vcte_peer));
    for (i = 0; i < N_AATE_S; i++, at++) {
        if (!(at->aate_flags & AATF_COMPLETE)) {
``` atmarp.c
-27-

```c
        ASSERT(at->aate_vcte == 0);
        continue;
    }
    if (at->aate_vcte != vp)
        continue;
    at->aate_vcte = 0;
    svc_dec(vp);
    if ((at->aate_flags & AATF_MULTICAST) == 0)
        atm_aate_free(at);    /* must clear aate_vcte
                   * first */
    else
        TR1(TL2, "arp_release: skipped AATF_MULTICAST at=%x\n", at);

}
    ASSERT(vp->vcte_refcnt == 0);
} int     atmarp_timeo1 = 24;    /* idle timeout */
int     atmarp_timeo2 = 3;     /* incomplete timeout */
extern int  hz;
/*
 * atm_arptimer() scans arp tables for active the ATM LAN atp. VCs ar
 * established fo registered multicast addresses if none exist. Atm
 * arp enrties for none registered addresses are timed out. When the
 * last reference to a VC is freed that VC is released (atm_aate_free
 * does this).
 */ atm_arptimer(atp)
    struct atmif  *atp;
{
    struct aate   *at = atp->ati_arptab, *end;
    int           s;

TR1(TL3, "atm_arptimer(%x)\n", at);
    atm_sched_timeout(atp);
    if (atp->ati_state == ATS_INACTIVE)
        return;
    s = splimp();
    end = &at[N_AATE_S];
    for (; at < end; at++) {
        /* set up multicast circuits which have been released */
        if ((at->aate_flags & AATF_MULTICAST) &&
            (at->aate_vcte == 0 ||
             ((1 << at->aate_vcte->vcte_state) & VCS_DEAD_OR_DYING))) {
            atm_initiate_setup(atp, at);
            continue;
        }
        if (at->aate_flags == 0 ||
            (at->aate_flags & AATF_MULTICAST))
``` atmarp.c

```
            continue;
        at->aate_timer++;
        if (at->aate_flags & AATF_COMPLETE) {
            if (at->aate_timer >= atmarp_timeo1)
                atm_aate_free(at);
        } else if (at->aate_timer >= atmarp_timeo2)
            atm_aate_free(at);
    }
    splx(s);
}
``` atmarp.h

```c
/* atmarp.h
 *
 * COPYRIGHT 1992 ADAPTIVE CORPORATION
 * ALL RIGHTS RESERVED
 */ ifndef RT68K
include "sys/types.h"
#else
#include <stdint.h>
#endif

/*
 * ATM Address Resolution Protocol (or ATM ARP) Definitions.
 */ define ETHERTYPE_ATMMAC  0x0805
define ARPHRD_ATM        16
/*
 * ATM Address Resolution Protocol.
 */
struct atm_arp {
    u_short     aa_llp;  /* lower layer protocol */
    u_short     aa_ulp;  /* upper layer protovol */
    u_char      aa_llp_len;
    u_char      aa_ulp_len;
    u_short     aa_msg_type;
    u_char      aa_sender_port[8];
    u_char      aa_sender_mac[6];
    u_char      aa_target_port[8];
    u_char      aa_target_mac[6];
};
/* aa_msg_type's */
#define ATM_ARP_REQUEST  1
#define ATM_ARP_REPLY    2
/*
 * MAC to ATM address resolution table, atm arp table entry, aate.
 */
struct aate {
    struct atm_addr aate_atmaddr;  /* port address */
    struct vcte     *aate_vcte;    /* vcte reference */
    u_char          aate_macaddr[6]; /* mac address */
    u_char          aate_timer;    /* ticks */
    u_char          aate_flags;    /* flags */
};
/* aate_flags field values */
#define AATF_INUSE     0x01
#define AATF_COMPLETE  0x02
#define AATF_MULTICAST 0x10
#define ATF_MULTI      AATF_MULTICAST
#define AATF_PROXY     0x20
``` atmarp.h

```
define AATF_RESOLVING 0x40 struct aate    *atm_aate_alloc(), *atm_arptab_look(), *atm_arpresolve();
struct aate    *atm_arptab_alloc(), *atm_find_at();
extern struct aate atm_aate[];
#define ATM_ARP_TABLES 16
extern int     atm_arptabs;
``` bits.c

```
/* bits.c
 *
 * COPYRIGHT 1992 ADAPTIVE CORPORATION
 * ALL RIGHTS RESERVED
 */

*******************************END*******************************/ ifndef UNIX
define ERRLOG printdbg
define printf printdbg
endif          /* ifndef UNIX */ include <stdint.h>
include "bits.h"

bits_get_bit(bits, size)
    bits_t      *bits;
    int         size;
{
    int         max_bit;
    int         ret;
    int         i;
    bits_t      mask;

max_bit = size * 8 * SIZE_BITS;
    for (ret = 0; ret < max_bit; ret++) {
        BITS_GET_I_MASK(ret, i, mask);
        if ((bits[i] & mask) == 0) {
            bits[i] |= mask;
            return (ret);
        }
    }
    return (-1);
} bits_tst_bit(bit, bits, size)
    int         bit;
    bits_t      *bits;
    int         size;
{
    int         ret;
    int         i;
    bits_t      mask;

BITS_GET_I_MASK(bit, i, mask);
    ret = i < size && (bits[i] & mask) != 0;
    return (ret);
}
``` bits.c

```
bits_alloc_bit(bit, bits, size)
    int       bit;
    bits_t    *bits;
    int       size;
{
    int       ret;
    int       i;
    bits_t    mask;

if (!bits_tst_bit(bit, bits, size)) {
        BITS_GET_I_MASK(bit, i, mask);
        if (i < size) {
            bits[i] |= mask;
            return (-1);
        } else {
            return (0);
        }
    }
    return (0);
} bits_free_bit(bit, bits, size)
    int       bit;
    bits_t    *bits;
    int       size;
{
    int       i;
    bits_t    mask;

BITS_GET_I_MASK(bit, i, mask);
    if (i < size)
        bits[i] &= ~mask;
} print_bits(bits, size)
    bits_t    *bits;
    int       size;
{
    int       i;

for (i = 0; i < size; i++) {
        if (bits[i] == 0) {
            printf("0x0 ");
        } else {
            printf("0x%08x ", bits[i]);
        }
    }
}
``` bits.h

```
/* bits.h
 *
 * COPYRIGHT 1992 ADAPTIVE CORPORATION
 * ALL RIGHTS RESERVED
 */

******************************END*****************************************/ ifndef BITS_H
define BITS_H typedef tUINT32 bits_t;
define SIZE_BITS   (sizeof(bits_t))

#define BITS_GET_I_MASK(bit, i, mask) \
    ((i) = (bit) / (8 * SIZE_BITS),\
     (mask) = (bits_t)0x80000000 >> ((bit) % (8 * SIZE_BITS)))

#endif          /* ifdef BITS_H */
``` if_atm.c

```c
/* if_atm.c
 *
 * COPYRIGHT 1992 ADAPTIVE CORPORATION
 * ALL RIGHTS RESERVED
 *
 *
 *
 * This file contains the operating specific routine for the ATM LAN MAC
 * for UNIX. The routines defined here are: atm_attach() is called
 * once per phys i/f at initialization.
 *
 * if_set_mac() is called get a MAC address from the OS.
 *
 * if_add_lan() is notify the OS an ATM LAN is ACTIVE.
 *
 * if_delete_lan() is notify the OS an ATM LAN is INACTIVE.
 *
 * atm_free_packets() is called to free packets queued on a VC.
 *
 * atm_append_packet() appends a packet on VC til it comes up.
 *
 * atm_send_packets() is called when a VC becomes established.
 *
 * atm_settime() Copy OS notion of time into long array of 2.
 *
 * atm_sched_timeout() schedule the OS to call atm_arptimer().
 *
 * svc_sched_timeout() schedule the OS to call svc_timeout().
 *
 * svc_init() allocates global memory area for ATM signaling.
 *
 * svc_report_version_conflict() report signaling version conflicts to
 * OS.
 *
 * atm_alloc_msg() allocates a msg buffer large enough for signal PDUs.
 *
 * atm_free_msg() frees message memory pointed to by cp.
 *
 * atm_alloc_bytes() is used to allocate memory for data structures
 *
 * aal_send_msg() sends the psecified aal payload on a VC.
 *
 * atm_send_arp() send a frame encapsulating in 802.6/LLC/SNAP type=ARP.
 *
 * atm_mac_input() handles aal payloads with 802.6 PDUs (ATM LAN).
 *
 * svc_mac_input() handles aal payloads with SVC PDUs.
 */
``` if_atm.c
-35-

```c
static char    sccsid[] = "%A%";

#ifndef    INET
define  INET       /* only support internet addressing */
endif
include "../sys/param.h"
include "../sys/systm.h"
#include "../sys/mbuf.h"
#include "../sys/socket.h"
#include "../sys/errno.h"
#include "../sys/ioctl.h"

#include "../net/if.h"
#include "../net/netisr.h"
#include "../net/route.h"
#include "../net/if_arp.h"

#include "../sun/openprom.h"
#include "../sun4c/mmu.h"

#ifdef   INET
#include "../netinet/in.h"
#include "../netinet/in_systm.h"
#include "../netinet/in_var.h"
#include "../netinet/ip.h"
endif include "debug.h"
include "niu.h"
#include "unipdu.h"
#include "atm.h"
#include "llc.h"
#include "svc.h"
#include "svc_util.h"
#include "if_niuarp.h"
#include "atmarp.h"
#include "if_niu.h"
#include "if_niuio.h"
#include "if_atm.h"
#include "sys/time.h"

int        atm_watch();
int        svc_pcm = 1;
extern int   atm_trace;
#define TL1    1
define TL2    atm_trace>1
define TL3    atm_trace>2
define TL4    atm_trace>3
define TL5    atm_trace>4
``` if_atm.c

```c
struct niu_arpcom niu_arpcoms[NNIU * NATMS];
/*
 * atm_attach() is called when the maximum number of allowed ATM LANs
 * for a specific interface have been determined.  atm_nnius must be
 * patched with the number of ATM LANs per physical interface before
 * booting.  Only that number of ATM LANs will be configured
 * regardless of ATM LAN configuration information providied by the
 * LMI configuration protocol.  (We could dynamically attach and
 * dettach ifnet structures BUT the there is a significant
 * probability other code in the system assumes ifnets are are static
 * after boot.  So ifnets are statically linked once at boot.)
 */ atm_attach(pc)
    struct pcif    *pc;
{
    struct ifnet   *ifp;
    struct atmif   *atp;
    int            lan, ifunit;
    int            niuoutput(), niusoioctl(), mac[2];

atm_init();
    for (lan = 0; lan < pc->pc_num_lans; lan++) {
        ifunit = atm_glob->atmif_used++;
        atp = &atm_glob->atmif[ifunit];
        atp->ati_ac = &niu_arpcoms[ifunit];
        niu_arpcoms[ifunit].ac_atmif = atp;
        ifp = &atp->ati_ac->ac_if;
        ifp->if_unit = ifunit;
        if (niu_info[pc->pc_num].macaddr[0] ||
            niu_info[pc->pc_num].macaddr[1]) {
            mac[0] = niu_info[pc->pc_num].macaddr[0];
            mac[1] = niu_info[pc->pc_num].macaddr[1] + lan;
            bcopy(((char *) mac) + 2,
                ((struct niu_arpcom *) ifp)->ac_enaddr, 6);
        } else
            niu_get_enaddr(ifp->if_unit,
                ((struct niu_arpcom *) ifp)->ac_enaddr);
        ifp->if_name = "aa";
        ifp->if_mtu = pc->pc_hw_max_mtu;
        ifp->if_flags = IFF_BROADCAST | IFF_NOTRAILERS;
        ifp->if_ioctl = niusoioctl;
        ifp->if_output = niuoutput;
        ifp->if_promisc = 1;
        ifp->if_timer = 1;
        ifp->if_snd.ifq_maxlen = IFQ_MAXLEN;
        ifp->if_watchdog = atm_watch;
        if_attach(ifp);
        atm_attach_lan(atp, pc);
    }
``` if_atm.c
-37-

```
} int     awi = 0;    /* atm watch interval, for those who
         * can not type */
int     awittg[NNIU];  /* atm watch interval ticks to go */ atm_watch(ifunit)
   int      ifunit;
{
   struct ifnet  *ifp = (struct ifnet *) & niu_arpcoms[ifunit];
   int      iounit = NIU_IFUNIT_TO_IOUNIT(ifunit);
   int      s;

ifp->if_timer = 1;
   if (ifunit != 0)
      return 0;
   if (awi == 0)
      return 0;
   if (awittg[iounit] <= 0) {
      printf("reseting unit %d from watchdog\n", iounit);
      s = splimp();
      (*niu_info[iounit].reset) (iounit, 1);
      if (niu_info[iounit].type == NIU_TYPE_HW) {
         setup_rxbuf(&niu_info[iounit]);
      }
      splx(s);
      awittg[iounit] = awi;
   } else
      awittg[iounit]--;
   return 0;
}

/*
 * set ati_mac from value provided by os
 */
if_set_mac(atp)
   struct atmif  *atp;
{
   bzero(&atp->ati_mac, sizeof(struct atm_addr));
   atp->ati_mac.aa_type = AAT_MAC;
   bcopy(atp->ati_ac->ac_enaddr,
      &atp->ati_mac.aa_byte[ATM_FIRST_MAC], 6);
}

/*
 * if_add_lan() is notify the OS an ATM LAN is ACTIVE. (and
 * conditionally set mtu size)
 */
if_add_lan(atp, mtu)
   struct atmif  *atp;
``` if_atm.c

```c
   int       mtu;
{
   if (mtu && mtu <= atp->ati_pcif->pc_hw_max_mtu)
      ((struct ifnet *) atp->ati_ac)->if_mtu = mtu;
   ((struct ifnet *) atp->ati_ac)->if_flags |= IFF_RUNNING;
}

/*
 * if_delete_lan() is notify the OS an ATM LAN is INACTIVE.
 */ if_delete_lan(atp, mtu)
   struct atmif   *atp;
{
   ((struct ifnet *) atp->ati_ac)->if_flags &= ~IFF_RUNNING;
}

/*
 * convert os ifunit to atmif index, this is not called very often.
 */
if_get_lan(atp)
   struct atmif   *atp;
{
   int       i;
   struct atmif   *atp0;
   for (i = 0, atp0 = atp->ati_pcif->pc_atmif;
         atp0 != atp;
         atp0 = atp0->ati_next, i++);
   return i;
}
/*
 * atm_free_packets() is called to free packets queued on a VC.
 */
#ifndef KERNEL
#define m_freem(m) atm_free_msg(m)
endif atm_free_packets(vp)
   struct vcte    *vp;
{
   struct mbuf    *m = (struct mbuf *) vp->vcte_packet;
   struct mbuf    *m0;

while (m) {
      m0 = m->m_act;
      m_freem(m);
      m = m0;
   }
   vp->vcte_packet = 0;
}
``` if_atm.c

```c
/*
 * atm_append_packet() appends a packet on VC til it comes up. (we
 * only queue two packets)
 */
atm_append_packet(vp, m)
    struct vcte   *vp;
    struct mbuf   *m;
{
  m->m_act = 0;
  if (vp->vcte_packet) {
     if (((struct mbuf *) vp->vcte_packet)->m_act != 0) {
        m_freem(m);
        return;
     } else
        ((struct mbuf *) vp->vcte_packet)->m_act = m;
  } else
     vp->vcte_packet = (caddr_t) m;
  svc_glob->svcstat.queued_frames++;
  return;
}
/*
 * atm_send_packets() is called when a VC becomes established. Any
 * queued packets are sent.
 */ atm_send_packets(vp)
    struct vcte   *vp;
{
  struct mbuf   *m = (struct mbuf *) vp->vcte_packet;
  struct mbuf   *m0;

while (m) {
     m0 = m->m_act;
     aal_send_msg(vp, vp->vcte_atmif->ati_mid, (caddr_t) m,
           LEN_FOR_MBUF_PTRS);
     m = m0;
  }
  vp->vcte_packet = 0;
}

/*
 * atm_settime() Copy OS notion of time into long array of 2.
 */
atm_settime(t)
    struct timeval *t;
{
  extern struct timeval time;
  int         spl;
  spl = spl7();
``` if_atm.c

```
    *t = time;
    splx(spl);
} int        atm_arptimer();
int        atm_arp_ms_per_tick = 10000; /* once every 10 seconds */
/*
 * atm_sched_timeout() schedule the OS to call atm_arptimer().
 */
atm_sched_timeout(atp)
    register struct atmif *atp;
{
#ifdef notdef
    /* I assumed tcp_start_timer() takes seconds ?? */
    tcp_start_timer(&(atp->tmr_entry),
        atm_arp_ms_per_tick / 10 ? ? ?,
        atm_arptimer, (caddr_t) atp);
#else
    timeout(atm_arptimer, (caddr_t) atp,
        atm_arp_ms_per_tick * hz / 1000);
#endif
}

/*
 * returns true if we are forwarding frames out a specific non-ATM
 * interface. Otherwise returns false.
 */ atm_mac_learned_on_non_atm_interface(mac)
    caddr_t    mac;
{
    return 0;
}

/*
 * atm_send_arp() send a frame encapsulating in 802.6/LLC/SNAP
 * type=ARP.
 */
atm_send_arp(atp, mac, msg, len)
    struct atmif  *atp;
    caddr_t       msg, mac;
{
    struct mbuf    *m;
    struct sockaddr sa;

m = dtom(msg);
    m->m_len = len;
    ASSERT(len <= MLEN);
    sa.sa_family = AF_UNSPEC;
``` if_atm.c

```c
    ((struct ether_header *) sa.sa_data)->ether_type =
        ETHERTYPE_ARP;
    bcopy(mac,
        ((struct ether_header *) sa.sa_data)->ether_dhost, 6);
    niuoutput(atp->ati_ac, m, &sa);
}

/*
 * aal_send_msg() sends the psecified aal payload on a VC. Sends a
 * message, msg, of length, len, byte on VC vp using multiplex-id,
 * mid. If len is LEN_FOR_MBUF_PTR then msg is a pointer to an mbuf
 * chain. Otherwise it is a pointer into an mbuf. There should
 * probably be separate routines for this...
 */
aal_send_msg(vp, mid, msg, len)
    struct vcte   *vp;
    int           mid;
    caddr_t       msg;
    int           len;
{
    struct mbuf   *m;
    struct ifnet  *ifp;
    struct sockaddr_aal sa;

if (len == LEN_FOR_MBUF_PTRS) {
        m = (struct mbuf *) msg;
    } else {
        struct setup  *pdu;
        pdu = (struct setup *) msg;
        TR1(TL3, "aal_send: %s\n",
            svc_pdu_type_str(pdu->lmi_pdu_type));
        if (pdu->lmi_pdu_type <= LMI_PDU_LAST)
            svc_glob->svcstat.pdus_sent[pdu->lmi_pdu_type]++;
        m = dtom(msg);
        m->m_len = len;
        if ((pdu->lmi_cref_type | pdu->lmi_cref_value) && TL2)
            svc_trace_pdu(pdu, len, 0, vp->vcte_ovpci);
    }
    vcoutput(vp, m, mid);
}

/*
 * atm_mac_input() handles aal payloads processing 802.6 & calling
 * LLC. Should be called at SPLIMP. Called by deliver_packet().
 * atm_data_ind() is called to process the ATM MAC header and get a
 * pointer to the LLC header. llc_data_ind() is called to process
 * the llc frame.
 */
``` if_atm.c

```
atm_mac_input(vp, m0)
  struct mbuf   *m0;
  struct vcte   *vp;
{
  struct ifnet  *ifp;
  struct atm_header *ah;
  struct llc_snap *lp;
  u_char        *src;
  u_long        *p;
  int           mac_hdr_len;
  int           promisc = 0;

ifp = (struct ifnet *) ((struct atmif *) vp->vcte_atmif)->ati_ac;
  ifp->if_ipackets++;

DB1(DL4, "aa%d: atm_mac_input\n", ifp->if_unit);

ah = mtod(m0, struct atm_header *);
  ASSERT((((u_long) ah) & 0x3) == 0);
  if (m0->m_len < LLC_LEN + ATM_HDR_LEN + ah->atm_elen * 4) {
    DB1(DL1, "aa%d: atm_mac_input short frame\n", ifp->if_unit);
    m_freem(m0);
    return ENOBUFS;
  }
  if (ah->atm_dst.aa_byte[2] & 0x01) {
    if (!niu_findmulti(vp->vcte_atmif, &ah->atm_dst.aa_byte[2])) {
      promisc = 1;
    }
  } else if (!ATM_ADDR_EQ(ah->atm_dst, vp->vcte_atmif->ati_mac)) {
    promisc = 1;
  }
  lp = (struct llc_snap *) ((caddr_t) ah + ah->atm_elen * 4 +
        sizeof(*ah));
  mac_hdr_len = (caddr_t) lp - (caddr_t) ah;
  src = &ah->atm_src.aa_byte[2];
  if (ifp->if_promisc) /* assume nit interface is active */
    niu_snitify_8026(ifp, m0, mac_hdr_len, promisc);
  if (promisc)
    m_freem(m0);
  else {
    m_adj(m0, mac_hdr_len);
    if (ah->atm_pid != ATM_PID_LLC)
      m_freem(m0);
    else
      llc_data_ind(ifp, m0, src, mac_hdr_len, lp);
  }
  return 0;
}

/*
``` if_atm.c

```c
 * svc_mac_input() handles aal payloads with SVC PDUs. Note, SVC PDUs
 * must fit in one mbuf. Hence the limitation for 4 ATM LANs for
 * 4.2BSD UNIX implementations. This could be changed by using
 * clusters for PDUs.
 */
svc_mac_input(vp, m)
    struct vcte    *vp;
    struct mbuf    *m;
{
    int         len = m_len(m);

if (len > MLEN) {
        svc_glob->svcstat.pdu_too_big++;
        m_freem(m);
        return 0;
    }
    m = m_pullup(m, len);
    if (m == 0) {
        svc_glob->svcstat.pdu_lost_nomem++;
        return 0;
    }
    ASSERT((mtod(m, int) &3) == 0);
    if (m->m_next) {
        m_freem(m->m_next);
        m->m_next = 0;
    }
    svc_pdu(vp->vcte_pcif, mtod(m, caddr_t), len);
} include "../sys/domain.h"
extern struct domain svcdomain, pvcdomain;
#define ADDDOMAIN(x)    { \
        extern struct domain x/**/domain; \
        x/**/domain.dom_next = domains; \
        domains = &x/**/domain; \
}

/*
 * svc_init() allocates global memory area for ATM signaling.
 */
extern int    tr_buf_size;
struct vcte   svc_vctes[VCTAB_SIZE];
int           svc_init_count = 0;
struct ulptab svc_ulptab[NULPS];
struct atm_globs atm_globs;
struct tr_globs tr_globs;
struct svc_globs svc_globs;
char          svc_e164_str[32];

svc_init()
``` if_atm.c

```c
{
    struct vcte   *vp;
    int           svc_mac_lmi(), svc_mac_input();

if (svc_init_count)
        return;
    svc_glob->static_buf = svc_e164_str;
    svc_init_count = 1;
    bzero(&svc_glob->svcstat, sizeof(struct svcstat));
    svc_glob->vcte_free = svc_vctes;
    svc_glob->vcte_base = svc_vctes;
    svc_glob->ulptab = svc_ulptab;
    svc_glob->ulp_inuse = 0;
    for (vp = svc_vctes; vp < &svc_vctes[VCTAB_SIZE]; vp++)
        vp->vcte_next_cref = (struct vcte *) &vp[1];
    (--vp)->vcte_next_cref = 0;
    svc_glob->sig_ulp = ulp_register(LMI_LMI_ORG,
            LMI_LMI_PID,
            svc_mac_input, svc_mac_lmi, 0);
    svc_glob->svc_pcif =
        (struct pcif *) atm_alloc_bytes(sizeof(struct pcif) * NNIU);
    bzero((caddr_t) svc_glob->svc_pcif, sizeof(struct pcif) * NNIU);
    svc_glob->svc_pcifn = &svc_glob->svc_pcif[NNIU];
    svc_glob->svc_parms = svc_parms;

atm_glob->atmif = (struct atmif *)
        atm_alloc_bytes(sizeof(struct atmif) * NATMS * NNIU);
    bzero((caddr_t) atm_glob->atmif,
        sizeof(struct atmif) * NATMS * NNIU);

tr_init(tr_glob, tr_buf_size);
    ADDDOMAIN(pvc);
    ADDDOMAIN(svc);
    ADDDOMAIN(llc);
    pvc_init();
}
#if 0
atm_bzero(p, l)
    char    *p;
{
    bzero(p, l);
} atm_bcopy(s, d, l)
    char    *s, *d;
{
    bcopy(s, d, l);
} atm_bcmp(s, d, l)
``` if_atm.c

```c
    char    *s, *d;
{
    return bcmp(s, d, l);
}
#endif

/*
 * svc_sched_timeout() is called to schedule svc_timeout() to be
 * called with the argument "pc" when the next signaling tick tock's.
 * On UNIX this is mapped onto timeout() converting svc_ms_per_tick
 * to Hertz. Presumably MS-DOS uses Avis based timeouts.
 */ svc_sched_timeout(pc)
    struct pcif  *pc;
{
    int     svc_timeout();

timeout(svc_timeout, (caddr_t) pc,
        (svc_ms_per_tick * hz) / 1000);
}

/*
 * svc_report_version_conflict() is called everytime a signaling PDU
 * with an unsupported version is received. It should report this
 * using the appropriate OS routines. For UNIX we printf to the
 * console no more than once every 15 seconds.
 */
struct timeval  svc_last_conflict;

svc_report_version_conflict()
{
    extern struct timeval time;
    if ((svc_last_conflict.tv_sec + 15) < time.tv_sec) {
        printf("niu0: signaling protocol version conflict\n");
        svc_last_conflict.tv_sec = time.tv_sec;
    }
}

/*
 * atm_alloc_msg() allocates a msg buffer large enough for signal
 * PDUs.
 */
caddr_t
atm_alloc_msg()
{
    struct mbuf  *m;

m = m_get(M_DONTWAIT, MT_DATA);
``` if_atm.c

```
    if (!m)
        return 0;
    m->m_off = MMINOFF;
    m->m_len = 0;
    return mtod(m, caddr_t);
} struct mbuf   *atm_lastfm;

/*
 * atm_free_msg() frees message memory pointed to by cp.
 */
atm_free_msg(cp)
    char      *cp;
{
    ASSERT(!VALID_VP((struct vcte *) cp));
    atm_lastfm = dtom(cp);
    m_freem(atm_lastfm);
}

/*
 * atm_alloc_bytes() is used to allocate memory for data structures
 * which are never freed, e.g., svc_pcif tables.
 */
caddr_t
atm_alloc_bytes(n)
{
    return kmem_alloc(n);
} int       atm_trace_to_console = 0;
/*
 * Convert address to a hex byte string.  The length of the address
 * is specified with the argument len.
 */
``` if_atm.c

```
char        *
atm_mac_sprintf(ap, len)
    u_char    *ap;
{
    int       i;
    char      *cp = atm_glob->static_buf;
    static char  digits[] = "0123456789abcdef";

for (i = 0; i < len; i++) {
        *cp++ = digits[*ap >> 4];
        *cp++ = digits[*ap++ & 0xf];
        *cp++ = ':';
    }
    *--cp = 0;
    return atm_glob->static_buf;
``` if atm_.h

```c
/* if_atm.h
 *
 * COPYRIGHT 1992 ADAPTIVE CORPORATION
 * ALL RIGHTS RESERVED
 */
#ifndef NIU_ATM_H
define NIU_ATM_H included include "bytes.h"
include "unipdu.h"

/*
 * atm mac service interface (asi).  This is the same as an ethernet
 * header so that upper layers can simply assume ATM is an ethernet.
 */
struct atmmsi {
    u_char      asi_dst[6];
    u_char      asi_src[6];
    u_short     asi_type;
};

/*
 * Structure of an ATM mac header for aal type 4, this is an 802.6
 * header.
 */ struct atm_header {
    struct atm_addr atm_dst;
    struct atm_addr atm_src;
    union {
        struct {
            u_int       mcb_pid:6;
            u_int       mcb_pad:2;
            u_int       mcb_delay:3;
            u_int       mcb_loss:1;
            u_int       mcb_crc:1;
            u_int       mcb_elen:3;
            u_int       mcb_pad1:16;
        }           mcbits;
        u_int       atm_mcb_long;
    }           un_mcb;
};

#define atm_mcbits  un_mcb.atm_mcb_long
#define atm_elen    un_mcb.mcbits.mcb_elen
#define atm_crc     un_mcb.mcbits.mcb_crc
#define atm_loss    un_mcb.mcbits.mcb_loss
#define atm_delay   un_mcb.mcbits.mcb_delay
#define atm_pid     un_mcb.mcbits.mcb_pid
``` if atm_.h

```c
#define ATM_PID_LLC    1  /* protocol ID for LLC */
#define ATM_MCBITS_NOCRC 0x04000000 /* protocol id 1 */
#define ATM_HDR_LEN sizeof(struct atm_header)
#define ATM_PAD_SHIFT   24

/*
 * The only header extension defined is a return port address. The
 * length must be set to ATME_RPA_SIZE. Pad exists to get the 64 bit
 * address 64 bit aligned relative to the atm header.
 */ struct atm_header_ext {
    u_char      atme_len;
    u_char      atme_type;
    u_char      atme_pad[2];  /* need not be zeros (nnbz) */
    struct atm_addr atme_rpa; /* return port address */
};

#define ATME_RPA_TYPE  112  /* out of SMDS range */
#define ATME_RPA_BYTES  sizeof(struct atm_header_ext)
#define ATME_RPA_WORDS  ((sizeof(struct atm_header_ext)+3)/4)

/*
 * Callers to atm_data_req() must ensure atleast ATM_DATA_REQ_ROOM
 * bytes are available in front of the packet data.
 */
#define ATM_DATA_REQ_ROOM (ATM_HDR_LEN+LLC_SNAP_LEN+ATME_RPA_BYTES)

/*
 * multicast address structures are linked to atm_arptabs which are
 * marked ATF_MULTI. Such entries are not timed out, nor are they
 * freed when underlying VCs are released. atm_delete_lan() free's
 * the ATF_MULTI atm_arptab entries and atm_add_lan() &
 * atm_niu_to_niu() re-allocate them and re initiate MC VCs for the
 * registered addresses.
 */
struct mcaddr {
    u_char      mc_enaddr[6]; /* multicast address */
    u_short     mc_count;     /* reference count */
    struct aate *mc_at;       /* multicast VC */
};

#define MCADDRMAX    64 /* multicast addr table length */
#define MCCOUNTMAX   (32*1024-1) /* multicast addr max
             * reference count */
/*
 * atmif, one per atm lan, used by atm lan layer
 */
struct atmif {
    struct niu_arpcom *ati_ac; /* contains arp and ifnet
``` if atm_.h
-50-

```
         * structures */
    struct atmif *ati_next;  /* linked off pcif structure */
    u_short      ati_state;  /* basically do we know who
         * we are */
    u_short      ati_mid; /* mid used for multicast frames */
    u_short      ati_mcasts;  /* max # multicasts circuits
         * configured */ struct atm_addr ati_port;
    struct atm_addr ati_mac;
#define ac_mac    ati_mac.aa_byte[2]

struct pcif  *ati_pcif;
    struct aate  *ati_arptab;  /* set at initialization */
    int          ati_num_mcasts;
    struct mcaddr ati_mcaddrs[MCADDRMAX];
};

/* ati_state */
#define ATS_INACTIVE  0
#define ATS_ACTIVE    3

/*
 * global data structure for r/w variables and variables explicitly
 * initialized.
 */ include "llc.h"

struct atm_globs {
    struct if_tr_hdr *itrb;
    struct atmif *atmif;
    int          atmifn;
    int          atmif_used;
    struct llc_snap llc_def;
    struct atm_addr atm_broadcast;
    struct atm_addr atm_null;
    struct ulptab *atm_ulp;
    int          atm_initialized;
    char         static_buf[32];
};

#ifndef RT68K
extern struct atm_globs atm_globs;
#define atm_glob (&atm_globs)
#else
#define atm_glob atm_get_glob()
struct atm_globs *atm_get_glob();
#endif
``` if atm_.h

```
define LEN_FOR_MBUF_PTRS 0xd5560002 define HASH_MULTICAST_ADDRESS(x) ((x)&0xff)

caddr_t    atm_alloc_msg(), atm_alloc_bytes();
#define NATMS  4  /* max # of ATM lans per physical
         * interface */ define e160_ntoa  svc_e164_ntoa/* these are really E.164 addresses */ endif         /* NIU_ATM_H */
``` if_niu.c

```c
/* if_niu.c
 *
 * COPYRIGHT 1992 ADAPTIVE CORPORATION
 * ALL RIGHTS RESERVED
 /*
 *
 * Description:   This file contains the network interface portion of
 * the niu device driver.
 *
 */
static char    sccsid[] = "%A%";

#ifndef    KERNEL
#define  KERNEL
endif ifndef    INET
define  INET       /* only support internet addressing */
endif include "../sys/param.h"
include "../sys/systm.h"
#include "../sys/mbuf.h"
#include "../sys/socket.h"
#include "../sys/errno.h"
#include "../sys/ioctl.h"
#include "../sys/time.h"
#include "../sys/kernel.h"
#include "../sun4c/psl.h"

#include "../net/if.h"
#include "../net/netisr.h"
#include "../net/route.h"
#include "../net/if_arp.h"

#include "../sun/openprom.h"
#include "../sundev/mbvar.h"
#include "../sun4c/mmu.h"

#ifdef  INET
#include "../netinet/in.h"
#include "../netinet/in_systm.h"
#include "../netinet/in_var.h"
#include "../netinet/ip.h"
endif include "debug.h"
include "niu.h"
#include "unipdu.h"
``` if_niu.c

```
#include "atm.h"
#include "tic.h"
#include "svc.h"
#include "if_niuarp.h"
#include "atmarp.h"
#include "if_niu.h"
#include "if_niuio.h"
#include "trace.h"
#include "../net/nit_if.h"
#include "snit.h"
int         aal_trace_enable = 1;

/* debugging and tracing stuff */
#define DL1    1
#define DL2    niu_debug>1
#define DL3    niu_debug>2
#define DL4    niu_debug>3
#define DL5    niu_debug>4
#define TL1    1
#define TL2    niu_trace>1
#define TL3    niu_trace>2
#define TL4    niu_trace>3
define TL5    niu_trace>4 define DRAIN_TIME    4
/* the SIOCNIUDBUG will set ALL debugging and tracing levels */
int         niu_debug = 1;   /* conveys important driver
            * information */
int         niu_trace = 1;   /* show excessive detail of the
            * program stream */
extern int    arp_debug;
extern int    arp_trace;
extern int    drv_debug;
extern int    drv_trace;
extern int    dump_flag;

int         niumtu = 2000;
int         niu_unit_count = 0; /* total number of sw and hw
            * units installed */
struct niu_dev  niu_info[NNIU]; /* network interface device structure */
int           niuoutput(), niusoioctl();

/*
 * Name:    niuoutput
 *
 * Input:   *ifp    -- pointer to network interface to
 * use. m    -- mbuf pointer containing packet to be sent.
 * dst      -- ip address of destination.
 *
 * Output:  None.
``` if_niu.c
-54-

```
 * Return:     0    -- no error. Error
 * Unix error code.
 *
 * Description: This routine is called with a frame and a destination
 * address. Appropriate address resoltuion is performed for the
 * destination addresses until a VCI is obtained. The families
 * supported are: AF_INET: An IP address is resloved using ARP
 * into a 48 bit address. AF_UNSPEC:  A 48 bit address is resloved
 * into a 60 bit address and LLC/SNAP header is added. AF_NS: A 48
 * bit address is resloved into a 60 bit address but no LLC/SNAP
 * header is added. AF_CCITT: A 60 bit telephone number is resolved
 * into a VCI using the port address to vci tables. AF_DLI: A VCI
 * is supplied. No resolution is performed. The VCI is in
 * sockaddr_aal structure. AF_INET, AF_UNSPEC and AF_NS frames are
 * encapsulated as per 802.6. Other address families are assumed to
 * be encapsulated already.
 *
 * Note: The above families overload existing AF_xxx values. Also raw
 * aal frames get queued on the first atmlan's ifnet send queue for
 * lack of a better place to put them.
 *
 */
int        niu_reset_on_full = 0, niu_auto_resets = 0;
int        willie_panic = 0;

niuoutput(ifp, m, dstin)
    struct ifnet  *ifp;
    register struct mbuf *m;
    struct sockaddr *dstin;
{
    int          usetrailers, s, len, ifunit, rate;
    struct vcte  *vp;
    struct ifqueue *ifq;
    struct sockaddr ldst;
    struct mbuf  *mh;
    struct in_addr idst;
    u_char       endest[6];
    struct niu_arpcom *ac;
    struct aal_parms *ap;
    struct llc_snap *lc;
    int          iounit, error = 0;

iounit = NIU_IFUNIT_TO_IOUNIT(ifp->if_unit);
    /* check if network is up */

TR4(TL3, "niuoutput(%x, %x, %x, af=%d)\n",
        ifp, m, dstin, dstin->sa_family);
    if ((ifp->if_flags & IFF_UP) == 0 &&
        dstin->sa_family != AF_DLI) {
``` if_niu.c

```
    m_freem(m);
    error = ENETDOWN;
    goto rtn;
  }
  ifunit = ifp->if_unit;
  ac = &niu_arpcoms[ifunit];
  s = splr(ipltospl(niu_info[iounit].priority));
#ifdef INET
  if (dstin->sa_family == AF_INET) {
    idst = ((struct sockaddr_in *) dstin)->sin_addr;
    DB2(DL2, "aa%d: dest = %s\n",
        ifunit, inet_ntoa(idst));
    if (!niu_arpresolve(ac, m, &idst,
            idst.sa_data, &usetrailers)) {
      goto rts;
    }
    ((struct ether_header *) idst.sa_data)->ether_type =
        ETHERTYPE_IP;
    idst.sa_family = AF_UNSPEC;
    dstin = &idst;
  } else
#endif
    if (dstin->sa_family != AF_DLI &&
        dstin->sa_family != AF_NS &&
        dstin->sa_family != AF_UNSPEC) {
    printf("aa%d: can't handle af%d\n", ifp->if_unit,
        dstin->sa_family);
    m_freem(m);
    niu_info[iounit].stats.errors++;
    error = EAFNOSUPPORT;
    goto rts;
  }
  /*
   * dstin.sa_data contains an ethernet header w/o a source adr
   * & type. (unless AF_DLI in which case we have a vci...)
   */
  if ((m->m_off & 0x3) || M_HASCL(m) ||   /* make room */
      (m->m_off - MMINOFF) < (ATM_DATA_REQ_ROOM +
            sizeof(struct aal_parms))) {
    if ((mh = m_get(M_DONTWAIT, MT_DATA)) == NULL) {
      m_freem(m);
      error = ENOBUFS;
      goto rts;
    }
    mh->m_len = 0;
    mh->m_off = MMAXOFF;
    mh->m_next = m;
    m = mh;
  }
  if (dstin->sa_family == AF_UNSPEC) {
``` if_niu.c

```
    /* add LLC and SNAP */
    lc = &(mtod(m, struct llc_snap *)[-1]);
    *lc = atm_glob->llc_def;
    lc->llc_type = ((struct atmmsi *) dstin->sa_data)->asi_type;
    m->m_off -= sizeof(*lc);
    m->m_len += sizeof(*lc);
}
len = 0;
for (mh = m; mh; mh = mh->m_next)
    len += mh->m_len;
if (dstin->sa_family == AF_UNSPEC ||
    dstin->sa_family == AF_NS) { /* get vci for mac
                * address */
    struct atm_header *ah = mtod(m, struct atm_header *);
    struct aate   *aat;

if ((ifp->if_flags & IFF_RUNNING) == 0) {
        m_freem(m);
        error = ENETDOWN;
        goto rts;
    }
    len += sizeof(*ah);
    ah--;
    ah->atm_dst.aa_long[0] = AAT_MAC << 28;
    bcopy(dstin->sa_data, &ah->atm_dst.aa_byte[2], 6);
    ah->atm_src = atm_glob->atmif[ifunit].ati_mac;
    ah->atm_mcbits = ((ATM_PID_LLC << 2) +
        ((4 - (len & 3)) & 3)) << ATM_PAD_SHIFT;
    ah->atm_elen = 0;
    m->m_off -= sizeof(*ah);
    m->m_len += sizeof(*ah);
    aat = atm_find_at(&atm_glob->atmif[ifunit],
        dstin->sa_data);
    if (!aat || !(vp = aat->aate_vcte)) {
        m_freem(m);
        error = EXDEV;
        goto rts;
    }
    if (vp->vcte_state < VCS_ESTAB) {
        atm_append_packet(vp, m);
        goto rts;
    }
} else {
    ASSERT(dstin->sa_family == AF_DLI);
    vp = ((struct sockaddr_aal *) dstin)->saal_vcte;
    if (vp)
        ASSERT(VALID_VP(vp));
}
m->m_off -= sizeof(struct aal_parms);
m->m_len += sizeof(struct aal_parms);
``` if_niu.c

```c
ap = mtod(m, struct aal_parms *);
ap->ap_mid = atm_glob->atmif[ifunit].atl_mid;
ap->ap_vpci = vp->vcte_ovpci;
ap->ap_rate = vp->vcte_opeak_rate >> 4;   /* from 1K bps to 16K
                * bps units */
if (vp->vcte_aal == 0)
    ap->ap_flags = AALP_RAW_CELL | AALP_CRC_NONE;
else
    ap->ap_flags = AALP_CRC_NONE;
/* iop, kludge till rev 2 fred i/f with 960 gets implemented */
if ((!(vp->vcte_pcif->pc_flags & PCIF_NIU_TO_NIU)) &&
    vp->vcte_pcif->pc_sig->vcte_state == VCS_ACTIVE)
    ap->ap_flags |= AALP_ENABLE_XON_XOFF;
vp->vcte_opackets++;
ifp->if_opackets++;
/*
 * If multicast then frame must be single threaded so used
 * the atm lan index + 1 to indicate in which outbound queue
 * the frame should be placed.
 */
ap->ap_orderq = (vp->vcte_flags & VCTEF_MCAST_CLIENT) ?
    (int) (vp->vcte_atmif - atm_glob->atmif) + 1 :
    AALP_UNORDERED;
ap->ap_orderq = 4;   /* iop, niu bug requires no more than
            * 1 vci per rate queue */
ap->ap_len = len + sizeof *ap;
/*
 * Place packet on interface transmit queue
 */
ifq = &niu_info[iounit].sendq;
if (IF_QFULL(ifq)) {
    DB0(DL2, "niuoutput: interface q full\n");
    if (niu_reset_on_full || niu_info[iounit].type == NIU_TYPE_SW ||
        niu_info[iounit].board_id == NIU_REV3) {
        ASSERT(willie_panic == 0);
        while (m) {
            m_freem(m);
            IF_DEQUEUE(ifq, m);
            IF_DROP(ifq);
        }
        niu_auto_resets++;
        (*niu_info[iounit].reset) (iounit, 0);
        TR1(TL1, "aa%d auto reset\n", ifp->if_unit);
        printf("aa%d auto reset\n", ifp->if_unit);
        if (niu_info[iounit].type == NIU_TYPE_HW) {
            setup_rxbuf(&niu_info[iounit]);
        }
    } else {
        IF_DROP(ifq);
        m_freem(m);
``` if_niu.c

```
        }
        error = ENOBUFS;
    } else {
        TR1(TL3, "%d on queue: ", ifp->if_snd.ifq_len);
        IF_ENQUEUE(ifq, m);
    }
    (*niu_info[iounit].sendpkt) (iounit);
rts:
    splx(s);
rtn:
    TR3(TL3, "niuoutput->%d, %d q %d d\n",
        error, ifq->ifq_len, ifq->ifq_drops);
    return error;
}

/*
 * send mbuf chain m on physical interface pc over VC vp using the
 * aal associated with that vp.  mid is the multiplex id for aal 3/4.
 * it is ignored for aal 5.
 */
vcoutput(vp, m, mid)
    struct mbuf    *m;
    struct vcte    *vp;
{
    int             s, len;
    struct ifqueue *ifq;
    struct mbuf    *mh;
    struct aal_parms *ap;
    int             iounit = vp->vcte_pcif->pc_num;
    int             error = 0;

ASSERT(VALID_VP(vp));
    s = splr(ipltospl(niu_info[iounit].priority));

if ((m->m_off & 0x3) || M_HASCL(m) ||
        (m->m_off - MMINOFF) < sizeof(struct aal_parms)) {
        if ((mh = m_get(M_DONTWAIT, MT_DATA)) == NULL) {
            m_freem(m);
            error = ENOBUFS;
            goto rts;
        }
        mh->m_len = 0;
        mh->m_off = MMAXOFF;
        mh->m_next = m;
        m = mh;
    }
    m->m_off -= sizeof(struct aal_parms);
    m->m_len += sizeof(struct aal_parms);
    ap = mtod(m, struct aal_parms *);
    ap->ap_mid = mid;
``` if_niu.c

```c
    ap->ap_vpci = vp->vcte_ovpci;
    ap->ap_rate = vp->vcte_opeak_rate >> 4;  /* from 1K bps to 16K
                                               * bps units */
    if (vp->vcte_aal == 0)
      ap->ap_flags = AALP_RAW_CELL | AALP_CRC_NONE;
    else
      ap->ap_flags = AALP_CRC_NONE;
    if ((!(vp->vcte_pcif->pc_flags & PCIF_NIU_TO_NIU)) &&
        vp->vcte_pcif->pc_sig &&
        vp->vcte_pcif->pc_sig->vcte_state == VCS_ACTIVE)
      ap->ap_flags |= AALP_ENABLE_XON_XOFF;
    vp->vcte_opackets++;
    /*
     * if multicast then frame must be single threaded so used
     * the atm lan index + 1 to indicate in which outbound queue
     * the frame should be placed.
     */
#if 0
    ap->ap_orderq = (vp->vcte_flags & VCTEF_MCAST_CLIENT) ?
        (int) (vp->vcte_atmif - atm_glob->atmif) + 1 :
        AALP_UNORDERED;
#endif
    ap->ap_orderq = 4;  /* lop, niu bug requires no more than
                         * 1 vci per rate queue */
    for (len = 0, mh = m; mh; mh = mh->m_next)
      len += mh->m_len;
    ap->ap_len = len;
    /*
     * Place packet on interface transmit queue.
     */
    ifq = &niu_info[iounit].sendq;
    if (IF_QFULL(ifq)) {
      DB0(DL2, "vcouput: interface q full\n");
      if (niu_reset_on_full ||
          niu_info[iounit].type == NIU_TYPE_SW ||
          niu_info[iounit].board_id == NIU_REV3) {
        ASSERT(willie_panic == 0);
        while (m) {
          m_freem(m);
          IF_DEQUEUE(ifq, m);
          IF_DROP(ifq);
        }
        niu_auto_resets++;
        (*niu_info[iounit].reset) (iounit, 0);
        TR1(TL1, "niu%d auto reset\n", iounit);
        printf("niu%d auto reset\n", iounit);
        if (niu_info[iounit].type == NIU_TYPE_HW) {
          setup_rxbuf(&niu_info[iounit]);
        }
      } else {
``` if_niu.c

```
        IF_DROP(ifq);
        m_freem(m);
      }
      error = ENOBUFS;
   } else {
      TR1(TL1, "%d on queue: ", ifq->ifq_len);
      IF_ENQUEUE(ifq, m);
   }
   (*niu_info[Iounit].sendpkt) (Iounit);
rts:
   splx(s);
   TR3(TL1, "vcoutput->%d, %d q %d d\n",
       error, ifq->ifq_len, ifq->ifq_drops);
   return error;
} int     niu_esr = 0;
niu_restart_sends(unit)
{
   struct atmif   *atp;

if (!niu_esr)
      return;
   atp = svc_glob->svc_pcif[unit].pc_atmif;
   while (atp) {
      if (((struct ifnet *) atp->ati_ac)->if_snd.ifq_len)
         (*niu_info[unit].sendpkt) (unit);
      atp = atp->ati_next;
   }
}

/*
 * Name: niusoioctl
 *
 * Input:  *ifp  – pointer to network interface to use. cmd
 * - command requested. *data – data associated with the command.
 *
 * Output: *data – data may be filled in by certain commands.
 *
 * Return:  0  – no error. Error  – Unix error code.
 *
 * Description: This is the network interface ioctl routine. An ifreq
 * structure must be used to access this routine.
 */
niusoioctl(ifp, cmd, data)
   register struct ifnet *ifp;
   int         cmd;
   caddr_t     data;
``` if_niu.c

```c
{
    int      error = 0, i, s, svc_timeout();
    int      ifunit = ifp->if_unit;
    extern int   atmarp_timeo1, atmarp_timeo2;
    struct ifreq   *ifr = (struct ifreq *) data;
    struct ifaddr  *ifa = (struct ifaddr *) data;
    struct niu_arpcom *ac = (struct niu_arpcom *) ifp;
    struct db_info *dbp;
    struct mcaddr  *mca;
    struct atmif   *atp;

TR2(TL3, "aa%d(%x): niusoioctl entered\n", ifunit, cmd);

switch (cmd) { case SIOCSIFADDR:
        /* set the interface ip address */
        TR1(TL4, "aa%d: ioctl SIOCSIFADDR\n", ifunit);
        switch (ifa->ifa_addr.sa_family) {
#ifdef INET
        case AF_INET:
            niu_arpcoms[ifunit].ac_ipaddr =
                IA_SIN(ifa)->sin_addr;
            ifp->if_flags |= IFF_UP;
            break;
#endif
        default:
            break;
        }
        break;

case SIOCSIFFLAGS:
        /* set interface flags */
        TR3(TL4, "aa%d: ioctl SIOCSIFFLAG (%d)flag=%d\n",
            ifunit, ifp->if_flags, ifr->ifr_flags);
        ifp->if_flags = ifr->ifr_flags;
        if (ifp->if_flags & IFF_UP) {
            struct niu_dev *niu;
            niu = &niu_info[NIU_IFUNIT_TO_IOUNIT(ifp->if_unit)];
            if (niu->type == NIU_TYPE_HW) {
                setup_rxbuf(niu);
            }
        }
        break;

case SIOCGIFFLAGS:
        /* get interface flags */
        TR2(TL4, "aa%d: ioctl SIOCGIFFLAG flag=%d\n",
            ifunit, ifp->if_flags);
        ifr->ifr_flags = ifp->if_flags;
``` if_niu.c

```c
    break;

case SIOCGETPORT:
  /* get port address */
  TR3(TL4, "aa%d: ioctl SIOCGETPORT port=%8x%8x\n", ifunit,
      atm_glob->atmif[ifunit].ati_port.aa_long[0],
      atm_glob->atmif[ifunit].ati_port.aa_long[1]);
  ifr->ifr_addr.sa_family = AF_CCITT;
  bcopy(&atm_glob->atmif[ifunit].ati_port,
      ifr->ifr_addr.sa_data,
      sizeof(struct atm_addr));
  break;

case SIOCNIUDBUG:
  /* set debug level for the entire niu device */
  dbp = (struct db_info *) ifr->ifr_data;
  niu_debug = dbp->niu_debug;   /* network interface */
  niu_trace = dbp->niu_trace;
  arp_debug = dbp->arp_debug;   /* arp */
  arp_trace = dbp->arp_trace;
  drv_debug = dbp->drv_debug;   /* /dev/niu */
  drv_trace = dbp->drv_trace;
  DB3(DL2, "aa%d: ioctl SIOCSNIUDBUG niu=%d %d\n",
      ifunit, niu_debug, niu_trace);
  DB3(DL2, "aa%d: ioctl SIOCSNIUDBUG arp=%d %d\n",
      ifunit, arp_debug, arp_trace);
  DB3(DL2, "aa%d: ioctl SIOCSNIUDBUG drv=%d %d\n",
      ifunit, drv_debug, drv_trace);
  break;

case SIOCGIFADDR:
case SIOCGMACADDR:
  /* get the interface ip address */
  TR1(TL2, "aa%d: ioctl SIOCGIFADDR\n", ifunit);
  bcopy(&niu_arpcoms[ifunit].ac_atmif->ati_mac.aa_byte[2],
      ifr->ifr_addr.sa_data, 6);
  break;
case SIOCSMACADDR:
  /* set the interface ip address */
  TR1(TL2, "aa%d: ioctl SIOCSIFADDR\n", ifunit);
  bcopy(ifr->ifr_addr.sa_data,
      &niu_arpcoms[ifunit].ac_atmif->ati_mac.aa_byte[2], 6);
  break;
case SIOCGAATIMEO1:
  bcopy(&atmarp_timeo1, &ifr->ifr_metric, sizeof(int));
  break;
case SIOCSAATIMEO1:
  bcopy(&ifr->ifr_metric, &atmarp_timeo1, sizeof(int));
  break;
case SIOCGAATIMEO2:
``` if_niu.c

```c
    bcopy(&atmarp_timeo2, &ifr->ifr_metric, sizeof(int));
    break;
case SIOCSAATIMEO2:
    bcopy(&ifr->ifr_metric, &atmarp_timeo2, sizeof(int));
    break;
case SIOCTIMEOUT:
    if ((atp = atm_glob->atmif) == 0) {
        error = ENXIO;
        break;
    }
    s = splnet();
    untimeout(svc_timeout, atm_glob->atmif[ifunit].ati_pcif);
    svc_timeout(atm_glob->atmif[ifunit].ati_pcif);
    for (; atp < &atm_glob->atmif[atm_glob->atmif_used];
        atp++) {
        if (atp->ati_state == ATS_INACTIVE)
            continue;
        atm_arptimer(atp);
    }
    splx(s);
    break;
case SIOCADDMULTI:
    TR1(TL4, "aa%d: ioctl SIOCADDMULTI\n", ifunit);
    error = niu_addmulti(ifp, ifr->ifr_addr.sa_data);
    break;
case SIOCDELMULTI:
    TR1(TL4, "aa%d: ioctl SIOCADDMULTI\n", ifunit);
    error = niu_delmulti(ifp, ifr->ifr_addr.sa_data);
    break;
case SIOCSPROMISC:
    ifp->if_flags ^= IFF_PROMISC;
    printf("aa%d promiscuous %sabled\n", ifunit,
        ifp->if_flags & IFF_PROMISC ? "en" : "dis");
    break;
case SIOCGSTATE:
    /* get signaling vc state */
    TR2(TL4, "aa%d: ioctl SIOCGSTATE state=%d\n", ifunit,
        atm_glob->atmif[ifunit].ati_pcif->pc_sig->vcte_state);
    ifr->ifr_metric =
        atm_glob->atmif[ifunit].ati_pcif->pc_sig->vcte_state;
    break;
case SIOCSSTATE:
    /* get signaling vc state */
    TR2(TL4, "aa%d: ioctl SIOCGSTATE state=%d\n", ifunit,
        atm_glob->atmif[ifunit].ati_pcif->pc_sig->vcte_state);
    if (ifr->ifr_metric < VCS_INACTIVE ||
        ifr->ifr_metric > VCS_ACTIVE)
        error = EINVAL;
    else
        svc_new_state(atm_glob->atmif[ifunit].ati_pcif->pc_sig,
```

```
            ifr->ifr_metric);
      break;
    default:
      DB2(DL2, "aa%d: ioctl bad command=%x\n",
         ifunit, cmd);
      error = EINVAL;
    }
    return (error);
}

/*
 * Find a multicast entry in the multicast filter for atm lan, atp.
 */
struct mcaddr *
niu_findmulti(atp, mac)
   struct atmif  *atp;
   u_char        *mac;
{
   int      i;

for (i = 0; i < atp->ati_num_mcasts; i++)
      if (bcmp(atp->ati_mcaddrs[i].mc_enaddr, mac, 6) == 0)
         return &atp->ati_mcaddrs[i];
   return 0;
}
/*
 * Add a multicast address to multicast filter for atm lan, atp.
 */
niu_addmulti(ifp, mac)
   struct ifnet  *ifp;
   u_char        *mac;
{
   int      i, s, error;
   struct aate   *at;
   struct mcaddr *mc;
   struct atmif  *atp = ((struct niu_arpcom *) ifp)->ac_atmif;

if ((mac[0] & 0x1) == 0)
      return EINVAL; /* not a multicast address */
   mc = niu_findmulti(atp, mac);
   s = splimp();
   if (mc) {
      if (mc->mc_count < MCCOUNTMAX) {
         mc->mc_count++;
         splx(s);
         return 0;
      } else {
         splx(s);
         return ENOSPC;
```

```c
        }
    }
    if (atp->ati_num_mcasts == MCADDRMAX) {
        splx(s);
        return ENOSPC;
    }
    mc = &atp->ati_mcaddrs[atp->ati_num_mcasts];
    mc->mc_count = 1;
    bcopy(mac, mc->mc_enaddr, 6);
    at = mc->mc_at = atm_find_at(atp, mac);
    if (at == 0) {
        splx(s);
        return ENOSPC;
    }
    at->aate_flags |= ATF_MULTI;
    atp->ati_num_mcasts++;
    splx(s);
    return 0;
}

/*
 * Delete a multicast address from multicast filter for atm lan, atp.
 */
niu_delmulti(ifp, mac)
    struct ifnet   *ifp;
    u_char         *mac;
{
    struct mcaddr *mc;
    int           i, s;
    struct aate   *at;
    struct atmif  *atp = ((struct niu_arpcom *) ifp)->ac_atmif;

mc = niu_findmulti(atp, mac);
    if (mc == 0)
        return ENXIO;
    s = splimp();
    if (--mc->mc_count > 0) {
        splx(s);
        return 0;
    } else if (at = mc->mc_at) {
        ASSERT(at->aate_flags & ATF_MULTI);
        at->aate_flags &= ~ATF_MULTI;
        atm_aate_free(at);
    }
    bcopy(&atp->ati_mcaddrs[--atp->ati_num_mcasts], mc, sizeof(*mc));
    splx(s);
    return 0;
}
``` if_niu.c

```c
/*
 * go steal an ethernets low order 2 bytes and append it two
 * Adaptive's IEEE prefix.
 */
unsigned int    def_enaddr[2] = {0x0080b2e0, 0x00010000};

niu_get_enaddr(unit, enaddr)
    u_int       unit;
    u_char      *enaddr;
{
    struct ifnet  *ifp;
    extern struct ifnet *ifnet;

bcopy(def_enaddr, enaddr, 6);
    for (ifp = ifnet; ifp; ifp = ifp->if_next)
        if (ifp->if_mtu == 1500) {
            enaddr[3] = (((struct niu_arpcom *) ifp)->ac_enaddr[3] & 0x1f) | 0xe0;
            enaddr[4] = ((struct niu_arpcom *) ifp)->ac_enaddr[4];
            enaddr[5] = ((struct niu_arpcom *) ifp)->ac_enaddr[5];
            break;
        }
    enaddr[0] = (u_char) unit << 1;
}

/*
 * This routine just looks up the input vci and dispatches the frame
 * to the appropriate input routine based upon vci.  Signaling and
 * raw user access does not necessarily use 802.6 framing.
 */
int     svc_send_releases = 1;
deliver_packet(unit, m0, vci)
    int         unit;
    struct mbuf *m0;
    u_short     vci;
{
    struct vcte  *vp;
    struct pcif  *pc;
    int          s;
    int          plen;

plen = m_len(m0);

aal_trace_m(m0, plen, 1, vci);
    s = splimp();
    pc = &svc_glob->svc_pcif[unit];
    if (pc->pc_raw_vp) {
        pc->pc_raw_vp->vcte_ipackets++;
        pvc_input(pc->pc_raw_vp, m0);
    } else if (vp = ivpci_to_vcte(pc, vci)) {
        if (VCS_DATA_IND_OK & VCS_TO_VMASK(vp->vcte_state)) {
``` if_niu.c
-67-

```
        ASSERT(VALID_ULP(vp->vcte_ulp));
        vp->vcte_ipackets++;
        (*vp->vcte_ulp->ulp_data) (vp, m0);
    } else
        m_freem(m0);
} else if (svc_send_releases && pc->pc_sig) {
    struct release *pdu;
    m_freem(m0);
    pdu = (struct release *) atm_alloc_msg();
    pdu->lmi_proto = LMI_PROTOCOL;
    pdu->lmi_pdu_type = IDU_INVALID_PDU;
    pdu->lmi_cref_type = LMI_CREFTYPE_PVC;
    pdu->lmi_cref_value = vci;
    LMI_SET_ELEMENT(&pdu->lmi_cause, LMI_RELEASE_CAUSE,
        VCI_UNACCEPTABLE);
    svc_xdu(pc, 0, pdu, sizeof *pdu);
    }
    splx(s);
}

/*
 * niu_snitify() makes a copy of m0, converts the 802.6/SNAP header
 * into an ethernet header and calls snit_intr().
 */
struct nit_if    niu_nit;
u_short          enet_hdr[7];

niu_snitify_8026(ifp, m, hlen, promisc)
    struct ifnet    *ifp;
    struct mbuf     *m;

{
    int       adj;
    u_char    *sp;  /* start of destination adr in 802.6
                     * header */

ASSERT(hlen >= 20);
    if (m->m_len < hlen + 3)
        return;    /* not enough for llc */
    sp = mtod(m, u_char *);
    bcopy(&sp[2], enet_hdr, 6);
    bcopy(&sp[2 + 8], &enet_hdr[3], 6);
    if (sp[hlen] == (u_char) 0xaa) {
        bcopy(&sp[hlen + 6], &enet_hdr[6], 2);
        adj = hlen + 8;
    } else {
        bcopy(&sp[hlen], &enet_hdr[6], 2);
        adj = hlen + 3;
    }
    if (m->m_len < adj)
```

Attorney Doc. No.:NETW7943DEL
/u/del/netw7/7943.paa.001 if_niu.c

```c
        return;
    m->m_len -= adj;
    m->m_off += adj;
    niu_nit.nif_header = (caddr_t) enet_hdr;
    niu_nit.nif_hdrlen = 14;
    niu_nit.nif_bodylen = m_len(m) - 14;
    niu_nit.nif_promisc = promisc;
    snit_intr(ifp, m, &niu_nit);
    m->m_len += adj;
    m->m_off -= adj;
} int         dump_len = 64;
int         dump_limit = 0;

dump_frame(s, dp, words)
    char    *s;
    int     *dp;
    int     words;
{
    if (dump_limit == 0)
        return;
    printf("%s ", s);
    if (words > dump_limit)
        words = dump_limit;
    while (words--)
        printf("%x ", *dp++);
    printf("\n");
} int         dumpbuf[64];
int         dumplen = 64;

dump_chain(s, m)
    char        *s;
    struct mbuf *m;
{
    int     left = m_len(m);

if (left > dumplen)
        left = dumplen;
    m_copydat(m, (char *) dumpbuf, left);
    left = (left + 3) / 4;
    dump_frame(s, dumpbuf, left);
} m_len(m)
    struct mbuf *m;
{
    int     len;
``` if_niu.c

```
    for (len = 0; m; m = m->m_next)
      len += m->m_len;
    return len;
} atm_arpioctl(ifunit, cmd, data)
    int        cmd;
    caddr_t    data;
{
    struct arpreq *ar = (struct arpreq *) data;
    struct aate   *at;
    int           s, error = 0;

if (ar->arp_pa.sa_family != AF_UNSPEC ||
        ar->arp_ha.sa_family != AF_CCITT)
      return (EAFNOSUPPORT);

s = splimp();
    at = atm_arptab_look(&atm_glob->atmif[ifunit],
            ar->arp_pa.sa_data);
    if (at == NULL)
      error = ENXIO;
    else if (ar->arp_pa.sa_data[0] & 0x01).
      error = EINVAL;
    else if (cmd == SIOCDARP)
      atm_aate_free(at);
    splx(s);
    return error;
} calc_mlen(m)
    struct mbuf *m;
{
    int        len = 0;

TR0(TL2, "calc_mlen: called\n");

while (m) {
      len += m->m_len;
      m = m->m_next;
    }
    DB1(DL3, "calc_mlen: len=0x%x\n", len);
    return (len);
} m_copydat(m, buf, len)
    struct mbuf *m;
    char        *buf;
    int         len;
{
``` if_niu.c

```
    int         j;
    while (len && m) {
        j = len;
        if (j > m->m_len)
            j = m->m_len;
        if (j) {
            bcopy(mtod(m, caddr_t), buf, j);
            buf += j;
            len -= j;
        }
        m = m->m_next;
    }
    return len;
} aal_trace_m(m, tlen, in, vci)
    struct mbuf    *m;
{
    int        s;
    if (!aal_trace_enable)
        return;
    s = spl7();
    atm_trace_buf(m, m_copydat, IF_TRACE_LOG, tlen, in, vci);
    splx(s);
}
``` if_niu.h
-71-

```c
/* if_niu.h
 * COPYRIGHT 1992 ADAPTIVE CORPORATION
 * ALL RIGHTS RESERVED
 */
/* static char sccsid[] = "@(#) if_niu.h 1.12@(#)"; */
/*
 * The aal interface is implemented as messages send (a)synchronously
 * between the MAC and aal layers. The aal_parms structure preceeds
 * frames transmitted and received. It is the complete interface
 * between the aal layer and the aal user. Rather than define some
 * VC parameters at circuit setup time and pass other per frame
 * parameters with each frame, all parameters are passed with each
 * frame. Thus, at the loss of some performance, the interface
 * betwen the H/W NIU (and 960 OS) and the host is simplified.
 *
 * To do: Average rate metering parameters will be added when we figure
 * out how to use them. frame level CRC should be specified but
 * current chips have a mode bit for CRC.
 */
struct aal_parms {
    vpci_t      ap_vpci;/* vpci to be operated upon */
    u_short     ap_mid; /* mid to use with frame */
    u_short     ap_len; /* packet length (excluding aal_parms
                * and */
    /* pad bytes if AALP_CRC_SMDS) */
    u_short     ap_rate;/* burst rate for frame divided by
                * 1024 */
    u_char      ap_orderq; /* Identifies an ordered send
                * queue. Frames */
    /* with the same orderq may not be interleaved. */
    /* AALP_UNORDERED indicates no restrictions */
    u_char      ap_flags; /* AALP_CRC_xxx */
};

/* ap_crc32 values */
#define AALP_CRC_NONE    0
#define AALP_CRC_ADAPTIVE 1
#define AALP_CRC_SMDS    2
#define AALP_RAW_CELL    4
#define AALP_ENABLE_XON_XOFF 8  /* enable xon/xoff higher
                * layer */
#define AALP_LOOP_VCI    0x10  /* loop rcv frames at 960 */

/* ap_rate value to specify maximum link rate */
#define AALP_MAX_RATE   (~0)  /* all one's */
/* ap_orderq value if frame has no ordering constraints */
#define AALP_UNORDERED  0

/*
 * niuoutput() sockaddr used for raw aal access with AF_DLI.
``` if_niu.h

```c
 * saal_vcte must reference a valid vcte.
 */
struct sockaddr_aal {
    u_short     saal_family;
    u_short     saal_pad2;
    struct vcte *saal_vcte;
    char        saal_pad6[6];
};

struct niu_desc {
    u_char      status;
    u_char      niual;
    u_short     reserved;
    u_int       pkt_addr;
    u_short     size;
    u_short     vci;
    u_int       chain_ptr;
};

/* used for SIOCNIUDBUG ioctl */
struct db_info {
    char        niu_debug;
    char        niu_trace;
    char        arp_debug;
    char        arp_trace;
    char        drv_debug;
    char        drv_trace;
};

/* MTU size */
#define AAMTU           9188

/* receive control registger */
#define RCNTL_REG       0
#define RCNTL_IDLE_INTR 0x80  /* rx fill interrupt */
#define RCNTL_FILL_INTR 0x40  /* rx idle interrupt */
#define RCNTL_PASS_IDLE 0x04  /* go through idle on every
                               * cell */
#define RCNTL_STOP_IDLE 0x02  /* stop on idle */
#define RCNTL_RESET     0x01  /* reset rx fifo, abort cell,
                               * spill mode */
#define RCNTL_MASK      0xc7  /* bits 3-5 unused */

/* receive status register 1 */
#define RSTAT1_REG       1
#define RSTAT1_LIGHT      0x80  /* rx fiber light present */
#define RSTAT1_FIFO_HALF  0x40  /* rx fifo half flag */
#define RSTAT1_FIFO_FULL  0x20  /* rx fifo full flag */
#define RSTAT1_FIFO_EMPTY 0x20  /* rx fifo empty flag */
``` if_niu.h
-73-

```c
#define RSTAT1_VIOLATION  0x04  /* rx violation */
#define RSTAT1_MASK       0xec  /* bits 0,1,4 unused */

/* receive status register 2 */
#define RSTAT2_REG        2
#define RSTAT2_IDLE       0x80  /* rx is idle */
#define RSTAT2_FIFO_OVR   0x40  /* rx fifo overflow */
#define RSTAT2_CMD_OVR    0x20  /* rx command overflow */
#define RSTAT2_CMD_RECV   0x10  /* rx command received */
#define RSTAT2_COMMAND    0x0f  /* rx command, 4 bits */
#define RSTAT2_INTR_MASK  0xd0  /* rx interrupt mask */

/* transmit control register */
#define TCNTL_REG         3
#define TCNTL_RESET       0x80  /* tx reset */
#define TCNTL_LOAD        0x40  /* load tx fifo */
#define TCNTL_SOC_ENBL    0x20  /* start of cell enable */
#define TCNTL_ENABLE      0x10  /* enable send from fifo */
#define TCNTL_COMMAND     0x0f  /* tx command */

/* transmit status register */
#define TSTAT_REG         4
#define TSTAT_FIFO_FULL   0x80  /* tx fifo full */
#define TSTAT_FIFO_HALF   0x40  /* tx fifo half */
#define TSTAT_FIFO_EMPTY  0x20  /* tx fifo empty */
define TSTAT_MASK        0xe0  /* bits 0-4 unused */ define MAX_INTR_TIME     200

/* dma controller control/status */
#define DMAC_INT_PEND   0x00000001  /* interrupt pending */
#define DMAC_ERR_PEND   0x00000002  /* error pending */
#define DMAC_DRAINING   0x0000000c  /* draining D cache */
#define DMAC_INT_EN     0x00000010  /* interrupt enable */
#define DMAC_FLUSH      0x00000020  /* flush buffer */
#define DMAC_SLAVE_ERR  0x00000040  /* slave error */
#define DMAC_RESET      0x00000080  /* reset DMA */
#define DMAC_WRITE      0x00000100  /* 1 = memory write; 0 =
                                     * memory read */
#define DMAC_EN_DMA     0x00000200  /* enable dma */
#define DMAC_EN_CNT     0x00002000  /* enable counter */
#define DMAC_TC         0x00004000  /* terminal count */
#define DMAC_ALE_AS     0x00100000  /* 1 = addr latch enb; 0
                                     * = addr strobe */
#define DMAC_LANCE_ERR  0x00200000  /* E channel error */
#define DMAC_FASTER     0x00400000  /* fast access for D
                                     * channel */
#define DMAC_TCI_DIS    0x00800000  /* TC interrupt disable */
#define DMAC_EN_NEXT    0x01000000  /* enable next */
#define DMAC_DMA_ON     0x02000000  /* DMA on */
```

```
#define DMAC_A_LOADED    0x04000000  /* address loaded */
#define DMAC_NA_LOADED   0x08000000  /* next address loaded */
define DMAC_DEV_ID      0xf0000000  /* device id */ define DMAC_INTR_MASK   0x00000003  /* DMAC interrupt
                        * pending mask */

/* dma address */
#define DMAC_ADDR_REG    6

/* dma next address */
#define DMAC_ADDRNXT_REG 7

/* dma count */
#define DMAC_COUNT_REG   8

/* dma next count */
define DMAC_CNTNXT_REG  9 define SW_NUM_SWREGS    10 /* number of registers on sw
                        * niu */
#define NUM_SWREGS       3  /* number of registers on sw
                        * niu */
#define NUM_SWINTR       1  /* number of interrupts on sw
                        * niu */ struct niu_addr_reg {
    u_char   *rcntl_reg; /* receive control register */
    u_char   *rstat1_reg; /* receive status 1 register */
    u_char   *rstat2_reg; /* receive status 2 register */
    u_char   *tcntl_reg; /* transmit control register */
    u_char   *tstat_reg; /* transmit status register */
};

struct niu_value_reg {
    u_char   rcntl_reg; /* receive control register */
    u_char   rstat1_reg; /* receive status 1 register */
    u_char   rstat2_reg; /* receive status 2 register */
    u_char   tcntl_reg; /* transmit control register */
    u_char   tstat_reg; /* transmit status register */
};

struct hw_niu_reg {
    u_long   *dma_reg;/* LSI dma status register */
    u_short  *attn_reg; /* niu attention register */
    u_long   *base_reg; /* niu base register */
    u_short  *intr_reg; /* niu interrupt acknowledge
                     * register */
    u_short  *lock_reg; /* niu dma lockout register */
    u_long   dma_value; /* local copy of dma status
``` if_niu.h

```c
              * register */
    u_short     attn_value;  /* local copy of niu
              * attention register */
    u_long      base_value;  /* local copy of niu base
              * register */
};

struct dmac_addr_reg {
    u_long      *status_reg;   /* status control register */
    u_long      *addr_reg;     /* address register */
    u_long      *next_address_reg;  /* next address register */
    u_long      *count_reg;    /* count register */
    u_long      *next_count_reg;    /* next count register */
};

#define NUM_DESC    1  /* up to 1 descriptors in
              * chain */
typedef struct {
    caddr_t     dma_addr;
    int         size;
}           DMA_DESC_BUF;

struct dmac_value_reg {
    u_long      status_reg;   /* status control register */
    u_long      addr_reg;     /* address register */
    u_long      next_address_reg;  /* next address register */
    u_long      count_reg;    /* count register */
    u_long      next_count_reg;    /* next count register */
};

struct niu_stats {
    u_long      ip_opkts;   /* number tx ip packets */
    u_long      ip_ipkts;   /* number rx ip packets */
    u_long      arp_opkts;  /* number tx ip packets */
    u_long      arp_ipkts;  /* number rx ip packets */
    u_long      drv_opkts;  /* number tx driver packets */
    u_long      drv_ipkts;  /* number rx driver packets */
    u_long      crc_errors;  /* total number crc errors */
    u_long      errors;  /* total number misc errors */
    u_long      allocd_failed;  /* number of alloc_desc
              * failures */
    u_long      finddesc_failed;  /* number of mismatched
              * tags */
};

/* packet direction */
#define NIU_RECEIVE    0  /* host receiving packets
              * from niu */
#define NIU_TRANSMIT   1  /* host trasmitting packets
              * to niu */
```

```c
typedef struct {
    int         in_use;
    int         cmd_tag;
    struct mbuf *m;
    int         num_desc;
    caddr_t     desc_addr;
    DMA_DESC_BUF *desc_ptr;
    caddr_t     data_addr;
}               DMA_DESC;
define NUM_DMA_DESC    11 define COMMAND_SIZE    16 define NO_COMMAND      0
define RESET_CMD       1
#define STATUS_CMD      2
#define CLR_STATS_CMD   3
#define RX_DATA_CMD     4
#define TX_DATA_CMD     5
#define CLR_INTR_CMD    6
#define RESET_Q_CMD     7
#define WORK_AROUND_CMD 8
define BOARD_ID_CMD    9 define CMD_INTR_OFF    0x00
define CMD_INTR_ON     0x01
#define CMD_CRC_MASK    0x06   /* frame level crc */
#define CMD_CRC_ADAPTIVE 0x02
#define CMD_CRC_SMDS    0x04
#define CMD_CRC_NONE    0x00
#define CMD_AAL_MASK    0x18
#define CMD_AAL4        0x00   /* default is aal4 */
#define CMD_AAL5        0x08   /* not yet implemented */
#define CMD_AAL_RAW     0x18   /* send raw cell ala s/w niu */
#define CMD_ENABLE_XON_XOFF 0x20 /* enable xon/xoff */
define CMD_LOOP_VCI    0x40   /* loop rcv frames at 960 */ typedef struct {
    u_char   param[COMMAND_SIZE - 4];
    u_short  tag;
    u_char   flags;
    u_char   command;
}            COMMAND;

typedef struct {
    u_char   param[COMMAND_SIZE - 8];
    u_int    board_id;
    u_short  tag;
    u_char   flags;
``` if_niu.h
-77-

```c
        u_char       command;
}              BID_CMD;

typedef struct {
    caddr_t      dma_addr;
    u_short      vci;
    u_short      mid;
    u_short      size;
    u_char       order_q;
    u_char       rate_q;
    u_short      tag;
    u_char       flags;
    u_char       command;
}              RX_CMD;

typedef struct {
    caddr_t      dma_addr;
    u_short      vci;
    u_short      mid;
    u_short      size;
    u_char       order_q;
    u_char       rate_q;
    u_short      tag;
    u_char       flags;
    u_char       command;
}              TX_CMD;

#define CMD_Q_SIZE          NUM_DMA_DESC
#define START_CMD_Q( q )    (&((q)->cmd_q[ 0 ]))
#define CUR_CMD_Q( q )      (&((q)->cmd_q[ (q)->cmd_elem ]))
#define END_CMD_Q( q )      (&((q)->cmd_q[ CMD_Q_SIZE - 1 ]))
#define NEXT_CMD_Q( elem )  if (++(elem) >= CMD_Q_SIZE)\
                                (elem) = 0;

typedef struct {
    int          cmd_elem;
    COMMAND      *cmd_q;
}              CMD_Q;

typedef struct {
    u_char       crc_err;
    u_char       parity_err;
    u_char       buf_ovr;
    u_char       buf_avail;
    u_char       pkt_drop;
    u_char       cell_drop;
}              HWNIU_STATS;

typedef struct {
    u_short      rx_packets;
``` if_niu.h

```c
    u_short    tx_packets;
    HWNIU_STATS    stats;
    u_char    reserved[6];
}    NIU_STATUS;

typedef struct {
    caddr_t    cmd_start; /* command q start */
    caddr_t    cmd_end;  /* command q end */
    caddr_t    done_start;  /* completed q start */
    caddr_t    done_end;  /* completed q end */
    caddr_t    status_start; /* status location */
}    HOST_BASE;

#define MAP_CMD_Q     0
#define MAP_DONE_Q    1
#define MAP_STATUS    2
#define MAP_BASE      3
typedef struct {
    caddr_t    base_dma;  /* host base dma address */
    caddr_t    status_dma;  /* status dma address */
    caddr_t    cmd_dma;  /* cmd q dma address */
    caddr_t    done_dma;  /* done q dma address */
}    DMA_ADDR;

/* board ids */
#define NIU_REV2  0
#define NIU_REV3  1
#define PNIU_REV1 2
#define PNIU_REV2 3
#define PNIU_REV3 4
struct niu_dev {
    u_char    type;
    u_short   tag; /* tag for each command */
    CMD_Q     cmd_q; /* command q */
    CMD_Q     done_q; /* completed q */
    NIU_STATUS   status; /* hw_niu status location */
    HOST_BASE    base;  /* host/niu io base structure */
    DMA_ADDR     dma_addr;  /* mapped dma address */
    int          priority;  /* interrupt priority */
    struct hw_niu_reg niu_reg; /* address of registers on
         * niu board */
    struct niu_stats stats; /* niu statistics */
    DMA_DESC     desc[CMD_Q_SIZE];  /* descriptor pool */
    int          intr_timeout; /* interrupt timeout counter */
    struct niu_addr_reg niu_addr; /* address of registers on
         * niu board */
    struct niu_value_reg niu_value;  /* contents of registers on
         * niu board */
    struct dmac_addr_reg dmac_addr;  /* address of registers on
         * L64853A SBus controller */
``` if_niu.h

```c
        struct dmac_value_reg dmac_value;  /* contents of registers
                * on L64853A SBus
                * controller */
int        (*sendpkt) ();  /* hw specific routine to
                * send queued pkts */
int        (*reset) ();   /* hw specific routine to
                * reset hw */
#define NIU_TYPE_SW  1
#define NIU_TYPE_HW  2
    u_short    direction;  /* receive or transmit
                * packets */
    int        board_id;   /* niu board revision */
    int        intr_state; /* is in interrupt state */
    int        post_rxbuf; /* count of rx buffers to be
                * posted */
    struct ifqueue  sendq;
    int        macaddr[2];
};

extern struct niu_dev niu_info[];
extern int   cell_flag; /* set for trasmission of raw 53 byte
            * cells */ define  NIU_IFUNIT_TO_IOUNIT(ifunit)  (atm_glob->atmif[ifunit].ati_pcif->pc_num)
``` lm.c

```c
/* lm.c
 *
 * COPYRIGHT 1992 ADAPTIVE CORPORATION
 * ALL RIGHTS RESERVED
 *
 */
 *******************************END***********************************/
ifdef CERNEL include "ipc_def.h"
include "net_def.h"
#include <global_def.h>
include <driver.h> undef lm_init else           /* ifndef CERNEL */
include <stdint.h>
include <global_def.h>
#include <ITC_if.h>
include <driver.h> include <RT_if.h>
include <timer.h>
#include <RT_def.h>
#include <enet_if.h>
include <net_def.h> define ERRLOG printdbg
define printf printdbg endif          /* ifdef CERNEL */ include "unipdu.h"
include "nnipdus.h"
#include "altask_gl.h"
#include "sigtask_gl.h"
#include "svctask_gl.h"
#include "svc_if.h"
#include "snmp_incl.h"
#include "AAL_if.h"
#include "wdb_if.h"
#include "q.h"
#include "bits.h"
#include "lm.h"

lm_tcb_t     *lm_init();
``` lm.c

```c
#ifdef CERNEL
include <stdio.h> main(argc, argv, environ)
    int        argc;
    char       *argv[];
    char       **environ[];
{
    tINT32     generic;
    tINT32     instance;
    tINT32     status;
    tUINT8     test_mode;

generic = TID_LM;
    instance = 0;

if ((status = SetTid(generic, instance)) != RT_SUCCESS) {
        printf("lm: SetTid Failed\n");
    } else {
        lm_main();
    }
}
endif          /* ifdef CERNEL */ lm_main()
{
    lm_tcb_t   *tcb;
    struct TimerBlock *tmr_blk;
    tUINT32    *msg;
    tINT32     delay;
    tUINT32    timerid;
    tUINT32    timerarg;

tcb = lm_init();
    if (tcb == NULL) {
        printf("lm: init failed");
        return;
    }
    tmr_blk = tcb->tmr_blk;
    timerid = tcb->timerid;
    timerarg = tcb->timerarg;

while (TRUE) {
        delay = 0;
        while (delay <= 0) {
            delay = TimerCheck(tmr_blk, &timerid, &timerarg);
            if (delay <= 0) {
                lm_srvc_timer(2);
                RTC_TimerSet(tmr_blk, (GetTime() + (STGRAN)),
                        timerid, timerarg);
```

```
            }
        }
        msg = (tUINT32 *) ReqMsg(LM_EX_MSK, delay);
        if (msg != NULL) {
            lm_srvc_msg(msg);
            free(msg);
        }
    }
} lm_srvc_timer(delay)
    tUINT32     delay;
{
    SETUP_TCB;

} lm_srvc_msg(msg)
    tITC_HEADER   *msg;
{
    int         ret;
    int         lm_crt_cfg();
    SETUP_TCB;

ret = RT_SUCCESS;
    printf("lm_srvc_msg, MsgType = %d\r\n", msg->MsgType);

switch (msg->MsgType) {
    case TA_AAL_IND_RECEIVE:
        lm_srvc_aal_msg(msg);
        break;
    case U_DTIND:
        lm_srvc_svc_msg(msg);
        break;
    case SNMPA_MGMT_GET:
        lm_srvc_mgmt_get(msg);
        break;
    case SNMPA_MGMT_VALIDATE:
        lm_srvc_mgmt_validate(msg);
        break;
    case SNMPA_MGMT_COMMIT:
        lm_srvc_mgmt_commit(msg);
        break;
    case SNMPA_MGMT_GETNEXT:
        lm_srvc_mgmt_getnext(msg);
        break;
    case SNMPA_CHECKIN_MSG:
        SendProxyCheckin(MHW_GetCardType(),
``` lm.c

```
            MHW_GetSlotid();
        break;
    default:
        if ((msg->MsgType >= MSG_WDB_BASE) &&
            (msg->MsgType <= MSG_WDB_TOP)) {
            wdb_process_msg(lm_crt_cfg, msg);
        } else {
            ret = !RT_SUCCESS;
            goto err_exit;
        }
        break;
    }
    return (ret);

err_exit:
    return (ret);
} lm_srvc_aal_msg(msg)
    tAAL_TA_IND_RX *msg;
{
    int         ret;
    lm_alan_cfg_enq_t *aal_msg;
    tUINT32     pvci;
    tUINT32     vci;

aal_msg = (lm_alan_cfg_enq_t *) msg->Rx.Buffer;
    ret = RT_SUCCESS;

vci = ((lm_atm_hdr_t *) & (msg->RxATM_Hdr))->vci;
    pvci = VCI_TO_PVCIm(vci);
    if (aal_msg->lmi_hdr.lh_pdu_type != NN_PDU_STATUS_ENQ ||
        aal_msg->lmi_hdr.lh_proto != NNI_PROTOCOL ||
        pvci != NNI_NAC_VCI) {
        ret = !RT_SUCCESS;
        goto err_exit;
    }
    switch (aal_msg->enq.elem_type) {
    case ALAN_CFG_ENQ:
        ret = lm_srvc_alan_cfg_enq(msg);
        break;
    case LMI_CONFIG_ENQ:
        ret = lm_srvc_es_cfg_enq(msg);
        break;
    default:
        goto err_exit;
        break;
    } return (ret);
``` lm.c

```
err_exit:
    return (ret);
} lm_srvc_alan_cfg_enq(msg)
    tAAL_TA_IND_RX *msg;
{
    int         ret;
    lm_alan_cfg_enq_t *alan_enq;
    tALANCFG_ENQ  *enq;
    tALANCFG_RESP *resp;
    tATMADDR    paddrs[MAX_PORTS_PER_SLOT];
    tUINT32     in_srvc;
    tUINT32     in_srvc_mask;
    int         i;
    int         max_port;
    lm_port_addr_t tst;
    lm_port_t   *port;
    lm_mac_t    *mac;
    qlink_t     *link;
    lm_mac_vlan_t *mv;
    tUINT32     tx_vci;
    tUINT32     rx_vci;
    tUINT8      rx_shelf;
    tUINT8      rx_slot;
    tUINT8      rx_port;
    lm_prefix_t prefix;
    lm_atm_hdr_t atm_hdr;
    SETUP_TCB;

ret = RT_SUCCESS;
    alan_enq = (lm_alan_cfg_enq_t *) msg->Rx.Buffer;
    enq = &alan_enq->enq;

in_srvc = 0;
    in_srvc_mask = 0x80000000;
    max_port = MAX_PORTS_PER_SLOT > enq->num_ports ?
        enq->num_ports : MAX_PORTS_PER_SLOT;
    LM_INIT_PORT_ADDR(&tst, tcb->my_node, tcb->my_shelf, enq->slotid, 0);
    for (i = 0; i < max_port; i++) {
        tst.aa_lannum = 0;
        tst.aa_port = i;
        port = FIND_PORT(tcb->port_q, &tst);
        if (port != NULL) {
            mac = port->mac;
            if (!IS_EMPTY_Q(port->pv_q)) {
                paddrs[i] = tst;
                in_srvc |= in_srvc_mask;
            }
``` lm.c

```
        if (mac != NULL && !IS_EMPTY_Q(mac->mv_q)) {
            link = HEAD_Q(mac->mv_q);
            mv = (lm_mac_vlan_t *) link->data;
            tst.aa_lannum = mv->mlid;
            paddrs[i] = tst;
            in_srvc |= in_srvc_mask;
        }
      }
      in_srvc_mask >>= 1;
    } atm_hdr = *((lm_atm_hdr_t *) & msg->RxATM_Hdr);
    prefix = *((lm_prefix_t *) & msg->RxPrefix);
    rx_vci = atm_hdr.vci;
    tx_vci = (rx_vci & (~SIG_PVCI_MASK)) | PVCI_TO_VCIm(NNI_SIG_VCI);
    rx_shelf = VCI_TO_SHELFm(rx_vci);
    rx_slot = VCI_TO_SLOTm(rx_vci);
    rx_port = VCI_TO_PORTm(rx_vci);

BUILD_ATM_HDR(&atm_hdr, tx_vci);
    BUILD_UCAST_PREFIX(&prefix, rx_shelf, rx_slot, rx_port);

lm_send_alan_cfg(prefix, atm_hdr, enq->slotid, in_srvc, max_port, paddrs);
    return (ret);

err_exit:
    return (ret);
} lm_srvc_es_cfg_enq(msg)
    tAAL_TA_IND_RX *msg;
{
    int         ret;
    lm_es_cfg_enq_t *es_enq;
    tCFGELEM    *enq;
    lm_mac_t    *mac;
    lm_port_t   *port;
    tUINT32     rx_vci;
    tUINT8      rx_shelf;
    tUINT8      rx_slot;
    tUINT8      rx_port;
    tUINT32     tx_vci;
    lm_prefix_t prefix;
    lm_atm_hdr_t  atm_hdr;
    lm_mac_addr_t *mac_addr;
    lm_port_addr_t port_addr;
    lm_es_cfg_resp_t *resp;
    int         resp_len;
    int         i;
    SETUP_TCB;
``` lm.c

```
    ret = RT_SUCCESS;
    es_enq = (lm_es_cfg_enq_t *) msg->Rx.Buffer;
    enq = &es_enq->enq;
    mac_addr = &enq->af_my_address;

atm_hdr = *((lm_atm_hdr_t *) & msg->RxATM_Hdr);
    prefix = *((lm_prefix_t *) & msg->RxPrefix);
    rx_vci = atm_hdr.vci;
    tx_vci = (rx_vci & (~SIG_PVCI_MASK)) | PVCI_TO_VCIm(NNI_SIG_VCI);
    rx_shelf = VCI_TO_SHELFm(rx_vci);
    rx_slot = VCI_TO_SLOTm(rx_vci);
    rx_port = VCI_TO_PORTm(rx_vci);
    LM_INIT_PORT_ADDR(&port_addr, tcb->my_node, rx_shelf, rx_slot,
          rx_port);

port = FIND_PORT(tcb->port_q, &port_addr);
    mac = FIND_MAC(tcb->mac_q, mac_addr);
    if (mac == NULL) {
        mac = add_mac(mac_addr);
        if (port != NULL) {
            atch_mac_port(mac, port);
            lm_dup_port_dflts(port, mac);
        }
    }
    if (port != NULL && (port->mac != mac || mac->port != port)) {
        free_mac_port(port->mac, port);
        atch_mac_port(mac, port);
    }
    resp = lm_build_es_cfg_resp(mac, enq, &resp_len);
    if (resp == NULL) {
        ret = !RT_SUCCESS;
        goto err_exit;
    }
    BUILD_ATM_HDR(&atm_hdr, tx_vci);
    BUILD_UCAST_PREFIX(&prefix, rx_shelf, rx_slot, rx_port);

ret = lm_send_es_cfg_resp(prefix, atm_hdr, resp, resp_len);
    return (ret);

err_exit:
    return (ret);
} lm_srvc_svc_msg(msg)
    tAALUSRMSG   *msg;
{
    tLMIHDR      *lmi_hdr;
    tSETUP       *setup;
``` lm.c

```
    lmi_hdr = (tLMIHDR *) & msg->U_PDU;
    switch (lmi_hdr->lh_pdu_type) {
    case SDU_SETUP_IND:
        lm_srvc_svc_setup_ind(msg);
        break;
    case SDU_SETUP_COMP:
        break;
    case SDU_RELEASE_IND:
        lm_srvc_svc_rel_ind(msg);
        break;
    default:
        break;
    }
} lm_srvc_svc_rel_ind(msg)
    struct svcif  *msg;
{

} lm_srvc_svc_setup_ind(msg)
    struct svcif  *msg;
{
    struct svcif    *resp;
    tLMIHDR         *lmi_hdr;
    tREL_REQ        *rel;
    int             resp_len;
    int             ret;
    lm_mac_t        *mac;
    lm_port_t       *port;
    lm_vlan_t       *vlan;
    lm_mac_vlan_t   *mv;
    lm_mlid_t       mlid;
    tSETUP          *rx_setup;
    tSETUP          *tx_setup;
    lm_port_addr_t  port_addr;
    lm_vc_addr_t    vc_addr;
    lm_vc_t         *vc;
    tUINT8          *vpci;
    SETUP_TCB;

ret = RT_SUCCESS;

resp_len = SVCIF_PDU_OFFSET + sizeof(*tx_setup) +
        sizeof(struct lmi_parm);
    resp = (struct svcif *) ReqMsgMemZero(resp_len);
    if (resp == NULL) {
        ret = !RT_SUCCESS;
        goto err_exit;
```

```
}
rx_setup = (tSETUP *) & msg->lmi_hdr;
tx_setup = (tSETUP *) & resp->lmi_hdr;
*tx_setup = *rx_setup;
lmi_hdr = (tLMIHDR *) & tx_setup->lmi_hdr;
lmi_hdr->lh_pdu_type = SDU_SETUP_RESP;
port_addr = rx_setup->lmi_caller;
mlid = port_addr.aa_lannum;
port_addr.aa_lannum = 0;
port = FIND_PORT(tcb->port_q, &port_addr);
if (port == NULL) {
    ret = !RT_SUCCESS;
    goto err_exit;
}
mac = port->mac;
if (mac == NULL) {
    ret = !RT_SUCCESS;
    goto err_exit;
}
mv = FIND_MLID(mac->mv_q, mlid);
if (mv == NULL) {
    ret = !RT_SUCCESS;
    goto err_exit;
}
vlan = mv->vlan;
if (vlan == NULL) {
    ret = !RT_SUCCESS;
    goto err_exit;
}
LM_INIT_VC_ADDR(&vc_addr, vlan->vlan_id, &rx_setup->lmi_callee);
vc = FIND_VC(vlan->vc_q, &vc_addr);
if (vc == NULL) {
    vc = add_vc(&vc_addr);
}
if (vc == NULL) {
    ret = !RT_SUCCESS;
    goto err_exit;
}
vc->ref_cnt++;
vpci = (tUINT8 *) tx_setup + sizeof(*tx_setup);
LMI_ADD_ELEMENT(vpci, LMI_OVPCI, vc->bid);

lmi_hdr->lh_cref_type |= LMI_CREFDIRECTION_MASK;
ret = lm_send_svc_msg(resp, resp_len);

return (ret);

err_exit:
    if (resp != NULL) {
``` lm.c

```
        lmi_hdr->lh_cref_type |= LMI_CREFDIRECTION_MASK;
        lm_send_svc_rel_req(lmi_hdr, INVALID_STATE);
        free(resp);
    }
    return (ret);
}
``` lm.h

```
/* lm.h
 *
 * COPYRIGHT 1992 ADAPTIVE CORPORATION
 * ALL RIGHTS RESERVED
 */
 *
 *****************************END******************************************/ ifndef LM_H
define LM_H define LM_VB_QUIET    (0)
define LM_VB_ERRS     (1)
#define LM_VB_TERSE    (2)
#define LM_VB_VERBOSE  (3)
#define LM_VB_MSGS     (4)
#define LM_VB_ALL      (999)

#define CHK_VB(level)  (tcb->verbose >= level)

#define LM_MAX_VLAN_NAME    (17)
#define LM_INDENT           (2)
#define LM_DFLT_MTU_SIZE    (9100)
#define LM_DFLT_NUM_MCASTS  (4)
#define LM_MAX_MLID         (256)
#define LM_MAX_BID          (1024)
#define LM_MAX_MID          (1024)
#define MAX_SLOTS           (16)
#define MAX_PORTS_PER_SLOT  (8)
#define MAX_PORTS           (MAX_SLOTS * MAX_PORTS_PER_SLOT)
#define LM_AAL_EX           (EX_INDICATION)
#define LM_AAL_EX_MSK       (M_EX_INDICATION)
#define LM_START_VCI        (0x3000)
#define LM_END_VCI          (0x3fff)
#define LM_INSTANCE (0)
#define LM_AAL_SID  (MAKE_SSID(TID_LM, LM_INSTANCE, LM_AAL_EX))
#define LM_EX_MSK   (M_EX_INDICATION)
#define SIZE_MID_BITS   (LM_MAX_MID / (8 * SIZE_BITS))
#define SIZE_MLID_BITS  (LM_MAX_MLID / (8 * SIZE_BITS))
#define SIZE_BID_BITS   (LM_MAX_BID / (8 * SIZE_BITS))
#define LM_CLR_MAC_ADDR(maddr)\
    ((maddr)->aa_long[0] = (maddr)->aa_long[1] = 0, (maddr)->aa_type = AAT_MAC)
#define LM_CLR_PORT_ADDR(paddr)\
    ((paddr)->aa_long[0] = (paddr)->aa_long[1] = 0, (paddr)->aa_type = AAT_PORT,\
    (paddr)->aa_country = USA)
#define LM_CLR_VC_ADDR(vcaddr) \
    ((vcaddr)->vlan_id = 0, LM_CLR_MAC_ADDR(&((vcaddr)->mac_addr)))
#define LM_INIT_PORT_ADDR(paddr, node, shelf, slot, port) \
    (LM_CLR_PORT_ADDR(paddr),\
    (paddr)->aa_node = node, (paddr)->aa_shelf = shelf, (paddr)->aa_slot = slot,\
``` lm.h
-91-

```
        (paddr)->aa_port = port, (paddr)->aa_lannum = 0)
#define LM_INIT_MAC_ADDR(maddr, mac_addr)\
        ((maddr)->aa_long[0] = (mac_addr)->aa_long[0], \
        (maddr)->aa_long[1] = (mac_addr)->aa_long[1], \
        (maddr)->aa_type = AAT_MAC)
#define LM_INIT_VC_ADDR(vcaddr, vid, maddr)\
        (LM_CLR_VC_ADDR(vcaddr), (vcaddr)->vlan_id = (vid),\
        LM_INIT_MAC_ADDR(&((vcaddr)->mac_addr), maddr))
#define LM_NUM_ELEM(ary) (sizeof(ary) / sizeof((ary)[0]))
#define BUILD_ITCH(Hdr, len, generic, instance, exch, mtype, mytid) \
                {Hdr.Length=len;                                \
                 Hdr.Dest.Label.Pid =0;                         \
                 Hdr.Dest.Label.Sid =                           \
                    MAKE_SSID(generic,instance,exch);\
                 Hdr.Dest.Net = LOCAL_NET;                      \
                 Hdr.Dest.Node = LOCAL_NODE;                    \
                 GetPid(&Hdr.Orig.Label.Pid);                  .\
                 Hdr.Orig.Label.Sid =                           \
                    MAKE_SSID(mytid.Generic, 0, EX_INDICATION);\
                 Hdr.MsgType = mtype;} typedef tUINT32 lm_mlid_t;
typedef tUINT32 lm_bid_t;
typedef tUINT16 lm_vlan_id_t;

typedef struct lm_prefix_s {
        unsigned        pri:2;
        unsigned        tag_a:6;
        unsigned        fill1:2;
        unsigned        rp:1;
        unsigned        nrc:1;
        unsigned        cos:4;
        unsigned        fill2:1;
        unsigned        br:1;
        unsigned        vem:1;
        unsigned        mb:1;
        unsigned        tag_b:4;
        unsigned        fill3:2;
        unsigned        tag_c:6;
}               lm_prefix_t;
#define SIZE_LM_PREFIX (sizeof(lm_prefix_t))

#define CLR_PREFIX(pfx) (*((tUINT32*)(pfx)) = 0)

#define BUILD_UCAST_PREFIX(pfx, shelf, slot, port)\
        (CLR_PREFIX(pfx), (pfx)->tag_a = shelf, (pfx)->tag_b = slot, \
        (pfx)->tag_c = port, (pfx)->rp = 1)
/* Fix RPA 10 Mar 92 */
``` lm.h

```c
#define BUILD_MCAST_PREFIX(pfx, bid)\
    (CLR_PREFIX(pfx), (pfx)->br = 1, (pfx)->tag_a = (((bid) & 0xfc00) >> 10),\
    (pfx)->tag_b = (((bid) & 0x03c0) >> 6), (pfx)->tag_c = ((bid) & 0x003f))

typedef struct lm_atm_hdr_s {
    unsigned    gfc:4;
    unsigned    vpi:8;
    unsigned    vci:16;
    unsigned    pt:2;
    unsigned    rsvd:1;
    unsigned    clp:1;
}           lm_atm_hdr_t;
#define SIZE_LM_ATM_HDR (sizeof(lm_atm_hdr_t))

#define CLR_ATM_HDR(hdr) (*((tUINT32*)(hdr)) = 0)
#define BUILD_ATM_HDR(hdr, the_vci)\
    (CLR_ATM_HDR(hdr), (hdr)->vci = the_vci)

typedef struct lm_alan_cfg_enq_s {
    struct lmi_hdr  lmi_hdr;
    tALANCFG_ENQ    enq;
}           lm_alan_cfg_enq_t;
#define SIZE_LM_ALAN_CFG_ENQ    (sizeof(lm_alan_cfg_enq_t))

typedef struct lm_alan_cfg_resp_s {
    struct lmi_hdr  lmi_hdr;
    tALANCFG_ENQ    enq;
    tALANCFG_RESP   resp;
}           lm_alan_cfg_resp_t;
#define SIZE_LM_ALAN_CFG_RESP   (sizeof(lm_alan_cfg_resp_t))

typedef struct lm_es_cfg_resp_s {
    struct lmi_hdr  lmi_hdr;
    tCFGELEM        enq;
    tCFGELEM        resp;
    tPORT_CFGELEM   paddr[1];
}           lm_es_cfg_resp_t;
#define SIZE_LM_ES_CFG_RESP (sizeof(lm_es_cfg_resp_t))

typedef struct lm_es_cfg_enq_s {
    struct lmi_hdr  lmi_hdr;
    struct config_elem enq;
}           lm_es_cfg_enq_t;
#define SIZE_LM_ES_CFG_ENQ (sizeof(lm_es_cfg_enq_t))

typedef struct atm_addr lm_mac_addr_t;
#define SIZE_LM_MAC_ADDR    (sizeof(lm_mac_addr_t))

typedef struct atm_addr lm_port_addr_t;
#define SIZE_LM_PORT_ADDR   (sizeof(lm_port_addr_t))
``` lm.h

```c
typedef struct lm_vc_addr_s {
    lm_vlan_id_t    vlan_id;
    struct atm_addr mac_addr;
}               lm_vc_addr_t;
#define SIZE_LM_VC_ADDR (sizeof(lm_vc_addr_t))

#define aa_country    aa_u.aaw.aasw_nibble2
#define aa_shelf      aa_u.aaw.aasw_nibble3
#define aa_slot       aa_u.aaw.aasw_nibble4
define aa_port       aa_u.aaw.aasw_nibble5 typedef struct lm_tcb_s {
    tTID            mytid;
    tPID            mypid;
    struct TimerBlock *tmr_blk;
    tUINT32         timerid;
    tUINT32         timerarg;
    tATMADDR        nac_atm_addr;
    tUINT32         nac_id;
    tAAL_KEY        my_aal_key;
    tUINT32         my_node;
    tUINT32         my_shelf;
    tUINT32         my_slot;
    lm_port_addr_t  port_tmplt;
    tUINT32         cur_bid;
    bits_t          bid_bits[SIZE_BID_BITS];
    bits_t          mlid_bits[SIZE_MLID_BITS];
    tUINT32         dflt_mtu_size;
    tUINT32         dflt_num_mcasts;
    tUINT32         verbose;
    tUINT32         do_cfg_wrts;
    char            vc_addr_buf[200];
    char            mac_addr_buf[sizeof(lm_mac_addr_t) * 3 + 1];
    char            port_addr_buf[40];
    char            vlan_id_buf[10];
    queue_t         port_queue;
    queue_t         vlan_queue;
    queue_t         mac_queue;
    queue_t         mv_queue;
    queue_t         pv_queue;
    queue_t         vc_queue;
    queue_t         *port_q;
    queue_t         *vlan_q;
    queue_t         *mac_q;
    queue_t         *mv_q;
    queue_t         *pv_q;
    queue_t         *vc_q;
}               lm_tcb_t;
#define SIZE_LM_TCB (sizeof(lm_tcb_t))
``` lm.h

```c
typedef struct lm_mac_s {
    qlink_t     mac_link;
    queue_t     mv_queue;
    queue_t     *mv_q;
    struct lm_port_s *port;
    lm_mac_addr_t mac_addr;
    bits_t      mlid_bits[SIZE_MLID_BITS];
}           lm_mac_t;
#define SIZE_LM_MAC (sizeof(lm_mac_t))

typedef struct lm_vlan_s {
    qlink_t     vlan_link;
    queue_t     pv_queue;
    queue_t     *pv_q;
    queue_t     mv_queue;
    queue_t     *mv_q;
    queue_t     vc_queue;
    queue_t     *vc_q;
    queue_t     free_vc_queue;
    queue_t     *free_vc_q;
    lm_vlan_id_t vlan_id;
    tUINT32     mtu_size;
    tUINT32     num_mcasts;
    lm_mlid_t   dflt_mlid;
    char        vlan_name[LM_MAX_VLAN_NAME];
    bits_t      mid_bits[SIZE_MID_BITS];
}           lm_vlan_t;
#define SIZE_LM_VLAN    (sizeof(lm_vlan_t))

typedef struct lm_port_s {
    qlink_t     port_link;
    lm_port_addr_t port_addr;
    lm_mac_t    *mac;
    queue_t     pv_queue;
    queue_t     *pv_q;
    bits_t      mlid_bits[SIZE_MLID_BITS];
}           lm_port_t;
#define SIZE_LM_PORT    (sizeof(lm_port_t))

typedef struct lm_vc_s {
    qlink_t     vc_link;
    qlink_t     vlan_link;
    lm_vlan_t   *vlan;
    lm_vc_addr_t vc_addr;
    lm_bid_t    bid;
    tUINT32     ref_cnt;
}           lm_vc_t;
#define SIZE_LM_VC (sizeof(lm_vc_t))
``` lm.h

```c
typedef struct lm_port_vlan_s {
    qlink_t      pv_link;
    qlink_t      port_link;
    qlink_t      vlan_link;
    lm_vlan_t    *vlan;
    lm_port_t    *port;
    lm_mlid_t    mlid;
    lm_vlan_id_t vlan_id;
    lm_port_addr_t port_addr;
}            lm_port_vlan_t;
#define SIZE_LM_PORT_VLAN   (sizeof(lm_port_vlan_t))

typedef struct lm_mac_vlan_s {
    qlink_t      mv_link;
    qlink_t      mac_link;
    qlink_t      vlan_link;
    lm_mac_t     *mac;
    lm_vlan_t    *vlan;
    lm_vlan_id_t vlan_id;
    lm_mac_addr_t mac_addr;
    tUINT16      mid;
    lm_mlid_t    mlid;
}            lm_mac_vlan_t;
#define SIZE_LM_MAC_VLAN    (sizeof(lm_mac_vlan_t))

typedef struct lm_cfg_glbl_s {
    tUINT32      dflt_mtu_size;
    tUINT32      dflt_num_mcasts;
}        lm_cfg_glbl_t;
#define SIZE_LM_CFG_GLBL    (sizeof(lm_cfg_glbl_t))

typedef struct lm_cfg_vlan_s {
    tUINT32      dflt_mlid;
    tUINT32      num_mcasts;
    tUINT32      mtu_size;
    char         vlan_name[LM_MAX_VLAN_NAME];
}        lm_cfg_vlan_t;
#define SIZE_LM_CFG_VLAN    (sizeof(lm_cfg_vlan_t))

typedef struct lm_cfg_port_s {
    tUINT32      el_tonto;
}        lm_cfg_port_t;
#define SIZE_LM_CFG_PORT    (sizeof(lm_cfg_port_t))

typedef struct lm_cfg_mac_s {
    tUINT32      el_tonto;
}        lm_cfg_mac_t;
#define SIZE_LM_CFG_MAC     (sizeof(lm_cfg_mac_t))

typedef struct lm_cfg_pv_s {
```

```
        tUINT32     mlid;
}          lm_cfg_pv_t;
#define SIZE_LM_CFG_PV     (sizeof(lm_cfg_pv_t))

typedef struct lm_cfg_mv_s {
    tUINT32     mlid;
}          lm_cfg_mv_t;
#define SIZE_LM_CFG_MV     (sizeof(lm_cfg_mv_t))

typedef struct lm_cfg_vc_s {
    tUINT32     el_tonto;
}          lm_cfg_vc_t;
#define SIZE_LM_CFG_VC     (sizeof(lm_cfg_vc_t))

typedef struct lm_glbl_cfg_key_s {
    tUINT32     tag;
}          lm_glbl_cfg_key_t;
#define SIZE_LM_GLBL_CFG_KEY     (sizeof(lm_glbl_cfg_key_t))

typedef struct lm_vlan_cfg_key_s {
    tUINT32     tag;
    lm_vlan_id_t   vlan_id;
}          lm_vlan_cfg_key_t;
#define SIZE_LM_VLAN_CFG_KEY     (sizeof(lm_vlan_cfg_key_t))

typedef struct lm_port_cfg_key_s {
    tUINT32     tag;
    lm_port_addr_t port_addr;
}          lm_port_cfg_key_t;
#define SIZE_LM_PORT_CFG_KEY     (sizeof(lm_port_cfg_key_t))

typedef struct lm_mac_cfg_key_s {
    tUINT32     tag;
    lm_mac_addr_t  mac_addr;
}          lm_mac_cfg_key_t;
#define SIZE_LM_MAC_CFG_KEY (sizeof(lm_mac_cfg_key_t))

typedef struct lm_vc_cfg_key_s {
    tUINT32     tag;
    lm_vc_addr_t   vc_addr;
}          lm_vc_cfg_key_t;
#define SIZE_LM_VC_CFG_KEY     (sizeof(lm_vc_cfg_key_t))

typedef struct lm_pv_cfg_key_s {
    tUINT32     tag;
    lm_port_addr_t port_addr;
    lm_vlan_id_t   vlan_id;
}          lm_pv_cfg_key_t;
#define SIZE_LM_PV_CFG_KEY     (sizeof(lm_pv_cfg_key_t))
``` lm.h

```c
typedef struct lm_mv_cfg_key_s {
    tUINT32         tag;
    lm_mac_addr_t   mac_addr;
    lm_vlan_id_t    vlan_id;
}               lm_mv_cfg_key_t;
#define SIZE_LM_MV_CFG_KEY  (sizeof(lm_mv_cfg_key_t))

typedef union cfg_key_u {
    tUINT32             tag;
    lm_glbl_cfg_key_t   glbl_key;
    lm_vlan_cfg_key_t   vlan_key;
    lm_port_cfg_key_t   port_key;
    lm_mac_cfg_key_t    mac_key;
    lm_vc_cfg_key_t     vc_key;
    lm_pv_cfg_key_t     pv_key;
    lm_mv_cfg_key_t     mv_key;
}               lm_cfg_key_t;
#define SIZE_LM_CFG_KEY  (sizeof(lm_cfg_key_t))

#define NULL_CFG_KEY    (0)
#define GLBL_CFG_KEY    (1)
#define VLAN_CFG_KEY    (2)
#define PORT_CFG_KEY    (3)
#define MAC_CFG_KEY     (4)
#define VC_CFG_KEY      (5)
#define PV_CFG_KEY      (6)
#define MV_CFG_KEY      (7)

#ifdef UNIX
extern tINT8    *GlobalP;
#undef printf
endif define malloc(size)    GetMem(size)
define free(ptr)       FreeMem(ptr)

#define FREE_Q(q, proc)     ((int)traverse_q(q, proc, NULL))
#define FREE_MV_Q(q)        FREE_Q(q, free_mv)
#define FREE_PV_Q(q)        FREE_Q(q, free_pv)
#define FREE_MAC_Q(q)       FREE_Q(q, free_mac)
#define FREE_VLAN_Q(q)      FREE_Q(q, free_vlan)
#define FREE_PORT_Q(q)      FREE_Q(q, free_port)
#define FREE_VC_Q(q)        FREE_Q(q, free_vc)
#define FREE_PORT_VLAN_Q(q) FREE_Q(q, free_port_vlan)
#define FREE_MAC_VLAN_Q(q)  FREE_Q(q, free_mac_vlan)
#define FREE_MAC_MV_Q(q)    FREE_Q(q, free_mac_mv)
#define FREE_VLAN_MV_Q(q)   FREE_Q(q, free_vlan_mv)
#define FREE_PORT_PV_Q(q)   FREE_Q(q, free_port_pv)
#define FREE_VLAN_PV_Q(q)   FREE_Q(q, free_vlan_pv)
``` lm.h

```
#define ATCH_MAC_MV_Q(q, mac)   ((int)traverse_q(q, atch_mac_mv, mac))
#define ATCH_VLAN_MV_Q(q, vlan) ((int)traverse_q(q, atch_vlan_mv, vlan))
#define ATCH_PORT_PV_Q(q, port) ((int)traverse_q(q, atch_port_pv, port))
#define ATCH_VLAN_PV_Q(q, vlan) ((int)traverse_q(q, atch_vlan_pv, vlan))

#define ATCH_MV_MAC_Q(q, mv)    ((int)traverse_q(q, atch_mv_mac, mv))
#define ATCH_MV_VLAN_Q(q, mv)   ((int)traverse_q(q, atch_mv_vlan, mv))
#define ATCH_PV_PORT_Q(q, pv)   ((int)traverse_q(q, atch_pv_port, pv))
#define ATCH_PV_VLAN_Q(q, pv)   ((int)traverse_q(q, atch_pv_vlan, pv))

#define FIND_MAC(q, mac)   ((lm_mac_t*)traverse_q(q, cmp_mac, mac))
#define FIND_PORT(q, port) ((lm_port_t*)traverse_q(q, cmp_port, port))
#define FIND_VLAN(q, vlan) ((lm_vlan_t*)traverse_q(q, cmp_vlan, vlan))
#define FIND_VC(q, vc)     ((lm_vc_t*)traverse_q(q, cmp_vc, vc))
#define FIND_MV(q, mv)     ((lm_mac_vlan_t*)traverse_q(q, cmp_mv, mv))
#define FIND_PV(q, pv)     ((lm_port_vlan_t*)traverse_q(q, cmp_pv, pv))
#define FIND_MLID(q, mlid) ((lm_mac_vlan_t*)traverse_q(q, cmp_mlid, mlid))

#define FINDNEXT_MAC(q, mac)   ((lm_mac_t*)traverse_q(q, cmpnext_mac, mac))
#define FINDNEXT_PORT(q, port) ((lm_port_t*)traverse_q(q, cmpnext_port, port))
#define FINDNEXT_VLAN(q, vlan) ((lm_vlan_t*)traverse_q(q, cmpnext_vlan, vlan))
#define FINDNEXT_VC(q, vc)     ((lm_vc_t*)traverse_q(q, cmpnext_vc, vc))
#define FINDNEXT_MV(q, mv)     ((lm_mac_vlan_t*)traverse_q(q, cmpnext_mv, mv))
#define FINDNEXT_PV(q, pv)     ((lm_port_vlan_t*)traverse_q(q, cmpnext_pv, pv))
#define FINDNEXT_MLID(q, mlid) ((lm_mac_vlan_t*)traverse_q(q, cmpnext_mlid, mlid))

#define PUTQ_SORTED_MAC(link, q)  (putq_sorted(link, q, qpsc_mac))
#define PUTQ_SORTED_PORT(link, q) (putq_sorted(link, q, qpsc_port))
#define PUTQ_SORTED_VLAN(link, q) (putq_sorted(link, q, qpsc_vlan))
#define PUTQ_SORTED_VC(link, q)   (putq_sorted(link, q, qpsc_vc))
#define PUTQ_SORTED_PV(link, q)   (putq_sorted(link, q, qpsc_pv))
#define PUTQ_SORTED_MV(link, q)   (putq_sorted(link, q, qpsc_mv))

#define PRINT_Q(q, proc, indent)   ((int)traverse_q(q, proc, indent))
#define PRINT_VLAN_Q(q, indent) PRINT_Q(q, print_vlan, indent)
#define PRINT_MAC_Q(q, indent)  PRINT_Q(q, print_mac, indent)
#define PRINT_PORT_Q(q, indent) PRINT_Q(q, print_port, indent)
#define PRINT_PV_Q(q, indent)   PRINT_Q(q, print_pv, indent)
#define PRINT_MV_Q(q, indent)   PRINT_Q(q, print_mv, indent)
#define PRINT_VC_Q(q, indent)   PRINT_Q(q, print_vc, indent)

#define pGlobalData  ((lm_tcb_t*)GlobalP)

#define DEFINE_TCB    lm_tcb_t  *tcb
define SETUP_TCB     DEFINE_TCB = pGlobalData extern struct AgentMsg *lm_cp_mgmt_msg();
extern lm_es_cfg_resp_t *lm_build_es_cfg_resp();
extern lm_mac_t *add_mac();
extern lm_port_t *add_port();
``` lm.h

```
extern lm_vlan_t    *add_vlan();
extern lm_vc_t      *add_vc();
extern lm_vc_t      *get_free_vc();
extern lm_vc_t      *add_free_vc();
extern lm_mac_vlan_t *add_mv();
extern lm_port_vlan_t *add_pv();
extern lm_mac_t     *cmp_mac();
extern lm_port_t    *cmp_port();
extern lm_vlan_t    *cmp_vlan();
extern lm_vc_t      *cmp_vc();
extern lm_port_vlan_t *cmp_pv();
extern lm_mac_vlan_t *cmp_mv();
extern lm_mac_vlan_t *cmp_mlid();
extern lm_mac_t     *cmpnext_mac();
extern lm_port_t    *cmpnext_port();
extern lm_vlan_t    *cmpnext_vlan();
extern lm_vc_t      *cmpnext_vc();
extern lm_port_vlan_t *cmpnext_pv();
extern lm_mac_vlan_t *cmpnext_mv();
extern lm_mac_vlan_t *cmpnext_mlid();
extern int    qpsc_mac();
extern int    qpsc_port();
extern int    qpsc_vlan();
extern int    qpsc_vc();
extern int    qpsc_pv();
extern int    qpsc_mv();
extern int    atch_mac_mv();
extern int    atch_vlan_mv();
extern int    atch_port_pv();
extern int    atch_vlan_pv();
extern int    atch_pv_vlan();
extern int    atch_pv_port();
extern int    atch_mv_mac();
extern int    atch_mv_vlan();
extern int    free_mac();
extern int    free_vlan();
extern int    free_port();
extern int    free_vc();
extern int    free_port_vlan();
extern int    free_mac_vlan();
extern int    free_mac_mv();
extern int    free_vlan_mv();
extern int    free_port_pv();
extern int    free_vlan_pv();
extern int    free_mv();
extern int    free_pv();
extern int    print_mac();
extern int    print_vlan();
extern int    print_port();
extern int    print_vc();
``` lm.h

```
extern int      print_mv();
extern int      print_pv();
extern char     *sprint_mac_addr();
extern char     *sprint_port_addr();
extern char     *sprint_vlan_id();
extern char     *sprint_vc_addr();

extern struct TimerBlock *TimerInit();

#endif           /* ifndef LM_H */
``` lm_cfg.c

```c
/* lm_cfg.c
 *
 * COPYRIGHT 1992 ADAPTIVE CORPORATION
 * ALL RIGHTS RESERVED
 */ ifdef CERNEL include "ipc_def.h"
include "net_def.h"
#include <global_def.h>
include <driver.h> undef lm_init else           /* ifndef CERNEL */ include <stdint.h>
include <global_def.h>
#include <ITC_if.h>
include <driver.h>
include <RT_if.h>
include <timer.h>
#include <RT_def.h>
#include <enet_if.h>
include <net_def.h> define ERRLOG printdbg
define printf printdbg endif          /* ifdef CERNEL */ include "unipdu.h"
include "nnipdus.h"
#include "altask_gl.h"
#include "sigtask_gl.h"
#include "svctask_gl.h"
#include "svc_if.h"
#include "snmp_incl.h"
#include "AAL_if.h"
#include "wdb_if.h"
#include "q.h"
#include "bits.h"
#include "lm.h"

#define WDB_VERS    (1)
#define WDB_PRI     (1)
``` lm_cfg.c

```c
lm_chg_glbl_cfg(dflt_mtu_size, dflt_num_mcasts, nac_addr, bid_bits, mlid_bits)
    tUINT32     *dflt_mtu_size;
    tUINT32     *dflt_num_mcasts;
    tATMADDR    *nac_addr;
    bits_t      *bid_bits;
    bits_t      *mlid_bits;
{
    SETUP_TCB;

if (dflt_mtu_size != NULL) {
        tcb->dflt_mtu_size = *dflt_mtu_size;
    }
    if (dflt_num_mcasts != NULL) {
        tcb->dflt_num_mcasts = *dflt_num_mcasts;
    }
    if (nac_addr != NULL) {
        tcb->nac_atm_addr = *nac_addr;
    }
    if (bid_bits != NULL) {
        bcopy(bid_bits, tcb->bid_bits, sizeof(tcb->bid_bits));
    }
    if (mlid_bits != NULL) {
        bcopy(mlid_bits, tcb->mlid_bits, sizeof(tcb->mlid_bits));
    }
    lm_wrt_glbl_cfg();
} lm_chg_vlan_cfg(vlan, dflt_mlid, num_mcasts, mtu_size, vlan_name)
    lm_vlan_t   *vlan;
    tUINT32     *dflt_mlid;
    tUINT32     *num_mcasts;
    tUINT32     *mtu_size;
    tUINT32     *vlan_name;
{
    qlink_t         *link;
    lm_mac_t        *mac;
    lm_mac_vlan_t   *mv;
    SETUP_TCB;

if (dflt_mlid != NULL) {
        if (*dflt_mlid >= LM_MAX_MLID ||
            !bits_tst_bit(*dflt_mlid, tcb->mlid_bits, SIZE_MLID_BITS)) {
            if (vlan->dflt_mlid < LM_MAX_MLID) {
                bits_free_bit(vlan->dflt_mlid, tcb->mlid_bits,
                        SIZE_MLID_BITS);
            }
            if (*dflt_mlid < LM_MAX_MLID) {
                bits_alloc_bit(*dflt_mlid, tcb->mlid_bits,
                        SIZE_MLID_BITS);
            }
``` lm_cfg.c

```
            vlan->dflt_mlid = *dflt_mlid;
        }
    }
    if (num_mcasts != NULL) {
        chg_num_vcs(vlan, *num_mcasts);
    }
    if (vlan_name != NULL) {
        int         name_len;

name_len = strlen(vlan_name);
        name_len = (name_len < LM_MAX_VLAN_NAME) ? name_len :
            LM_MAX_VLAN_NAME - 1;
        bcopy(vlan_name, vlan->vlan_name, name_len);
        vlan->vlan_name[name_len] = 0;
    }
    if (mtu_size != NULL) {
        vlan->mtu_size = *mtu_size;
    }
    lm_wrt_vlan_cfg(vlan);
    for (link = HEAD_Q(vlan->mv_q); link != NULL;
        link = link->next) {
        mv = (lm_mac_vlan_t *) link->data;
        mac = mv->mac;
        if (mac != NULL) {
            lm_send_es_cfg_ind(mac);
        }
    }
} lm_chg_port_cfg(port, mac_addr, mlid_bits)
    lm_port_t     *port;
    lm_mac_addr_t *mac_addr;
    bits_t        *mlid_bits;
{
    lm_mac_t     *mac;
    SETUP_TCB;

if (mac_addr != NULL) {
        if (port->mac != NULL) {
            mac = port->mac;
            free_mac(mac);
        }
        mac = add_mac(mac_addr);
        atch_mac_port(mac, port);
        lm_dup_port_dflts(port, mac);
    }
    if (mlid_bits != NULL) {
        bcopy(mlid_bits, port->mlid_bits, sizeof(port->mlid_bits));
    }
    lm_wrt_port_cfg(port);
``` lm_cfg.c

```c
}
lm_chg_mac_cfg(mac, mlid_bits)
    lm_mac_t    *mac;
    bits_t      *mlid_bits;
{
    SETUP_TCB;

if (mlid_bits != NULL) {
        bcopy(mlid_bits, mac->mlid_bits, sizeof(mlid_bits));
    }
    lm_wrt_mac_cfg(mac);
} lm_chg_vc_cfg(vc, bid, ref_cnt)
    lm_vc_t     *vc;
    lm_bid_t    *bid;
    tUINT32     *ref_cnt;
{
    SETUP_TCB;

if (bid != NULL) {
        if (!bits_tst_bit(*bid, tcb->bid_bits, SIZE_BID_BITS)) {
            bits_free_bit(vc->bid, tcb->bid_bits, SIZE_BID_BITS);
            bits_alloc_bit(*bid, tcb->bid_bits, SIZE_BID_BITS);
            vc->bid = *bid;
        }
    }
    if (ref_cnt != NULL) {
        vc->ref_cnt = *ref_cnt;
    }
    lm_wrt_vc_cfg(vc);
} lm_chg_pv_cfg(pv, mlid)
    lm_port_vlan_t *pv;
    tUINT32        *mlid;
{
    lm_port_t   *port;
    SETUP_TCB;

port = pv->port;
    if (mlid != NULL && port != NULL) {
        if (!bits_tst_bit(*mlid, port->mlid_bits, SIZE_MLID_BITS)) {
            bits_free_bit(pv->mlid, port->mlid_bits, SIZE_MLID_BITS);
            bits_alloc_bit(*mlid, port->mlid_bits, SIZE_MLID_BITS);
            pv->mlid = *mlid;
        }
    }
}
``` lm_cfg.c

```
    lm_wrt_pv_cfg(pv);
} lm_chg_mv_cfg(mv, mlid)
    lm_mac_vlan_t  *mv;
    tUINT32        *mlid;
{
    lm_mac_t   *mac;
    SETUP_TCB;

mac = mv->mac;
    if (mlid != NULL && mac != NULL) {
        if (!bits_tst_bit(*mlid, mac->mlid_bits, SIZE_MLID_BITS)) {
            bits_free_bit(mv->mlid, mac->mlid_bits, SIZE_MLID_BITS);
            bits_alloc_bit(*mlid, mac->mlid_bits, SIZE_MLID_BITS);
            mv->mlid = *mlid;
        }
    }
    lm_wrt_mv_cfg(mv);
    if (mac != NULL) {
        lm_send_es_cfg_ind(mac);
    }
} lm_rm_glbl_cfg()
{
    lm_glbl_cfg_key_t key;
    lm_cfg_glbl_t    cfg;
    SETUP_TCB;

key.tag = GLBL_CFG_KEY;

wdb_send_remove_noack(&key, sizeof(key));
} lm_rm_vlan_cfg(vlan)
    lm_vlan_t   *vlan;
{
    lm_vlan_cfg_key_t key;
    lm_cfg_vlan_t    cfg;
    SETUP_TCB;

key.tag = VLAN_CFG_KEY;
    key.vlan_id = vlan->vlan_id;

wdb_send_remove_noack(&key, sizeof(key));
} lm_rm_port_cfg(port)
    lm_port_t   *port;
``` lm_cfg.c
-106-

```
{
    lm_port_cfg_key_t key;
    lm_cfg_port_t    cfg;
    SETUP_TCB;

key.tag = PORT_CFG_KEY;
    key.port_addr = port->port_addr;

wdb_send_remove_noack(&key, sizeof(key));
} lm_rm_mac_cfg(mac)
    lm_mac_t    *mac;
{
    lm_mac_cfg_key_t key;
    lm_cfg_mac_t    cfg;
    SETUP_TCB;

key.tag = MAC_CFG_KEY;
    key.mac_addr = mac->mac_addr;

wdb_send_remove_noack(&key, sizeof(key));
} lm_rm_vc_cfg(vc)
    lm_vc_t    *vc;
{
    lm_vc_cfg_key_t key;
    lm_cfg_vc_t    cfg;
    SETUP_TCB;

key.tag = VC_CFG_KEY;
    key.vc_addr = vc->vc_addr;

wdb_send_remove_noack(&key, sizeof(key));
} lm_rm_pv_cfg(pv)
    lm_port_vlan_t *pv;
{
    lm_pv_cfg_key_t key;
    lm_cfg_pv_t    cfg;
    SETUP_TCB;

key.tag = PV_CFG_KEY;
    key.port_addr = pv->port_addr;
    key.vlan_id = pv->vlan_id;

wdb_send_remove_noack(&key, sizeof(key));
}
``` lm_cfg.c

```c
lm_rm_mv_cfg(mv)
    lm_mac_vlan_t *mv;
{
    lm_mv_cfg_key_t key;
    lm_cfg_mv_t     cfg;
    SETUP_TCB;

key.tag = MV_CFG_KEY;
    key.mac_addr = mv->mac_addr;
    key.vlan_id = mv->vlan_id;

wdb_send_remove_noack(&key, sizeof(key));
} lm_wrt_glbl_cfg()
{
    lm_glbl_cfg_key_t key;
    lm_cfg_glbl_t     cfg;
    SETUP_TCB;

if (tcb->do_cfg_wrts) {
        key.tag = GLBL_CFG_KEY;

cfg.dflt_mtu_size = tcb->dflt_mtu_size;
        cfg.dflt_num_mcasts = tcb->dflt_num_mcasts;
        wdb_send_store_noack(&key, sizeof(key), &cfg, sizeof(cfg),
                WDB_VERS, WDB_PRI);
    }
} lm_wrt_vlan_cfg(vlan)
    lm_vlan_t    *vlan;
{
    lm_vlan_cfg_key_t key;
    lm_cfg_vlan_t     cfg;
    SETUP_TCB;

if (tcb->do_cfg_wrts) {
        key.tag = VLAN_CFG_KEY;
        key.vlan_id = vlan->vlan_id;

cfg.dflt_mlid = vlan->dflt_mlid;
        cfg.num_mcasts = vlan->num_mcasts;
        cfg.mtu_size = vlan->mtu_size;
        bcopy(vlan->vlan_name, cfg.vlan_name, sizeof(cfg.vlan_name));
        wdb_send_store_noack(&key, sizeof(key), &cfg, sizeof(cfg),
                WDB_VERS, WDB_PRI);
    }
}
``` lm_cfg.c

```
lm_wrt_port_cfg(port)
    lm_port_t    *port;
{
    lm_port_cfg_key_t key;
    lm_cfg_port_t   cfg;
    SETUP_TCB;

if (tcb->do_cfg_wrts) {
        key.tag = PORT_CFG_KEY;
        key.port_addr = port->port_addr;

cfg.el_tonto = 0;
        wdb_send_store_noack(&key, sizeof(key), &cfg, sizeof(cfg),
                WDB_VERS, WDB_PRI);
    }
} lm_wrt_mac_cfg(mac)
    lm_mac_t     *mac;
{
    lm_mac_cfg_key_t key;
    lm_cfg_mac_t    cfg;
    SETUP_TCB;

if (tcb->do_cfg_wrts) {
        key.tag = MAC_CFG_KEY;
        key.mac_addr = mac->mac_addr;

cfg.el_tonto = 0;
        wdb_send_store_noack(&key, sizeof(key), &cfg, sizeof(cfg),
                WDB_VERS, WDB_PRI);
    }
} lm_wrt_vc_cfg(vc)
    lm_vc_t      *vc;
{
    lm_vc_cfg_key_t key;
    lm_cfg_vc_t     cfg;
    SETUP_TCB;

if (tcb->do_cfg_wrts) {
        key.tag = VC_CFG_KEY;
        key.vc_addr = vc->vc_addr;

cfg.el_tonto = 0;
        wdb_send_store_noack(&key, sizeof(key), &cfg, sizeof(cfg),
                WDB_VERS, WDB_PRI);
    }
``` lm_cfg.c

```c
}
lm_wrt_pv_cfg(pv)
    lm_port_vlan_t *pv;
{
    lm_pv_cfg_key_t key;
    lm_cfg_pv_t    cfg;
    SETUP_TCB;

if (tcb->do_cfg_wrts) {
        key.tag = PV_CFG_KEY;
        key.port_addr = pv->port_addr;
        key.vlan_id = pv->vlan_id;

cfg.mlid = pv->mlid;
        wdb_send_store_noack(&key, sizeof(key), &cfg, sizeof(cfg),
                WDB_VERS, WDB_PRI);
    }
} lm_wrt_mv_cfg(mv)
    lm_mac_vlan_t *mv;
{
    lm_mv_cfg_key_t key;
    lm_cfg_mv_t    cfg;
    SETUP_TCB;

if (tcb->do_cfg_wrts) {
        key.tag = MV_CFG_KEY;
        key.mac_addr = mv->mac_addr;
        key.vlan_id = mv->vlan_id;

cfg.mlid = mv->mlid;
        wdb_send_store_noack(&key, sizeof(key), &cfg, sizeof(cfg),
                WDB_VERS, WDB_PRI);
    }
} lm_crt_cfg(key, klen, cfg, clen)
    lm_cfg_key_t *key;
    int          klen;
    tUINT8       *cfg;
    int          clen;
{
    switch (key->tag) {
    case NULL_CFG_KEY:
        break;
    case GLBL_CFG_KEY:
        lm_crt_glbl_cfg(key, cfg);
        break;
``` lm_cfg.c

```
        case VLAN_CFG_KEY:
            lm_crt_vlan_cfg(key, cfg);
            break;
        case PORT_CFG_KEY:
            lm_crt_port_cfg(key, cfg);
            break;
        case MAC_CFG_KEY:
            lm_crt_mac_cfg(key, cfg);
            break;
        case VC_CFG_KEY:
            lm_crt_vc_cfg(key, cfg);
            break;
        case PV_CFG_KEY:
            lm_crt_pv_cfg(key, cfg);
            break;
        case MV_CFG_KEY:
            lm_crt_mv_cfg(key, cfg);
            break;
        default:
            break;
    }
} lm_crt_glbl_cfg(key, cfg)
    lm_glbl_cfg_key_t *key;
    lm_cfg_glbl_t *cfg;
{
    SETUP_TCB;

lm_chg_glbl_cfg(&cfg->dflt_mtu_size, &cfg->dflt_num_mcasts, NULL, NULL,
        NULL);
} lm_crt_vlan_cfg(key, cfg)
    lm_vlan_cfg_key_t *key;
    lm_cfg_vlan_t *cfg;
{
    lm_vlan_t       *vlan;
    qlink_t         *link;
    lm_mac_vlan_t   *mv;
    lm_mac_t        *mac;
    SETUP_TCB;

vlan = FIND_VLAN(tcb->vlan_q, key->vlan_id);
    if (vlan == NULL) {
        vlan = add_vlan(key->vlan_id, cfg->mtu_size, cfg->num_mcasts,
            cfg->vlan_name);
    }
    lm_chg_vlan_cfg(vlan, &cfg->dflt_mlid, &cfg->num_mcasts,
        &cfg->mtu_size, &cfg->vlan_name);
``` lm_cfg.c

```c
}
lm_crt_port_cfg(key, cfg)
    lm_port_cfg_key_t *key;
    lm_cfg_port_t *cfg;
{
    lm_port_t    *port;
    SETUP_TCB;

port = FIND_PORT(tcb->port_q, &key->port_addr);
    if (port == NULL) {
        port = add_port(&key->port_addr);
    }
} lm_crt_mac_cfg(key, cfg)
    lm_mac_cfg_key_t *key;
    lm_cfg_mac_t *cfg;
{
    lm_mac_t     *mac;
    SETUP_TCB;

mac = FIND_MAC(tcb->mac_q, &key->mac_addr);
    if (mac == NULL) {
        mac = add_mac(&key->mac_addr);
    }
} lm_crt_vc_cfg(key, cfg)
    lm_vc_cfg_key_t *key;
    lm_cfg_vc_t *cfg;
{
    SETUP_TCB;
} lm_crt_pv_cfg(key, cfg)
    lm_pv_cfg_key_t *key;
    lm_cfg_pv_t *cfg;
{
    lm_port_vlan_t  tmp;
    lm_port_t      *port;
    lm_vlan_t      *vlan;
    lm_port_vlan_t *pv;

SETUP_TCB;

tmp.vlan_id = key->vlan_id;
    tmp.port_addr = key->port_addr;
    pv = FIND_PV(tcb->pv_q, &tmp);
    if (pv == NULL) {
``` lm_cfg.c

```
        port = FIND_PORT(tcb->port_q, &key->port_addr);
        if (port == NULL) {
            port = add_port(&key->port_addr);
        }
        if (vlan == NULL) {
            vlan = add_vlan(key->vlan_id, tcb->dflt_mtu_size,
                tcb->dflt_num_mcasts);
        }
        pv = add_pv(&key->port_addr, key->vlan_id, cfg->mlid);
    }
    lm_chg_pv_cfg(pv, &cfg->mlid);
} lm_crt_mv_cfg(key, cfg)
    lm_mv_cfg_key_t *key;
    lm_cfg_mv_t     *cfg;
{
    lm_mac_vlan_t  *mv;
    lm_mac_vlan_t  tmp;
    lm_mac_t       *mac;
    lm_vlan_t      *vlan;
    SETUP_TCB;

tmp.vlan_id = key->vlan_id;
    tmp.mac_addr = key->mac_addr;
    mv = FIND_MV(tcb->mv_q, &tmp);
    if (mv == NULL) {
        mac = FIND_MAC(tcb->mac_q, &key->mac_addr);
        if (mac == NULL) {
            mac = add_mac(&key->mac_addr);
        }
        if (vlan == NULL) {
            vlan = add_vlan(key->vlan_id, tcb->dflt_mtu_size,
                tcb->dflt_num_mcasts);
        }
        mv = add_mv(&key->mac_addr, key->vlan_id, cfg->mlid);
    }
    lm_chg_mv_cfg(mv, &cfg->mlid);
}
``` lm_mgmt.c

```c
/* lm_mgmt.c
 * COPYRIGHT 1992 ADAPTIVE CORPORATION
 * ALL RIGHTS RESERVED
 */

/****************************END******************************/ ifdef CERNEL include "ipc_def.h"
include "net_def.h"
#include <global_def.h>
include <driver.h> undef lm_init else          /* ifndef CERNEL */ include <stdint.h>
include <global_def.h>
#include <ITC_if.h>
include <driver.h>
include <RT_if.h>
include <timer.h>
#include <RT_def.h>
#include <enet_if.h>
include <net_def.h> define ERRLOG printdbg
define printf printdbg endif         /* ifdef CERNEL */ include "unipdu.h"
include "nnipdus.h"
#include "altask_gl.h"
#include "sigtask_gl.h"
#include "svctask_gl.h"
#include "svc_if.h"
#include "snmp_incl.h"
#include "AAL_if.h"
#include "q.h"
#include "bits.h"
#include "lm.h"

extern lm_port_vlan_t *lm_mgmt_find_pv();
extern lm_mac_vlan_t *lm_mgmt_find_mv();
extern lm_vlan_t *lm_mgmt_find_vlan();
extern lm_port_t *lm_mgmt_find_port();
``` lm_mgmt.c

```c
extern lm_mac_t *lm_mgmt_find_mac();
extern lm_vc_t *lm_mgmt_find_vc();

extern lm_port_vlan_t *lm_mgmt_findnext_pv();
extern lm_mac_vlan_t *lm_mgmt_findnext_mv();
extern lm_vlan_t *lm_mgmt_findnext_vlan();
extern lm_port_t *lm_mgmt_findnext_port();
extern lm_mac_t *lm_mgmt_findnext_mac();
extern lm_vc_t *lm_mgmt_findnext_vc();

lm_srvc_mgmt_get(msg)
    struct AgentMsg *msg;
{
    int     ret;

ret = lm_do_mgmt_get(msg, FALSE);
    return (ret);
} lm_srvc_mgmt_getnext(msg)
    struct AgentMsg *msg;
{
    int     ret;

ret = lm_do_mgmt_get(msg, TRUE);
    return (ret);
} lm_do_mgmt_get(msg, getnext)
    struct AgentMsg *msg;
    int     getnext;
{
    int     ret;
    struct MB   *mb;
    struct MBH  *mb_hdr;
    struct AgentMsg *tx_msg;

ret = RT_SUCCESS;
    tx_msg = lm_cp_mgmt_msg(msg);
    mb = &tx_msg->Body;
    mb_hdr = &mb->head;
    mb_hdr->datoff = 0;
    switch (mb_hdr->ovcode) {
    case LM_GLBL_OVN:
        ret = lm_mgmt_get_glbl(tx_msg, getnext);
        break;
    case LM_ATTR_ENT_OVN:
        ret = lm_mgmt_get_attr_ent(tx_msg, getnext);
        break;
``` lm_mgmt.c

```
        case LM_PV_OVN:
            ret = lm_mgmt_get_pv(tx_msg, getnext);
            break;
        case LM_NODE_ENT_OVN:
            ret = lm_mgmt_get_node_ent(tx_msg, getnext);
            break;
        case LM_MAC_ENT_OVN:
            ret = lm_mgmt_get_mac_ent(tx_msg, getnext);
            break;
        case LM_MP_ENT_OVN:
            ret = lm_mgmt_get_mp_ent(tx_msg, getnext);
            break;
        case LM_PM_ENT_OVN:
            ret = lm_mgmt_get_pm_ent(tx_msg, getnext);
            break;
        case LM_VC_ENT_OVN:
            ret = lm_mgmt_get_vc_ent(tx_msg, getnext);
            break;
        default:
            ret = !RT_SUCCESS;
            mb_hdr->ercode = ER_GENERIC;
            goto err_exit;
            break;
        }
        ret = lm_send_mgmt_rsp(tx_msg);
        return (ret);

err_exit:
    lm_send_mgmt_rsp(tx_msg);
    return (ret);
} lm_mgmt_get_glbl(msg, getnext)
    struct AgentMsg *msg;
    int         getnext;
{
    int         ret;
    struct MB    *mb;
    struct MBH   *mb_hdr;
    struct OS    tmp_os;
    int         num_vlans;
    int         num_ports;
    int         num_macs;
    int         num_mvs;
    int         num_pvs;
    int         num_vcs;
    SETUP_TCB;

if (CHK_VB(LM_VB_MSGS)) {
        printf("getting globals\r\n");
``` lm_mgmt.c

```
    }
    num_vlans = QUEUE_LEN(tcb->vlan_q);
    num_ports = QUEUE_LEN(tcb->port_q);
    num_macs = QUEUE_LEN(tcb->mac_q);
    num_mvs = QUEUE_LEN(tcb->mv_q);
    num_pvs = QUEUE_LEN(tcb->pv_q);
    num_vcs = QUEUE_LEN(tcb->vc_q);
    ret = RT_SUCCESS;
    mb = &msg->Body;
    mb_hdr = &mb->head;
    tmp_os.length = sizeof(tcb->nac_atm_addr);
    bcopy(&tcb->nac_atm_addr, tmp_os.buffer, tmp_os.length);
    MB_wp_OS(mb, LM_NAC_ADDR_PIX, &tmp_os);
    tmp_os.length = sizeof(tcb->bid_bits);
    bcopy(tcb->bid_bits, tmp_os.buffer, tmp_os.length);
    MB_wp_OS(mb, LM_BID_PIX, &tmp_os);
    tmp_os.length = sizeof(tcb->mlid_bits);
    bcopy(tcb->mlid_bits, tmp_os.buffer, tmp_os.length);
    MB_wp_OS(mb, LM_MLID_BITS_PIX, &tmp_os);
    MB_wp_INT(mb, LM_DFLT_MTU_PIX, &tcb->dflt_mtu_size);
    MB_wp_INT(mb, LM_DFLT_MCAST_PIX, &tcb->dflt_num_mcasts);
    MB_wp_INT(mb, LM_NUM_VLANS_PIX, &num_vlans);
    MB_wp_INT(mb, LM_NUM_MACS_PIX, &num_macs);
    MB_wp_INT(mb, LM_NUM_PORTS_PIX, &num_ports);
    MB_wp_INT(mb, LM_NUM_MVS_PIX, &num_mvs);
    MB_wp_INT(mb, LM_NUM_PVS_PIX, &num_pvs);
    MB_wp_INT(mb, LM_NUM_VCS_PIX, &num_vcs);
    return (ret);

err_exit:
    return (ret);
} lm_mgmt_get_attr_ent(msg, getnext)
    struct AgentMsg *msg;
    int              getnext;
{
    int         ret;
    struct MB      *mb;
    struct MBH     *mb_hdr;
    struct LM_ATTR_ENT_IDX *idx;
    lm_vlan_t      *vlan;
    struct OS       tmp_os;
    struct LM_ATTR_ENT_IDX tmp_idx;
    int         num_macs;
    int         num_ports;
    SETUP_TCB;

ret = RT_SUCCESS;
``` lm_mgmt.c

```
    mb = &msg->Body;
    mb_hdr = &mb->head;
    idx = (struct LM_ATTR_ENT_IDX *) mb_hdr->iid;
    vlan = lm_mgmt_find_vlan(idx);
    if (vlan == NULL) {
        if (getnext) {
            vlan = lm_mgmt_findnext_vlan(idx);
            if (vlan == NULL) {
                ret = !RT_SUCCESS;
                mb_hdr->ercode = ER_NOSUCHNAME;
                goto err_exit;
            }
        } else {
            ret = IRT_SUCCESS;
            mb_hdr->ercode = ER_NOSUCHNAME;
            goto err_exit;
        }
    }
    if (CHK_VB(LM_VB_MSGS)) {
        printf("getting stats on vlan %d\r\n", vlan->vlan_id);
    }
    num_macs = QUEUE_LEN(vlan->mv_q);
    num_ports = QUEUE_LEN(vlan->pv_q);

lm_cvt_vlan_idx(&vlan->vlan_id, &tmp_idx);
    *idx = tmp_idx;
    lm_cvt_idx_os(tmp_idx.LM_VLAN, LM_NUM_ELEM(tmp_idx.LM_VLAN), &tmp_os);
    MB_wp_OS(mb, LM_VLAN_PIX, &tmp_os);

tmp_os.length = strlen(vlan->vlan_name);
    bcopy(vlan->vlan_name, tmp_os.buffer, tmp_os.length);
    MB_wp_OS(mb, LM_VLAN_NAME_PIX, &tmp_os);

MB_wp_INT(mb, LM_NUM_MCAST_PIX, &vlan->num_mcasts);
    MB_wp_INT(mb, LM_MTU_SIZE_PIX, &vlan->mtu_size);
    MB_wp_INT(mb, LM_MLID_PIX, &vlan->dflt_mlid);
    MB_wp_INT(mb, LM_ATTR_NUM_PORTS_PIX, &num_ports);
    MB_wp_INT(mb, LM_ATTR_NUM_MACS_PIX, &num_macs);

tmp_os.length = sizeof(vlan->mid_bits);
    bcopy(vlan->mid_bits, tmp_os.buffer, tmp_os.length);
    MB_wp_OS(mb, LM_MID_BITS_PIX, &tmp_os);

return (ret);

err_exit:
    return (ret);
} lm_mgmt_get_pv(msg, getnext)
``` lm_mgmt.c
-118-

```c
    struct AgentMsg *msg;
    int         getnext;
{
    int         ret;
    struct MB   *mb;
    struct MBH  *mb_hdr;
    struct LM_PV_IDX *idx;
    struct LM_PV_IDX tmp_idx;
    lm_port_vlan_t *pv;
    struct OS   tmp_os;
    SETUP_TCB;

ret = RT_SUCCESS;
    mb = &msg->Body;
    mb_hdr = &mb->head;
    idx = (struct LM_PV_IDX *) mb_hdr->iid;
    pv = lm_mgmt_find_pv(idx);
    if (pv == NULL) {
        if (getnext) {
            pv = lm_mgmt_findnext_pv(idx);
            if (pv == NULL) {
                ret = !RT_SUCCESS;
                mb_hdr->ercode = ER_NOSUCHNAME;
                goto err_exit;
            }
        } else {
            ret = !RT_SUCCESS;
            mb_hdr->ercode = ER_GENERIC;
            goto err_exit;
        }
    }
    if (CHK_VB(LM_VB_MSGS)) {
        printf("getting stats on pv = \r\n");
        print_pv(pv, 0);
    }
    lm_cvt_pv_idx(pv, &tmp_idx);
    *idx = tmp_idx;
    MB_wp_INT(mb, LM_PV_SHELF_PIX, &tmp_idx.LM_PV_SHELF);
    MB_wp_INT(mb, LM_PV_CARD_PIX, &tmp_idx.LM_PV_CARD);
    MB_wp_INT(mb, LM_PV_PORT_PIX, &tmp_idx.LM_PV_PORT);
    MB_wp_INT(mb, LM_PV_MLID_PIX, &pv->mlid);
    lm_cvt_idx_os(tmp_idx.LM_PV_VLAN, LM_NUM_ELEM(tmp_idx.LM_PV_VLAN),
        &tmp_os);
    MB_wp_OS(mb, LM_PV_VLAN_PIX, &tmp_os);
    return (ret);

err_exit:
    return (ret);
}
``` lm_mgmt.c

```
lm_mgmt_get_node_ent(msg, getnext)
    struct AgentMsg *msg;
    int         getnext;
{
    int         ret;
    struct MB    *mb;
    struct MBH   *mb_hdr;
    SETUP_TCB;

ret = RT_SUCCESS;
    mb = &msg->Body;
    mb_hdr = &mb->head;

print_tcb(tcb, 0);
    ret = !RT_SUCCESS;
    mb_hdr->ercode = ER_GENERIC;
    goto err_exit;

return (ret);

err_exit:
    return (ret);
} lm_mgmt_get_mac_ent(msg, getnext)
    struct AgentMsg *msg;
    int         getnext;
{
    int         ret;
    struct MB    *mb;
    struct MBH   *mb_hdr;
    struct LM_MAC_ENT_IDX *idx;
    struct LM_MAC_ENT_IDX tmp_idx;
    lm_mac_vlan_t  tmp_mv;
    lm_mac_addr_t  mac_addr;
    lm_mac_vlan_t  *mv;
    struct OS    tmp_os;
    SETUP_TCB;

ret = RT_SUCCESS;
    mb = &msg->Body;
    mb_hdr = &mb->head;
    idx = (struct LM_MAC_ENT_IDX *) mb_hdr->lid;
    mv = lm_mgmt_find_mv(idx);
    if (mv == NULL) {
        if (getnext) {
            mv = lm_mgmt_findnext_mv(idx);
            if (mv == NULL) {
                ret = !RT_SUCCESS;
``` lm_mgmt.c

```
            mb_hdr->ercode = ER_NOSUCHNAME;
            goto err_exit;
        }
    } else {
        ret = !RT_SUCCESS;
        mb_hdr->ercode = ER_GENERIC;
        goto err_exit;
    }
}
if (CHK_VB(LM_VB_MSGS)) {
    printf("getting stats on mv = ");
    print_mv(mv, 0);
}
lm_cvt_mv_idx(mv, &tmp_idx);
*idx = tmp_idx;
lm_cvt_idx_os(tmp_idx.LM_MAC_VLAN, LM_NUM_ELEM(tmp_idx.LM_MAC_VLAN),
        &tmp_os);
MB_wp_OS(mb, LM_MAC_VLAN_PIX, &tmp_os);

lm_cvt_idx_os(tmp_idx.LM_MAC_ADDR, LM_NUM_ELEM(tmp_idx.LM_MAC_ADDR),
        &tmp_os);
MB_wp_OS(mb, LM_MAC_ADDR_PIX, &tmp_os);
MB_wp_INT(mb, LM_MAC_MLID_PIX, &mv->mlid);
return (ret);

err_exit:
    return (ret);
} lm_mgmt_get_mp_ent(msg, getnext)
    struct AgentMsg *msg;
    int         getnext;
{
    int         ret;
    struct MB   *mb;
    struct MBH  *mb_hdr;
    struct LM_MP_ENT_IDX *idx;
    struct LM_MP_ENT_IDX tmp_idx;
    lm_mac_addr_t mac_addr;
    lm_mac_t    *mac;
    lm_port_t   *port;
    lm_port_addr_t port_addr;
    struct OS   tmp_os;
    int         shelf;
    int         slot;
    int         port_num;
    int         num_vlans;
    SETUP_TCB;

ret = RT_SUCCESS;
``` lm_mgmt.c

```
   mb = &msg->Body;
   mb_hdr = &mb->head;
   idx = (struct LM_MP_ENT_IDX *) mb_hdr->lid;
   mac = lm_mgmt_find_mac(idx);
   if (mac == NULL) {
      if (getnext) {
         mac = lm_mgmt_findnext_mac(idx);
         if (mac == NULL) {
            ret = !RT_SUCCESS;
            mb_hdr->ercode = ER_NOSUCHNAME;
            goto err_exit;
         }
      } else {
         ret = !RT_SUCCESS;
         mb_hdr->ercode = ER_GENERIC;
         goto err_exit;
      }
   }
   if (CHK_VB(LM_VB_MSGS)) {
      printf("getting stats on mac = %s\r\n",
            sprint_mac_addr(&mac->mac_addr));
   }
   num_vlans = QUEUE_LEN(mac->mv_q);

lm_cvt_mac_idx(&mac->mac_addr, &tmp_idx);
   *idx = tmp_idx;
   lm_cvt_idx_os(tmp_idx.LM_MP_MAC, LM_NUM_ELEM(tmp_idx.LM_MP_MAC),
         &tmp_os);
   MB_wp_OS(mb, LM_MP_MAC_PIX, &tmp_os);

LM_CLR_PORT_ADDR(&port_addr);
   if (mac->port != NULL) {
      port = mac->port;
      LM_INIT_PORT_ADDR(&port_addr, tcb->my_node,
            port->port_addr.aa_shelf + 1,
            port->port_addr.aa_slot + 1,
            port->port_addr.aa_port + 1);
   }
   shelf = port_addr.aa_shelf;
   slot = port_addr.aa_slot;
   port_num = port_addr.aa_port;

MB_wp_INT(mb, LM_MP_SHELF_PIX, &shelf);
   MB_wp_INT(mb, LM_MP_CARD_PIX, &slot);
   MB_wp_INT(mb, LM_MP_PORT_PIX, &port_num);
   MB_wp_INT(mb, LM_MP_NUM_VLANS_PIX, &num_vlans);
   tmp_os.length = sizeof(mac->mlid_bits);
   bcopy(mac->mlid_bits, tmp_os.buffer, tmp_os.length);
   MB_wp_OS(mb, LM_MP_MLID_BITS_PIX, &tmp_os);
``` lm_mgmt.c

```c
    return (ret);

err_exit:
    return (ret);
} lm_mgmt_get_vc_ent(msg, getnext)
    struct AgentMsg *msg;
    int         getnext;
{
    int         ret;
    struct MB   *mb;
    struct MBH  *mb_hdr;
    struct LM_VC_ENT_IDX *idx;
    struct LM_VC_ENT_IDX tmp_idx;
    lm_vc_addr_t  vc_addr;
    lm_vc_t     *vc;
    struct OS   tmp_os;
    SETUP_TCB;

ret = RT_SUCCESS;
    mb = &msg->Body;
    mb_hdr = &mb->head;
    idx = (struct LM_VC_ENT_IDX *) mb_hdr->lid;
    vc = lm_mgmt_find_vc(idx);
    if (vc == NULL) {
        if (getnext) {
            vc = lm_mgmt_findnext_vc(idx);
            if (vc == NULL) {
                ret = !RT_SUCCESS;
                mb_hdr->ercode = ER_NOSUCHNAME;
                goto err_exit;
            }
        } else {
            ret = !RT_SUCCESS;
            mb_hdr->ercode = ER_GENERIC;
            goto err_exit;
        }
    }
    if (CHK_VB(LM_VB_MSGS)) {
        printf("getting stats on vc = %s\r\n",
            sprint_vc_addr(&vc->vc_addr));
    }
    lm_cvt_vc_idx(&vc->vc_addr, &tmp_idx);
    *idx = tmp_idx;
    lm_cvt_idx_os(tmp_idx.LM_VC_VLAN, LM_NUM_ELEM(tmp_idx.LM_VC_VLAN),
            &tmp_os);
    MB_wp_OS(mb, LM_VC_VLAN_PIX, &tmp_os);

lm_cvt_idx_os(tmp_idx.LM_VC_MAC, LM_NUM_ELEM(tmp_idx.LM_VC_MAC),
``` lm_mgmt.c

```
            &tmp_os);
       MB_wp_OS(mb, LM_VC_MAC_PIX, &tmp_os);

MB_wp_INT(mb, LM_VC_REF_CNT_PIX, &vc->ref_cnt);
       MB_wp_INT(mb, LM_VC_BID_PIX, &vc->bid);
       return (ret);

err_exit:
       return (ret);
} lm_mgmt_get_pm_ent(msg, getnext)
    struct AgentMsg *msg;
    int         getnext;
{
    int         ret;
    struct MB       *mb;
    struct MBH      *mb_hdr;
    struct LM_PM_ENT_IDX *idx;
    struct LM_PM_ENT_IDX tmp_idx;
    lm_mac_addr_t  mac_addr;
    lm_mac_t    *mac;
    lm_port_t   *port;
    lm_port_addr_t port_addr;
    struct OS       tmp_os;
    int         shelf;
    int         slot;
    int         port_num;
    int         num_vlans;
    SETUP_TCB;

ret = RT_SUCCESS;
    mb = &msg->Body;
    mb_hdr = &mb->head;
    idx = (struct LM_PM_ENT_IDX *) mb_hdr->iid;
    port = lm_mgmt_find_port(idx);
    if (port == NULL) {
       if (getnext) {
           port = lm_mgmt_findnext_port(idx);
           if (port == NULL) {
              ret = !RT_SUCCESS;
              mb_hdr->ercode = ER_NOSUCHNAME;
              goto err_exit;
           }
       } else {
           ret = !RT_SUCCESS;
           mb_hdr->ercode = ER_GENERIC;
           goto err_exit;
       }
    }
``` lm_mgmt.c

```
        num_vlans = QUEUE_LEN(port->pv_q);

if (CHK_VB(LM_VB_MSGS)) {
        printf("getting stats on port %s\r\n",
            sprint_port_addr(&port->port_addr));
    }
    lm_cvt_port_idx(&port->port_addr, &tmp_idx);
    *idx = tmp_idx;
    port_addr = port->port_addr;
    LM_CLR_MAC_ADDR(&mac_addr);
    if (port->mac != NULL) {
        mac = port->mac;
        mac_addr = mac->mac_addr;
    }
    shelf = port_addr.aa_shelf + 1;
    slot = port_addr.aa_slot + 1;
    port_num = port_addr.aa_port + 1;
    MB_wp_INT(mb, LM_PM_SHELF_PIX, &shelf);
    MB_wp_INT(mb, LM_PM_CARD_PIX, &slot);
    MB_wp_INT(mb, LM_PM_PORT_PIX, &port_num);
    MB_wp_INT(mb, LM_PM_NUM_VLANS_PIX, &num_vlans);
    tmp_os.length = sizeof(mac_addr) - 2;
    bcopy((char *) &mac_addr + 2, tmp_os.buffer, tmp_os.length);
    MB_wp_OS(mb, LM_PM_MAC_PIX, &tmp_os);
    tmp_os.length = sizeof(port->mlid_bits);
    bcopy(port->mlid_bits, tmp_os.buffer, tmp_os.length);
    MB_wp_OS(mb, LM_PM_MLID_BITS_PIX, &tmp_os);
    return (ret);

err_exit:
    return (ret);
} lm_srvc_mgmt_validate(msg)
    struct AgentMsg *msg;
{
    int         ret;
    struct MB       *mb;
    struct MBH      *mb_hdr;
    struct AgentMsg *tx_msg;

ret = RT_SUCCESS;
    tx_msg = lm_cp_mgmt_msg(msg);
    mb = &tx_msg->Body;
    mb_hdr = &mb->head;
    switch (mb_hdr->ovcode) {
    case LM_GLBL_OVN:
        ret = lm_mgmt_val_glbl(tx_msg);
        break;
    case LM_ATTR_ENT_OVN:
```

```
        ret = lm_mgmt_val_attr_ent(tx_msg);
        break;
    case LM_PV_OVN:
        ret = lm_mgmt_val_pv(tx_msg);
        break;
    case LM_NODE_ENT_OVN:
        ret = lm_mgmt_val_node_ent(tx_msg);
        break;
    case LM_MAC_ENT_OVN:
        ret = lm_mgmt_val_mac_ent(tx_msg);
        break;
    case LM_MP_ENT_OVN:
        ret = lm_mgmt_val_mp_ent(tx_msg);
        break;
    case LM_PM_ENT_OVN:
        ret = lm_mgmt_val_pm_ent(tx_msg);
        break;
    case LM_VC_ENT_OVN:
        ret = lm_mgmt_val_vc_ent(tx_msg);
        break;
    default:
        ret = !RT_SUCCESS;
        mb_hdr->ercode = ER_GENERIC;
        goto err_exit;
        break;
    }
    ret = lm_send_mgmt_rsp(tx_msg);
    return (ret);

err_exit:
    lm_send_mgmt_rsp(tx_msg);
    return (ret);
} lm_mgmt_val_attr_ent(msg)
    struct AgentMsg *msg;
{
    int         ret;
    struct MB   *mb;
    struct MBH  *mb_hdr;
    struct LM_ATTR_ENT_IDX *idx;
    lm_vlan_t   *vlan;
    lm_vlan_id_t vlan_id;
    tUINT32     mtu_size;
    tUINT32     num_mcasts;
    tUINT8      got_mtu_size;
    tUINT8      got_num_mcasts;
    SETUP_TCB;

ret = RT_SUCCESS;
``` lm_mgmt.c

```c
        mb = &msg->Body;
        mb_hdr = &mb->head;
        mtu_size = num_mcasts = -1;
        idx = (struct LM_ATTR_ENT_IDX *) mb_hdr->iid;
        vlan = lm_mgmt_find_vlan(idx);
        if (vlan == NULL) {
        } else {
            got_num_mcasts = MB_dop(mb, LM_NUM_MCAST_PIX);
            got_mtu_size = MB_dop(mb, LM_MTU_SIZE_PIX);
            num_mcasts = got_num_mcasts ?
                MB_cp_INT(mb, LM_NUM_MCAST_PIX, &num_mcasts) : -1;
            mtu_size = got_mtu_size ?
                MB_cp_INT(mb, LM_MTU_SIZE_PIX, &mtu_size) : -1;

}
        return (ret);

err_exit:
        return (ret);
} lm_mgmt_val_pv(msg)
    struct AgentMsg *msg;
{
    int         ret;
    struct MB   *mb;
    struct MBH  *mb_hdr;
    struct LM_PV_IDX *idx;
    lm_port_vlan_t *pv;
    SETUP_TCB;

ret = RT_SUCCESS;
    mb = &msg->Body;
    mb_hdr = &mb->head;
    idx = (struct LM_PV_IDX *) mb_hdr->iid;
    pv = lm_mgmt_find_pv(idx);

if (pv == NULL) {
    }
    return (ret);

err_exit:
        return (ret);
} lm_mgmt_val_node_ent(msg)
    struct AgentMsg *msg;
{
    int         ret;
    struct MB   *mb;
``` lm_mgmt.c

```
    struct MBH    *mb_hdr;
    SETUP_TCB;

ret = RT_SUCCESS;
    mb = &msg->Body;
    mb_hdr = &mb->head;

ret = !RT_SUCCESS;
    mb_hdr->ercode = ER_GENERIC;
    goto err_exit;

return (ret);

err_exit:
    return (ret);
} lm_mgmt_val_mac_ent(msg)
    struct AgentMsg *msg;
{
    int         ret;
    struct MB       *mb;
    struct MBH      *mb_hdr;
    lm_mac_vlan_t   *mv;
    SETUP_TCB;

ret = RT_SUCCESS;
    mb = &msg->Body;
    mb_hdr = &mb->head;

return (ret);

err_exit:
    return (ret);
} lm_mgmt_val_glbl(msg)
    struct AgentMsg *msg;
{
    int         ret;
    SETUP_TCB;

ret = RT_SUCCESS;
    return (ret);
} lm_mgmt_val_mp_ent(msg)
    struct AgentMsg *msg;
{
    int         ret;
``` lm_mgmt.c

```c
    struct MB      *mb;
    struct MBH     *mb_hdr;
    struct LM_MP_ENT_IDX *idx;
    struct LM_MP_ENT_IDX tmp_idx;
    lm_mac_addr_t  mac_addr;
    lm_mac_t       *mac;
    lm_port_t      *port;
    lm_port_addr_t port_addr;
    struct OS      tmp_os;
    int            shelf;
    int            slot;
    int            port_num;
    SETUP_TCB;

ret = RT_SUCCESS;
    mb = &msg->Body;
    mb_hdr = &mb->head;
    idx = (struct LM_MP_ENT_IDX *) mb_hdr->lid;
    mac = lm_mgmt_find_mac(idx);
    if (mac == NULL) {
    } else {
    }
    return (ret);

err_exit:
    return (ret);
} lm_mgmt_val_pm_ent(msg)
    struct AgentMsg *msg;
{
    int            ret;
    struct MB      *mb;
    struct MBH     *mb_hdr;
    struct LM_PM_ENT_IDX *idx;
    struct LM_PM_ENT_IDX tmp_idx;
    lm_mac_addr_t  mac_addr;
    lm_mac_t       *mac;
    lm_port_t      *port;
    lm_port_addr_t port_addr;
    struct OS      tmp_os;
    int            shelf;
    int            slot;
    int            port_num;
    SETUP_TCB;

ret = RT_SUCCESS;
    mb = &msg->Body;
    mb_hdr = &mb->head;
``` lm_mgmt.c

```
    idx = (struct LM_PM_ENT_IDX *) mb_hdr->iid;
    port = lm_mgmt_find_port(idx);
    if (port == NULL) {
    } else {
    }
    return (ret);

err_exit:
    return (ret);
} lm_mgmt_val_vc_ent(msg)
    struct AgentMsg *msg;
{
    int         ret;
    struct MB       *mb;
    struct MBH      *mb_hdr;
    struct LM_VC_ENT_IDX *idx;
    struct LM_VC_ENT_IDX tmp_idx;
    lm_vc_addr_t    vc_addr;
    lm_vc_t         *vc;
    struct OS       tmp_os;
    SETUP_TCB;

ret = RT_SUCCESS;
    mb = &msg->Body;
    mb_hdr = &mb->head;
    idx = (struct LM_VC_ENT_IDX *) mb_hdr->iid;
    vc = lm_mgmt_find_vc(idx);
    if (vc == NULL) {
    } else {
    }
    return (ret);

err_exit:
    return (ret);
} lm_srvc_mgmt_commit(msg)
    struct AgentMsg *msg;
{
    int         ret;
    struct MB       *mb;
    struct MBH      *mb_hdr;
    struct AgentMsg *tx_msg;

ret = RT_SUCCESS;
    tx_msg = lm_cp_mgmt_msg(msg);
    mb = &tx_msg->Body;
    mb_hdr = &mb->head;
``` lm_mgmt.c

```c
        switch (mb_hdr->ovcode) {
        case LM_GLBL_OVN:
            ret = lm_mgmt_cmt_glbl(tx_msg);
            break;
        case LM_ATTR_ENT_OVN:
            ret = lm_mgmt_cmt_attr_ent(tx_msg);
            break;
            break;
        case LM_PV_OVN:
            ret = lm_mgmt_cmt_pv(tx_msg);
            break;
        case LM_NODE_ENT_OVN:
            ret = lm_mgmt_cmt_node_ent(tx_msg);
            break;
        case LM_MAC_ENT_OVN:
            ret = lm_mgmt_cmt_mac_ent(tx_msg);
            break;
        case LM_MP_ENT_OVN:
            ret = lm_mgmt_cmt_mp_ent(tx_msg);
            break;
        case LM_PM_ENT_OVN:
            ret = lm_mgmt_cmt_pm_ent(tx_msg);
            break;
        case LM_VC_ENT_OVN:
            ret = lm_mgmt_cmt_vc_ent(tx_msg);
            break;
        default:
            ret = IRT_SUCCESS;
            mb_hdr->ercode = ER_GENERIC;
            goto err_exit;
            break;
        }
        ret = lm_send_mgmt_rsp(tx_msg);
        return (ret);

err_exit:
        lm_send_mgmt_rsp(tx_msg);
        return (ret);
} lm_mgmt_cmt_glbl(msg)
    struct AgentMsg *msg;
{
    int         ret;
    int         i;
    struct MB   *mb;
    struct MBH  *mb_hdr;
    struct OS   tmp_os;
    tUINT32     *dflt_mtu_size;
    tUINT32     *dflt_num_mcasts;
``` lm_mgmt.c
-131-

```
tATMADDR    *nac_addr;
bits_t      *bid_bits;
bits_t      *mlid_bits;
tUINT32     dflt_mtu_size_a;
tUINT32     dflt_num_mcasts_a;
tATMADDR    nac_addr_a;
bits_t      bid_bits_a[SIZE_BID_BITS];
bits_t      mlid_bits_a[SIZE_MLID_BITS];
SETUP_TCB;

ret = RT_SUCCESS;
mb = &msg->Body;
mb_hdr = &mb->head;
dflt_mtu_size = dflt_num_mcasts = nac_addr =
    bid_bits = mlid_bits = NULL;
if (MB_dop(mb, LM_NAC_ADDR_PIX)) {
    MB_cp_OS(mb, LM_NAC_ADDR_PIX, &tmp_os);
    if (tmp_os.length != sizeof(nac_addr_a)) {
        ret = !RT_SUCCESS;
        mb_hdr->ercode = ER_GENERIC;
        goto err_exit;
    }
    bcopy(tmp_os.buffer, &nac_addr_a, sizeof(nac_addr_a));
    nac_addr = &nac_addr_a;
}
if (MB_dop(mb, LM_BID_PIX)) {
    bzero(bid_bits_a, sizeof(bid_bits_a));
    MB_cp_OS(mb, LM_BID_PIX, &tmp_os);
    if (tmp_os.length > sizeof(bid_bits_a)) {
        ret = !RT_SUCCESS;
        mb_hdr->ercode = ER_GENERIC;
        goto err_exit;
    }
    bcopy(tmp_os.buffer, bid_bits_a, tmp_os.length);
    bid_bits = &bid_bits_a;
}
if (MB_dop(mb, LM_DFLT_MTU_PIX)) {
    MB_cp_INT(mb, LM_DFLT_MTU_PIX, &dflt_mtu_size_a);
    dflt_mtu_size = &dflt_mtu_size_a;
}
if (MB_dop(mb, LM_DFLT_MCAST_PIX)) {
    MB_cp_INT(mb, LM_DFLT_MCAST_PIX, &dflt_num_mcasts_a);
    dflt_num_mcasts = &dflt_num_mcasts_a;
}
if (MB_dop(mb, LM_MLID_BITS_PIX)) {
    bzero(mlid_bits_a, sizeof(mlid_bits_a));
    MB_cp_OS(mb, LM_MLID_BITS_PIX, &tmp_os);
    if (tmp_os.length > sizeof(mlid_bits_a)) {
        ret = !RT_SUCCESS;
        mb_hdr->ercode = ER_GENERIC;
``` lm_mgmt.c

```
            goto err_exit;
        }
        bcopy(tmp_os.buffer, mlid_bits_a, tmp_os.length);
        mlid_bits = &mlid_bits_a;
    }
    lm_chg_glbl_cfg(dflt_mtu_size, dflt_num_mcasts, nac_addr, bid_bits,
            mlid_bits);
    return (ret);

err_exit:
    return (ret);
} lm_mgmt_cmt_attr_ent(msg)
    struct AgentMsg *msg;
{
    int         ret;
    int         tmp_ret;
    int         a_r;
    struct MB   *mb;
    struct MBH  *mb_hdr;
    struct LM_ATTR_ENT_IDX *idx;
    qlink_t     *link;
    lm_mac_t    *mac;
    lm_mac_vlan_t *mv;
    lm_vlan_t   *vlan;
    lm_vlan_id_t vlan_id;
    tUINT32     *mtu_size;
    tUINT32     *num_mcasts;
    tUINT32     *dflt_mlid;
    char        *vlan_name;
    tUINT32     mtu_size_a;
    tUINT32     num_mcasts_a;
    tUINT32     dflt_mlid_a;
    char        vlan_name_a[LM_MAX_VLAN_NAME];
    int         vlan_name_len;
    struct OS   tmp_os;
    int         chngd;
    SETUP_TCB;

ret = RT_SUCCESS;
    chngd = FALSE;
    mb = &msg->Body;
    mb_hdr = &mb->head;

a_r = MB_cmp_ix(mb, LM_VLAN_PIX, LM_VLAN_IXO, LM_VLAN_IXL);

dflt_mlid = num_mcasts = mtu_size = vlan_name = NULL;

num_mcasts_a = tcb->dflt_num_mcasts;
``` lm_mgmt.c

```c
    mtu_size_a = tcb->dflt_mtu_size;
    dflt_mlid_a = LM_MAX_MLID;
    tmp_os.length = 3;
    bcopy("bob", tmp_os.buffer, tmp_os.length);
    if (MB_dop(mb, LM_MLID_PIX)) {
        MB_cp_INT(mb, LM_MLID_PIX, &dflt_mlid_a);
        dflt_mlid = &dflt_mlid_a;
    }
    if (MB_dop(mb, LM_NUM_MCAST_PIX)) {
        MB_cp_INT(mb, LM_NUM_MCAST_PIX, &num_mcasts_a);
        num_mcasts = &num_mcasts_a;
    }
    if (MB_dop(mb, LM_MTU_SIZE_PIX)) {
        MB_cp_INT(mb, LM_MTU_SIZE_PIX, &mtu_size_a);
        mtu_size = &mtu_size_a;
    }
    if (MB_dop(mb, LM_VLAN_NAME_PIX)) {
        MB_cp_OS(mb, LM_VLAN_NAME_PIX, &tmp_os);
        if (tmp_os.length > sizeof(vlan_name_a) - 1) {
            tmp_os.length = sizeof(vlan_name_a) - 1;
        }
        vlan_name = &vlan_name_a;
    }
    bcopy(tmp_os.buffer, vlan_name_a, tmp_os.length);
    vlan_name_a[tmp_os.length] = 0;

idx = (struct LM_ATTR_ENT_IDX *) mb_hdr->iid;
    vlan = lm_mgmt_find_vlan(idx);
    if (vlan == NULL && a_r == MB_IXP_CREATE) {
        lm_cvt_idx_vlan(idx->LM_VLAN, &vlan_id);
        vlan = add_vlan(vlan_id, mtu_size_a, num_mcasts_a,
            vlan_name_a);
    } else if (vlan != NULL && a_r == MB_IXP_DELETE) {
        vlan_id = vlan->vlan_id;
        free_vlan(vlan);
        vlan = NULL;
    }
    if (vlan != NULL) {
        lm_chg_vlan_cfg(vlan, dflt_mlid, num_mcasts, mtu_size,
            vlan_name);
    }
    if (vlan != NULL) {
        print_vlan(vlan, 0);
    } else
        printf("tried to add vlan %d, a_r = %d\r\n", vlan_id, a_r);
    return (ret);

err_exit:
    return (ret);
}
``` lm_mgmt.c
-134-

```
lm_mgmt_cmt_pv(msg)
    struct AgentMsg *msg;
{
    int         ret;
    int         a_r;
    struct MB   *mb;
    struct MBH  *mb_hdr;
    struct LM_PV_IDX *idx;
    lm_port_t   *port;
    lm_vlan_t   *vlan;
    lm_port_addr_t port_addr;
    lm_vlan_id_t  vlan_id;
    tUINT32     *mlid;
    tUINT32     mlid_a;
    lm_port_vlan_t *pv;
    SETUP_TCB;

ret = RT_SUCCESS;
    mb = &msg->Body;
    mb_hdr = &mb->head;
    mlid = NULL;
    a_r = MB_cmp_ix(mb, LM_PV_VLAN_PIX, LM_PV_VLAN_IXO, LM_PV_VLAN_IXL);
    idx = (struct LM_PV_IDX *) mb_hdr->iid;
    pv = lm_mgmt_find_pv(idx);
    if (pv == NULL && a_r == MB_IXP_CREATE) {
        lm_cvt_idx_port(&idx->LM_PV_SHELF, &port_addr);
        lm_cvt_idx_vlan(&idx->LM_PV_VLAN, &vlan_id);
        port = FIND_PORT(tcb->port_q, &port_addr);
        vlan = FIND_VLAN(tcb->vlan_q, vlan_id);
        if (port == NULL) {
            port = add_port(&port_addr);
        }
        if (vlan == NULL) {
            vlan = add_vlan(vlan_id, tcb->dflt_mtu_size,
                tcb->dflt_num_mcasts);
        }
        pv = add_pv(&port_addr, vlan_id, vlan->dflt_mlid);
        if (pv == NULL) {
            ret = !RT_SUCCESS;
            mb_hdr->ercode = ER_GENERIC;
            goto err_exit;
        }
    } else if (pv != NULL && a_r == MB_IXP_DELETE) {
        free_pv(pv);
        pv = NULL;
    }
    if (pv != NULL) {
        if (MB_dop(mb, LM_PV_MLID_PIX)) {
            MB_cp_INT(mb, LM_PV_MLID_PIX, &mlid_a);
``` lm_mgmt.c
-135-

```c
        mlid = &mlid_a;
    }
} else {
    ret = !RT_SUCCESS;
    mb_hdr->ercode = ER_GENERIC;
    goto err_exit;
}
if (pv != NULL) {
    lm_chg_pv_cfg(pv, mlid);
}
return (ret);

err_exit:
    return (ret);
} lm_mgmt_cmt_node_ent(msg)
    struct AgentMsg *msg;
{
    int         ret;
    struct MB    *mb;
    struct MBH   *mb_hdr;
    SETUP_TCB;

ret = RT_SUCCESS;
    mb = &msg->Body;
    mb_hdr = &mb->head;

ret = !RT_SUCCESS;
    mb_hdr->ercode = ER_GENERIC;
    goto err_exit;

return (ret);

err_exit:
    return (ret);
} lm_mgmt_cmt_mac_ent(msg)
    struct AgentMsg *msg;
{
    int         ret;
    int         a_r;    /* add/remove flag */
    struct LM_MAC_ENT_IDX tmp_idx;
    struct MB    *mb;
    struct MBH   *mb_hdr;
    struct LM_MAC_ENT_IDX *idx;
    lm_mac_addr_t  mac_addr;
    lm_vlan_id_t   vlan_id;
    tUINT32        *mlid;
``` lm_mgmt.c

```c
tUINT32     mlid_a;
lm_mac_vlan_t *mv;
lm_mac_t    *mac;
lm_port_t   *port;
lm_vlan_t   *vlan;
SETUP_TCB;

ret = RT_SUCCESS;
mb = &msg->Body;
mb_hdr = &mb->head;
mac = NULL;
mlid = NULL;
idx = (struct LM_MAC_ENT_IDX *) mb_hdr->iid;
a_r = MB_cmp_ix(mb, LM_MAC_VLAN_PIX, LM_MAC_VLAN_IXO, LM_MAC_VLAN_IXL);

mv = lm_mgmt_find_mv(idx);
if (mv == NULL && a_r == MB_IXP_CREATE) {
   lm_cvt_idx_mac(&idx->LM_MAC_ADDR, &mac_addr);
   lm_cvt_idx_vlan(&idx->LM_MAC_VLAN, &vlan_id);
   mac = FIND_MAC(tcb->mac_q, &mac_addr);
   vlan = FIND_VLAN(tcb->vlan_q, vlan_id);
   if (mac == NULL) {
      mac = add_mac(&mac_addr);
   }
   if (vlan == NULL) {
      vlan = add_vlan(vlan_id, tcb->dflt_mtu_size,
            tcb->dflt_num_mcasts);
   }
   mv = add_mv(&mac_addr, vlan_id, LM_MAX_MID, vlan->dflt_mlid);
} else if (mv != NULL && a_r == MB_IXP_DELETE) {
   mac = mv->mac;
   free_mv(mv);
   mv = NULL;
}
if (mv != NULL) {
   mac = mv->mac;
   if (MB_dop(mb, LM_MAC_MLID_PIX)) {
      if (mac == NULL) {
         ret = !RT_SUCCESS;
         mb_hdr->ercode = ER_GENERIC;
         goto err_exit;
      }
      MB_cp_INT(mb, LM_MAC_MLID_PIX, &mlid_a);
      mlid = &mlid_a;
   }
} else {
   ret = !RT_SUCCESS;
   mb_hdr->ercode = ER_GENERIC;
   goto err_exit;
}
``` lm_mgmt.c

```c
        if (mv != NULL) {
            lm_chg_mv_cfg(mv, mlid);
        }
        return (ret);

err_exit:
        return (ret);
} lm_mgmt_cmt_vc_ent(msg)
    struct AgentMsg *msg;
{
    int             ret;
    struct MB       *mb;
    struct MBH      *mb_hdr;
    struct LM_VC_ENT_IDX *idx;
    struct LM_VC_ENT_IDX tmp_idx;
    lm_vc_addr_t    vc_addr;
    lm_vc_t         *vc;
    lm_bid_t        *bid;
    tUINT32         *ref_cnt;
    lm_bid_t        bid_a;
    tUINT32         ref_cnt_a;
    struct OS       tmp_os;
    SETUP_TCB;

ret = RT_SUCCESS;
    mb = &msg->Body;
    mb_hdr = &mb->head;
    bid = ref_cnt = NULL;
    idx = (struct LM_VC_ENT_IDX *) mb_hdr->iid;
    vc = lm_mgmt_find_vc(idx);
    if (vc == NULL) {
        ret = !RT_SUCCESS;
        mb_hdr->ercode = ER_GENERIC;
        goto err_exit;
    }
    lm_cvt_vc_idx(&vc->vc_addr, &tmp_idx);
    *idx = tmp_idx;
    lm_cvt_idx_os(tmp_idx.LM_VC_VLAN, LM_NUM_ELEM(tmp_idx.LM_VC_VLAN),
            &tmp_os);
    if (MB_dop(mb, LM_VC_REF_CNT_PIX)) {
        MB_cp_INT(mb, LM_VC_REF_CNT_PIX, &ref_cnt_a);
        ref_cnt = &ref_cnt_a;
    }
    if (MB_dop(mb, LM_VC_BID_PIX)) {
        MB_cp_INT(mb, LM_VC_BID_PIX, &bid_a);
        bid = &bid_a;
    }
    lm_chg_vc_cfg(vc, bid, ref_cnt);
``` lm_mgmt.c

```
        return (ret);

err_exit:
        return (ret);
} lm_mgmt_cmt_pm_ent(msg)
    struct AgentMsg *msg;
{
    int             ret;
    struct MB       *mb;
    struct MBH      *mb_hdr;
    struct LM_PM_ENT_IDX *idx;
    struct LM_PM_ENT_IDX tmp_idx;
    lm_mac_addr_t   mac_addr_a;
    lm_mac_addr_t   *mac_addr;
    bits_t          *mlid_bits;
    bits_t          mlid_bits_a[SIZE_MLID_BITS];
    lm_port_t       *port;
    lm_port_addr_t  port_addr;
    struct OS       tmp_os;
    SETUP_TCB;

ret = RT_SUCCESS;
    mb = &msg->Body;
    mb_hdr = &mb->head;
    mac_addr = mlid_bits = NULL;
    idx = (struct LM_PM_ENT_IDX *) mb_hdr->iid;
    port = lm_mgmt_find_port(idx);
    if (port == NULL) {
        ret = !RT_SUCCESS;
        mb_hdr->ercode = ER_GENERIC;
        goto err_exit;
    }
    if (MB_dop(mb, LM_PM_MAC_PIX)) {
        LM_CLR_MAC_ADDR(&mac_addr_a);
        MB_cp_OS(mb, LM_PM_MAC_PIX, &tmp_os);
        bcopy(tmp_os.buffer, (char *) &mac_addr_a + 2, tmp_os.length);
        mac_addr = &mac_addr_a;
    }
    if (MB_dop(mb, LM_PM_MLID_BITS_PIX)) {
        MB_cp_OS(mb, LM_PM_MLID_BITS_PIX, &tmp_os);
        bcopy(tmp_os.buffer, mlid_bits_a, tmp_os.length);
        mlid_bits = &mlid_bits_a;
    }
    if (port != NULL) {
        lm_chg_port_cfg(port, mac_addr, mlid_bits);
    }
    return (ret);
``` lm_mgmt.c

```c
err_exit:
    return (ret);
} lm_mgmt_cmt_mp_ent(msg)
    struct AgentMsg *msg;
{
    int         ret;
    int         a_r;    /* add/remove flag */
    struct MB   *mb;
    struct MBH  *mb_hdr;
    struct LM_MP_ENT_IDX *idx;
    struct LM_MP_ENT_IDX tmp_idx;
    lm_mac_addr_t mac_addr;
    lm_mac_t    *mac;
    lm_port_t   *port;
    bits_t      *mlid_bits;
    bits_t      mlid_bits_a[SIZE_MLID_BITS];
    lm_port_addr_t port_addr;
    struct OS   tmp_os;
    int         shelf;
    int         slot;
    int         port_num;
    SETUP_TCB;

ret = RT_SUCCESS;
    mb = &msg->Body;
    mb_hdr = &mb->head;
    mlid_bits = NULL;
    idx = (struct LM_MP_ENT_IDX *) mb_hdr->iid;
    a_r = MB_cmp_ix(mb, LM_MP_MAC_PIX, LM_MP_MAC_IXO, LM_MP_MAC_IXL);
    mac = lm_mgmt_find_mac(idx);
    if (mac == NULL && a_r == MB_IXP_CREATE) {
        lm_cvt_idx_mac(&idx->LM_MP_MAC, &mac_addr);
        mac = add_mac(&mac_addr);
        if (mac == NULL) {
            ret = !RT_SUCCESS;
            mb_hdr->ercode = ER_GENERIC;
            goto err_exit;
        }
    }
    if (mac != NULL && a_r == MB_IXP_DELETE) {
        free_mac(mac);
        mac = NULL;
    }
    if (mac != NULL) {
        if (MB_dop(mb, LM_MP_MLID_BITS_PIX)) {
            MB_cp_OS(mb, LM_MP_MLID_BITS_PIX, &tmp_os);
            bcopy(tmp_os.buffer, mlid_bits_a, tmp_os.length);
            mlid_bits = &mlid_bits_a;
``` lm_mgmt.c

```
        }
    }
    if (mac != NULL) {
        lm_chg_mac_cfg(mac, mlid_bits);
    }
    return (ret);

err_exit:
    return (ret);
} struct AgentMsg *
lm_cp_mgmt_msg(msg)
    struct AgentMsg *msg;
{
    struct AgentMsg *ret;
    int          msg_len;

msg_len = msg->Hdr.Length + ITSZ;
    ret = (struct AgentMsg *) ReqMsgMemZero(msg_len);
    if (ret == NULL)
        goto err_exit;

bcopy(msg, ret, msg_len);
    return (ret);

err_exit:
    Crash(993, 0, 0);
} lm_vc_t    *
lm_mgmt_find_vc(idx)
    struct LM_PV_IDX *idx;
{
    lm_vc_addr_t   tmp_vc;
    lm_vlan_t     *vlan;
    lm_vc_t       *ret;
    SETUP_TCB;

ret = NULL;
    lm_cvt_idx_vc(idx, &tmp_vc);
    vlan = FIND_VLAN(tcb->vlan_q, tmp_vc.vlan_id);
    if (vlan != NULL) {
        ret = FIND_VC(vlan->vc_q, &tmp_vc);
    }
    return (ret);
} lm_port_vlan_t *
``` lm_mgmt.c

```c
lm_mgmt_find_pv(idx)
    struct LM_PV_IDX *idx;
{
    lm_port_vlan_t  tmp_pv;
    lm_port_vlan_t *ret;
    SETUP_TCB;

lm_cvt_idx_pv(idx, &tmp_pv);
    ret = FIND_PV(tcb->pv_q, &tmp_pv);
    return (ret);
} lm_mac_vlan_t *
lm_mgmt_find_mv(idx)
    struct LM_MAC_ENT_IDX *idx;
{
    lm_mac_vlan_t *ret;
    lm_mac_vlan_t  tmp_mv;
    lm_mac_vlan_t *mv;
    SETUP_TCB;

lm_cvt_idx_mv(idx, &tmp_mv);
    ret = FIND_MV(tcb->mv_q, &tmp_mv);
    return (ret);
} lm_mac_t   *
lm_mgmt_find_mac(idx)
    struct LM_MP_ENT_IDX *idx;
{
    lm_mac_t     *ret;
    lm_mac_addr_t mac_addr;
    SETUP_TCB;

lm_cvt_idx_mac(idx->LM_MP_MAC, &mac_addr);
    ret = FIND_MAC(tcb->mac_q, &mac_addr);
    return (ret);
} lm_port_t   *
lm_mgmt_find_port(idx)
    struct LM_PM_ENT_IDX *idx;
{
    lm_port_t    *ret;
    lm_port_addr_t port_addr;
    SETUP_TCB;

lm_cvt_idx_port(&idx->LM_PM_SHELF, &port_addr);
    ret = FIND_PORT(tcb->port_q, &port_addr);
    return (ret);
``` lm_mgmt.c

```c
}
lm_vlan_t   *
lm_mgmt_find_vlan(idx)
    struct LM_ATTR_ENT_IDX *idx;
{
    lm_vlan_t   *ret;
    lm_vlan_id_t  vlan_id;
    int       i;
    SETUP_TCB;

lm_cvt_idx_vlan(idx->LM_VLAN, &vlan_id);
    ret = FIND_VLAN(tcb->vlan_q, vlan_id);
    return (ret);
} lm_vc_t   *
lm_mgmt_findnext_vc(idx)
    struct LM_VC_ENT_IDX *idx;
{
    lm_vc_addr_t  tmp_vc;
    lm_vc_t    *ret;
    lm_vlan_t   *vlan;
    SETUP_TCB;

ret = NULL;
    lm_cvt_idx_vc(idx, &tmp_vc);
    vlan = FIND_VLAN(tcb->vlan_q, tmp_vc.vlan_id);
    if (vlan != NULL) {
        ret = FINDNEXT_VC(vlan->vc_q, &tmp_vc);
    }
    if (ret == NULL) {
        vlan = FINDNEXT_VLAN(tcb->vlan_q, tmp_vc.vlan_id);
        if (vlan != NULL) {
            ret = FINDNEXT_VC(vlan->vc_q, &tmp_vc);
        }
    }
    return (ret);
} lm_port_vlan_t *
lm_mgmt_findnext_pv(idx)
    struct LM_PV_IDX *idx;
{
    lm_port_vlan_t tmp_pv;
    lm_port_vlan_t *ret;
    SETUP_TCB;

lm_cvt_idx_pv(idx, &tmp_pv);
    ret = FINDNEXT_PV(tcb->pv_q, &tmp_pv);
``` lm_mgmt.c

```c
    return (ret);
} lm_mac_vlan_t *
lm_mgmt_findnext_mv(idx)
    struct LM_MAC_ENT_IDX *idx;
{
    lm_mac_vlan_t *ret;
    lm_mac_vlan_t tmp_mv;
    lm_mac_addr_t mac_addr;
    lm_mac_vlan_t *mv;
    SETUP_TCB;

lm_cvt_idx_mv(idx, &tmp_mv);
    ret = FINDNEXT_MV(tcb->mv_q, &tmp_mv);
    return (ret);
} lm_mac_t    *
lm_mgmt_findnext_mac(idx)
    struct LM_MP_ENT_IDX *idx;
{
    lm_mac_t    *ret;
    lm_mac_addr_t mac_addr;
    SETUP_TCB;

lm_cvt_idx_mac(idx->LM_MP_MAC, &mac_addr);
    ret = FINDNEXT_MAC(tcb->mac_q, &mac_addr);
    return (ret);
} lm_port_t    *
lm_mgmt_findnext_port(idx)
    struct LM_PM_ENT_IDX *idx;
{
    lm_port_t    *ret;
    lm_port_addr_t port_addr;
    SETUP_TCB;

lm_cvt_idx_port(&idx->LM_PM_SHELF, &port_addr);
    ret = FINDNEXT_PORT(tcb->port_q, &port_addr);
    return (ret);
} lm_vlan_t    *
lm_mgmt_findnext_vlan(idx)
    struct LM_ATTR_ENT_IDX *idx;
{
    lm_vlan_t    *ret;
    lm_vlan_id_t vlan_id;
``` lm_mgmt.c

```c
    int         i;
    SETUP_TCB;

lm_cvt_idx_vlan(idx->LM_VLAN, &vlan_id);
    ret = FINDNEXT_VLAN(tcb->vlan_q, vlan_id);
    return (ret);
} lm_cvt_mv_idx(mv, idx)
    lm_mac_vlan_t *mv;
    struct LM_MAC_ENT_IDX *idx;
{
    bzero(idx, sizeof(*idx));
    lm_cvt_mac_idx(&mv->mac_addr, idx->LM_MAC_ADDR);
    lm_cvt_vlan_idx(&mv->vlan_id, idx->LM_MAC_VLAN);
} lm_cvt_pv_idx(pv, idx)
    lm_port_vlan_t *pv;
    struct LM_PV_IDX *idx;
{
    bzero(idx, sizeof(*idx));
    idx->LM_PV_SHELF = pv->port_addr.aa_shelf + 1;
    idx->LM_PV_CARD  = pv->port_addr.aa_slot + 1;
    idx->LM_PV_PORT  = pv->port_addr.aa_port + 1;
    lm_cvt_vlan_idx(&pv->vlan_id, idx->LM_PV_VLAN);
} lm_cvt_port_idx(port_addr, idx)
    lm_port_addr_t *port_addr;
    struct LM_PM_ENT_IDX *idx;
{
    bzero(idx, sizeof(*idx));
    idx->LM_PM_SHELF = port_addr->aa_shelf + 1;
    idx->LM_PM_CARD  = port_addr->aa_slot + 1;
    idx->LM_PM_PORT  = port_addr->aa_port + 1;
} lm_cvt_vc_idx(vc_addr, idx)
    lm_vc_addr_t *vc_addr;
    struct LM_VC_ENT_IDX *idx;
{
    bzero(idx, sizeof(*idx));
    lm_cvt_mac_idx(&vc_addr->mac_addr, idx->LM_VC_MAC);
    lm_cvt_vlan_idx(&vc_addr->vlan_id, idx->LM_VC_VLAN);
} lm_cvt_mac_idx(mac, idx)
    lm_mac_addr_t *mac;
``` lm_mgmt.c

```
    struct LM_MP_ENT_IDX *idx;
{
    int        i;

bzero(idx, sizeof(*idx));
    for (i = ATM_FIRST_MAC; i < sizeof(lm_mac_addr_t); i++) {
        idx->LM_MP_MAC[i - ATM_FIRST_MAC] = mac->aa_byte[i];
    }
} lm_cvt_vlan_idx(vlan_id, idx)
    lm_vlan_id_t *vlan_id;
    struct LM_ATTR_ENT_IDX *idx;
{
    bzero(idx, sizeof(*idx));
    idx->LM_VLAN[LM_VLAN_IXL - 1] = *vlan_id;
}

/**/ lm_cvt_idx_mv(idx, mv)
    struct LM_MAC_ENT_IDX *idx;
    lm_mac_vlan_t *mv;
{
    lm_cvt_idx_mac(idx->LM_MAC_ADDR, &mv->mac_addr);
    lm_cvt_idx_vlan(idx->LM_MAC_VLAN, &mv->vlan_id);
} lm_cvt_idx_pv(idx, pv)
    struct LM_PV_IDX *idx;
    lm_port_vlan_t *pv;
{
    lm_cvt_idx_port(&idx->LM_PV_SHELF, &pv->port_addr);
    lm_cvt_idx_vlan(idx->LM_PV_VLAN, &pv->vlan_id);
} lm_cvt_idx_vc(idx, vc_addr)
    struct LM_VC_ENT_IDX *idx;
    lm_vc_addr_t *vc_addr;
{
    lm_cvt_idx_mac(idx->LM_VC_MAC, &vc_addr->mac_addr);
    lm_cvt_idx_vlan(idx->LM_VC_VLAN, &vc_addr->vlan_id);
} lm_cvt_idx_port(idx, port)
    struct LM_PM_ENT_IDX *idx;
    lm_port_addr_t *port;
{
    SETUP_TCB;
```

```
    LM_INIT_PORT_ADDR(port, tcb->my_node, idx->LM_PM_SHELF - 1,
        idx->LM_PM_CARD - 1, idx->LM_PM_PORT - 1);
} lm_cvt_idx_mac(idx, mac)
    struct LM_MP_ENT_IDX *idx;
    lm_mac_addr_t  *mac;
{
    int         i;

LM_CLR_MAC_ADDR(mac);
    for (i = ATM_FIRST_MAC; i < sizeof(lm_mac_addr_t); i++) {
        mac->aa_byte[i] = idx->LM_MP_MAC[i - ATM_FIRST_MAC];
    }
} lm_cvt_idx_vlan(idx, vlan_id)
    struct LM_ATTR_ENT_IDX *idx;
    lm_vlan_id_t  *vlan_id;
{
    *vlan_id = idx->LM_VLAN[LM_VLAN_IXL - 1];
} lm_cvt_idx_os(idx, len, os)
    u_short     *idx;
    int          len;
    struct OS   *os;
{
    int         i;

os->length = len;
    for (i = 0; i < len; i++) {
        os->buffer[i] = idx[i];
    }
}
``` lm_util.c

```c
/* lm_util.c
 * COPYRIGHT 1992 ADAPTIVE CORPORATION
 * ALL RIGHTS RESERVED

* Description:
 *         <Description of the general category of file contents>
 * Routines:
 *         <An OPTIONAL list summarizing the routines in this file>
 *****************************END*****************************************/ ifdef CERNEL include "ipc_def.h"
include "net_def.h"
#include <global_def.h>
include <driver.h> undef lm_init else           /* ifndef CERNEL */ include <stdint.h>
include <ITC_if.h>
#include <RT_if.h>
#include <global_def.h>
include <driver.h>
#include <timer.h>
#include <RT_def.h>
#include <enet_if.h>
include <net_def.h>
include <NAC_shared_def.h> define ERRLOG printdbg
define printf printdbg endif          /* ifdef CERNEL */ include "unipdu.h"
include "nnipdus.h"
#include "altask_gl.h"
#include "sigtask_gl.h"
#include "svctask_gl.h"
#include "svc_if.h"
#include "snmp_incl.h"
#include "AAL_if.h"
#include "wdb_if.h"
#include "q.h"
#include "bits.h"
#include "lm.h"
``` lm_util.c

```c
static char    hex_dig[] = "0123456789abcdef";

lm_es_cfg_resp_t *
lm_build_es_cfg_resp(mac, enq, resp_len)
    lm_mac_t    *mac;
    tCFGELEM    *enq;
    int         *resp_len;
{
    lm_es_cfg_resp_t *ret;
    int         ret_len;
    int         num_paddrs;
    tPORT_CFGELEM *paddr;
    qlink_t     *link;
    lm_mac_vlan_t *mv;
    lm_port_t   *port;
    struct atm_addr port_addr;
    int         i;
    int         mlid;
    SETUP_TCB;

ret = NULL;
    ret_len = 0;

if (CHK_VB(LM_VB_MSGS)) {
        printf("Sending es_cfg_resp msg to mac %s\r\n",
            sprint_mac_addr(&mac->mac_addr));
    }
    port = mac->port;
    num_paddrs = -1;
    if (port != NULL) {
        for (link = HEAD_Q(mac->mv_q); link != NULL; link = link->next) {
            mv = (lm_mac_vlan_t *) link->data;
            mlid = mv->mlid;
            printf("num_paddrs = %d, mlid = %d\r\n", num_paddrs, mlid);
            num_paddrs = (num_paddrs <= mlid) ? mlid : num_paddrs;
        }
    }
    num_paddrs++;
    ret_len = SIZE_LM_ES_CFG_RESP +
        (num_paddrs - 1) * sizeof(tPORT_CFGELEM);

ret = (lm_es_cfg_resp_t *)
        ReqMsgMemZero(ret_len);
    if (ret == NULL)
        goto err_exit;

bzero(ret, ret_len);
    BUILD_UNI_HDRm(&ret->lmi_hdr, NNI_PROTOCOL, NN_PDU_STATUS_RESP,
        LMI_STATUS_CONFIG, LMI_GLOBAL_CREF_TYPE,
        LMI_GLOBAL_CREF_VALUE);
``` lm_util.c

```
    ret->enq = *enq;
    port_addr = port->port_addr;
    paddr = ret->paddr;

for (i = 0; I < num_paddrs; I++) {
        paddr[i].af_type = LMI_PORT_ADDR;
        paddr[i].af_port = port_addr;
        paddr[i].af_port.aa_lannum = i;
    } link = HEAD_Q(mac->mv_q);
    for (link = HEAD_Q(mac->mv_q); link != NULL; link = link->next) {
        mv = (lm_mac_vlan_t *) link->data;
        mlid = mv->mlid;
        paddr[mlid].af_type = LMI_PORT_ADDR;
        paddr[mlid].af_mid = mv->mid;
        if (mv->vlan == NULL) {
            paddr[mlid].af_mcasts = 0;
            paddr[mlid].af_mtu = 0;
        } else {
            paddr[mlid].af_mcasts = mv->vlan->num_mcasts;
            paddr[mlid].af_mtu = mv->vlan->mtu_size;
        }
        paddr[mlid].af_port = port_addr;
        paddr[mlid].af_port.aa_lannum = mv->mlid;
    }
    *resp_len = ret_len;
    return (ret);

err_exit:
    *resp_len = 0;
    return (ret);
} lm_send_mgmt_rsp(msg)
    struct AgentMsg *msg;
{
    int     ret;
    SETUP_TCB;

if (CHK_VB(LM_VB_MSGS)) {
        printf("sending a mgmt rsp\r\n");
    }
    ret = SendProxyMsg(msg, msg->Body.head.mbsize,
            SNMPA_MGMT_GETRESP);
    return (ret);
} lm_send_svc_rel_req(lmi_hdr, cause)
    tLMIHDR   *lmi_hdr;
``` lm_util.c

```
        tUINT32     cause;
{
    int         ret;
    struct svcif *msg;
    tUINT32     msg_len;
    tREL_REQ    *rel_req;
    tUINT8      *rel_cause;
    tLMIHDR     *tx_lmi_hdr;
    tITC_HEADER *itc;
    SETUP_TCB;

if (CHK_VB(LM_VB_MSGS)) {
        printf("sending a svc_rel_req msg, cause is %d\r\n",
            cause);
    }
    ret = RT_SUCCESS;
    msg_len = SVCIF_PDU_OFFSET + sizeof(*rel_req);
    msg = (struct svcif *) ReqMsgMemZero(msg_len);
    if (msg == NULL) {
        ret = !RT_SUCCESS;
        goto err_exit;
    }
    rel_req = (tREL_REQ *) & msg->lmi_hdr;
    tx_lmi_hdr = &rel_req->lmi_hdr;
    *tx_lmi_hdr = *lmi_hdr;
    tx_lmi_hdr->lh_pdu_type = SDU_RELEASE_REQ;
    rel_cause = (tUINT8 *) & rel_req->lmi_cause;
    LMI_ADD_ELEMENT(rel_cause, LMI_RELEASE_CAUSE, cause);
    ret = lm_send_svc_msg(msg, msg_len);
    return (ret);

err_exit:
    return (ret);
} lm_send_svc_msg(itc, len)
    tITC_HEADER *itc;
    tUINT32     len;
{
    int         ret;
    SETUP_TCB;

if (CHK_VB(LM_VB_MSGS)) {
        printf("sending a svc msg\r\n");
    }
    BUILD_ITCH((*itc), len - IASZ, TID_SVC, 0, EX_REQUEST,
        TA_AAL_IND_RECEIVE, tcb->mytid);
    ret = SendMsg(itc);
    return (ret);
}
``` lm_util.c

```c
lm_send_alan_cfg(prefix, atm_hdr, slot_num, active_ports, num_paddrs, paddrs)
    lm_prefix_t    prefix;
    lm_atm_hdr_t   atm_hdr;
    tUINT8         slot_num;
    tUINT32        active_ports;
    tUINT32        num_paddrs;
    tATMADDR       *paddrs;
{
    lm_alan_cfg_resp_t *resp;
    int         ret;
    int         resp_len;
    int         i;
    SETUP_TCB;

if (CHK_VB(LM_VB_MSGS)) {
        printf("send an alan_cfg msg, prefix = 0x%x, atm_hdr = 0x%x\r\n", prefix, atm_hdr);
        printf("\tslot_num = %d, act_ports = %d, num_paddrs = %d\r\n",
            slot_num, active_ports, num_paddrs);
    }
    resp_len = SIZE_LM_ALAN_CFG_RESP + (num_paddrs - 1) * sizeof(tATMADDR);

resp = (lm_alan_cfg_resp_t *) ReqMsgMemZero(resp_len, 0);
    if (resp == NULL) {
        ret = !RT_SUCCESS;
        goto err_exit;
    }
    /* Fill in the NNSTATUS_RESP fields */
    BUILD_UNI_HDRm(&resp->lmi_hdr, NNI_PROTOCOL, NN_PDU_STATUS_RESP,
        LMI_STATUS_CONFIG, LMI_GLOBAL_CREF_TYPE,
        LMI_GLOBAL_CREF_VALUE);

/* Fill in the ALANCFG_ENQ fields */ resp->enq.elem_type = ALAN_CFG_ENQ;
    resp->enq.slotid = slot_num;

/* Fill in the ALANCFG_RESP fields */ resp->resp.elem_type = ALAN_CFG_RESP;
    resp->resp.active_ports = active_ports;
    resp->resp.nac_id = tcb->nac_id;
    ATM_ADDR_COPY(resp->resp.nac_addr, tcb->nac_atm_addr);
    resp->resp.num_paddr = num_paddrs;
    for (i = 0; i < num_paddrs; i++)
        ATM_ADDR_COPY(resp->resp.paddrs[i], paddrs[i]);

ret = AAL_DataSendNR(&tcb->my_aal_key, resp, resp_len,
        *((tUINT32 *) & prefix), *((tUINT32 *) & atm_hdr));
    return (ret);
``` lm_util.c

```c
err_exit:
    if (resp != NULL)
        FreeMem(resp);
    return (ret);
} lm_send_es_cfg_ind(mac)
    lm_mac_t    *mac;
{
    int         ret;
    lm_port_t   *port;
    lm_prefix_t prefix;
    lm_atm_hdr_t atm_hdr;
    tCFGELEM    enq;
    lm_es_cfg_resp_t *resp;
    int         resp_len;
    tUINT32     tx_shelf;
    tUINT32     tx_slot;
    tUINT32     tx_port;
    tUINT32     tx_vci;
    SETUP_TCB;

if (CHK_VB(LM_VB_MSGS)) {
        printf("sending es_cfg_ind to mac %s\r\n",
            sprint_mac_addr(&mac->mac_addr));
    }
    ret = RT_SUCCESS;

port = mac->port;
    if (port == NULL) {
        ret = !RT_SUCCESS;
        goto err_exit;
    }
    bzero(&enq, sizeof(enq));
    tx_shelf = port->port_addr.aa_shelf;
    tx_slot = port->port_addr.aa_slot;
    tx_port = port->port_addr.aa_port;
    tx_vci = SHELF_SLOT_PORT_TO_VCIm(NN_SIG_VCI, tx_shelf, tx_slot,
                tx_port);
    enq.af_type = LMI_CONFIG_ENQ;
    enq.af_version = LMI_VERSION;
    enq.af_my_address = mac->mac_addr;
    resp = lm_build_es_cfg_resp(mac, &enq, &resp_len);
    if (resp == NULL) {
        goto err_exit;
    }
    resp->lmi_type_spec = LMI_STATUS_IND;
    BUILD_ATM_HDR(&atm_hdr, tx_vci);
    BUILD_UCAST_PREFIX(&prefix, tx_shelf, tx_slot, tx_port);
``` lm_util.c

```c
    ret = lm_send_es_cfg_resp(prefix, atm_hdr, resp, resp_len);
    return (ret);

err_exit:
    return (ret);
} lm_send_es_cfg_resp(prefix, atm_hdr, resp, resp_len)
    lm_prefix_t    prefix;
    lm_atm_hdr_t   atm_hdr;
    lm_es_cfg_resp_t *resp;
{
    int        ret;
    SETUP_TCB;

if (CHK_VB(LM_VB_MSGS)) {
        printf("sending es_cfg_resp, prefix = 0x%x, atm_hdr = 0x%x\r\n",
            prefix, atm_hdr);
    }
    if (resp == NULL) {
        goto err_exit;
    }
    ret = AAL_DataSendNR(&tcb->my_aal_key, resp, resp_len,
        *((tUINT32 *) & prefix), *((tUINT32 *) & atm_hdr));
    return (ret);

err_exit:
    if (CHK_VB(LM_VB_ERRS)) {
        printf("Couldn't send a null aal msg\n");
    }
    return (-1);
} send_mcast_cfg()
{
    int        ret;
} lm_tcb_t    *
lm_init()
{
    lm_tcb_t    *ret;
    int         err_code;
    tUINT32     i;
    int         lm_crt_cfg();
    struct wdb_msg *wmsg;
    lm_glbl_cfg_key_t key;

ret = (lm_tcb_t *) malloc(SIZE_LM_TCB);
    if (ret == NULL)
``` lm_util.c

```c
        goto err_exit;

SetGlobalP(ret);
    bzero(ret, sizeof(*ret));
    ret->cur_bid = 0;
    ret->my_node = MHW_GetNodeNumber();
    ret->my_shelf = MHW_GetShelfNumber();
    ret->my_slot = MHW_GetSlotId();
    bzero(&ret->port_tmplt, sizeof(ret->port_tmplt));
    ret->port_tmplt.aa_type = AAT_PORT;
    ret->port_tmplt.aa_country = USA;
    ret->port_tmplt.aa_node = ret->my_node;
    ret->port_tmplt.aa_shelf = ret->my_shelf;
    ret->tmr_blk = TimerInit(1);
    LM_INIT_PORT_ADDR(&ret->nac_atm_addr, ret->my_node, ret->my_shelf,
            ret->my_slot, 0);
    ret->dflt_mtu_size = LM_DFLT_MTU_SIZE;
    ret->dflt_num_mcasts = LM_DFLT_NUM_MCASTS;
    ret->verbose = LM_VB_ALL;

ret->mac_q = &ret->mac_queue;
    ret->port_q = &ret->port_queue;
    ret->vlan_q = &ret->vlan_queue;
    ret->mv_q = &ret->mv_queue;
    ret->pv_q = &ret->pv_queue;
    ret->vc_q = &ret->vc_queue;
    init_q(ret->mac_q);
    init_q(ret->port_q);
    init_q(ret->vlan_q);
    init_q(ret->mv_q);
    init_q(ret->pv_q);
    init_q(ret->vc_q);

/* throw away the 0th bid, as per jlb's recommedation */ bits_get_bit(ret->bid_bits, SIZE_BID_BITS);

err_code = AAL_SAP_Create(LM_START_VCI, LM_END_VCI, LM_AAL_SID,
            &ret->my_aal_key);
#ifdef UNIX
    GetTid(&ret->mytid);
#else           /* ifdef UNIX */
    ret->mytid.Generic = TID_LM;
    ret->mytid.Instance = LM_INSTANCE;
#endif          /* ifdef UNIX */
    GetPid(&ret->mypid);

ret->do_cfg_wrts = TRUE;
    key.tag = GLBL_CFG_KEY;
    wmsg = wdb_send_fetch_wait(&key, sizeof(key));
``` lm_util.c

```
        if (wmsg == NULL || wdb_get_ercode(wmsg) != 0) {
            lm_kludge_data_init();
        } else {
            ret->do_cfg_wrts = FALSE;
            wdb_send_startup_queries(lm_crt_cfg);
            ret->do_cfg_wrts = TRUE;
        }
        SendProxyCheckin(MHW_GetCardType(), MHW_GetSlotId());
        return (ret);

err_exit:
        return (NULL);
} lm_mac_t     *
add_mac(mac_addr)
    lm_mac_addr_t *mac_addr;
{
    lm_mac_t    *ret;
    qlink_t     *link;
    lm_mac_t    *tmp;
    SETUP_TCB;

if (CHK_VB(LM_VB_TERSE)) {
        printf("adding mac addr %s\r\n", sprint_mac_addr(mac_addr));
    }
    mac_addr->aa_type = AAT_MAC;
    ret = FIND_MAC(tcb->mac_q, mac_addr);
    if (ret != NULL)
        return (ret);

ret = (lm_mac_t *) malloc(SIZE_LM_MAC);
    if (ret == NULL)
        goto err_exit;

bzero(ret, SIZE_LM_MAC);
    ret->mac_addr = *mac_addr;
    ret->mac_addr.aa_type = AAT_MAC;
    ret->port = NULL;
    ret->mv_q = &ret->mv_queue;
    init_q(ret->mv_q);
    init_qlink(&ret->mac_link, ret);

ATCH_MAC_MV_Q(tcb->mv_q, ret);
    PUTQ_SORTED_MAC(&ret->mac_link, tcb->mac_q);
    lm_wrt_mac_cfg(ret, NULL);
    return (ret);

err_exit:
    Crash(999, 0, 0);
``` lm_util.c

```c
} lm_port_t   *
add_port(port_addr)
    lm_port_addr_t *port_addr;
{
    lm_port_t   *ret;
    SETUP_TCB;

port_addr->aa_type = AAT_PORT;
    port_addr->aa_country = USA;

if (CHK_VB(LM_VB_TERSE)) {
        printf("adding port %s\r\n", sprint_port_addr(port_addr));
    }
    ret = FIND_PORT(tcb->port_q, port_addr);
    if (ret != NULL)
        return (ret);

ret = (lm_port_t *) malloc(SIZE_LM_PORT);
    if (ret == NULL)
        goto err_exit;

bzero(ret, SIZE_LM_PORT);
    ret->port_addr = *port_addr;
    ret->port_addr.aa_type = AAT_PORT;
    ret->port_addr.aa_lannum = 0;
    ret->mac = NULL;
    ret->pv_q = &ret->pv_queue;
    init_q(ret->pv_q);
    init_qlink(&ret->port_link, ret);

ATCH_PORT_PV_Q(tcb->pv_q, ret);
    PUTQ_SORTED_PORT(&ret->port_link, tcb->port_q);
    lm_wrt_port_cfg(ret);
    return (ret);

err_exit:
    Crash(998, 0, 0);
} lm_vlan_t   *
add_vlan(vlan_id, mtu, num_mcasts, name)
    lm_vlan_id_t    vlan_id;
    int             mtu;
    int             num_mcasts;
    char            *name;
{
    lm_vlan_t   *ret;
    int         i;
``` lm_util.c

```
    SETUP_TCB;

if (CHK_VB(LM_VB_TERSE)) {
        printf("adding vlan %d, mtu = %d, num_mcasts = %d, name = %s\r\n",
            vlan_id, mtu, num_mcasts, name);
    }
    ret = FIND_VLAN(tcb->vlan_q, vlan_id);
    if (ret != NULL)
        return (ret);

ret = (lm_vlan_t *) malloc(SIZE_LM_VLAN);
    if (ret == NULL)
        goto err_exit;

bzero(ret, SIZE_LM_VLAN);
    ret->vlan_id = vlan_id;
    ret->mtu_size = mtu;
    ret->num_mcasts = 0;
    ret->dflt_mlid = LM_MAX_MLID;
    strcpy(ret->vlan_name, name);
    ret->mv_q = &ret->mv_queue;
    ret->pv_q = &ret->pv_queue;
    ret->vc_q = &ret->vc_queue;
    ret->free_vc_q = &ret->free_vc_queue;
    init_q(ret->mv_q);
    init_q(ret->pv_q);
    init_q(ret->vc_q);
    init_q(ret->free_vc_q);
    init_qlink(&ret->vlan_link, ret);

chg_num_vcs(ret, num_mcasts);

ATCH_VLAN_MV_Q(tcb->mv_q, ret);
    ATCH_VLAN_PV_Q(tcb->pv_q, ret);
    PUTQ_SORTED_VLAN(&ret->vlan_link, tcb->vlan_q);
    lm_chg_vlan_cfg(ret, &ret->dflt_mlid, NULL, NULL, NULL);
    return (ret);

err_exit:
    Crash(997, 0, 0);
} lm_vc_t      *
get_free_vc(vlan)
    lm_vlan_t    *vlan;
{
    lm_vc_t      *ret;
    qlink_t      *link;

ret = NULL;
``` lm_util.c

```c
        link = HEAD_Q(vlan->free_vc_q);
        if (link == NULL)
            goto err_exit;

ret = (lm_vc_t *) link->data;
        rmq(link);
        PUTQ_SORTED_VC(link, vlan->vc_q);
        return (ret);

err_exit:
        return (NULL);
} lm_vc_t     *
add_vc(vc_addr)
    lm_vc_addr_t    *vc_addr;
{
    lm_vc_t     *ret;
    lm_vlan_t   *vlan;
    SETUP_TCB;

if (CHK_VB(LM_VB_TERSE)) {
        printf("adding vc %s\r\n", sprint_vc_addr(vc_addr));
    }
    ret = NULL;

vlan = FIND_VLAN(tcb->vlan_q, vc_addr->vlan_id);
    if (vlan == NULL)
        goto err_exit;

ret = FIND_VC(vlan->vc_q, vc_addr);
    if (ret != NULL)
        return (ret);

ret = get_free_vc(vlan);
    if (ret == NULL)
        goto err_exit;

ret->vc_addr = *vc_addr;
    ret->ref_cnt = 0;
    return (ret);

err_exit:
        return (NULL);
} chg_num_vcs(vlan, num_vcs)
    lm_vlan_t   *vlan;
    tINT32      num_vcs;
{
``` lm_util.c

```
    int         ret;
    int         delta;
    int         i;
    qlink_t     *link;
    qlink_t     *next;
    lm_vc_t     *vc;
    int         on_vc_q;

ret = 0;
    delta = num_vcs - vlan->num_mcasts;
    if (delta < 0) {
        on_vc_q = FALSE;
        link = HEAD_Q(vlan->free_vc_q);
        for (i = 0; i > delta; i--) {
            if (link == NULL) {
                if (on_vc_q)
                    break;
                link = HEAD_Q(vlan->vc_q);
                on_vc_q = TRUE;
            }
            if (link == NULL)
                break;
            next = link->next;
            vc = (lm_vc_t *) link->data;
            free_vc(vc);
            ret--;
            link = next;
        }
    } else if (delta > 0) {
        for (i = 0; i < delta; i++) {
            add_free_vc(vlan);
            ret++;
        }
    }
    vlan->num_mcasts = num_vcs;
    return (ret);
} lm_vc_t     *
add_free_vc(vlan)
    lm_vlan_t   *vlan;
{
    lm_vc_t         *ret;
    lm_mac_addr_t   mac_addr;
    lm_bid_t        bid;
    SETUP_TCB;

bid = bits_get_bit(tcb->bid_bits, SIZE_BID_BITS);
    if (bid == -1)
        goto err_exit;
``` lm_util.c

```
    if (CHK_VB(LM_VB_TERSE)) {
        printf("getting a free mcast vc for vlan %s, bid = %d\r\n",
            sprint_vlan_id(&vlan->vlan_id), bid);
    }
    ret = (lm_vc_t *) malloc(SIZE_LM_VC);
    if (ret == NULL)
        goto err_exit;

bzero(ret, SIZE_LM_VC);
    LM_CLR_MAC_ADDR(&mac_addr);
    LM_INIT_VC_ADDR(&ret->vc_addr, vlan->vlan_id, &mac_addr);
    ret->bid = bid;
    ret->vlan = vlan;
    init_qlink(&ret->vc_link, ret);
    init_qlink(&ret->vlan_link, ret);
    PUTQ_SORTED_VC(&ret->vc_link, tcb->vc_q);
    PUTQ_SORTED_VC(&ret->vlan_link, vlan->free_vc_q);

return (ret);

err_exit:
    Crash(994, 0, 0);
} lm_port_vlan_t *
add_pv(port_addr, vlan_id, mlid)
    lm_port_addr_t *port_addr;
    lm_vlan_id_t   vlan_id;
    lm_mlid_t      mlid;
{
    lm_port_vlan_t tmp;
    lm_port_vlan_t *ret;
    lm_port_t      *port;
    lm_vlan_t      *vlan;
    SETUP_TCB;

if (CHK_VB(LM_VB_TERSE)) {
        printf("adding pv, port_addr = %s, vlan = %d, mlid = %d\r\n",
            sprint_port_addr(port_addr), vlan_id, mlid);
    }
    tmp.vlan_id = vlan_id;
    tmp.port_addr = *port_addr;
    ret = FIND_PV(tcb->pv_q, &tmp);
    if (ret != NULL)
        return (ret);

ret = (lm_port_vlan_t *) malloc(SIZE_LM_PORT_VLAN);
    if (ret == NULL)
        goto err_exit;
``` lm_util.c

```
        bzero(ret, SIZE_LM_PORT_VLAN);
        ret->port_addr = *port_addr;
        ret->vlan_id = vlan_id;
        ret->port = NULL;
        ret->vlan = NULL;
        ret->mlid = mlid;
        init_qlink(&ret->pv_link, ret);
        init_qlink(&ret->port_link, ret);
        init_qlink(&ret->vlan_link, ret);

ATCH_PV_VLAN_Q(tcb->vlan_q, ret);
        ATCH_PV_PORT_Q(tcb->port_q, ret);
        PUTQ_SORTED_PV(&ret->pv_link, tcb->pv_q);
        lm_wrt_pv_cfg(ret);
        return (ret);

err_exit:
        Crash(996, 0, 0);
} lm_mac_vlan_t *
add_mv(mac_addr, vlan_id, mid, mlid)
        lm_mac_addr_t *mac_addr;
        lm_vlan_id_t  vlan_id;
        int           mid;
        lm_mlid_t     mlid;
{
    lm_mac_vlan_t  tmp;
    lm_mac_vlan_t  *ret;
    SETUP_TCB;

if (CHK_VB(LM_VB_TERSE)) {
        printf("adding mv, mac_addr = %s, vlan = %d, mid = %d, mlid = %d\r\n",
            sprint_mac_addr(mac_addr), vlan_id, mid, mlid);
    }
    tmp.mac_addr = *mac_addr;
    tmp.vlan_id = vlan_id;
    ret = FIND_MV(tcb->mv_q, &tmp);
    if (ret != NULL)
        return (ret);

ret = (lm_mac_vlan_t *) malloc(SIZE_LM_MAC_VLAN);
    if (ret == NULL)
        goto err_exit;

bzero(ret, SIZE_LM_MAC_VLAN);
    ret->mac_addr = *mac_addr;
    ret->vlan_id = vlan_id;
    ret->mac = NULL;
``` lm_util.c

```
        ret->vlan = NULL;
        ret->mid = mid;
        ret->mlid = mlid;
        init_qlink(&ret->mv_link, ret);
        init_qlink(&ret->mac_link, ret);
        init_qlink(&ret->vlan_link, ret);

ATCH_MV_VLAN_Q(tcb->vlan_q, ret);
        ATCH_MV_MAC_Q(tcb->mac_q, ret);
        PUTQ_SORTED_MV(&ret->mv_link, tcb->mv_q);
        lm_chg_mv_cfg(ret, &ret->mlid);
        return (ret);

err_exit:
        Crash(995, 0, 0);
} free_tcb(tcb)
    lm_tcb_t    *tcb;
{
    if (tcb != NULL) {
        FREE_VLAN_Q(tcb->vlan_q);
        FREE_MAC_Q(tcb->mac_q);
        FREE_PORT_Q(tcb->port_q);
        FREE_VC_Q(tcb->vc_q);
        FREE_MV_Q(tcb->mv_q);
        FREE_PV_Q(tcb->pv_q);
        lm_rm_glbl_cfg();
        free(tcb);
    }
} free_mac(mac)
    lm_mac_t    *mac;
{
    SETUP_TCB;

if (mac != NULL) {
        if (CHK_VB(LM_VB_TERSE)) {
            printf("freeing mac addr = %s\r\n",
                sprint_mac_addr(&mac->mac_addr));
        }
        lm_rm_mac_cfg(mac);
        rmq(&mac->mac_link);
        FREE_MV_Q(mac->mv_q);
        lm_send_es_cfg_ind(mac);
        if (mac->port != NULL) {
            mac->port->mac = NULL;
            mac->port = NULL;
        }
``` lm_util.c

```
            free(mac);
        }
        return (NULL);
} free_vlan(vlan)
    lm_vlan_t    *vlan;
{
    SETUP_TCB;

if (vlan != NULL) {
        if (CHK_VB(LM_VB_TERSE)) {
            printf("freeing vlan %s\r\n",
                sprint_vlan_id(&vlan->vlan_id));
        }
        lm_rm_vlan_cfg(vlan);
        rmq(&vlan->vlan_link);
        FREE_PV_Q(vlan->pv_q);
        FREE_MV_Q(vlan->mv_q);
        FREE_VC_Q(vlan->vc_q);
        FREE_VC_Q(vlan->free_vc_q);
        bits_free_bit(vlan->dflt_mlid, tcb->mlid_bits, SIZE_MLID_BITS);
        free(vlan);
    }
    return (NULL);
} free_vc(vc)
    lm_vc_t     *vc;
{
    SETUP_TCB;

if (vc != NULL) {
        if (CHK_VB(LM_VB_TERSE)) {
            printf("freeing vc %s\r\n",
                sprint_vc_addr(&vc->vc_addr));
        }
        lm_rm_vc_cfg(vc);
        rmq(&vc->vc_link);
        rmq(&vc->vlan_link);
        vc->vlan = NULL;
        bits_free_bit(vc->bid, tcb->bid_bits, SIZE_BID_BITS);
        free(vc);
    }
    return (NULL);
} free_port(port)
    lm_port_t    *port;
{
``` lm_util.c

```
        SETUP_TCB;

if (port != NULL) {
        if (CHK_VB(LM_VB_TERSE)) {
           printf("freeing port addr = %s\r\n",
              sprint_port_addr(&port->port_addr));
        }
        lm_rm_port_cfg(port);
        rmq(&port->port_link);
        if (port->mac != NULL) {
           port->mac->port = NULL;
           port->mac = NULL;
        }
        FREE_PV_Q(port->pv_q);
        free(port);
     }
     return (NULL);
} free_port_pv(pv)
     lm_port_vlan_t *pv;
{
     lm_port_t    *port;

if (pv != NULL) {
        rmq(&pv->port_link);
        port = pv->port;
        if (port != NULL) {
           bits_free_bit(pv->mlid, port->mlid_bits,
              SIZE_MLID_BITS);
           pv->port = NULL;
        }
     }
     return (NULL);
} free_vlan_pv(pv)
     lm_port_vlan_t *pv;
{
     if (pv != NULL) {
        rmq(&pv->vlan_link);
        pv->vlan = NULL;
     }
     return (NULL);
} free_pv(pv)
     lm_port_vlan_t *pv;
{
     SETUP_TCB;
``` lm_util.c

```
    if (pv != NULL) {
        if (CHK_VB(LM_VB_TERSE)) {
            printf("freeing pv, port_addr = %s, vlan = %d, mlid = %d\r\n",
                sprint_port_addr(&pv->port_addr), pv->vlan_id,
                pv->mlid);
        }
        lm_rm_pv_cfg(pv);
        rmq(&pv->pv_link);
        free_vlan_pv(pv);
        free_port_pv(pv);
        free(pv);
    }
    return (NULL);
} free_mac_mv(mv)
    lm_mac_vlan_t *mv;
{
    if (mv != NULL) {
        if (mv->mac != NULL) {
            rmq(&mv->mac_link);
            bits_free_bit(mv->mlid, mv->mac->mlid_bits,
                SIZE_MLID_BITS);
            mv->mac = NULL;
        }
    }
    return (NULL);
} free_vlan_mv(mv)
    lm_mac_vlan_t *mv;
{
    if (mv != NULL) {
        if (mv->vlan != NULL) {
            rmq(&mv->vlan_link);
            mv->vlan = NULL;
        }
    }
    return (NULL);
} free_mv(mv)
    lm_mac_vlan_t *mv;
{
    SETUP_TCB;

if (mv != NULL) {
        if (CHK_VB(LM_VB_TERSE)) {
            printf("freeing mv, mac_addr = %s, vlan = %d\r\n",
``` lm_util.c

```
            sprint_mac_addr(&mv->mac_addr), mv->vlan_id);
        }
        lm_rm_mv_cfg(mv);
        if (mv->mac != NULL)
            lm_send_es_cfg_ind(mv->mac);
        rmq(&mv->mv_link);
        free_mac_mv(mv);
        free_vlan_mv(mv);
        free(mv);
    }
    return (NULL);
} free_mac_port(mac, port)
    lm_mac_t    *mac;
    lm_port_t   *port;
{
    if (mac != NULL)
        mac->port = NULL;
    if (port != NULL)
        port->mac = NULL;
    return (NULL);
} chk_port_mlid(port, mlid)
    lm_port_t   *port;
    lm_mlid_t   mlid;
{
    int         ret;

ret = bits_tst_bit(mlid, port->mlid_bits, SIZE_MLID_BITS);
    return (ret);
} chk_mac_mlid(mac, mlid)
    lm_mac_t    *mac;
    lm_mlid_t   mlid;
{
    int         ret;

ret = bits_tst_bit(mlid, mac->mlid_bits, SIZE_MLID_BITS);
    return (ret);
} lm_mac_t    *
cmp_mac(mac, mac_addr)
    lm_mac_t       *mac;
    lm_mac_addr_t  *mac_addr;
{
    if (cmp_mac_addr(&mac->mac_addr, mac_addr) == 0)
```

```
        return (mac);
    return (NULL);
} lm_mac_t   *
cmpnext_mac(mac, mac_addr)
    lm_mac_t      *mac;
    lm_mac_addr_t *mac_addr;
{
    int       ret;

ret = cmp_mac_addr(&mac->mac_addr, mac_addr);
    if (ret >= 0)
        return (mac);

return (NULL);
} lm_port_t  *
cmp_port(port, port_addr)
    lm_port_t      *port;
    lm_port_addr_t *port_addr;
{
    if (cmp_port_addr(&port->port_addr, port_addr) == 0)
        return (port);
    return (NULL);
} lm_port_t  *
cmpnext_port(port, port_addr)
    lm_port_t      *port;
    lm_port_addr_t *port_addr;
{
    int       ret;

ret = cmp_port_addr(&port->port_addr, port_addr);
    if (ret >= 0)
        return (port);

return (NULL);
} lm_vlan_t  *
cmp_vlan(vlan, vlan_id)
    lm_vlan_t    *vlan;
    lm_vlan_id_t  vlan_id;
{
    if (vlan->vlan_id == vlan_id)
        return (vlan);
    return (NULL);
``` lm_util.c

```
} lm_vlan_t    *
cmpnext_vlan(vlan, vlan_id)
    lm_vlan_t    *vlan;
    lm_vlan_id_t    vlan_id;
{
    int        ret;

ret = cmp_vlan_id(&vlan->vlan_id, &vlan_id);
    if (ret >= 0)
        return (vlan);
    return (NULL);
} lm_vc_t    *
cmp_vc(vc, vc_addr)
    lm_vc_t        *vc;
    lm_vc_addr_t    *vc_addr;
{
    if (cmp_vc_addr(&vc->vc_addr, vc_addr) == 0)
        return (vc);
    return (NULL);
} lm_vc_t    *
cmpnext_vc(vc, vc_addr)
    lm_vc_t        *vc;
    lm_vc_addr_t    *vc_addr;
{
    int        ret;

ret = cmp_vc_addr(&vc->vc_addr, vc_addr);
    if (ret >= 0)
        return (vc);
    return (NULL);
} lm_mac_vlan_t *
cmp_mv(mv, tst)
    lm_mac_vlan_t *mv;
    lm_mac_vlan_t *tst;
{
    if (cmp_mac_addr(&mv->mac_addr, &tst->mac_addr) == 0 &&
        cmp_vlan_id(&mv->vlan_id, &tst->vlan_id) == 0)
        return (mv);
    return (NULL);
}
``` lm_util.c

```
lm_mac_vlan_t *
cmpnext_mv(mv, tst)
    lm_mac_vlan_t *mv;
    lm_mac_vlan_t *tst;
{
    int     ret;

ret = cmp_mac_addr(&mv->mac_addr, &tst->mac_addr);
    if (ret > 0)
        return (mv);
    if (ret == 0) {
        ret = cmp_vlan_id(&mv->vlan_id, &tst->vlan_id);
        if (ret >= 0)
            return (mv);
    }
    return (NULL);
} lm_mac_vlan_t *
cmp_mlid(mv, mlid)
    lm_mac_vlan_t *mv;
    lm_mlid_t     mlid;
{
    if (mv->mlid == mlid)
        return (mv);
    return (NULL);
} lm_mac_vlan_t *
cmpnext_mlid(mv, mlid)
    lm_mac_vlan_t *mv;
    lm_mlid_t     mlid;
{
    int     ret;

if (mv->mlid >= mlid)
        return (mv);
    return (NULL);
} lm_port_vlan_t *
cmp_pv(pv, tst)
    lm_port_vlan_t *pv;
    lm_port_vlan_t *tst;
{
    if (cmp_port_addr(&pv->port_addr, &tst->port_addr) == 0 &&
        cmp_vlan_id(&pv->vlan_id, &tst->vlan_id) == 0)
        return (pv);
    return (NULL);
}
``` lm_util.c

```c
lm_port_vlan_t *
cmpnext_pv(pv, tst)
    lm_port_vlan_t *pv;
    lm_port_vlan_t *tst;
{
    int        ret;

ret = cmp_port_addr(&pv->port_addr, &tst->port_addr);
    if (ret > 0)
        return (pv);
    if (ret == 0) {
        ret = cmp_vlan_id(&pv->vlan_id, &tst->vlan_id);
        if (ret >= 0)
            return (pv);
    }
    return (NULL);
} atch_mac_port(mac, port)
    lm_mac_t   *mac;
    lm_port_t  *port;
{
    mac->port = port;
    port->mac = mac;
    return (NULL);
} atch_port_pv(pv, port)
    lm_port_vlan_t *pv;
    lm_port_t      *port;
{
    int        tst;

if (cmp_port_addr(&pv->port_addr, &port->port_addr) == 0) {
        PUTQ_SORTED_PV(&pv->port_link, port->pv_q);
        pv->port = port;
        if (pv->mlid >= LM_MAX_MLID ||
            bits_tst_bit(pv->mlid, port->mlid_bits, SIZE_MLID_BITS)) {
            pv->mlid = bits_get_bit(port->mlid_bits,
                SIZE_MLID_BITS);
            printf("replacing pv mlid %d with %d\r\n", LM_MAX_MLID, pv->mlid);
        } else {
            bits_alloc_bit(pv->mlid, port->mlid_bits,
                SIZE_MLID_BITS);
        }
    }
    return (NULL);
}
``` lm_util.c
-171-

```c
atch_vlan_pv(pv, vlan)
    lm_port_vlan_t *pv;
    lm_vlan_t      *vlan;
{
    if (cmp_vlan_id(&pv->vlan_id, &vlan->vlan_id) == 0) {
        PUTQ_SORTED_PV(&pv->vlan_link, vlan->pv_q);
        pv->vlan = vlan;
    }
    return (NULL);
} atch_mac_mv(mv, mac)
    lm_mac_vlan_t *mv;
    lm_mac_t      *mac;
{
    if (cmp_mac_addr(&mv->mac_addr, &mac->mac_addr) == 0) {
        PUTQ_SORTED_MV(&mv->mac_link, mac->mv_q);
        mv->mac = mac;
        if (mv->mlid >= LM_MAX_MLID ||
            bits_tst_bit(mv->mlid, mac->mlid_bits, SIZE_MLID_BITS)) {
            mv->mlid = bits_get_bit(mac->mlid_bits, SIZE_MLID_BITS);
            printf("replacing mv mlid %d with %d\r\n", LM_MAX_MLID, mv->mlid);
        } else {
            bits_alloc_bit(mv->mlid, mac->mlid_bits,
                    SIZE_MLID_BITS);
        }
    }
    return (NULL);
} atch_vlan_mv(mv, vlan)
    lm_mac_vlan_t *mv;
    lm_vlan_t     *vlan;
{
    if (cmp_vlan_id(&mv->vlan_id, &vlan->vlan_id) == 0) {
        PUTQ_SORTED_MV(&mv->vlan_link, vlan->mv_q);
        mv->vlan = vlan;
        if (mv->mid >= LM_MAX_MID) {
            mv->mid = bits_get_bit(vlan->mid_bits, SIZE_MID_BITS);
        }
    }
    return (NULL);
} atch_pv_port(port, pv)
    lm_port_t     *port;
    lm_port_vlan_t *pv;
{
    return (atch_port_pv(pv, port));
}
``` lm_util.c

```c
atch_pv_vlan(vlan, pv)
    lm_vlan_t      *vlan;
    lm_port_vlan_t *pv;
{
    return (atch_vlan_pv(pv, vlan));
} atch_mv_mac(mac, mv)
    lm_mac_t      *mac;
    lm_mac_vlan_t *mv;
{ return (atch_mac_mv(mv, mac));
} atch_mv_vlan(vlan, mv)
    lm_vlan_t     *vlan;
    lm_mac_vlan_t *mv;
{
    return (atch_vlan_mv(mv, vlan));
} cmp_port_addr(p1, p2)
    lm_port_addr_t *p1;
    lm_port_addr_t *p2;
{
    int     ret;

ret = ATM_ADDR_EQ(*p1, *p2) ? 0 :
          ATM_ADDR_GT(*p1, *p2) ? 1 : -1;
    return (ret);
} cmp_vlan_id(v1, v2)
    lm_vlan_id_t *v1;
    lm_vlan_id_t *v2;
{
    int     ret;

ret = (*v1 == *v2) ? 0 :
          *v1 > *v2 ? 1 : -1;
    return (ret);
} cmp_mac_addr(m1, m2)
    lm_mac_addr_t *m1;
    lm_mac_addr_t *m2;
{
    int     ret;
```

```
        ret = ATM_ADDR_EQ(*m1, *m2) ? 0 :
            ATM_ADDR_GT(*m1, *m2) ? 1 : -1;
        return (ret);
} cmp_vc_addr(vc1, vc2)
    lm_vc_addr_t   *vc1;
    lm_vc_addr_t   *vc2;
{
    int         ret;

ret = cmp_mac_addr(&vc1->mac_addr, &vc2->mac_addr);
    if (ret == 0)
        ret = cmp_vlan_id(&vc1->vlan_id, &vc2->vlan_id);
    return (ret);
} cmp_pv_addr(pv1, pv2)
    lm_port_vlan_t *pv1;
    lm_port_vlan_t *pv2;
{
    int         ret;

ret = cmp_port_addr(&pv1->port_addr, &pv2->port_addr);
    if (ret == 0)
        ret = cmp_vlan_id(&pv1->vlan_id, &pv2->vlan_id);
    return (ret);
} cmp_mv_addr(mv1, mv2)
    lm_mac_vlan_t  *mv1;
    lm_mac_vlan_t  *mv2;
{
    int         ret;

ret = cmp_mac_addr(&mv1->mac_addr, &mv2->mac_addr);
    if (ret == 0)
        ret = cmp_vlan_id(&mv1->vlan_id, &mv2->vlan_id);
    return (ret);
} lm_dup_port_dflts(port, mac)
    lm_port_t   *port;
    lm_mac_t    *mac;
{
    qlink_t     *link;
    lm_port_vlan_t *pv;

for (link = HEAD_Q(port->pv_q); link != NULL; link = link->next) {
``` lm_util.c

```c
        pv = (lm_port_vlan_t *) link->data;
        add_mv(&mac->mac_addr, pv->vlan_id, LM_MAX_MID, pv->mlid);
    }
} lm_kludge_data_init()
{
    lm_port_addr_t  port_addr;
    lm_port_t       *port;
    int             i;
    int             j;
    int             k;
    int             min_slot;
    int             max_slot;
    int             min_port;
    int             max_port;
    int             min_vlan;
    int             max_vlan;
    SETUP_TCB;

min_slot = 0;
    max_slot = 15;
    min_port = 0;
    max_port = 5;
    min_vlan = 1;
    max_vlan = 1;

LM_INIT_PORT_ADDR(&port_addr, tcb->my_node, tcb->my_shelf, min_slot,
            min_port);

for (j = max_slot; j >= min_slot; j--) {
        if (j == tcb->my_slot) {
            port_addr.aa_slot = j;
            port_addr.aa_port = min_port;
            add_port(&port_addr);
            continue;
        }
        port_addr.aa_slot = j;
        for (i = max_port; i >= min_port; i--) {
            port_addr.aa_port = i;
            add_port(&port_addr);
        }
    } for (i = max_vlan; i >= min_vlan; i--) {
        add_vlan(i, tcb->dflt_mtu_size, tcb->dflt_num_mcasts, "bob");
    }

LM_INIT_PORT_ADDR(&port_addr, tcb->my_node, tcb->my_shelf, min_slot,
``` lm_util.c

```
            min_port);
    for (k = max_vlan; k >= min_vlan; k--) {
        for (j = max_slot; j >= min_slot; j--) {
            if (j == tcb->my_slot) {
                port_addr.aa_slot = j;
                port_addr.aa_port = min_port;
                add_pv(&port_addr, k, LM_MAX_MLID);
                continue;
            }
            port_addr.aa_slot = j;
            for (i = max_port; i >= min_port; i--) {
                port_addr.aa_port = i;
                add_pv(&port_addr, k, LM_MAX_MLID);
            }
        }
    }
    lm_wrt_glbl_cfg();
    print_tcb(tcb, 0);
} qpsc_mac(link1, link2)
    qlink_t     *link1;
    qlink_t     *link2;
{
    int         ret;
    lm_mac_t    *mac1;
    lm_mac_t    *mac2;

mac1 = (lm_mac_t *) link1->data;
    mac2 = (lm_mac_t *) link2->data;

ret = cmp_mac_addr(&mac1->mac_addr, &mac2->mac_addr);
    return (ret);
} qpsc_port(link1, link2)
    qlink_t     *link1;
    qlink_t     *link2;
{
    int         ret;
    lm_port_t   *port1;
    lm_port_t   *port2;

port1 = (lm_port_t *) link1->data;
    port2 = (lm_port_t *) link2->data;

ret = cmp_port_addr(&port1->port_addr, &port2->port_addr);
    return (ret);
}
``` lm_util.c

```c
qpsc_vlan(link1, link2)
    qlink_t    *link1;
    qlink_t    *link2;
{
    int         ret;
    lm_vlan_t   *vlan1;
    lm_vlan_t   *vlan2;

vlan1 = (lm_vlan_t *) link1->data;
    vlan2 = (lm_vlan_t *) link2->data;

ret = cmp_vlan_id(&vlan1->vlan_id, &vlan2->vlan_id);
    return (ret);
} qpsc_vc(link1, link2)
    qlink_t    *link1;
    qlink_t    *link2;
{
    int         ret;
    lm_vc_t     *vc1;
    lm_vc_t     *vc2;

vc1 = (lm_vc_t *) link1->data;
    vc2 = (lm_vc_t *) link2->data;
    ret = cmp_vc_addr(vc1, vc2);
    return (ret);
} qpsc_pv(link1, link2)
    qlink_t    *link1;
    qlink_t    *link2;
{
    int             ret;
    lm_port_vlan_t  *pv1;
    lm_port_vlan_t  *pv2;

pv1 = (lm_port_vlan_t *) link1->data;
    pv2 = (lm_port_vlan_t *) link2->data;
    ret = cmp_pv_addr(pv1, pv2);
    return (ret);
} qpsc_mv(link1, link2)
    qlink_t    *link1;
    qlink_t    *link2;
{
    int             ret;
    lm_mac_vlan_t   *mv1;
    lm_mac_vlan_t   *mv2;
``` lm_util.c

```c
    mv1 = (lm_mac_vlan_t *) link1->data;
    mv2 = (lm_mac_vlan_t *) link2->data;
    ret = cmp_mv_addr(mv1, mv2);
    return (ret);
} ifdef UNIX

MHW_GetNodeNumber()
{
    return (42);
}

MHW_GetShelfNumber()
{
    return (0);
} else           /* ifndef CERNEL */

MHW_GetNodeNumber()
{
    tSHARED_RW   *shr;

shr = (tSHARED_RW *) GetSharedP();
    return (shr->Node);
}

MHW_GetShelfNumber()
{
    return (0);
} endif          /* ifdef CERNEL */
```

```
/* q.c
 *
 * COPYRIGHT 1992 ADAPTIVE CORPORATION
 * ALL RIGHTS RESERVED
 */

* Description:
*           <Description of the general category of file contents>
* Routines:
*           <An OPTIONAL list summarizing the routines in this file>
*****************************END*****************************/ include "q.h"

init_qlink(link, p)
    qlink_t     *link;
    int         *p;
{
    link->prev = NULL;
    link->next = NULL;
    link->q = NULL;
    link->data = p;
} init_q(q)
    queue_t     *q;
{
    q->head = NULL;
    q->tail = NULL;
    q->count = 0;
} putq(link, q)
    queue_t     *q;
    qlink_t     *link;
{
    link->q = q;
    link->prev = q->tail;
    link->next = NULL;
    if (q->tail == NULL) {
        q->head = link;
    } else {
        q->tail->next = link;
    }
    q->tail = link;
    q->count++;
} putq_before(link, before)
    qlink_t     *link;
```

```
        qlink_t    *before;
{
    queue_t    *q;

q = before->q;
    link->q = q;
    link->prev = before->prev;
    link->next = before;
    before->prev = link;
    if (IS_HEAD_LINK(link)) {
        q->head = link;
    } else {
        link->prev->next = link;
    }
    q->count++;
} putq_after(link, after)
    qlink_t    *link;
    qlink_t    *after;
{
    queue_t    *q;

q = after->q;
    link->q = q;
    if (q == NULL) {
        link->prev = after;
        link->next = after->next;
        after->next = link;
        if (IS_TAIL_LINK(link)) {
            q->tail = link;
        } else {
            link->next->prev = link;
        }
        q->count++;
    }
} putq_head(link, q)
    qlink_t    *link;
    queue_t    *q;
{
    link->q = q;
    link->next = q->head;
    link->prev = NULL;
    if (q->head == NULL) {
        q->tail = link;
    } else {
        q->head->prev = link;
    }
``` q.c

```
        q->head = link;
        q->count++;
}
putq_tail(link, q)
    qlink_t    *link;
    queue_t    *q;
{
    putq(link, q);
} rmq(link)
    qlink_t    *link;
{
    queue_t    *q;

q = link->q;
    if (link->next == NULL) {
        q->tail = link->prev;
    } else {
        link->next->prev = link->prev;
    }
    if (link->prev == NULL) {
        q->head = link->next;
    } else {
        link->prev->next = link->next;
    }
    link->prev = NULL;
    link->next = NULL;
    link->q = NULL;
    q->count--;
} int    *
traverse_q(q, func, arg)
    queue_t    *q;
    int        *(*func) ();
    int        *arg;
{
    qlink_t    *link;
    qlink_t    *next;
    int        *ret;

ret = NULL;
    for (link = q->head; link != NULL; link = next) {
        next = link->next;
        ret = (*func) (link->data, arg);
        if (ret != NULL) {
            break;
```

```
            }
        }
        return (ret);
} putq_sorted(link, q, func)
    qlink_t    *link;
    queue_t    *q;
    int        (*func) ();
{
    qlink_t    *cur;
    qlink_t    *next;
    int        ret;

ret = 1;
    for (cur = q->head; cur != NULL; cur = next) {
        next = cur->next;
        ret = (*func) (link, cur);
        if (ret <= 0) {
            putq_before(link, cur);
            break;
        }
    }
    if (ret > 0) {
        putq_tail(link, q);
    }
}
```

```c
/* q.h
 * COPYRIGHT 1992 ADAPTIVE CORPORATION
 * ALL RIGHTS RESERVED
 *
 ***************************END***************************/ ifndef Q_H
define Q_H ifndef NULL
define NULL (0)
endif          /* !NULL */ struct qlink_s {
    struct qlink_s *prev;
    struct qlink_s *next;
    struct queue_s *q;
    int          *data;
};
typedef struct qlink_s qlink_t;
#define SIZE_QLINK (sizeof(qlink_t))

struct queue_s {
    qlink_t     *head;
    qlink_t     *tail;
    int         count;
};
typedef struct queue_s queue_t;
#define SIZE_QUEUE (sizeof(queue_t))

#define QUEUE_LEN(q)    ((q)->count)
#define IS_EMPTY_Q(q)   ((q)->head == NULL && (q)->tail == NULL)
#define HEAD_Q(q)       ((q)->head)
#define TAIL_Q(q)       ((q)->tail)
#define IS_HEAD_LINK(link)  ((link)->prev == NULL)
#define IS_TAIL_LINK(link)  ((link)->next == NULL)

extern int   *traverse_q();
extern int   put_sorted();
extern int   init_qlink();
extern int   init_q();
extern int   putq();
extern int   rmq();
extern int   put_before();
extern int   put_after();
extern int   put_head();
extern int   put_tail();

#endif          /* !Q_H */
```

SVC.C

```c
/* svc.c
 *
 * COPYRIGHT 1992 ADAPTIVE CORPORATION
 * ALL RIGHTS RESERVED
 *
 */ static char    sccsid[] = "%A%";

if  !defined(CERNEL) && defined(RT68K)
#define ERRLOG printdbg
define printf printdbg
endif
include "atm.h"
include "svc.h"
#include "unipdu.h"
#include "debug.h"
#include "svc_utl.h"
#include "if_atm.h"

/* debugging and tracing stuff */
#define TL1    1
#define TL2    svc_trace>1
#define TL3    svc_trace>2
#define TL4    svc_trace>3
define TL5    svc_trace>4 int       svc_trace = 2;

/*
 * switch virtual connection service
 *
 * This module provides basic virtual connection, or vc, management
 * services to users of the atm layer services. a service interface
 * to the SVC signaling protocol is provied via the sdu_input()
 * routine. In addition the virtual connection data structure, vcte,
 * provides hooks for upper layer protocols so that they need not
 * replicate functionality the signaling module requires itsself.
 * Each upper layer protocol must register routines to be called when
 * payload frames arrive and signaling service notifications arrive.
 * ulp_register() is used to register upper layer protocols. After a
 * protocol registers itsself it may interact with the signaling
 * module by sending/receiving signaling service data units (which
 * have the same structure as the signaling PDUs, found in unipdu.h).
 * The service data interface is describe in []. The call reference
 * field in the setup_request SDU is ignored. The call reference in
 * all other SDUs is a pointer to the virtual connection data
 * structure. Protocols may use this pointer to call svc_inc() and
 * svc_dec() to add references. Protocols may call
```

SVC.C
-184-

```
* svc_find_next_peer() to find all the vcte's is specific states.
* Typically this is used to find an existing connection to a peer
* for re-use.
*
* Pointers, Conventions & Data Structures
*
* vp points to a virtual connection table entrye, vcte. There is
* one vcte per virtual connection. Each vp is on two hash chains,
* one linked by call reference and one linked by peer address. pc
* points to the physical interface with which a pdu or vc is
* associated. Each physical interface has a pcif structure which
* describes the characteristics of the interface and has the virtual
* connection hash tables, pc_vcalltab[] & pc_vpeertab[] and incoming
* vpci lookup table, pc_ivpci_tab[]. pdu (points to) a
* protocol data unit xdu (points to) a protocol or service
* data unit sdu (points to) a service data unit pdu, sdu, &
* xdu all point to a buffer which can be extended at least as far as
* the largest supported UNI transmitted signaling data unit. atp
* points to an atm lan interface structure. Conceptually atm lans
* are layered above the virtual circuit (and aal) layers. The
* virtual circuit layer needs a list of list port addresses per
* physical interface. The atmif structures conveneintly have port
* addresses are are statically linked off pcif's at boot so this
* module uses (and manages) those port addresses. ulp  points to an
* upper layer protocol table entry, ulptab. A ulp uniquely
* identifies an upper layer protocol to which signaling SDUs and
* payload traffic are directed.
*
* Messages, allocation, non-reuse policy.
*
* Messages passed to us from below or above must be aligned on 4 byte
* boundaries. Messages are not re-used. When this module needs
* memory for a message it allocates a newti buffer by calling
* atm_alloc_msg(). This routine must provide an aligned  buffer at
* least 104 bytes long. Messages received are not re-used because
* while they may be large enough to hold a signaling pdu there is
* not a convenient way to determine where the physical buffer begins
* and ends. Rather than pass physical buffer boundaries around with
* the buffers they are simply not reused.
*
* Multicast Server VCs
*
* VCs with the VCTEF_MCAST_SERVER flag are connections to an ATM LAN
* multicast server. The network directs these requests to servers.
* These VCs do not actually carry payload. The vcte_ivpci and
* vcte_ovpci fields contain network specific control information for
* these VCs.  The server supplies these fields via setup request
* and response SDUs.
*/
```

SVC.C

```c
#include "niu.h"   /* how many interfaces */

/*
 * Due to the one of brain damaged OSes this code must execute upon
 * all global variables which are modified at run time must be
 * accessed via a pointer held by that OS.
 */ int     ulptab_size = NULPS;
int     ivpci_tab_size = IVPCI_TAB_SIZE;
int     vctab_size = VCTAB_SIZE;
int     svc_default_qos = LMI_QOS_PRIO_LO;
int     svc_ms_per_tick = 400;

svc_init_pcif(unit, in_peak_rate, out_peak_rate, max_vci, max_mtu)
{
    struct pcif   *pc;
    struct vcte   *vp;

pc = &svc_glob->svc_pcif[unit];
    atm_bzero(pc, sizeof *pc);
    pc->pc_num = unit;
    pc->pc_num_lans = atm_nnius[unit] <= NATMS ? atm_nnius[unit] : NATMS;
    pc->pc_hw_max_mtu = max_mtu;
    pc->pc_hw_max_vci = max_vci;
    pc->pc_opeak_rate = out_peak_rate;
    pc->pc_ipeak_rate = in_peak_rate;
    pc->pc_sig = ivc_create(pc, LMI_GLOBAL_CREF_TYPE, LMI_GLOBAL_CREF_VALUE,
            LMI_VPCI, LMI_VPCI, &atm_glob->atm_null,
        &atm_glob->atm_null, svc_glob->sig_ulp, 0, PAYLOAD_AAL_4);
    if (svc_pcm) {
        svc_new_state(pc->pc_sig, VCS_WGRC);
    } else {
        svc_new_state(pc->pc_sig, VCS_ACTIVE);
        pc->pc_sig->vcte_ticks = 0;
    }
    if (pc->pc_num_lans)
        atm_attach(pc);   /* if atm lans are configured attach
                * them */
    else
        atm_init();  /* needed even if no atm lans
            * configured */
    svc_sched_timeout(pc);
}

/*
 * Once every tick (controlled by svc_ms_per_tick) all the VCs are
```

SVC.C
-186-

```
 * scanned looking for timeout conditions. Both the signaling VC and
 * payload VCs are serviced from here. When vcte_ticks is
 * decremented to 0 either an IDU_TO or and IDU_MAX_RETRIES message
 * is sent to the VC state machine.
 */ int     svc_max_retrans[VCS_LAST + 1] = {0, 0, 0, 7, 7, 0, 7, -1, -1, -1, 7};
int     svc_new_ticks[VCS_LAST + 1] = {0, 0, 0, 2, 2, 0, 2, 4, 4, 4, 1};
int     svc_backoff[] = {1, 2, 4, 8, 16, 24, 24, 24, 24};
int     svc_max_retires = sizeof(svc_backoff) / sizeof(int);
int     svc_timed_states = (1 << VCS_WC) | (1 << VCS_WCACK) | (1 << VCS_WRC) |
(1 << VCS_WGRC) | (1 << VCS_WAR) | (1 << VCS_ACTIVE);
int     svc_backoff_states = (1 << VCS_WC) | (1 << VCS_WCACK) | (1 << VCS_WRC);

svc_timeout(pc)
    struct pcif   *pc;
{
    struct vcte   *vp, *next;
    struct release_comp *to;
    int           i;
    int           s;

if (pc->pc_sig->vcte_state == VCS_INACTIVE) {
        svc_sched_timeout(pc);
        return;
    }
    for (i = 0; i < VCALLTAB_SIZE; i++) {
      s = splimp();
      next = pc->pc_vcalltab[i];
      while (vp = next) {
        ASSERT(VALID_VP(next));
        next = vp->vcte_next_cref;
        if (vp->vcte_cref_type | vp->vcte_cref_value)
            /* not global cref */
            ASSERT(VALID_STATE(vp->vcte_state));
        if (vp->vcte_ticks == 0)   /* no timeouts scheduled */
            continue;
        ASSERT(VALID_STATE(vp->vcte_state));
        ASSERT((1 << vp->vcte_state) & svc_timed_states);
        vp->vcte_ticks--;
        if (vp->vcte_ticks <= 0) { /* timer has expired */
            if ((to = (struct release_comp *) atm_alloc_msg()) == 0) {
                /*
                 * no memory, schedule a
                 * timeout, and quit
                 */
                vp->vcte_ticks++; /* back off ticks for
                         * this vc */
                svc_sched_timeout(pc);
                return;
```

SVC.C
-187-

```
        }
      /*
       * send IDU_TO if retrans left else
       * send IDU_MAX_RETRIES
       */
      if (vp->vcte_timeouts < svc_max_retrans[vp->vcte_state]) {
          to->lmi_cref_type = vp->vcte_cref_type;
          to->lmi_cref_value = vp->vcte_cref_value;
          to->lmi_pdu_type = IDU_TO;
          vp->vcte_ticks = svc_backoff[vp->vcte_timeouts++] *
              svc_new_ticks[vp->vcte_state];
      } else
          to->lmi_pdu_type = IDU_MAX_RETRIES;
      svc_xdu(vp->vcte_pcif, vp, to, sizeof(*to));
    }
  }
  splx(s);
}
svc_sched_timeout(pc);
}

/*
 * The signaling software is accessed via svc_pdu() and svc_sdu().
 * Users call svc_sdu() with a sdu and the aal layer calls svc_pdu()
 * with a pdu. The caller is resposnible for pass messages in
 * contiguous memory properly aligned. The caller is responsible for
 * providing synchroniztion, i.e., grabbing some global semaphore,
 * turning off interrupts, etc. This routine horseshoes down but not
 * up. That is a service request will not trigger calls to an upper
 * layer sdu routine.
 *
 * Before calling svc_xdu() the vc table is searched for call reference
 * in the pdu. If none is found and the call refernece type is PVC
 * and the pdu type is a release then the call reference is assumed
 * to be an incoming vci. These are generated when the network
 * receives payload cells on a release VC.
 */ svc_pdu(pc, pdu, length)
    struct pcif   *pc;
    struct release *pdu;
    int           length;
{
    int           bad_pdu;
    struct vcte   *vp;

if (pdu->lmi_proto != LMI_PROTOCOL ||
        !svc_valid_pdu_type(pdu->lmi_pdu_type)) {
```

```
        atm_free_msg(pdu);
        return PROTOCOL_ERR;   /* invalid protocol or pdu
                * type */
    }
    /*
     * when sig vc is not active only accept pdus w/ global call
     * reference
     */
    if (pc->pc_sig->vcte_state != VCS_ACTIVE &&
        !(pdu->lmi_cref_type == LMI_GLOBAL_CREF_TYPE &&
          pdu->lmi_cref_value == LMI_GLOBAL_CREF_VALUE)) {
        TR0(TL3, "sig vc not active, pdu dropped\n");
        atm_free_msg(pdu);
        return NETWORK_UNAVAIL;
    }
    if (pdu->lmi_pdu_type <= LMI_PDU_LAST)
        svc_glob->svcstat.pdus_sent[pdu->lmi_pdu_type]++;
    /* if pdu doesnt parse ok, change pdu type to invalid */
    if (bad_pdu = svc_parse_xdu(pc, pdu, length)) {
        svc_glob->svcstat.parse_causes[bad_pdu]++;
        pdu->lmi_pdu_type = IDU_INVALID_PDU;
        LMI_SET_ELEMENT(&pdu->lmi_cause, LMI_RELEASE_CAUSE, bad_pdu);
        length = sizeof(*pdu);
    }
    vp = svc_find_cref(pc, pdu->lmi_cref_type, pdu->lmi_cref_value);
    /*
     * if call ref lookup fails and release pdu treat call ref as
     * a PVC vci
     */
    if (!vp && pdu->lmi_pdu_type == LMI_PDU_RELEASE &&
        pdu->lmi_cref_type == LMI_CREFTYPE_PVC)
        vp = ivpci_to_vcte(pc, pdu->lmi_cref_value);
    return svc_xdu(pc, vp, pdu, length);
}

/*
 * svc_sdu() does preliminary service data unit parsing and calls
 * svc_xdu() for the real work.
 */ svc_sdu(pc, vp, pdu, length)
    struct pcif    *pc;
    struct vcte    *vp;
    struct xdu     *pdu;
    int            *length;
{
    int            bad_pdu;

/* if the signaling VC is not active reject service requests */
    if (pc->pc_sig->vcte_state != VCS_ACTIVE) {
```

SVC.C
-189-

```
        atm_free_msg(pdu);
        return NETWORK_UNAVAIL;
    }
    ASSERT((pdu->lmi_cref_type & LMI_CREFTYPE_MASK) == LMI_CREFTYPE_SVC);
    /*
     * reject service requests with unknown encoding or invalid
     * request types
     */ if (pdu->lmi_proto != LMI_PROTOCOL ||
        !svc_valid_sdu_type(pdu->lmi_pdu_type)) {
        atm_free_msg(pdu);
        return UNKNOWN_MSG;
    } else if (bad_pdu = svc_parse_xdu(pc, pdu, length)) {
        svc_glob->svcstat.parse_causes[bad_pdu]++;
        atm_free_msg(pdu);
        return bad_pdu;
    }
    return svc_xdu(pc, vp, pdu, length);
}

/*
 * svc_xdu() service data units and protocol data units come here.
 * If they failed their respective parsing they have been turned into
 * IDU_INVALIDs which, in most cases result in release PDUs being
 * sent, via svc_reject_pdu(). Next the state specific routine for vp
 * is called. If vp is zero the routine for VCS_CLOSED,
 * svc_closed(), is called.
 */
int        svc_closed(), svc_wsr(), svc_wc(), svc_wcack(), svc_estab(), svc_wrc(),
           svc_inactive(), svc_active(), svc_wgrc(), svc_war(), panic();
int        (*(svc_state_functions[])) () = {
    panic, svc_closed, svc_wsr, svc_wc, svc_wcack, svc_estab,
    svc_wrc, svc_inactive, svc_wgrc, svc_war, svc_active
};
char       *svc_state_names[] = {"undefined", "closed", "wsr", "wc", "wcack",
"estab", "wrc", "inactive", "wgrc", "war", "active"};
int        svc_nnames = sizeof(svc_state_names) / sizeof(char *);

svc_xdu(pc, vp, pdu, len)
    struct pcif   *pc;  /* physical unit */
    struct vcte   *vp;
    struct xdu    *pdu;
    int           len;
{
    int           state, rtn, trace_level;

ASSERT(VALID_PC(pc));
    ASSERT(PDU_ALIGNED(pdu));
```

```
    ASSERT(len >= sizeof(struct lmi_hdr));

if (vp) {
        state = vp->vcte_state;
        if (vp->vcte_cref_type | vp->vcte_cref_value)
            /* if not global call reference */
            ASSERT(VALID_STATE(state));
    } else
        state = VCS_CLOSED;

if (pdu->lmi_cref_type | pdu->lmi_cref_value)
        trace_level = TL2;
    else
        trace_level = TL3;
    TR4(trace_level, "xdu vp=%x %s %s %d\n", vp,
        svc_state_names[state],
        svc_xdu_type_str(pdu->lmi_pdu_type), len);

if ((pdu->lmi_cref_type | pdu->lmi_cref_value) && TL2)
        svc_trace_pdu(pdu, len, 1, LMI_VPCI);

if (pdu->lmi_pdu_type == IDU_INVALID_PDU)
        rtn = svc_reject_pdu(pc, pdu, len, vp);
    else
        rtn = (*svc_state_functions[state]) (pc, pdu, len, vp);

TR3(trace_level, "xdue vp=%x %s %d\n", vp,
        vp ? svc_state_names[vp->vcte_state] : "was closed", rtn);
    return rtn;
}

/*
 * Clear any previous timers and set new ones.  Also log transitions
 * to new states.
 */
svc_new_state(vp, state)
    struct vcte   *vp;
{
    if (vp->vcte_state != state)
        svc_log_new_state(vp, state);
    vp->vcte_timeouts = 0;
    if ((1 << state) & svc_timed_states)
        vp->vcte_ticks = svc_new_ticks[state];
    else
        vp->vcte_ticks = 0;

vp->vcte_state = state;
}
```

SVC.C
-191-

```c
/*
 * State function for signaling vc in inactive state should never be
 * called.
 */
svc_inactive(pc, pdu, len, vp)
    struct pcif    *pc;
    struct xdu     *pdu;
    int            len;
    struct vcte    *vp;
{
    atm_free_msg(pdu);
}

/*
 * State function for signaling vc in waiting for global release
 * state. The signaling VC stays in WGRC until we geta a global
 * release_comp. config status enq/resps are ignored. Other status
 * enquires and responses are processed normally. There is no limit
 * to how long we stay in this state (svc_new_state() resets the
 * number of timeouts to zero.)
 */
svc_wgrc(pc, pdu, len, vp)
    struct pcif    *pc;
    struct xdu     *pdu;
    int            len;
    struct vcte    *vp;
{
    switch (pdu->lmi_pdu_type) {
    case LMI_PDU_STATUS_RESP:
    case LMI_PDU_STATUS_ENQ:
        if (pdu->lmi_status_type != LMI_STATUS_CONFIG)
            svc_status(pc, pdu, len, vp);
    case IDU_TO:
    case IDU_MAX_RETRIES:  /* fallen into */
        svc_new_state(vp, VCS_WGRC);  /* to reset timer &
                          * timeout count */
        svc_send_release(vp);
        break;
    case LMI_PDU_RELEASE:
        svc_send_release_comp(vp);
        break;
    case LMI_PDU_RELEASE_COMP:
        svc_new_state(vp, VCS_WAR);
        svc_request_config(pc);
        break;
    }
    atm_free_msg(pdu);
    return 0;
}
```

```
/*
 * State function for signaling vc in waiting for address response
 * state. This state is left when we receive a response to one of
 * our config requests. svc_reconfig() actually changes the state to
 * active. releases and release_comps do not effect us because we
 * have come through the WGRC state insuring that all VCs have been
 * cleared and we reject any attempts to setup new VCs in this state.
 */
svc_war(pc, pdu, len, vp)
    struct pcif    *pc;
    struct xdu     *pdu;
    int            len;
    struct vcte    *vp;
{
    switch (pdu->lmi_pdu_type) {
    case IDU_TO:
    case IDU_MAX_RETRIES:
        svc_new_state(vp, VCS_WAR);   /* to reset timer &
                       * timeout count */
        svc_request_config(pc);
        break;
    case LMI_PDU_STATUS_ENQ:
        if (pdu->lmi_status_type == LMI_STATUS_CONFIG)
            svc_send_config(pc);
        else
            svc_status(pc, pdu, len, vp);
        break;
    case LMI_PDU_STATUS_RESP:
        if (pdu->lmi_status_type == LMI_STATUS_CONFIG)
            svc_reconfig(pc, pdu, len, vp);  /* sets state to ACTIVE */
        else
            svc_status(pc, pdu, len, vp);
        break;
    case LMI_PDU_RELEASE:
        svc_send_release_comp(vp);
        break;
    case LMI_PDU_RELEASE_COMP:
        break;
    }
    atm_free_msg(pdu);
    return 0;
}

/*
 * state function for signaling vc is active, we just send keep
 * alives and hope not to get releases, after max retries we release
 * all vcs, send a global release & go to waiting for global release
 * complete.
```

```
*/ svc_active(pc, pdu, len, vp)
    struct pcif    *pc;
    struct xdu     *pdu;
    int            len;
    struct vcte    *vp;
{
    struct atmif   *atp;

switch (pdu->lmi_pdu_type) {
    case IDU_TO:
        svc_request_config(pc);
        break;
    case LMI_PDU_STATUS_ENQ:
        if (pdu->lmi_status_type == LMI_STATUS_CONFIG)
            svc_send_config(pc);
        else
            svc_status(pc, pdu, len, vp);
        break;
    case LMI_PDU_STATUS_RESP:
        if (pdu->lmi_status_type != LMI_STATUS_CONFIG) {
            svc_status(pc, pdu, len, vp);
            break;
        } else if (svc_check_config(pc, pdu, len)) {
            vp->vcte_cause = 0;
            svc_new_state(vp, VCS_ACTIVE);   /* config same, reset
                         * timeouts */
            break;
        } else
            vp->vcte_cause = NUMBER_CHANGED;
    /*
     * If we get here we must delete all atm lans,
     * release all VCs and vcte_cause is set so it gets
     * logged corectly. We sned a release_comp if a
     * release triggered this.
     */
    case IDU_MAX_RETRIES:
    case LMI_PDU_RELEASE:    /* fallen into */
        svc_release_all(vp);
        svc_send_release(vp);
        if (pdu->lmi_pdu_type == LMI_PDU_RELEASE) {
            svc_set_cause(vp);
            svc_send_release_comp(vp);
        } else if (pdu->lmi_pdu_type == IDU_MAX_RETRIES)
            vp->vcte_cause = NETWORK_TIMEOUT;
        svc_new_state(vp, VCS_WGRC);
        for (atp = pc->pc_atmif; atp; atp = atp->ati_next)
            atm_delete_lan(atp);
        break;
```

SVC.C
-194-

```c
    }
free_and_out:
    atm_free_msg(pdu);
    return 0;
}

/*
 * svc_check_config() returns true if this config_resp is the same as
 * the last.
 */
svc_check_config(pc, pdu, len)
    struct pcif    *pc;
    struct config  *pdu;
    int            len;
{
    int       rtn;

if (!pc->pc_last_config) {
        pc->pc_last_config = (u_char *) atm_alloc_msg();
        if (!pc->pc_last_config) {
            printf("svc_check_config: no memory\n");
            return 0;
        }
        pc->pc_last_config_len = 0;
    }
    /*
     * dumb, simple, but almost foolproof check for configuration
     * changes.
     */
    rtn = (pc->pc_last_config_len == len &&
        (atm_bcmp(pc->pc_last_config, pdu, len) == 0));
    return rtn;
}

/*
 * 2. set maximums based on LMI_CONFIG element 3a. if port element
 * then add one lan per element. 3a. else configure for back-to-back
 * operation.
 */ svc_reconfig(pc, pdu, len, vp)
    struct pcif       *pc;
    struct status_enq *pdu;
    int               len;
    struct vcte       *vp;
{
    struct config_elem    *ce;
    struct port_addr_elem *pae;
    struct atmif          *atp;
```

SVC.C
-195-

```c
ASSERT(pdu->lmi_pdu_type == LMI_PDU_STATUS_RESP);
ASSERT(pdu->lmi_status_type == LMI_STATUS_CONFIG);
ASSERT(SVC_PARSED(LMI_CONFIG_ENQ));
ASSERT(SVC_PARSED(LMI_CONFIG_RESP));

ce = (struct config_elem *) SVC_GET(LMI_CONFIG_RESP);

pc->pc_net_max_vci = ce->af_max_vci;
pc->pc_net_max_vcs = ce->af_max_vcs;
pc->pc_net_max_qos = ce->af_max_qos;
if (!pc->pc_last_config) {
   pc->pc_last_config = (u_char *) atm_alloc_msg();
   if (!pc->pc_last_config) {
      printf("svc_reconfig: no memory\n");
      return;
   }
}
atm_bcopy(pdu, pc->pc_last_config, len);
pc->pc_last_config_len = len;
svc_new_state(vp, VCS_ACTIVE);
if (!SVC_PARSED(LMI_PORT_ADDR)) {
   if (ce->af_my_address.aa_type != AAT_MAC) {
      pc->pc_flags = 0;
      return;
   }
   /* configure back-to-back niu's */
   pc->pc_flags |= PCIF_NIU_TO_NIU;
   if (ATM_ADDR_GT(ce->af_my_address, pc->pc_atmif->ati_mac))
      pc->pc_flags |= PCIF_OTHER_MAC_ADDR_IS_HIGHER;
   for (atp = pc->pc_atmif; atp; atp = atp->ati_next)
      atm_niu_to_niu(atp);

return;
}
/* configure one atm lan per port_addr element */
pc->pc_flags &= ~(PCIF_NIU_TO_NIU | PCIF_OTHER_MAC_ADDR_IS_HIGHER);
pae = (struct port_addr_elem *) SVC_GET(LMI_PORT_ADDR);
atp = pc->pc_atmif;
while (((caddr_t) pae < (caddr_t) pdu + len) && atp) {
   ASSERT(pae->af_type == LMI_PORT_ADDR);
   atm_add_lan(atp, pae->af_port,
      pae->af_mid, pae->af_mcasts, pae->af_mtu);
   pae++;
   atp = atp->ati_next;
}
}

/*
 * send our configuration in respond to the parsed config enq. Our
```

```
 * config_elem is based upon compiled table sizes and the h/w vci
 * lookup table.
 */
svc_send_config(pc)
    struct pcif    *pc;
{
    int         len;
    struct config_elem *ce;
    struct status_enq *pdu;

if (!(pdu = (struct status_enq *)
            svc_alloc_pdu(LMI_PDU_STATUS_RESP, pc->pc_sig)))
        return 0;
    pdu->lmi_status_type = LMI_STATUS_CONFIG;
    ASSERT(SVC_PARSED(LMI_CONFIG_ENQ));
    ce = (struct config_elem *) & pdu[1];
    /* copy requestors config info to resp */
    *ce++ = *(struct config_elem *) SVC_GET(LMI_CONFIG_ENQ);
    /* then add our config_elem */
    ce->af_type = LMI_CONFIG_RESP;
    svc_add_config(pc, ce);
    len = sizeof(*pdu) + sizeof(*ce) * 2;
    aal_send_msg(pc->pc_sig, 0, pdu, len);
}
/*
 * send request for configuration, include our config_elem
 */
svc_request_config(pc)
    struct pcif    *pc;
{
    struct config_elem *ce;
    struct status_enq *pdu;

ASSERT(VALID_PC(pc));
    if (!(pdu = (struct status_enq *)
            svc_alloc_pdu(LMI_PDU_STATUS_ENQ, pc->pc_sig)))
        return 0;
    pdu->lmi_status_type = LMI_STATUS_CONFIG;
    ce = (struct config_elem *) & pdu[1];
    ce->af_type = LMI_CONFIG_ENQ;
    svc_add_config(pc, ce);
    aal_send_msg(pc->pc_sig, 0, pdu, sizeof(*pdu) + sizeof(*ce));
} svc_add_config(pc, ce)
    struct pcif    *pc;
    struct config_elem *ce;
{
    ce->af_version = LMI_VERSION;
    ce->af_max_vci = pc->pc_hw_max_vci;
```

SVC.C
-197-

```
    ce->af_max_vcs = VCTAB_SIZE;
    ce->af_max_qos = 0;
    ce->af_my_address = pc->pc_atmif->atl_mac;
}

/*
 * state function for payload vc, vc is closed. we allocate a vcte
 * structure. all pdus other than setup are ignored. This should
 * probably send releases. and hope not to get releases, after max
 * retries we release all vcs, send a global release &  go to waiting
 * for global release complete.
 */ svc_closed(pc, pdu, len, vp)
    struct pcif   *pc;
    struct xdu    *pdu;
    int           len;
    struct vcte   *vp;
{
    int        error = 0;

switch (pdu->lmi_pdu_type) {
    case SDU_SETUP_REQ:
        ASSERT(!vp);
        vp = svc_alloc_vcte(pc, pdu);
        if (!vp) {
            error = NO_RESOURCES;
            break;
        }
        if (error = svc_setup_req_unsalvageable(pdu, vp)) {
            svc_close(vp);
            break;
        }
        svc_update_user_info(vp);
        svc_new_state(vp, VCS_WC);
        svc_send_setup(vp);
        break;
    case SDU_RELEASE_REQ:
    case SDU_SETUP_RESP:
        atm_free_msg(pdu);
        return INVALID_STATE;
        break;

case LMI_PDU_SETUP:
        ASSERT(!vp);
        vp = svc_alloc_vcte(pc, pdu);  /* we need to alloc a vp
                 * to sent a release ! */
        if (!vp)
            break;   /* try to get mem when setup
```

```
                 * retransmitted */
    if (svc_setup_unsalvageable(pdu, vp)) {
        svc_send_release(vp);
        svc_close(vp);
    } else {
        svc_update_user_info(vp);
        svc_new_state(vp, VCS_WSR);
        svc_send_setup_ind(vp);
    }
    break;
case LMI_PDU_STATUS_ENQ:
case LMI_PDU_CONNECT:
case LMI_PDU_CONNECT_ACK:  /* turn misguided pdu into a
                            * release and send it */
    svc_send_release_pdu(pc, pdu, len);
    return 0;
case LMI_PDU_RELEASE:   /* our release comp may have been
                         * dropped */
    pdu->lmi_cref_type ^= LMI_CREFDIRECTION_MASK;
    pdu->lmi_pdu_type = LMI_PDU_RELEASE_COMP;
    aal_send_msg(pc->pc_sig, 0, pdu, sizeof(struct release_comp));
    return 0;
case LMI_PDU_RELEASE_COMP:
case LMI_PDU_STATUS_RESP:
    break;
}
atm_free_msg(pdu);
return error;
}

/*
 * state function for payload vc, vc is waiting for a setup resp from
 * user.
 */ svc_wsr(pc, pdu, len, vp)
    struct pcif   *pc;
    struct xdu    *pdu;
    int           len;
    struct vcte   *vp;
{
    switch (pdu->lmi_pdu_type) {
    case SDU_SETUP_REQ:
        atm_free_msg(pdu);
        return INVALID_STATE;
    case SDU_SETUP_RESP:
        ASSERT(VALID_VP(vp));
        svc_setup_resp_vcis(pdu, vp);
```

```
      svc_update_user_info(vp);
      svc_new_state(vp, VCS_WCACK);
      svc_send_connect(vp);
      break;
    case SDU_RELEASE_REQ:
      svc_update_user_info(vp);
      svc_set_cause(vp);
      svc_new_state(vp, VCS_WRC);
      svc_send_release(vp);
      break;
    case LMI_PDU_SETUP:
    case LMI_PDU_CONNECT:
    case LMI_PDU_CONNECT_ACK:
      break;     /* protocol voilation, ignore */
    case LMI_PDU_RELEASE:
      svc_update_user_info(vp);
      svc_set_cause(vp);
      svc_send_release_comp(vp);
    case LMI_PDU_RELEASE_COMP: /* fallen into */
      svc_send_release_ind(vp);
      svc_close(vp);
      break;
    case LMI_PDU_STATUS_ENQ:
    case LMI_PDU_STATUS_RESP:
      svc_status(pc, pdu, len, vp);
      break;
    }
    atm_free_msg(pdu);
    return 0;
}

/*
 * state function for payload vc, vc is waiting for a connect from
 * peer
 */
svc_wc(pc, pdu, len, vp)
    struct pcif   *pc;
    struct xdu    *pdu;
    int           len;
    struct vcte   *vp;
{
    switch (pdu->lmi_pdu_type) {
    case LMI_PDU_CONNECT:
      /*
       * if negoiation succeeds goto estab otherwise start
       * releasing
       */
      if ((vp->vcte_cause = svc_connect_unsalvageable(pdu, vp)) == 0) {
        svc_new_state(vp, VCS_ESTAB);
```

SVC.C
-200-

```c
      svc_send_cack(vp);
      svc_update_user_info(vp);
      svc_send_setup_conf(vp);
    } else {
      svc_new_state(vp, VCS_WRC);
      svc_send_release(vp);
      svc_send_release_ind(vp);
    }
    break;
  case IDU_TO:
    svc_send_setup(vp);
    break;
  case IDU_MAX_RETRIES:   /* give up and start releasing */
    vp->vcte_cause = NO_ANSWER_FROM_USER;
    svc_new_state(vp, VCS_WRC);
    svc_send_release(vp);
    svc_send_release_ind(vp);
    break;
  case SDU_SETUP_REQ:
  case SDU_SETUP_RESP:
    atm_free_msg(pdu);
    return INVALID_STATE;
  case SDU_RELEASE_REQ:   /* user releases, start releasing */
    svc_update_user_info(vp);
    svc_set_cause(vp);
    svc_new_state(vp, VCS_WRC);
    svc_send_release(vp);
    break;
  case LMI_PDU_RELEASE:
    svc_update_user_info(vp);
    svc_set_cause(vp);
    svc_send_release_comp(vp);
  case LMI_PDU_RELEASE_COMP: /* fallen into */
    svc_send_release_ind(vp);
    svc_close(vp);
    break;
  case LMI_PDU_SETUP:
  case LMI_PDU_CONNECT_ACK:
    break;
  case LMI_PDU_STATUS_ENQ:
  case LMI_PDU_STATUS_RESP:
    svc_status(pc, pdu, len, vp);
    break;
  }
  atm_free_msg(pdu);
  return 0;
}

/*
```

SVC.C
-201-

```
 * connect negoiation, we blindly accept whatever peer incoming vci
 * he wants; we try to accomodate the peers outgoing vci, reassigning
 * if necessary. The setup_conf will inform user of final vci's. We
 * lower out outbound peak to the the peers inbound peak rate. We
 * told the peer our inbound max. If he is going to send fast we
 * reject with service unavailable.
 */ svc_connect_unsalvageable(pdu, vp)
    struct vcte    *vp;
    struct connect *pdu;
{
    vpci_t      vci;
    u_long      rate;

if (SVC_PARSED(LMI_IQOS_PEAK_BW)) { /* reset outbound peak */
        rate = SVC_GET(LMI_IQOS_PEAK_BW);
        if (rate < vp->vcte_opeak_rate)
            vp->vcte_opeak_rate = rate;
    }
    if (SVC_PARSED(LMI_OQOS_PEAK_BW) &&
        svc_parms[LMI_OQOS_PEAK_BW].par_value > vp->vcte_pcif->pc_ipeak_rate)
        return QOS_UNAVAILABLE; /* peer insists on sending
                * fast than we can recv */
    if (vp->vcte_flags & VCTEF_MCAST_SERVER) {
        ASSERT(vp->vcte_ivpci != 0);
        ASSERT(vp->vcte_ovpci != 0);
        return 0;  /* vci's are ignored on the multicast
            * server */
    }
    ASSERT(SVC_PARSED(LMI_IVPCI));
    if ((vci = SVC_GET(LMI_IVPCI)) != vp->vcte_ovpci)
        vp->vcte_ovpci = vci;
    ASSERT(SVC_PARSED(LMI_OVPCI));
    if ((vci = SVC_GET(LMI_OVPCI)) != vp->vcte_ivpci) {
        /* ivpci changed */
        if (ivpci_to_vcte(vp->vcte_pcif, vci))
            /* if new one already in use */
            return vp->vcte_cause = VCI_UNACCEPTABLE;
        ASSERT(vp->vcte_pcif->pc_ivpci_tab[vp->vcte_ivpci] == vp);
        vp->vcte_pcif->pc_ivpci_tab[vp->vcte_ivpci] = 0;
        vp->vcte_pcif->pc_ivpci_tab[vci] = vp;
        vp->vcte_ivpci = vci;
    }
    return 0;
}

/*
 * setup negoiation; we negoiate peer ovpci's and we blindly accept
```

SVC.C
-202-

```
 * peer ivpci's because we could care less if they want to screw
 * themselves. After calling this routine both the vci's will be
 * assigned. The user isn't allowed to change vci's.
 */ svc_setup_unsalvageable(pdu, vp)
    struct connect *pdu;
    struct vcte   *vp;
{
    vpci_t     vci;

if (!svc_find_parsed_ulp())
        return vp->vcte_cause = ULP_UNAVAILABLE;
    if (vp->vcte_flags & VCTEF_MCAST_SERVER)
        return 0;   /* vci's are ignored on the multicast
                     * server */
    /* set peak rates giving preference to requested values */
    if (SVC_PARSED(LMI_IQOS_PEAK_BW)) {
        vp->vcte_opeak_rate = SVC_GET(LMI_IQOS_PEAK_BW);
        if (vp->vcte_opeak_rate > vp->vcte_pcif->pc_opeak_rate)
            vp->vcte_opeak_rate = vp->vcte_pcif->pc_opeak_rate;
    } else
        vp->vcte_opeak_rate = vp->vcte_pcif->pc_opeak_rate;
    if (SVC_PARSED(LMI_OVPCI)) {  /* check that ivpci is
                                   * available */
        if (ivpci_to_vcte(vp->vcte_pcif, SVC_GET(LMI_OVPCI))) {
            /* request ivpci is in use, pick another */
            if ((vci = svc_get_ivpci(vp->vcte_pcif)) == 0)
                return vp->vcte_cause = NO_VCI_AVAIL;
        } else
            vci = SVC_GET(LMI_OVPCI);
    } else if ((vci = svc_get_ivpci(vp->vcte_pcif)) == 0)
        return vp->vcte_cause = NO_VCI_AVAIL;
    vp->vcte_ivpci = vci;
    vp->vcte_pcif->pc_ivpci_tab[vci] = vp;
    /* use requested ovpci, if none requested use ivpci */
    if (SVC_PARSED(LMI_IVPCI))
        vp->vcte_ovpci = SVC_GET(LMI_IVPCI);
    else
        vp->vcte_ovpci = vp->vcte_ivpci;
    return 0;
}

/*
 * similar to setup pdu negoiation, only the users notion of incoming
 * is the same as ours.
 */
svc_setup_req_unsalvageable(pdu, vp)
```

SVC.C
-203-

```c
    struct connect *pdu;
    struct vcte    *vp;
{
    vpci_t      vci;
    struct ulptab *ulp;

if ((ulp = vp->vcte_ulp) == 0)
        return vp->vcte_cause = ULP_UNAVAILABLE;
    if (vp->vcte_flags & VCTEF_MCAST_SERVER) {  /* use server provided
                * values */
        if (SVC_PARSED(LMI_IVPCI))
            vp->vcte_ivpci = SVC_GET(LMI_IVPCI);
        if (SVC_PARSED(LMI_OVPCI))
            vp->vcte_ovpci = SVC_GET(LMI_OVPCI);
        return 0;  /* do not update pc_ivpci_tab[] */
    }
    /* set peak rates giving preference to requested values */
    vp->vcte_opeak_rate = SVC_PARSED(LMI_OQOS_PEAK_BW) ?
        SVC_GET(LMI_OQOS_PEAK_BW) : vp->vcte_pcif->pc_opeak_rate;
    if (SVC_PARSED(LMI_IVPCI)) {  /* user thinks he knows a
                * good ivpci ! */
        if (ivpci_to_vcte(vp->vcte_pcif, SVC_GET(LMI_IVPCI))) {  /* he was wrong */
            ASSERT(vp->vcte_pcif->pc_ivpci_tab[vp->vcte_ivpci] == vp);
            /* try to allocate a ivpci not already in use */
            if ((vci = svc_get_ivpci(vp->vcte_pcif)) == 0)
                return vp->vcte_cause = VCI_UNACCEPTABLE;
        } else
            vci = SVC_GET(LMI_IVPCI);
    } else if ((vci = svc_get_ivpci(vp->vcte_pcif)) == 0)
        return vp->vcte_cause = VCI_UNACCEPTABLE;
    vp->vcte_ivpci = vci;
    vp->vcte_pcif->pc_ivpci_tab[vci] = vp;
    /*
     * if user did not request an ovpci then use 0 (which means
     * non specified yet)
     */
    if (SVC_PARSED(LMI_OVPCI))
        vp->vcte_ovpci = SVC_GET(LMI_OVPCI);
    else
        vp->vcte_ovpci = 0;
    return 0;
}

/*
 * setup resp vci allocation for mcast_server VCs. vci's for other
 * VCs are allocated when the setup pdu or setup request sdu is
 * received.
 */
svc_setup_resp_vcis(pdu, vp)
    struct connect *pdu;
```

```
        struct vcte   *vp;
{
    if (vp->vcte_flags & VCTEF_MCAST_SERVER) {   /* use server provided
                    * values */
        if (SVC_PARSED(LMI_IVPCI))
            vp->vcte_ivpci = SVC_GET(LMI_IVPCI);
        if (SVC_PARSED(LMI_OVPCI))
            vp->vcte_ovpci = SVC_GET(LMI_OVPCI);
        /* do not update pc_ivpci_tab[] */
    }
    return 0;
}

/*
 * state function for payload vc, vc is waiting for a connect ack
 * from initiator
 */
svc_wcack(pc, pdu, len, vp)
    struct pcif   *pc;
    struct xdu    *pdu;
    int           len;
    struct vcte   *vp;
{
    switch (pdu->lmi_pdu_type) {
    case LMI_PDU_SETUP:   /* looks like our connect was dropped */
        svc_send_connect(vp);   /* so retransmit it */
        break;
    case LMI_PDU_CONNECT:   /* protocol violation */
        break;
    case LMI_PDU_CONNECT_ACK:   /* notify user vc is
                * established */
        svc_new_state(vp, VCS_ESTAB);
        svc_send_setup_comp(vp);
        break;
    case IDU_TO:      /* retransmit connect */
        svc_send_connect(vp);
        break;
    case IDU_MAX_RETRIES:   /* give up and start releasing */
        vp->vcte_cause = NO_ANSWER_FROM_USER;
        svc_new_state(vp, VCS_WRC);
        svc_send_release(vp);
        svc_send_release_ind(vp);
        break;
    case SDU_SETUP_REQ:
    case SDU_SETUP_RESP:   /* reject confused user requests */
        atm_free_msg(pdu);
        return INVALID_STATE;
    case SDU_RELEASE_REQ:
```

SVC.C

```c
        svc_update_user_info(vp);
        svc_set_cause(vp);
        svc_new_state(vp, VCS_WRC);
        svc_send_release(vp);
        break;
    case LMI_PDU_RELEASE:
        svc_update_user_info(vp);
        svc_set_cause(vp);
        svc_send_release_comp(vp);
    case LMI_PDU_RELEASE_COMP: /* fallen into */
        svc_send_release_ind(vp);
        svc_close(vp);
        break;
    case LMI_PDU_STATUS_ENQ:
    case LMI_PDU_STATUS_RESP:
        svc_status(pc, pdu, len, vp);
        break;
    }
    atm_free_msg(pdu);
    return 0;
}

/*
 * state function for payload vc, vc is established. Just wait
 * around for release pdu or request. If a setup is received then
 * release this vc and call closed state function for the pdu.
 */ svc_estab(pc, pdu, len, vp)
    struct pcif    *pc;
    struct xdu     *pdu;
    int            len;
    struct vcte    *vp;
{
    /* ignore all pdus except status enq/resp for PVCs */
    if ((vp->vcte_cref_type & LMI_CREFTYPE_MASK) == LMI_CREFTYPE_PVC &&
        (pdu->lmi_pdu_type == LMI_PDU_STATUS_ENQ ||
         pdu->lmi_pdu_type == LMI_PDU_STATUS_RESP)) {
        atm_free_msg(pdu);
        return 0;
    }
    switch (pdu->lmi_pdu_type) {
    case LMI_PDU_SETUP:  /* closed this VC and start seting up
                          * another */
        vp->vcte_cause = NORMAL_RELEASE;
        svc_send_release_ind(vp);
        svc_close(vp);
        return svc_closed(pc, pdu, len, (struct vcte *) 0);
    case LMI_PDU_CONNECT:  /* retransmit connect_ack for peer */
```

```
      svc_send_cack(vp);
      break;
   case LMI_PDU_CONNECT_ACK:  /* duplicate, ignored */
      break;
   case IDU_TO:
   case IDU_MAX_RETRIES:
      panic("svc_estab timeout");
      break;
   case SDU_SETUP_REQ:
   case SDU_SETUP_RESP:
      atm_free_msg(pdu);
      return INVALID_STATE;
   case SDU_RELEASE_REQ:
      svc_update_user_info(vp);
      svc_set_cause(vp);
      svc_new_state(vp, VCS_WRC);
      svc_send_release(vp);
      break;
   case LMI_PDU_RELEASE:
      svc_update_user_info(vp);
      svc_set_cause(vp);
      svc_send_release_comp(vp);
   case LMI_PDU_RELEASE_COMP:  /* fallen into */
      svc_send_release_ind(vp);
      svc_close(vp);
      break;
   case LMI_PDU_STATUS_ENQ:
   case LMI_PDU_STATUS_RESP:
      svc_status(pc, pdu, len, vp);
      break;
   }
   atm_free_msg(pdu);
   return 0;
}

/*
 * state function for payload vc, vc is waiting for a release
 * complete. No user requests are valid. After max retries or a
 * release from our peer we close vc out. Everything else (except
 * status enq/resps) are ignored.
 */
svc_wrc(pc, pdu, len, vp)
   struct pcif   *pc;
   struct xdu    *pdu;
   int           len;
   struct vcte   *vp;
{
   switch (pdu->lmi_pdu_type) {
   case SDU_SETUP_REQ:
```

SVC.C
-207-

```c
        case SDU_SETUP_RESP:
            atm_free_msg(pdu);
            return INVALID_STATE;
        case LMI_PDU_SETUP:
        case LMI_PDU_CONNECT_ACK:
        case LMI_PDU_CONNECT:
        case SDU_RELEASE_REQ:
            break;
        case IDU_TO:
            svc_send_release(vp);
            break;
        case LMI_PDU_RELEASE:
            svc_send_release_comp(vp);
        case IDU_MAX_RETRIES:   /* fallen into */
        case LMI_PDU_RELEASE_COMP:
            svc_close(vp);
            break;
        case LMI_PDU_STATUS_ENQ:
        case LMI_PDU_STATUS_RESP:
            svc_status(pc, pdu, len, vp);
            break;
    }
    atm_free_msg(pdu);
    return 0;
}

/*
 * svc_set_cause() is called after a release pdu or release_req sdu
 * is received. vcte_cause is updated.
 */ svc_set_cause(vp)
    struct vcte   *vp;
{
    if (SVC_PARSED(LMI_RELEASE_CAUSE))
        vp->vcte_cause = SVC_GET(LMI_RELEASE_CAUSE);
    else
        vp->vcte_cause = NORMAL_RELEASE;
}

/*
 * this routine updates the user_info field of the vcte from the xdu
 * last parsed. The pdu had better still be around as the parse
 * routines just set a pointer into the pdu.
 */
svc_update_user_info(vp)
    struct vcte   *vp;
{
    struct lmi_uinfo *ui;
```

SVC.C
-208-

```c
if (SVC_PARSED(LMI_USER_INFO)) {
    ui = (struct lmi_uinfo *) SVC_GET(LMI_USER_INFO);
    if (vp->vcte_user_info == 0)
        vp->vcte_user_info = atm_alloc_msg();
    ASSERT(ui->af_len <= LMI_MAX_UINFO);
    atm_bcopy(ui->af_value, vp->vcte_user_info, ui->af_len);
    vp->vcte_user_info_len = ui->af_len;
} else {
    if (vp->vcte_user_info)
        atm_free_msg(vp->vcte_user_info);
    vp->vcte_user_info = 0;
}
}

/*
 * svc_alloc_vcte() allocates a VC table entry and fills in
 * appropriate fields based upon elements parsed by svc_parse_xdu().
 * Call references are generated here for setup_req's, the time
 * being.
 */
struct vcte *
svc_alloc_vcte(pc, pdu)
    struct pcif   *pc;
    struct setup  *pdu;
{
    struct vcte    *vp;
    struct atm_addr *local, *peer;
    int             i;
    struct lmi_ulp *lu;

ASSERT(pdu->lmi_pdu_type == LMI_PDU_SETUP ||
        pdu->lmi_pdu_type == SDU_SETUP_REQ);
    ASSERT(VALID_PC(pc));
    /* grab free vcte entry */
    if (!(vp = svc_glob->vcte_free)) {
        svc_glob->svcstat.msg_alloc_failures++;
        return vp;
    }
    svc_glob->svcstat.vctes++;
    pc->pc_num_vcs++;
    ASSERT(VALID_VP(vp));
    svc_glob->vcte_free = vp->vcte_next_cref;
    /* update free list head */
    atm_bzero(vp, sizeof(*vp));
    vp->vcte_pcif = pc;
    /* set call reference and insert in cref hash table */
    vp->vcte_cref_value = pdu->lmi_cref_value;
    vp->vcte_cref_type = pdu->lmi_cref_type;
    if (pdu->lmi_pdu_type == LMI_PDU_SETUP) {
```

SVC.C
-209-

```c
        peer = &pdu->lmi_caller;
        local = &pdu->lmi_callee;
    } else {    /* SDU_SETUP_REQ */
        vp->vcte_cref_type |= LMI_CREFDIRECTION_MASK;
        if (vp->vcte_cref_value == 0)
            vp->vcte_cref_value = (u_long) vp & 0xffffff;
        peer = &pdu->lmi_callee;
        local = &pdu->lmi_caller;
    }
    i = VCALL_HASH(vp->vcte_cref_value);
    vp->vcte_next_cref = pc->pc_vcalltab[i];
    pc->pc_vcalltab[i] = vp;

/*
     * set local and peer addresses and insert in peer addr hash
     * table
     */
    vp->vcte_local = *local;
    vp->vcte_peer = *peer;
    i = VPEER_HASH(&vp->vcte_peer);
    vp->vcte_next_peer = pc->pc_vpeertab[i];
    pc->pc_vpeertab[i] = vp;

/*
     * set mcast and pvc flags, stations and multicast servers
     * are distinct
     */
    if (peer->aa_type == AAT_MAC)
        vp->vcte_flags = VCTEF_MCAST_CLIENT;
    else if (local->aa_type == AAT_MAC)
        vp->vcte_flags = VCTEF_MCAST_SERVER;
    vp->vcte_ulp = svc_find_parsed_ulp();
    ulp_tax(vp->vcte_ulp);
    ASSERT(vp->vcte_ulp != 0);
    if (!SVC_PARSED(LMI_DEST_ULP)) { /* symmetric ulps */
        lu = (struct lmi_ulp *) SVC_GET(LMI_ULP);
    } else {    /* peer ulp is different from local */
        lu = (struct lmi_ulp *) SVC_GET(LMI_DEST_ULP);
    }
    vp->vcte_pid = lu->af_pid;
    vp->vcte_org = lu->af_org;
    vp->vcte_aal = lu->af_aal;
    svc_update_user_info(vp);
    vp->vcte_state = VCS_CLOSED;
    vp->vcte_qos = SVC_PARSED(LMI_IQOS_SERVICE_CLASS) ?
        SVC_GET(LMI_IQOS_SERVICE_CLASS) : svc_default_qos;
    return vp;
}

/*
```

```
 * create a pvc, used for local creating vcs, signaling, raw access
 * etc.
 */ struct vcte  *
lvc_create(pc, ctype, cvalue, in, out, peer, local, ulp, atp, aal)
    struct pcif  *pc;
    int           in, out;
    struct atm_addr *peer, *local;
    struct ulptab *ulp;
    struct atmif  *atp;
{
    int           i;
    struct vcte   *vp;

if (ivpci_to_vcte(pc, in))
        return (struct vcte *) 0;
    if (in >= IVPCI_TAB_SIZE)
        return 0;

if (!(vp = svc_glob->vcte_free)) {
        return vp;
    }
    svc_glob->svcstat.vctes++;
    pc->pc_num_vcs++;
    ASSERT(VALID_VP(vp));
    svc_glob->vcte_free = vp->vcte_next_cref; /* update free list head */
    atm_bzero(vp, sizeof(*vp));
    vp->vcte_cref_type = ctype;
    vp->vcte_cref_value = cvalue;
    i = VCALL_HASH(vp->vcte_cref_value);
    vp->vcte_next_cref = pc->pc_vcalltab[i];
    pc->pc_vcalltab[i] = vp;

if (local->aa_type != AAT_NULL)
        vp->vcte_local = *local;
    else
        vp->vcte_local = atm_glob->atm_null;
    vp->vcte_peer = *peer;
    i = VPEER_HASH(&vp->vcte_peer);
    vp->vcte_next_peer = pc->pc_vpeertab[i];
    pc->pc_vpeertab[i] = vp;
    vp->vcte_pcif = pc;
    vp->vcte_pcif->pc_ivpci_tab[in] = vp;
    vp->vcte_ivpci = in;
    vp->vcte_ovpci = out;
    vp->vcte_opeak_rate = pc->pc_opeak_rate;
    vp->vcte_ulp = ulp;
    ulp_tax(ulp);
    vp->vcte_pid = ulp->ulp_pid;
```

SVC.C
-211-

```
    vp->vcte_org = ulp->ulp_org;
    vp->vcte_aal = aal;
    vp->vcte_atmif = atp;
    svc_new_state(vp, VCS_ESTAB);
    return vp;
} svc_free_vcte(vp)
    struct vcte   *vp;
{
    ASSERT(VALID_VP(vp));
    if (vp->vcte_user_info)
        atm_free_msg(vp->vcte_user_info);
    vp->vcte_next_cref = svc_glob->vcte_free;
    svc_glob->vcte_free = vp;
    svc_glob->svcstat.vctes--;
    vp->vcte_pcif->pc_num_vcs--;
    ulp_free(vp->vcte_ulp);
} svc_dec(vp)
    struct vcte   *vp;
{
    ASSERT(VALID_VP(vp));
    ASSERT(vp->vcte_refcnt >= 1);
    --vp->vcte_refcnt;
    if (vp->vcte_refcnt == 0 && vp->vcte_state == VCS_CLOSED) {
        TR1(TL1, "svc_dec(%x): deffered free\n", vp);
        svc_free_vcte(vp);
    }
    return vp->vcte_refcnt;
} svc_inc(vp)
    struct vcte   *vp;
{
    ASSERT(VALID_VP(vp));
    ASSERT(vp->vcte_refcnt >= 0);
    vp->vcte_refcnt++;
}

/*
 * get a free ivpci, does't need to be fast as we only do this as
 * setup time.
 */ vpci_t
svc_get_ivpci(pc)
    struct pcif   *pc;
```

SVC.C
-212-

```c
{
    int         i;
    for (i = LMI_LAST_RSVD_VCI + 1; i < IVPCI_TAB_SIZE; i++)
        if (pc->pc_ivpci_tab[i] == 0)
            return i;
    return 0;
}

/*
 * Find the next vcte entry given a local port address (atp), a peer
 * address and an upper layer protocol and a set of valid states.
 * Closed vcte's are delinked from peer hash chain so do not go
 * looking for closed vcte's.
 */ struct vcte    *
svc_find_next_peer(pc, peer, ulp, np, vstates)
    struct pcif    *pc;
    struct atm_addr *peer;
    struct ulptab  *ulp;
    struct vcte    *np;
    int            vstates;
{
    int         i;

if (!np) {
        i = VPEER_HASH(peer);
        np = pc->pc_vpeertab[i];
    } else
        np = np->vcte_next_peer;
    for (; np; np = np->vcte_next_peer)
        if (np->vcte_peer.aa_long[1] == peer->aa_long[1] &&
            np->vcte_peer.aa_long[0] == peer->aa_long[0] &&
            ((1 << np->vcte_state) & vstates) &&
            ulp == np->vcte_ulp)
            break;
    return np;
}

/*
 * Find an existing VC between the specified port addresses using the
 * specified upper layer protocol, ulp, in one of the states, states,
 * setup on interface, pc.
 */
struct vcte    *
svc_find_vc(pc, from, to, ulp, states)
    struct pcif    *pc;
    struct atm_addr *from, *to;
    struct ulptab  *ulp;
```

```c
{
    struct vcte    *vp;

vp = svc_find_next_peer(pc, to, ulp, 0, states);
    /* get first match */
    while (vp) {
        if (ATM_ADDR_EQ(*from, vp->vcte_local))
            return vp;
        vp = svc_find_next_peer(pc, to, atm_glob->atm_ulp, vp, states);  /* get next match */
    }
    return 0;
}

/*
 * Lookup VC by call reference and physical interface.
 */
struct vcte    *
svc_find_cref(pc, type, value)
    struct pcif    *pc;
    int            type;
    u_long         value;
{
    struct vcte    *np;
    int            i;

i = VCALL_HASH(value);
    for (np = pc->pc_vcalltab[i]; np; np = np->vcte_next_cref)
        if ((np->vcte_cref_type == type) &&
            (np->vcte_cref_value == value))
            break;
    return np;
}
/*
 * Lookup pcif by port address.
 */
struct pcif    *
svc_find_port(adr)
    struct atm_addr *adr;
{
    struct atmif   *atp;
    int            i;

for (i = 0; i < NNIU; i++) {
        if ((atp = svc_glob->svc_pcif[i].pc_atmif) &&
            ATM_ADDR_EQ(*adr, atp->ati_port))
            return &svc_glob->svc_pcif[i];
    }
    return 0;
}
```

SVC.C
-214-

```
/*
 * svc_close is called when a vc goes into closed state. The vcte is
 * delinked from the call reference and peer address hash chains.
 */
svc_close(vp)
    struct vcte    *vp;
{
    struct vcte    *np;
    int            i;

ASSERT(VALID_VP(vp));
    ASSERT(VALID_ULP(vp->vcte_ulp));
    ASSERT(VALID_PC(vp->vcte_pcif));
    svc_new_state(vp, VCS_CLOSED);
    if (!(vp->vcte_flags & VCTEF_MCAST_SERVER))
        vp->vcte_pcif->pc_ivpci_tab[vp->vcte_ivpci] = (struct vcte *) 0;

/* delete vcte from call reference hash chain */
    i = VCALL_HASH(vp->vcte_cref_value);
    np = vp->vcte_pcif->pc_vcalltab[i];
    ASSERT(np);
    if (np != vp) {
        while (np->vcte_next_cref != vp)
            np = np->vcte_next_cref;
        np->vcte_next_cref = vp->vcte_next_cref;
    } else
        vp->vcte_pcif->pc_vcalltab[i] = vp->vcte_next_cref;

/* delete vcte from peer port_addr hash chain */
    i = VPEER_HASH(&vp->vcte_peer);
    np = vp->vcte_pcif->pc_vpeertab[i];
    ASSERT(np);
    if (np != vp) {
        while (np->vcte_next_peer != vp)
            np = np->vcte_next_peer;
        np->vcte_next_peer = vp->vcte_next_peer;
    } else
        vp->vcte_pcif->pc_vpeertab[i] = vp->vcte_next_peer;

/*
     * all upper layers currently free references on ICS , but
     * when they do not then the vcte will have to be free here.
     */
    if (vp->vcte_refcnt == 0)
        svc_free_vcte(vp);
    else
        TR1(TL1, "svc_close(%x): free deferred\n", vp);
```

```
	return;
}

/*
 * return a pointer to a port address in one of the atmif structures
 * linked off the phsyical inetrface pc.
 */
struct atm_addr *
svc_find_local_port(pc, port)
    struct pcif    *pc;
    struct atm_addr *port;
{
    struct atmif   *atp;

ASSERT(VALID_PC(pc));
    atp = pc->pc_atmif;
    while (atp) {
        if (ATM_ADDR_EQ(atp->ati_port, *port))
            return &atp->ati_port;
        atp = atp->ati_next;
    }
    return 0;
}

/*
 * upper layer protocol routines
 *
 * The upper protocol table manages Q93S saps or ULPs.  Upper layer
 * protocols register IEEE org/pid pairs in the ulptab using
 * ulp_register().  When upper payer protocols think they are done
 * using a ULP they call ulp_unregister(). ulp table entries are
 * reference counted by svc.c routines.  When a vcte to ulp reference
 * is created the table entry reference count is incremented.
 * Likewise when a table reference is destroyed the refcnt is
 * decremented.
 *
 * The protocol running over the adaptation layer is negoiated at
 * connection setup. SNAP organization and protocol ids are used.
 * Protocols which expect need be notified when new circuits are
 * established or when frames arrive on circuits must register using
 * ulp_register().  Protocols may not un-register.  ulp_find is used
 * to lookup a ulptab entry for a given org,pid pair.  This is fairly
 * infrequent as circuits are given pointer to ulptab enrties when
 * they are established.
 */ struct ulptab *
ulp_find(pid, org)
    int        pid, org;
```

```
{
    int         i;
    for (i = 0; i < NULPS; i++)
        if (svc_glob->ulptab[i].ulp_pid == pid &&
            svc_glob->ulptab[i].ulp_org == org &&
            svc_glob->ulptab[i].ulp_registered)
            return &svc_glob->ulptab[i];
    return 0;
} ulp_alloc_pid()
{
    int         i;

for (i = 0; i < NULPS && ulp_find(LMI_PID_NET_ATM + i, LMI_ORG_NET); i++);
    return i + LMI_PID_NET_ATM;
}

/*
 * register an upper layer protocol for aal dispatch on vpci. 0
 * return indicates no room in the table. otherwise a pointer to the
 * ulptab entry is returned. If both org and pid are zero then this
 * routine allocates an un-used org/pid within Adaptive Corp's
 * protocol space.
 */ struct ulptab *
ulp_register(org, pid, data, lmi, pcb)
    int         org, pid;
    int         (*data) ();
    int         (*lmi) ();
    caddr_t     pcb;
{
    struct ulptab *up;
    struct svc_globs *sg = svc_glob;

if (org >= (1 << 24) || pid >= (1 << 16))
        return 0;
    if (sg->ulp_inuse == NULPS)
        return 0;

up = ulp_find(pid, org);
    if (up) {
        if (up->ulp_lmi == lmi && up->ulp_data == data)
            return up;
        else
            return 0;
    }
    for (up = sg->ulptab; up->ulp_refcnt > 0 ||
        up->ulp_registered; up++);
```

SVC.C
-217-

```c
    if (pid == 0 && org == 0) {
        org = LMI_ORG_NET;
        pid = ulp_alloc_pid();
    }
    up->ulp_registered = 1;
    up->ulp_refcnt = 1;
    up->ulp_org = org;
    up->ulp_pid = pid;
    up->ulp_lmi = lmi;
    up->ulp_data = data;
    up->ulp_pcb = pcb;
    sg->ulp_inuse++;

return up;
} struct ulptab *
ulp_unregister(ulp)
    struct ulptab *ulp;
{
    ASSERT(ulp->ulp_registered);
    ulp->ulp_registered = 0;
    ulp_free(ulp);
} ulp_free(ulp)
    struct ulptab *ulp;
{
    struct svc_globs *sg = svc_glob;

if (--ulp->ulp_refcnt <= 0) {
        ASSERT(ulp->ulp_refcnt == 0);
        /* atm_bzero(ulp, sizeof *ulp); */
        sg->ulp_inuse--;
    }
} ulp_tax(ulp)
    struct ulptab *ulp;
{
    ulp->ulp_refcnt++;
}

/*
 * Called with sevice data units for the signaling VC.  However the
 * signaling vc should never be in a state where SDUs are passed. It
 * has a separate state machie. this may change...
 */
svc_mac_lmi()
{
```

SVC.C
-218-

```c
    panic("svc_mac_lmi");
}

/*
 * release all connections sharing the same physical interface as vp.
 * Connections already in CLOSED or WRC are not effected.  PVCs are
 * not released (the signlaing VC is considered a PVC).
 */ svc_release_all(svp)
    struct vcte    *svp;
{
    struct pcif    *pc = svp->vcte_pcif;
    struct vcte    *vp;
    int            i;

ASSERT(VALID_VP(svp));
    ASSERT(VALID_PC(pc));

for (i = 0; i < VPEERTAB_SIZE; i++) {
        for (vp = pc->pc_vpeertab[i]; vp; vp = vp->vcte_next_peer) {
            if (vp == pc->pc_sig)
                continue;
            if ((vp->vcte_cref_type & LMI_CREFTYPE_MASK) == LMI_CREFTYPE_PVC)
                continue;
            ASSERT(vp->vcte_state != VCS_CLOSED);
            if (vp->vcte_state <= VCS_ESTAB)
                svc_send_release_ind(vp);
            svc_close(vp);
        }
    }
}

/*
 * This routine handles non-configuration status pdus and sdus.
 * Unfortunately this routine is expected to grow as ATM Forum adds
 * more LMI functionality. Currenly only vc_status requests are
 * responded to.  Responses are ignored.
 */
svc_status(pc, pdu, len, vp)
    struct pcif    *pc;
    struct xdu     *pdu;
    int            len;
    struct vcte    *vp;
{
    struct status_resp *rdu;
    caddr_t        end;

if (pdu->lmi_pdu_type == LMI_PDU_STATUS_ENQ) {
```

```c
        switch (pdu->lmi_status_type) {
        case LMI_STATUS_VC:
          rdu = (struct status_resp *)
            svc_alloc_pdu_no_vp(LMI_PDU_STATUS_RESP,
              pdu->lmi_cref_type ^ LMI_CREFDIRECTION_MASK,
                pdu->lmi_cref_value);
          if (rdu == 0)
            break;
          rdu->lmi_status_type = pdu->lmi_status_type;
          end = (caddr_t) rdu + sizeof(*rdu);
          if (vp) {
            LMI_SET_ELEMENT(end, LMI_VC_STATUS, vp->vcte_state);
          } else {
            LMI_SET_ELEMENT(end, LMI_VC_STATUS, VCS_CLOSED);
          }
          aal_send_msg(pc->pc_sig, 0, rdu,
            sizeof(*rdu) + sizeof(struct lmi_parm));
          break;
        default:
          TR1(TL2, "svc_status: unsupported status request received, type =%d\n",
            pdu->lmi_status_type);
        }
      }
    return;
} svc_brp()
{
  return;
}
``` svc.h

```c
/* svc.h
 *
 * COPYRIGHT 1992 ADAPTIVE CORPORATION
 * ALL RIGHTS RESERVED
 */ ifndef NIU_SVC_H
define NIU_SVC_H   Included
#include "bytes.h"
#include "svc_if.h"

/*
 * atm_addr are pdu related definitions are in unipdu.h
 */
#include "unipdu.h"

/*
 * Virtaul connection (channel or circuit) table entry.
 *
 * One entry per connection.  Each entry is linked into two separate
 * lists whose heads kept in two hash tables in the pcif structure.
 * The call reference lits is used to speed up signaling protocol
 * lookups.  The peer port address list is used to speed up ATM MAC
 * lookups when searching for a connection to a particular
 * destination.
 *
 * Each connection has a pointer to an upper layer protocol table. This
 * table defines the SNAP encoded protcol identifier, a funciton to
 * be called with signaling service data units and a function to be
 * called for incoming frames. (The signaling protocol has an entry
 * in this table which is how signaling PDUs are directed to
 * svc_pdu().  The upper layer protocols manipulate vcte_packet,
 * vcte_refcnt abd vcte_atmif themselves. They are includec in this
 * structure for conveneince (so the ATM MAC module does not need a
 * separate VC table of its own).
 */ struct vcte { struct vcte   *vcte_next_cref;   /* linked by callref */
    struct vcte   *vcte_next_peer;   /* linked by peer adr */
    struct ulptab *vcte_ulp;  /* upper layer protocol,
              * local binding */
    struct atm_addr vcte_local;   /* local port address */ struct atm_addr vcte_peer; /* atm adr of peer */
    struct pcif   *vcte_pcif; /* physical interface this VC
              * uses */ vpci_t        vcte_ivpci;   /* vci pon which frames are
``` svc.h

```
         * received */
vpci_t      vcte_ovpci;   /* vci used from transmission */
u_char      vcte_state;   /* defined in unipdu.h */
u_char      vcte_timeouts; /* number of timeouts */
u_char      vcte_ticks;   /* number of ticks before
         * next timeout */
u_char      vcte_cref_type; /* direction is value
         * expected to be received */
u_long      vcte_cref_value; /* random value */ u_char      vcte_qos;     /* vague notion of quality is
         * negotiated */
u_char      vcte_instance; /* incremeneted every
         * allocation */
u_char      vcte_user_info_len; /* length of
         * vcte_user_info buffer */
u_long      vcte_opeak_rate; /* outbound peak rate
         * divided by 1024 */
u_short     vcte_flags;   /* VCTEF_MCAST indicates
         * multicast vc */
u_short     vcte_cause;   /* why this vc died */
short       vcte_refcnt;  /* one per referencing
         * conn_p,*mte & atmif */ struct atmif *vcte_atmif;  /* atm lan i/f, if
         * appropriate */
caddr_t     vcte_packet;  /* used by atm mac to queued
         * a frame */
caddr_t     vcte_user_info; /* pointer to user info
         * buffer */
u_long      vcte_ipackets;

u_short     vcte_aal;
u_short     vcte_pid;
u_long      vcte_org;
u_long      vcte_opackets;
};

/* vcte_flags */
#define VCTEF_MCAST_CLIENT  1  /* peer address is multicast */
#define VCTEF_MCAST_SERVER  2  /* local address is multicast */
#define VCTEF_CRC32         4  /* add crc32 to each frame,
                                * used by ulp */
/* table sizes */
#define IVPCI_TAB_SIZE (8192+2048) /* indexed by incoming vpci */
define VCTAB_SIZE    256  /* maximum number of VCs supprted */ define ivpci_to_vcte(pc, vci)  ((vci < IVPCI_TAB_SIZE) ? (pc)->pc_ivpci_tab[vci] : (struct vcte *)0)
vpci_t      get_ivpci();
``` svc.h

```c
#define BITS_IN_VCHASH 4
#define VCALLTAB_SIZE (1<<(BITS_IN_VCHASH))
#define VCALL_HASH(cref) VCTABS_HASH(cref)

#define VPEERTAB_SIZE (1<<(BITS_IN_VCHASH))
#define VPEER_HASH(adr) VCTABS_HASH((adr)->aa_long[1])
#define VCTABS_HASH(value) (((value)^\
        ((value)>>BITS_IN_VCHASH)^\
        ((value)>>BITS_IN_VCHASH*2)^\
        ((value)>>BITS_IN_VCHASH*3)^\
        ((value)>>BITS_IN_VCHASH*4)) \
        & ((1<<BITS_IN_VCHASH)-1))

extern struct vcte *setup_ind(), *get_vcte(), *os_get_vcte();

/*
 * Internal Data Units PDU types for timeouts.
 */ define IDU_TO          18
define IDU_MAX_RETRIES 19
#define IDU_INVALID_PDU 20

/* User VC states    */ define VCS_CLOSED  1  /* closed */
define VCS_WSR     2  /* setup recv, waiting for upper
                        * layer setup response */
#define VCS_WC      3  /* waiting for connect */
#define VCS_WCACK   4  /* waiting for connect ack */
#define VCS_ESTAB   5  /* waiting for release */
#define VCS_WRC     6  /* waiting for release complete */

/*
 * states for signaling VC.
 */
#define VCS_INACTIVE 7  /* should never be in this state */
#define VCS_WGRC     8  /* waiting global release complete */
#define VCS_WAR      9  /* waiting address reponse */
define VCS_ACTIVE   10 /* signaling connection up */ define VCS_LAST VCS_ACTIVE define VCS_TO_VMASK(state) (1<<(state))
define VCS_DATA_IND_OK    ((1<<VCS_WCACK)+(1<<VCS_ESTAB)+(1<<VCS_INACTIVE)+ \
        (1<<VCS_WGRC)+(1<<VCS_WAR)+(1<<VCS_ACTIVE))
#define VCS_NOT_DEAD_OR_DYING \
        ((1<<VCS_WC)+(1<<VCS_ESTAB)+(1<<VCS_WCACK)+(1<<VCS_WSR))
#define VCS_DEAD_OR_DYING ((1<<VCS_CLOSED)+(1<<VCS_WRC))
``` svc.h

```
/*
 * upper layer protocol table
 *
 * one entry per protocol registered to 'manage' virtual circuits which
 * carried the indicated org and pid in the setup/connect PDUs.
 */ struct ulptab {
    int         ulp_org;/* org negotiated at set up */
    int         ulp_pid;/* protocol id negotiated at setup */
    int         (*ulp_lmi) ();  /* called when a circuit
                 * state changes */
    int         (*ulp_data) ();  /* called when a frame is
                 * received */
    caddr_t     ulp_pcb;/* protocol specific control block */
    int         ulp_refcnt;
    int         ulp_registered;
};

#define NULPS 32
extern struct ulptab ulptab[];
struct ulptab *ulp_register(), *ulp_find();

struct svcstat {
    int         vctes;
    int         queued_frames;
    int         msg_alloc_failures;
    int         misaligned_pdus;
    int         pdu_too_big;
    int         pdu_lost_nomem;
    int         padding[2];
    int         pdus_received[LMI_PDU_LAST + 1];
    int         pdus_sent[LMI_PDU_LAST + 1];
    int         parse_causes[LAST_CAUSE + 1];
};

/*
 * pcif, one per physical channel, used by vc layer. We assume one
 * atm lan per port address assigned to theis physical interface. So
 * pc_atmif is used for that purpose. There is a spearate incoming
 * VCI lookup table, pc_ivpci_tab, per interface. Ther is also
 * separate hash chains by peer address and call reference. pc_sig
 * references the signaling channel.
 */
struct pcif {
    u_char      pc_num;  /* unit number from i/o system */
    u_char      pc_num_lans;  /* number of ATM LANs
                 * (atmif's) for this i/f */
    u_short     pc_flags;
#define PCIF_NIU_TO_NIU     1
``` svc.h

```c
#define PCIF_OTHER_MAC_ADDR_IS_HIGHER 2
    u_long      pc_hw_max_mtu;   /* maximum MTU h/w supports */
    u_long      pc_hw_max_vci;   /* upper bound on peer
                 * incoming vci */
    u_long      pc_net_max_vci;  /* upper bound on peer
                 * incoming vci */ u_long      pc_net_max_vcs;  /* limit on number of vc's
                 * network will allow */
    u_long      pc_net_max_qos;  /* high qos net supports */
    u_long      pc_opeak_rate;   /* outgoing peak rate of link
                 * divided by 1024 */
    u_long      pc_ipeak_rate;   /* incoming peak rate of link
                 * divided by 1024 */ struct atmif *pc_atmif;  /* linked list of atm lans */
    u_char      *pc_last_config;  /* last atm lan config pdu */
    u_short     pc_last_config_len;  /* last atm lan config
                 * pdu */
    u_short     pc_num_vcs;  /* current number of vctes
                 * allocated */
    struct vcte *pc_sig; /* signaling vc */ struct vcte *pc_raw_vp; /* vc collecting all ATM
                 * cells received */
    struct vcte *pc_vcalltab[VCALLTAB_SIZE];  /* vcte's by call ref */
    struct vcte *pc_vpeertab[VPEERTAB_SIZE];  /* vcte's by peer addr */
    struct vcte *pc_ivpci_tab[IVPCi_TAB_SIZE];
};
struct vcte *svc_find_next_peer(), *svc_get_signaling_vcte(), *lvc_create();
struct vcte *svc_find_cref(), *svc_alloc_vcte(), *svc_find_vc();
struct atm_addr *svc_find_local_port();
extern int  svc_backoff[], svc_max_retrans[];
extern int  svc_ms_per_tick;
int         svc_pdu();
int         svc_sdu();
vpci_t      svc_get_ivpci();

struct xdu {
    struct lmi_hdr lmi_hdr;
};

struct xdu  *svc_alloc_pdu();

#define PDU_ALIGNED(pdu) ((((int)pdu)&3)==0)

extern int  svc_new_ticks[];

char        *svc_xdu_type_str();
``` svc.h

```
extern int    svc_pcm;
extern int    svc_default_qos;
extern int    hz;
extern int    atm_nnius[];  /* number of atm lans for each
         * interface */ struct svc_globs {
   struct pcif   *svc_pcif;
   struct vcte   *vcte_free;
   struct vcte   *vcte_base;
   struct ulptab *ulptab;
   int           ulp_inuse;
   struct pcif   *svc_pcifn;
   struct ulptab *sig_ulp;
   struct svc_parm *svc_parms;
   int           svc_parms_found;
   struct svcstat svcstat;
   char          *static_buf;
};

struct pcif   *svc_find_port();
#ifndef RT68K
extern struct svc_globs svc_globs;
#define svc_glob (&svc_globs)
#else
#define svc_glob svc_get_glob()
struct svc_globs *svc_get_glob();
endif endif         /* NIU_SVC_H */
``` svc_pdu.c

```c
/* svc_pdu.c
 *
 * COPYRIGHT 1992 ADAPTIVE CORPORATION
 * ALL RIGHTS RESERVED
 /* static char    sccsid[] = "%A%";

if  !defined(CERNEL) && defined(RT68K)
#define ERRLOG printdbg
define printf printdbg
endif include "atm.h"
include "svc.h"
#include "unipdu.h"
#include "debug.h"
#include "svc_utl.h"
#include "if_atm.h"

/* debugging and tracing stuff */
#define TL1    1
#define TL2    svc_trace>1
#define TL3    svc_trace>2
#define TL4    svc_trace>3
define TL5    svc_trace>4

/*
 * allocate a generic pdu, given call reference and type.
 */ struct xdu    *
svc_alloc_pdu_no_vp(type, ctype, cvalue)
{
   struct xdu    *pdu;

if (pdu = (struct xdu *) atm_alloc_msg()) {
      pdu->lmi_proto = LMI_PROTOCOL;
      pdu->lmi_pdu_type = type;
      pdu->lmi_cref_type = ctype;
      pdu->lmi_cref_value = cvalue;
   }
   return pdu;
}

/*
 * allocate a generic pdu for a vp
 */
struct xdu    *
svc_alloc_pdu(type, vp)
``` svc_pdu.c

```c
    int         type;
    struct vcte *vp;
{
    int         direction;
    if (vp != vp->vcte_pcif->pc_sig) {
        direction = (type <= LMI_PDU_LAST ? LMI_CREFDIRECTION_MASK : 0);
        return svc_alloc_pdu_no_vp(type, vp->vcte_cref_type ^ direction,
                vp->vcte_cref_value);
    } else
        return svc_alloc_pdu_no_vp(type, LMI_GLOBAL_CREF_TYPE, LMI_GLOBAL_CREF_VALUE);
}

/*
 * allocate a release pdu for the specified VC.
 */ struct release *
svc_alloc_release(vp, type, len)
    struct vcte *vp;
    int         *len;
{
    struct release *pdu;
    ASSERT(VALID_VP(vp));
    if ((pdu = (struct release *) svc_alloc_pdu(type, vp)) == 0)
        return pdu;
    LMI_SET_ELEMENT(&pdu->lmi_cause, LMI_RELEASE_CAUSE, vp->vcte_cause);
    if (vp->vcte_user_info) {
        struct lmi_uinfo *ui;
        ui = (struct lmi_uinfo *) ((caddr_t) pdu + sizeof(*pdu));
        ui->af_type = LMI_USER_INFO;
        ui->af_len = vp->vcte_user_info_len;
        atm_bcopy(vp->vcte_user_info, ui->af_value, vp->vcte_user_info_len);
        *len = sizeof(*pdu) + ((sizeof(*ui) - sizeof(ui->af_value) + ui->af_len + 3) / 4) * 4;
    } else
        *len = sizeof(*pdu);
    return pdu;
}

/*
 * allocate a setup or connect for the specified VC.
 */
struct setup *
svc_alloc_setup_xdu(vp, type, length)
    struct vcte *vp;
    int         type;
    int         *length;
{
    vpci_t      in, out;
    struct setup *pdu, *beg;
    char        *gcp; /* a pointer for the greenhouse
``` svc_pdu.c

```c
	 * compiler */
	if (!(pdu = (struct setup *) svc_alloc_pdu(type, vp)))
		return 0;
	beg = pdu;
	ASSERT(pdu->lmi_pdu_type == type);
	pdu->lmi_ncalls = 1;
	svc_fill_ports(vp, pdu);
	if (type == LMI_PDU_SETUP || type == LMI_PDU_CONNECT) {
		in = vp->vcte_ivpci;
		out = vp->vcte_ovpci;
	} else if (type == SDU_SETUP_IND || type == SDU_SETUP_CONF) {
		out = vp->vcte_ivpci;
		in = vp->vcte_ovpci;
	}
	gcp = ((caddr_t) pdu) + sizeof(*pdu);
	if (out)
		LMI_ADD_ELEMENT(gcp, LMI_OVPCI, out);
	if (in)
		LMI_ADD_ELEMENT(gcp, LMI_IVPCI, in);
	if (vp->vcte_qos != svc_default_qos) {
		LMI_ADD_ELEMENT(gcp, LMI_IQOS_SERVICE_CLASS, vp->vcte_qos);
		LMI_ADD_ELEMENT(gcp, LMI_OQOS_SERVICE_CLASS, vp->vcte_qos);
	}
	LMI_ADD_ELEMENT(gcp, LMI_OQOS_PEAK_BW, vp->vcte_opeak_rate);
	LMI_ADD_ELEMENT(gcp, LMI_IQOS_PEAK_BW, vp->vcte_pcif->pc_ipeak_rate);
	if (vp->vcte_user_info) {
		struct lmi_uinfo *ui;
		ui = (struct lmi_uinfo *) gcp;
		ui->af_type = LMI_USER_INFO;
		ui->af_len = vp->vcte_user_info_len;
		atm_bcopy(vp->vcte_user_info, ui->af_value, vp->vcte_user_info_len);
		gcp += ((ui->af_len + 5) / 4) * 4;
	}
	if (type == LMI_PDU_SETUP) {
		((struct lmi_ulp *) gcp)->af_type = LMI_ULP;
		((struct lmi_ulp *) gcp)->af_aal = vp->vcte_aal;
		((struct lmi_ulp *) gcp)->af_pid = vp->vcte_pid;
		((struct lmi_ulp *) gcp)->af_org = vp->vcte_org;
		gcp += sizeof(struct lmi_ulp);
	}
	*length = gcp - (caddr_t) beg;
	return beg;
}

/*
 * send a release
 */
svc_send_release_pdu(pc, pdu, len)
	struct pcif	*pc;
``` svc_pdu.c

```c
  struct release *pdu;
  int        len;
{
  struct release *pdu0;
  if (len < sizeof *pdu) {
    pdu0 = (struct release *) atm_alloc_msg();
    if (!pdu0) {
      atm_free_msg(pdu);
      return;
    }
    *pdu0 = *pdu;
    atm_free_msg(pdu);
    pdu = pdu0;
  }
  pdu->lmi_cref_type ^= LMI_CREFDIRECTION_MASK;
  pdu->lmi_pdu_type = LMI_PDU_RELEASE;
  LMI_SET_ELEMENT(&pdu->lmi_cause, LMI_RELEASE_CAUSE, INVALID_CALL_REF);
  aal_send_msg(pc->pc_sig, 0, pdu, sizeof(*pdu));
  return 0;
}

/*
 * send a release and initiate local release if appropriate
 */
svc_reject_pdu(pc, pdu, len, vp)
  struct pcif   *pc;
  struct release *pdu;
  int        len;
  struct vcte  *vp;
{
  struct atmif *atp;
  if (!vp) {
    pdu->lmi_pdu_type = LMI_PDU_RELEASE;
    ASSERT(pdu->lmi_cause.af_type == LMI_RELEASE_CAUSE);
    aal_send_msg(pc->pc_sig, 0, pdu, sizeof(*pdu));
    return 0;
  } else if (vp->vcte_state < VCS_WRC) {
#ifndef lint
    int       dummy;
    LMI_GET_ELEMENT(&pdu->lmi_cause, vp->vcte_cause, dummy);
#endif
    svc_new_state(vp, VCS_WRC);
    svc_send_release(vp);
    svc_send_release_ind(vp);
  } else if (vp->vcte_state > VCS_WRC) { /* PCM states */
    svc_new_state(vp, VCS_WGRC);
    svc_release_all(vp);
    svc_send_release(vp);
    for (atp = pc->pc_atmif; atp; atp = atp->ati_next)
      atm_delete_lan(atp);
``` svc_pdu.c

```
   }
   atm_free_msg(pdu);
   return 0;
} struct setup  *svc_alloc_setup_xdu();

svc_send_setup(vp)
   struct vcte   *vp;
{
   int         len;
   struct setup   *pdu;

ASSERT(VALID_VP(vp));

if (pdu = svc_alloc_setup_xdu(vp, LMI_PDU_SETUP, &len))
      aal_send_msg(vp->vcte_pcif->pc_sig, 0, pdu, len);
} svc_send_setup_ind(vp)
   struct vcte   *vp;
{
   int         len;
   struct setup   *pdu;

ASSERT(VALID_VP(vp));
   if (pdu = svc_alloc_setup_xdu(vp, SDU_SETUP_IND, &len))
      (*vp->vcte_ulp->ulp_lmi) (vp, pdu, len);
} svc_send_setup_conf(vp)
   struct vcte   *vp;
{
   int         len;
   struct setup   *pdu;

ASSERT(VALID_VP(vp));
   if (pdu = svc_alloc_setup_xdu(vp, SDU_SETUP_CONF, &len))
      (*vp->vcte_ulp->ulp_lmi) (vp, pdu, len);
} svc_send_setup_comp(vp)
   struct vcte   *vp;
{
   struct xdu   *pdu;
   ASSERT(VALID_VP(vp));
   if (pdu = (struct xdu *) svc_alloc_pdu(SDU_SETUP_COMP, vp))
      (*vp->vcte_ulp->ulp_lmi) (vp, pdu, sizeof(*pdu));
   return;
}
``` svc_pdu.c

```c
svc_send_connect(vp)
    struct vcte   *vp;
{
    struct setup  *pdu;
    int           len;

ASSERT(VALID_VP(vp));
    if (pdu = svc_alloc_setup_xdu(vp, LMI_PDU_CONNECT, &len))
        aal_send_msg(vp->vcte_pcif->pc_sig, 0, pdu, len);
}
svc_send_cack(vp)
    struct vcte   *vp;
{
    struct connect_ack *pdu;
    ASSERT(VALID_VP(vp));
    if (pdu = (struct connect_ack *) svc_alloc_pdu(LMI_PDU_CONNECT_ACK, vp))
        aal_send_msg(vp->vcte_pcif->pc_sig, 0, pdu, sizeof(*pdu));
} svc_send_release_comp(vp)
    struct vcte   *vp;
{
    struct release_comp *pdu;
    ASSERT(VALID_VP(vp));
    if (pdu = (struct release_comp *) svc_alloc_pdu(LMI_PDU_RELEASE_COMP, vp))
        aal_send_msg(vp->vcte_pcif->pc_sig, 0, pdu, sizeof(*pdu));
} svc_send_release(vp)
    struct vcte   *vp;
{
    struct release *pdu;
    int            len;

ASSERT(VALID_VP(vp));
    if (pdu = svc_alloc_release(vp, LMI_PDU_RELEASE, &len))
        aal_send_msg(vp->vcte_pcif->pc_sig, 0, pdu, len);
}
svc_send_release_ind(vp)
    struct vcte   *vp;
{
    int           len;
#if 0
    struct release *pdu;
    ASSERT(VALID_VP(vp));
    if (pdu = svc_alloc_release(vp, SDU_RELEASE_IND, &len))
        (*vp->vcte_ulp->ulp_lmi) (vp, pdu, len);
#else
    struct setup  *pdu;
``` svc_pdu.c

```
    caddr_t    cp;
    ASSERT(VALID_VP(vp));
    if (pdu = (struct setup *) svc_alloc_pdu(SDU_RELEASE_IND, vp)) {
        svc_fill_ports(vp, pdu);
        cp = (caddr_t) & pdu[1];
        LMI_ADD_ELEMENT(cp, LMI_RELEASE_CAUSE, vp->vcte_cause);
        len = cp - (caddr_t) pdu;
        (*vp->vcte_ulp->ulp_lmi) (vp, pdu, len);
    }
#endif
} svc_fill_ports(vp, pdu)
    struct vcte   *vp;
    struct setup  *pdu;
{
    if (vp->vcte_cref_type & LMI_CREFDIRECTION_MASK) {
        pdu->lmi_caller = vp->vcte_local;   /* we initiated setup */
        pdu->lmi_callee = vp->vcte_peer;
    } else {
        pdu->lmi_callee = vp->vcte_local;   /* peer initiated setup */
        pdu->lmi_caller = vp->vcte_peer;
    }
}
``` svc_utl.c

```c
/* svc.utl.c
 *
 * COPYRIGHT 1992 ADAPTIVE CORPORATION
 * ALL RIGHTS RESERVED
 */

/*
 *
 * This file contains svc utility and pdu parsing routines.
 *
 */ static char     sccsid[] = "%A%";

if  !defined(CERNEL) && defined(RT68K)
#define ERRLOG printdbg
define printf printdbg
endif ifdef notdef
include "all.h"
#include "ip_errs.h"
#include "unsp.h"
endif          /* notdef */ include "atm.h"
include "svc.h"
#include "unipdu.h"
#include "debug.h"
#include "trace.h"
#include "svc_utl.h"

extern int    svc_trace;
define TL2 svc_trace>1 char       *svc_xdu_names[] = {"unknown", "setup", "connect", "connect_ack",
    /* 4 */ "status_enquiry", "status_response", "release", "release_complete",
    /* 8 */ "setup_request", "setup_response", "release_request", "status_request",
    /* 12 */ "release_indication", "setup_complete", "setup_confirm", "known_sdu",
    /* 16 */ "setup_indication", "status_response", "timeout", "max_retries",
 /* 20 */ "invalud pdu"};

char       *
svc_xdu_type_str(type)
   u_int     type;
{
  if (type < IDU_INVALID_PDU)
     return svc_xdu_names[type];
``` svc_utl.c

```
    else
      return svc_xdu_names[0];
} char        *
svc_pdu_type_str(type)
    u_int       type;
{
  if (type < LMI_PDU_LAST)
    return svc_xdu_names[type];
  else
    return svc_xdu_names[0];
} svc_valid_sdu_type(type)
{
  if (type < SDU_SETUP_REQ || type > SDU_STATUS_RESP || type == 15 /* ! */ )
    return 0;
  return 1;
} svc_valid_pdu_type(type)
{
  if (type < LMI_PDU_SETUP || type > LMI_PDU_LAST)
    return 0;
  return 1;
} char        *
svc_e164_ntoa(adr)
    struct atm_addr *adr;
{
  u_char       *cp = (u_char *) adr;

sprintf(svc_glob->static_buf, "%x:%x:%x:%x:%x:%x:%x:%x",
      cp[0], cp[1], cp[2], cp[3],
      cp[4], cp[5], cp[6], cp[7]);
  return svc_glob->static_buf;
}

/*
 * parse pdu returns the event cooresponding to the pdu type. In
 * addition global flags are set to reference the parameters in the
 * pdu. If there is any problem with the PDU this routine should
 * catch it. This just checks static pdu validity for protocol
 * violations. A zero return indicates the pdu does not violate any
 * encoding rules. Caller and callee addresses are checked as they
 * are considered static. The vci's are not checked as they are
 * subject to pdu specific negoiation.
``` svc_utl.c

```c
*/

/* Following was moved to svc.h to give other files access to it */
#ifndef notdef
#define CON_ELEMS ((1<<LMI_IVPCI)+(1<<LMI_OVPCI)+(1<<LMI_USER_INFO)+(1<<LMI_IQOS_PEAK_BW)+ \
     (1<<LMI_OQOS_PEAK_BW)+(1<<LMI_IQOS_SERVICE_CLASS)+(1<<LMI_OQOS_SERVICE_CLASS))
endif          /* NOT notdef */ int     setup_valid_elems = -1 /* CON_ELEMS+(1<<LMI_ULP) */ ;
int     connect_valid_elems = -1 /* CON_ELEMS */ ;
int     release_valid_elems = (1 << LMI_RELEASE_CAUSE) + (1 << LMI_USER_INFO);
int     no_valid_elems = 0;
int     valid_response_elems[LMI_STATUS_NTYPES] =   /* indexed by status
    type */ {
(1 << LMI_CONFIG_ENQ) | (1 << LMI_CONFIG_RESP) | (1 << LMI_PORT_ADDR), 0, 0, 0, 0, 0};
int     valid_enquiry_elems[LMI_STATUS_NTYPES] =  /* indexed by status
    type */ {
(1 << LMI_CONFIG_ENQ), 0, 0, (1 << LMI_VC_STATUS), 0, 0};

svc_parse_xdu(pc, pdu, len)
    struct pcif   *pc;
    struct xdu    *pdu;
    int           len;
{
    int       reason;

reason = svc_parse_xdu_real(pc, pdu, len);
    if (reason) {
       TR1(TL2, "svc_parse_xdu() -> %d\n", reason);
       svc_trace_pdu(pdu, len, 1, pc->pc_sig->vcte_ivpci);
    }
    return reason;
} svc_parse_xdu_real(pc, pdu, len)
    struct pcif   *pc;
    struct xdu    *pdu;
    int           len;
{
    int       reason = 0;
    struct port_addr_elem *pae;
    int       j;
    int       swap_pdu;

#ifdef little_endian
    if (pdu->lmi_pdu_type <= LMI_PDU_LAST) {
       OS_REVERSE32(pdu->lmi_cref_value);
``` svc_utl.c

```c
    swap_pdu = 1;
} else
#endif
    swap_pdu = 0;

ASSERT(PDU_ALIGNED(pdu));

/* validate call reference if not sdu_setup_request */
if ((pdu->lmi_cref_type & LMI_CREFTYPE_MASK) != LMI_CREFTYPE_SVC &&
    (pdu->lmi_cref_type & LMI_CREFTYPE_MASK) != LMI_CREFTYPE_PVC &&
    (pdu->lmi_pdu_type != SDU_SETUP_REQ))
    return INVALID_CALL_REF;

/*
 * reverse caller/callee for multicast when stations are back
 * to back
 */ if (pc->pc_flags & PCIF_NIU_TO_NIU) {
    if ((pdu->lmi_pdu_type == LMI_PDU_CONNECT &&
        ((struct setup *) pdu)->lmi_caller.aa_type == AAT_MAC))
        svc_fixup_mcast_connect(pc, pdu);
    else if (pdu->lmi_pdu_type == LMI_PDU_SETUP &&
        ((struct setup *) pdu)->lmi_callee.aa_type == AAT_MAC)
        svc_fixup_mcast_setup(pc, pdu);
}
switch (pdu->lmi_pdu_type) {
case LMI_PDU_SETUP:
case SDU_SETUP_RESP:
    if (!svc_valid_peer_port(&((struct setup *) pdu)->lmi_caller))
        return INVALID_SRC_ADDR;
    if (((struct setup *) pdu)->lmi_ncalls != 1)
        return INVALID_MSG_ELEMENT;
    reason = svc_set_opts((caddr_t) pdu + sizeof(struct setup),
            len - sizeof(struct setup),
        pdu->lmi_pdu_type == LMI_PDU_SETUP ?
        setup_valid_elems : connect_valid_elems, swap_pdu);
    if (pdu->lmi_pdu_type == LMI_PDU_SETUP &&
        !svc_find_parsed_ulp())
        return ULP_UNAVAILABLE;
    break;
case SDU_SETUP_REQ:
case LMI_PDU_CONNECT:
    if (!svc_valid_peer_port(&((struct setup *) pdu)->lmi_callee))
        return INVALID_SRC_ADDR;
    if (((struct setup *) pdu)->lmi_ncalls != 1)
        return INVALID_MSG_ELEMENT;
    reason = svc_set_opts((caddr_t) pdu + sizeof(struct setup),
            len - sizeof(struct setup),
        pdu->lmi_pdu_type == SDU_SETUP_REQ ?
``` svc_ut.c
-237-

```
    setup_valid_elems : connect_valid_elems, swap_pdu);
   if (pdu->lmi_pdu_type == LMI_PDU_CONNECT &&
       !(SVC_PARSED(LMI_IVPCI) && SVC_PARSED(LMI_OVPCI)))
      return ELEMENT_MISSING;
   break;
case SDU_STATUS_REQ:
case LMI_PDU_STATUS_ENQ:
   if (pdu->lmi_status_type >= LMI_STATUS_NTYPES)
      return UNKNOWN_MSG;
   reason = svc_set_opts((caddr_t) pdu + sizeof(struct xdu),
            len - sizeof(struct xdu),
            valid_enquiry_elems[pdu->lmi_status_type - LMI_STATUS_CONFIG], swap_pdu);
   if (pdu->lmi_status_type == LMI_STATUS_CONFIG) {
      if (!SVC_PARSED(LMI_CONFIG_ENQ))
         return ELEMENT_MISSING;
      if (((struct config_elem *)
            SVC_GET(LMI_CONFIG_ENQ))->af_version != LMI_VERSION) {
         svc_report_version_conflict();
         return LMI_VERSION_CONFLICT;
      }
   }
   break;
case LMI_PDU_STATUS_RESP:
   if (pdu->lmi_status_type >= LMI_STATUS_NTYPES)
      return UNKNOWN_MSG;
   if (reason = svc_set_opts((caddr_t) pdu + sizeof(struct xdu),
            len - sizeof(struct xdu),
            valid_response_elems[pdu->lmi_status_type - LMI_STATUS_CONFIG], swap_pdu)) {
      svc_brp(pdu, reason);
      break;
   }
   switch (pdu->lmi_status_type) {
   case LMI_STATUS_CONFIG:
      if (!SVC_PARSED(LMI_CONFIG_ENQ) ||
          !SVC_PARSED(LMI_CONFIG_RESP))
         return ELEMENT_MISSING;
      if (((struct config_elem *)
            SVC_GET(LMI_CONFIG_RESP))->af_version != LMI_VERSION) {
         svc_report_version_conflict();
         return LMI_VERSION_CONFLICT;
      }
      if (SVC_PARSED(LMI_PORT_ADDR)) {
         /*
          * port addr elements must be
          * contiguous
          */
         pae = (struct port_addr_elem *) SVC_GET(LMI_PORT_ADDR);
         for (j = 0;
              j < svc_glob->svc_parms[LMI_PORT_ADDR].par_ndups;
              j++, pae++)
```

```
            if (pae[1].af_type != LMI_PORT_ADDR)
                return INVALID_MSG_ELEMENT;
        }
        break;
    case LMI_STATUS_VC:
        if (!SVC_PARSED(LMI_VC_STATUS))
            return ELEMENT_MISSING;
        break;
    default:
        reason = UNKNOWN_MSG;
    }
    break;
case LMI_PDU_CONNECT_ACK:
case LMI_PDU_RELEASE_COMP:
    reason = svc_set_opts((caddr_t) pdu + sizeof(struct xdu),
            len - sizeof(struct xdu),
            no_valid_elems, swap_pdu);
    break;
case SDU_RELEASE_REQ:
case LMI_PDU_RELEASE:
    reason = svc_set_opts((caddr_t) pdu + sizeof(struct xdu),
            len - sizeof(struct xdu),
            release_valid_elems, swap_pdu);
    break;
default:
    ASSERT(0);  /* should not get here */
    return UNKNOWN_MSG;
}
return reason;
}

/*
 * This routine fixes up multicast setup/connect when back to back
 * nius are signaling to that we go throught the promiscuous mode
 * setup logic. The callee (multicast) is moved to the caller. A
 * local port address for the interface is copied into the callee
 * address. The lanid from the last byte is copied.
 */ svc_fixup_mcast_setup(pc, pdu)
    struct pcif   *pc;
    struct setup  *pdu;
{
    int           lan;
    struct atmif  *atp;

lan = pdu->lmi_caller.aa_lannum;
    pdu->lmi_caller = pdu->lmi_callee;
    for (atp = pc->pc_atmif; atp; atp = atp->ati_next) {
``` svc_utl.c

```c
        if (atp->ati_port.aa_lannum == lan) {
          pdu->lmi_callee = atp->ati_port;
          pdu->lmi_callee.aa_lannum = lan;
          return;
        }
    }       /* else we will fail later as no
             * local port addresses are defined */
}

/*
 * peer is sending a connect back (we are back-to-back) with his port
 * adr as the callee and the mcast adr as the caller. we need to put
 * our port adr as the caller and the mcast as the callee.
 */
svc_fixup_mcast_connect(pc, pdu)
    struct pcif  *pc;
    struct setup *pdu;
{
    int          lan;
    struct atmif *atp;

lan = pdu->lmi_callee.aa_lannum;
    pdu->lmi_callee = pdu->lmi_caller;
    for (atp = pc->pc_atmif; atp; atp = atp->ati_next) {
        if (atp->ati_port.aa_lannum == lan) {
          pdu->lmi_caller = atp->ati_port;
          pdu->lmi_caller.aa_lannum = lan;
          return;
        }
    }       /* else we will fail later as no
             * local port addresses are defined */
} svc_valid_peer_port(port)
    struct atm_addr *port;
{
    if (port->aa_type == AAT_MAC)
      /* if MAC addr then must be multicast */
      return port->aa_byte[ATM_FIRST_MAC] & 0x1;
    else if (port->aa_type != AAT_PORT)
      return 0;   /* not mac, not port, then invalid */
    return 1;     /* not very selective */
}

/*
 * If there was a source ulp then return ulptab entry for it (if
 * found) otherwise return ulptab entry for LMI_ULP.  LMI_SRC_ULP
 * only appears in SDU_SETUP_REQ SDUs. When parsing them we want to
 * verify that there is a SDU handler for this curcuit. LMI_SRC_ULP
 * allows different ULPs on each end of a connection.
``` svc_utl.c

```
*/
struct ulptab *
svc_find_parsed_ulp()
{
   if (SVC_PARSED(LMI_ULP))
      return ulp_find(((struct lmi_ulp *) svc_glob->svc_parms[LMI_ULP].par_ptr)->af_pid,
         ((struct lmi_ulp *) svc_glob->svc_parms[LMI_ULP].par_ptr)->af_org);
   else
      return 0;
} struct svc_parm svc_parms[LMI_LAST_ELEMENT + 1] = {
   {"no_element", 0, 0}, {"relase_cause", 4, 0},
   {"ivpci", 4, 0}, {"ovpci", 4, 0},
   {"iqos_peak_bw", 4, 0}, {"iqos_ave_bw", 4, 0},
   {"iqos_peak_dur", 4, 0}, {"iqos_priority", 4, 0},
   {"oqos_peak_bw", 4, 0}, {"oqos_ave_bw", 4, 0},
   {"oqos_peak_dur", 4, 0}, {"oqos_proirity", 4, 0},
   {"ulp", sizeof(struct lmi_ulp), LMI_PAR_REFERENCE},
   {"user_info", 4, LMI_PAR_REFERENCE},
   {"config_enq", sizeof(struct config_elem), LMI_PAR_REFERENCE},
   {"port_address", sizeof(struct port_addr_elem), LMI_PAR_REFERENCE},
   {"config_resp", sizeof(struct config_elem), LMI_PAR_REFERENCE},
   {"dest_ulp", sizeof(struct lmi_ulp), LMI_PAR_REFERENCE},
   {"vc_status", 4, 0},
};
int       svc_parms_size = sizeof(svc_parms);

/*
 * svc_set_opts() extracts optional paramaters from xdu's and places
 * them in the svc_parms structure. The values in svc_parms are only
 * valid until svc_set_opts() is called again or the buffer being
 * parsed is modified or freed. svc_swap_opts() performs byte swap
 * operations on fields of the pdu which are not accessed via
 * add/get/set element macroes. Those macroes perform the byte
 * swapping as the pdus are built / parsed. svc_swap_pdu is called
 * immediately after a signaling pdu is received and just prior to
 * transmission. atm_addr structures are always kept in network
 * order so no swapping is required. atmarpmhash() is the only
 * routine which mucks about with atm_addr structures and it takes
 * responsibility for getting the bytes right. Only PDUs are swapped
 * from network order to host order.
 */ svc_set_opts(cp, left, valid_elems, swap_pdu)
   u_char     *cp;
{
``` svc_utl.c

```
    int         i;
    struct svc_parm *par;
    u_char      *ep = cp + left;

svc_glob->svc_parms_found = 0;
    if (swap_pdu)
        svc_swap_opts(cp, left);
    while (cp < ep) {
        if (*cp > LMI_LAST_ELEMENT ||
            (valid_elems & (1 << *cp)) == 0)
            return INVALID_MSG_ELEMENT;
        par = &svc_glob->svc_parms[*cp];
        if (left < par->par_size)
            return INVALID_MSG_ELEMENT;
        if (svc_glob->svc_parms_found & (1 << *cp)) {
            /* dup, just count and skip */
            if (++par->par_ndups <= par->par_max_dups)
                return INVALID_MSG_ELEMENT;
        } else {
            svc_glob->svc_parms_found |= (1 << *cp);
            par->par_ndups = 0;
            if (par->par_flags & LMI_PAR_REFERENCE)
                par->par_ptr = (caddr_t) cp;
            else
                LMI_GET_ELEMENT(cp, par->par_value, i);
        }
        if (*cp == LMI_USER_INFO) {
            i = cp[1];
            if (i > LMI_MAX_UINFO || cp + i > ep)
                return INVALID_MSG_ELEMENT;
            cp += ((2 + i + 3) / 4) * 4;
        } else
            cp += par->par_size;
    }
    return 0;
}

/*
 * svc_swap_opts() - this routine swaps all non lmi_parm elements.
 */ svc_swap_opts(cp, left)
    u_char      *cp;
    int         left;
{
    int         i, type;
    struct svc_parm *par;
    u_char      *ep = cp + left;

while (cp < ep) {
``` svc_utl.c

```c
    /* if af_type is invalid */
    if (*cp > LMI_LAST_ELEMENT)
        return INVALID_MSG_ELEMENT;
    par = &svc_glob->svc_parms[*cp]; /* get parm table
            * pointer for this type */ if (left < par->par_size)
        return INVALID_MSG_ELEMENT;  /* elem does not fit in
            * pdu */
    /*
    * Now switch on the af_type field and swap the
    * non-byte accesssed elements within the structure
    */
    type = *cp; /* get element type */
    if (type == LMI_ULP || type == LMI_DEST_ULP) {
        OS_REVERSE16(((struct lmi_ulp *) cp)->af_pid);
        OS_REVERSE32(((struct lmi_ulp *) cp)->af_org);
    } else if (type == LMI_CONFIG_ENQ || type == LMI_CONFIG_RESP) {
        OS_REVERSE16(((struct config_elem *) cp)->af_max_qos);
        OS_REVERSE32(((struct config_elem *) cp)->af_max_vci);
        OS_REVERSE32(((struct config_elem *) cp)->af_max_vcs);
    } else if (type == LMI_PORT_ADDR) {
        OS_REVERSE16(((struct port_addr_elem *) cp)->af_mid);
        OS_REVERSE16(((struct port_addr_elem *) cp)->af_mcasts);
        OS_REVERSE32(((struct port_addr_elem *) cp)->af_mtu);
    }
    if (*cp == LMI_USER_INFO) {
        i = cp[1];
        if (i > LMI_MAX_UINFO || cp + i > ep)
            return INVALID_MSG_ELEMENT;
        cp += ((2 + i + 3) / 4) * 4;
    } else
        cp += par->par_size;
    }
    return 0;
} char    *
svc_cause_to_str(cause)
{
    switch (cause) {
        case UASSIGNED_SRC_ADDR:return "UASSIGNED_SRC_ADDR";
    case UASSIGNED_DST_ADDR:
        return "UASSIGNED_DST_ADDR";
    case NO_DESTINATION_ROUTE:
        return "NO_DESTINATION_ROUTE";
    case VCI_UNACCEPTABLE:
        return "VCI_UNACCEPTABLE";
``` svc_utl.c

```c
        case NORMAL_RELEASE:
            return "NORMAL_RELEASE";
        case NO_ANSWER_FROM_USER:
            return "NO_ANSWER_FROM_USER";
        case VC_IDLE:
            return "VC_IDLE";
        case VC_REDUNDANT:
            return "VC_REDUNDANT";
        case NO_VCI_AVAIL:
            return "NO_VCI_AVAIL";
        case NETWORK_UNAVAIL:
            return "NETWORK_UNAVAIL";
        case TEMPORARY_FAILURE:
            return "TEMPORARY_FAILURE";
        case NO_RESOURCES:
            return "NO_RESOURCES";
        case QOS_UNAVAILABLE:
            return "QOS_UNAVAILABLE";
        case ULP_UNAVAILABLE:
            return "ULP_UNAVAILABLE";
        case INVALID_CALL_REF:
            return "INVALID_CALL_REF";
        case INVALID_SRC_ADDR:
            return "INVALID_SRC_ADDR";
        case INVALID_DST_ADDR:
            return "INVALID_DST_ADDR";
        case INVALID_MSG_ELEMENT:
            return "INVALID_MSG_ELEMENT";
        case ELEMENT_MISSING:
            return "ELEMENT_MISSING";
        case INVALID_STATE:
            return "INVALID_STATE";
        case INVALID_SIGVCI:
            return "INVALID_SIGVCI";
        case UNKNOWN_MSG:
            return "UNKNOWN_MSG";
        case UNSUPPORTED_SERVICE:
            return "UNSUPPORTED_SERVICE";
        case PROTOCOL_ERR:
            return "PROTOCOL_ERR";
        case NETWORK_TIMEOUT:
            return "NETWORK_TIMEOUT";
        case LMI_VERSION_CONFLICT:
            return "LMI_VERSION_CONFLICT";
        default:
            return "unknown cause";
    }
}
``` svc_utl.c

```c
/*
 * svc_log_new_state() maintains a circular buffer of VC state
 * information. The cause, time, call reference, port or card,
 * caller/callee addresses are logged. Logging may be disabled by
 * setiing svc_rlog to zero.
 */
int         svc_rlog_enabled = 1;

void
svc_log_new_state(vp, new_state)
    struct vcte   *vp;
{
    register struct svc_rlog *s;

if (!svc_rlog_enabled)
        return;
    s = (struct svc_rlog *) tr_get_entry(sizeof *s);
    if (!s)
        return;
    s->thdr.subsystem = SVC_STATE_LOG;
    s->thdr.sss = vp->vcte_pcif->pc_num;
    s->thdr.length = sizeof(*s);
    s->new_state = new_state;
    s->timeouts = vp->vcte_timeouts;
    s->old_state = vp->vcte_state;
    s->cref_type = vp->vcte_cref_type;
    s->cref_value = vp->vcte_cref_value;
    s->cause = vp->vcte_cause;
    s->caller = vp->vcte_local;
    s->callee = vp->vcte_peer;
    s->ipackets = vp->vcte_ipackets;
    s->opackets = vp->vcte_opackets;
    atm_settime(s->time);
    return;
} ifdef little_endian
svc_swap_pdu(pdu, len)
    struct xdu   *pdu;
    int          len;
{
    int          reason = 0;
    struct port_addr_elem *pae;
    int          j;

/*
     * All pdus have an lmi_hdr. The only thing in the header
     * that must be swapped is the u_long lmi_cref_value. Do it
     * now.
``` svc_utl.c

```c
    */
    OS_REVERSE32(pdu->lmi_cref_value);

/*
     * I think that I only need to convert LMI pdus vs SDU pdus.
     * I believe that SDU pdus are generated locally or are
     * modified versions of allready converted LMI pdus.
     */ switch (pdu->lmi_pdu_type) {
    case LMI_PDU_SETUP:
        /*
         * The setup pdu has an lmi_hdr (already swapped
         * above), two atm_addr (already in correct byte
         * order because they are written via byte accesses
         * and possible optional lmi_parms
         *
         */
    case LMI_PDU_CONNECT:
        /*
         * NOTE lmi_lvci and lmi_ovci are acctually treated
         * just like lmi_parms. Therefore swapped via
         * LMI_GET_ELEM and LMI_SET_ELEM. So ... just skip
         * over a setup size struct to get to "additonal"
         * opts.
         */
        svc_swap_opts((caddr_t) pdu + sizeof(struct setup),
            len - sizeof(struct setup));
        break;

case LMI_PDU_STATUS_ENQ:
    case LMI_PDU_STATUS_RESP:
    case LMI_PDU_CONNECT_ACK:
    case LMI_PDU_RELEASE_COMP:
    case LMI_PDU_RELEASE:
        /* status enq is just an lmi_hdr addtional opts    */ svc_swap_opts((caddr_t) pdu + sizeof(struct xdu),
            len - sizeof(struct xdu));
        break;
    default:
        break;
    }
    return;
}
#endif          /* little endian */
``` vlm.c

```c
/* vlm.c
 *
 * COPYRIGHT 1992 ADAPTIVE CORPORATION
 * ALL RIGHTS RESERVED
 */

* Description:
*           <Description of the general category of file contents>
* Routines:
*           <An OPTIONAL list summarizing the routines in this file>
****************************END****************************************/
#ifdef UNIX
#include <signal.h>
frap()
{
    print_my_tcb();
} main(argc, argv)
    int         argc;
    char        *argv[];
{
    EnvInit(argc, argv);
    OpenComm(MHW_GetSlotId(), GetGeneric());
    signal(SIGUSR1, frap);
    lm_main();
}
AAL_SAP_Create()
{
    return (1);
}

AAL_DataSendNR(key, data, len, prefix, atm_hdr)
    int         *key;
    short       *data;
    int         len;
    int         prefix;
    int         *atm_hdr;
{
    return (1);
}
#endif
```

We claim:
1. A communication system comprising,
an ATM network having a plurality of ports, each port having a unique port address, and said ATM network including one or more ATM switches for connecting sending ports having sending port addresses to receiving ports having receiving port addresses,
a plurality of stations, each station having a unique station address distinguishing the station from other stations, each station connected to the ATM network at one of said ports whereby source stations at said sending ports communicate with destination stations at said receiving ports, each station including,
packet means for providing packets for transferring information, said information including a destination station address for addressing one or a group of said destination stations,
packet converter means connected to said packet means for converting between packets and cells for transfers between stations,
address resolution means connected to the ATM network for determining a particular one or more of said receiving port addresses corresponding to said destination station address, said address resolution means including multicast means for multicasting said destination station address from a particular one of said source stations to a group of said destination stations, said multicast means including,
response means for providing said particular one or more of said receiving port addresses corresponding to said destination station address,
reply means for transmitting said particular one or more of said receiving port addresses to a sending port through said ATM network,
connection management means connected to receive said one or more receiving port addresses from said address resolution means for requesting connections through said ATM network connecting said sending ports to said receiving ports whereby packets are transferred from source stations to destination stations by cell transfers through said ATM network.

2. The system of claim 1 wherein said ATM network includes means for connecting a sending port to many receiving ports.

3. The system of claim 1 wherein said management means includes means for transfering configuration parameters between stations and said ATM network.

4. The system of claim 3 wherein said management means includes means for transfering multicast configuration parameters between stations and said ATM network.

5. The system of claim 1 wherein said management means includes means for transfering unicast configuration parameters between stations.

6. The system of claim 1 wherein said destination station address corresponds to a particular destination station of said group of destination stations and wherein said reply means includes,
means for establishing a port-to-port connection between said particular destination station at a receiving port and said particular one of said source stations at a sending port.

7. The system of claim 1 wherein,
in said multicast means,
said response means provides one of said particular one or more of said receiving port addresses for a particular destination station having said destination station address,
said reply means establishes a port-to-port connection between said particular destination station at a receiving port and said particular one of said source stations at a sending port, and
said management means includes means for transmitting cells between said particular one of said source stations and said particular destination station over said port-to-port connection.

8. A communication system comprising,
an ATM network having a plurality of ports, each port having a unique port address, and said ATM network including one or more ATM switches for connecting sending ports having sending port addresses to receiving ports having receiving port addresses,
a plurality of stations, each station having a unique station address distinguishing the station from other stations, each station connected to the ATM network at one of said ports whereby source stations at said sending ports communicate with destination stations at said receiving ports, each station including,
packet means for providing packets for transferring information, said information including a destination station address for addressing a group of said destination stations,
packet converter means connected to said packet means for converting between packets and cells for transfers between stations,
address resolution means connected to the ATM network for determining a particular one of said receiving port addresses corresponding to said destination station address, said address resolution means including multicast means for multicasting said destination station address from a particular one of said source stations to a group of said destination stations, wherein said group of destination stations that receive the multicast destination station address constitutes a local network,
connection management means connected to receive said particular one of said receiving port addresses from said address resolution means for requesting connections through said ATM network connecting said sending ports to said receiving ports whereby packets are transferred from source stations to destination stations by cell transfers through said ATM network,
local network management means for controlling which of said stations are included within said group of destination stations that receive the multicast destination station address.

9. The system of claim 8 wherein said local network management means includes a station table for storing station addresses for indicating which of said stations are included within the local network.

10. The system of claim 9 wherein said local network management means includes,
means for adding and deleting a station address to said station table for adding and deleting, respectively, a station to and from the local network.

11. The system of claim 8 wherein each particular station of said group of said destination stations includes,
means for communicating with said local network management means for communicating that said particular station is included in said local network.

12. The system of claim 8 wherein said local network management means includes a port table for indicating ports for said group of destination stations that constitute the local network.

13. The system of claim 12 wherein local network management means includes,
   means for adding and deleting a port address to said port table for indicating additions and deletions respectively, of said ports.

14. A communication system comprising,
   an ATM network having a plurality of ports, each port having a unique port address and said ATM network including an ATM switch for connecting sending ports having sending port addresses to receiving ports having receiving port addresses,
   a plurality of stations, each station having a unique station address distinguishing the station from other stations, each station connected to the ATM network at one of said ports whereby source stations at said sending ports communicate with destination stations at said receiving ports, each station including,
      packet means for providing packets for transferring information, said information including a destination station address for addressing one or a group of said destination stations,
      packet converter means connected to said packet means for converting between packets and cells for transfers between stations,
   identification means for identifying a plurality of groups of stations, each group constituting a local network of the stations in the group,
   address resolution means connected to the ATM network for determining a particular one or more of said receiving port addresses corresponding to said destination station address, said address resolution means including multicast means for multicasting said destination station address from a particular one of said source stations to a group of stations constituting a local network including the source station identified by said identification means, wherein said multicast means includes,
      response means for providing said particular one or more of said receiving port addresses corresponding to said destination station address,
      reply means for transmitting said particular one or more of said receiving port addresses to a sending port through said ATM network,
   connection management means connected to receive said receiving port addresses from said address resolution means for requesting connections through said ATM network to connect said sending ports to said receiving ports whereby packets are transferred from source stations to destination stations by cell transfers through said ATM network.

15. The system of claim 14 wherein said ATM network includes means for connecting a sending port to many receiving ports.

16. The system of claim 14 wherein said management means includes means for transfering configuration parameters between stations and said ATM network.

17. The system of claim 16 wherein said management means includes means for transfering multicast configuration parameters between stations and said ATM network.

18. The system of claim 14 wherein said management means includes means for transfering unicast configuration parameters between stations.

19. The system of claim 14 wherein said destination station address corresponds to a particular destination station of said group of stations including the source station and wherein said reply means includes,
   means for establishing a port-to-port connection between said particular destination station at a receiving port and said particular one of said source stations at a sending port.

20. The system of claim 14 wherein,
   in said multicast means,
      said response means provides one of said particular one or more of said receiving port addresses for a particular destination station having said destination station address,
      said reply means establishes a port-to-port connection between said particular destination station at a receiving port and said particular one of said source stations at a sending port, and
   said connection means includes means for transmitting cells between said particular one of said source stations and said particular destination station over said port-to-port connection.

21. The system of claim 14 wherein said ATM network includes,
   local network management means for controlling which of said stations are included within each of said groups of stations constituting a local network.

22. The system of claim 21 wherein said local network management means includes a port table for indicating ports for stations that are included within each of said groups of stations constituting a local network.

23. The system of claim 22 wherein said local network management means includes,
   means for adding and deleting a port address to said port table.

24. The system of claim 14 wherein said communication system includes,
   local network management means for transmitting said one or more receiving port addresses corresponding to said destination station address for each of the stations in each of said groups of stations constituting a local network.

25. The system of claim 24 wherein said local network management means includes station table means for storing station addresses for indicating which stations are included within each of said groups of stations constituting a local network.

26. The system of claim 25 wherein local network management means includes,
   means for adding and deleting station addresses to said station table means and thereby for indicating additions and deletions respectively, of stations to and from the groups of stations constituting a local network.

27. The system of claim 26 wherein local network management means includes,
   means for adding and deleting a station address to said station table means and thereby for indicating additions and deletions respectively, of one or more stations to and from a plurality of said groups of stations constituting a local network.

28. The system of claim 27 wherein each station includes,
   means for communicating with said local network management means for communicating ones of said groups of stations constituting a local network with which the station is associated.

29. The system of claim 27 wherein each station has a physical connection to a port of said ATM network and wherein said means for adding and deleting operates independently of the physical connection of each station.

30. The system of claim 25 wherein said station table means stores a particular one of said station addresses corresponding to a particular one of said stations to establish associations with a particular two or more of said groups of stations constituting a local network to indicate that said particular one of said stations is logically in each of said particular two or more of said groups of stations constituting a local network.

31. The system of claim 30 wherein said particular one of said stations is a bridge station connecting between said particular two of said groups of stations constituting a local network.

32. The system of claim 30 wherein said particular one of said stations is a router station connecting between said particular two of said groups of stations constituting a local network.

* * * * *